US007685063B2

(12) United States Patent
Schuchardt et al.

(10) Patent No.: US 7,685,063 B2
(45) Date of Patent: Mar. 23, 2010

(54) CLIENT-SERVER ARCHITECTURE FOR MANAGING CUSTOMER VEHICLE LEASING

(75) Inventors: Jeff D. Schuchardt, St. Louis, MO (US); Mark E. McDaris, Wildwood, MO (US)

(73) Assignee: The Crawford Group, Inc., St. Louis, MO (US)

( * ) Notice: Subject to any disclaimer, the term of this patent is extended or adjusted under 35 U.S.C. 154(b) by 1143 days.

(21) Appl. No.: 11/090,400

(22) Filed: Mar. 25, 2005

(65) Prior Publication Data

US 2006/0218085 A1 Sep. 28, 2006

(51) Int. Cl.
*G06Q 40/00* (2006.01)

(52) U.S. Cl. ............................ 705/38; 705/36; 705/37; 700/99

(58) Field of Classification Search ............. 705/35–45
See application file for complete search history.

(56) References Cited

U.S. PATENT DOCUMENTS 4,736,294 A 4/1988 Gill et al.

(Continued)

FOREIGN PATENT DOCUMENTS

EP 1724719 11/2006

(Continued)

OTHER PUBLICATIONS

Credit Risk in the Leasing Industry. Mathias Schmit. Journal of Banking & Finance 28 (2004) 811-833.*

(Continued)

*Primary Examiner*—Frantzy Poinvil
*Assistant Examiner*—Clifford Madamba
(74) *Attorney, Agent, or Firm*—Thompson Coburn LLP; Benjamin L. Volk, Jr.

(57) ABSTRACT

A system for managing a credit profile for a customer having a fleet of leased vehicles, the system comprising: (a) a client computer; (b) a server in communication with the client computer; and (c) a database in communication with the server, the database being configured to store a plurality of customer credit profiles, each customer credit profile comprising a credit limit for a customer and a leased vehicle limit for a customer, the credit limit corresponding to a maximum amount of monetary credit that has been authorized for extension to the customer, the leased vehicle limit corresponding to a maximum number of leased vehicles that are authorized for the customer's leased vehicle fleet; and wherein the server is configured to (1) provide a plurality of GUIs for display on the client computer, wherein at least one of the GUIs is configured to submit a request for a change to a customer's credit profile in response to user input, at least one of the GUIs is configured to display at least a portion of the customer's credit profile in response to user input, and at least one of the GUIs is configured to receive input from the user corresponding to an action to take on the submitted request, and (2) update the customer's credit profile in accordance with the action input. Also disclosed herein is a method for managing a credit profile for a customer having a fleet of leased vehicles.

52 Claims, 64 Drawing Sheets

U.S. PATENT DOCUMENTS

| | | | | |
|---|---|---|---|---|
| 4,934,419 | A | 6/1990 | Lamont et al. | |
| 5,262,941 | A | 11/1993 | Saladin et al. | |
| 5,704,045 | A | 12/1997 | King et al. | |
| 5,737,215 | A | 4/1998 | Schricker et al. | |
| 5,774,883 | A | 6/1998 | Andersen et al. | |
| 5,904,727 | A | 5/1999 | Prabhakaran | |
| 5,922,040 | A | 7/1999 | Prabhakaran | |
| 5,926,817 | A | 7/1999 | Christeson et al. | |
| H1830 | H | 1/2000 | Petrimoulx et al. | |
| 6,067,531 | A | 5/2000 | Hoyt et al. | |
| 6,192,347 | B1 | 2/2001 | Graff | |
| 6,243,643 | B1 | 6/2001 | Uematsu | |
| 6,298,333 | B1 | 10/2001 | Manzi et al. | |
| 6,347,302 | B1 | 2/2002 | Joao | |
| 6,502,080 | B1 | 12/2002 | Eichorst et al. | |
| 6,505,106 | B1 | 1/2003 | Lawrence et al. | |
| 6,526,392 | B1 | 2/2003 | Dietrich et al. | |
| 6,587,836 | B1 | 7/2003 | Ahlberg et al. | |
| 6,587,841 | B1 * | 7/2003 | DeFrancesco et al. | 705/38 |
| 6,609,108 | B1 | 8/2003 | Pulliam et al. | |
| 6,609,118 | B1 | 8/2003 | Khedkar et al. | |
| 6,622,129 | B1 | 9/2003 | Whitworth | |
| 6,654,726 | B1 | 11/2003 | Hanzek | |
| 6,701,232 | B2 | 3/2004 | Yamaki | |
| 6,725,201 | B2 | 4/2004 | Joao | |
| 6,728,685 | B1 | 4/2004 | Ahluwalia | |
| 6,785,658 | B1 | 8/2004 | Merker et al. | |
| 6,810,401 | B1 | 10/2004 | Thompson et al. | |
| 6,823,319 | B1 | 11/2004 | Lynch et al. | |
| 6,950,826 | B1 | 9/2005 | Freeman | |
| 6,952,680 | B1 | 10/2005 | Melby et al. | |
| 7,124,088 | B2 | 10/2006 | Bauer et al. | |
| 7,184,978 | B1 | 2/2007 | Tams et al. | |
| 7,283,972 | B2 | 10/2007 | Himes | |
| 2001/0034686 | A1 | 10/2001 | Eder | |
| 2001/0034690 | A1 | 10/2001 | Joseph | |
| 2001/0034700 | A1 | 10/2001 | Foss et al. | |
| 2001/0039525 | A1 | 11/2001 | Messmer et al. | |
| 2001/0049653 | A1 | 12/2001 | Sheets | |
| 2002/0016655 | A1 | 2/2002 | Joao | |
| 2002/0038272 | A1 | 3/2002 | Menchero | |
| 2002/0046143 | A1 | 4/2002 | Eder | |
| 2002/0049659 | A1 | 4/2002 | Johnson et al. | |
| 2002/0065690 | A1 | 5/2002 | Kusumoto | |
| 2002/0065698 | A1 | 5/2002 | Schick et al. | |
| 2002/0065707 | A1 | 5/2002 | Lancaster et al. | |
| 2002/0069143 | A1 | 6/2002 | Cepeda | |
| 2002/0072958 | A1 | 6/2002 | Yuyama et al. | |
| 2002/0077944 | A1 | 6/2002 | Bly et al. | |
| 2002/0082860 | A1 * | 6/2002 | Johnson | 705/1 |
| 2002/0082899 | A1 | 6/2002 | Aley | |
| 2002/0082966 | A1 | 6/2002 | O'Brien et al. | |
| 2002/0087378 | A1 | 7/2002 | Como | |
| 2002/0099618 | A1 | 7/2002 | Stiberman | |
| 2002/0107873 | A1 | 8/2002 | Winkler et al. | |
| 2002/0116236 | A1 | 8/2002 | Johnson et al. | |
| 2002/0116309 | A1 | 8/2002 | Keyes et al. | |
| 2002/0128864 | A1 | 9/2002 | Maus et al. | |
| 2002/0128985 | A1 | 9/2002 | Greenwald | |
| 2002/0138379 | A1 | 9/2002 | Yuasa et al. | |
| 2002/0143673 | A1 | 10/2002 | Hitchings et al. | |
| 2002/0147601 | A1 | 10/2002 | Fagan | |
| 2002/0152092 | A1 | 10/2002 | Bibas et al. | |
| 2002/0169658 | A1 | 11/2002 | Adler | |
| 2002/0171650 | A1 | 11/2002 | Prabhakaran | |
| 2002/0178080 | A1 | 11/2002 | Ly et al. | |
| 2002/0178129 | A1 | 11/2002 | Horimoto et al. | |
| 2002/0178147 | A1 | 11/2002 | Arroyo et al. | |
| 2002/0198797 | A1 | 12/2002 | Cooper et al. | |
| 2002/0198820 | A1 | 12/2002 | Mills | |
| 2003/0014352 | A1 | 1/2003 | Marzan | |
| 2003/0018551 | A1 | 1/2003 | Hanson et al. | |
| 2003/0023545 | A1 | 1/2003 | Hawkins et al. | |
| 2003/0033242 | A1 | 2/2003 | Lynch et al. | |
| 2003/0036891 | A1 | 2/2003 | Aragones et al. | |
| 2003/0036964 | A1 | 2/2003 | Boyden et al. | |
| 2003/0041012 | A1 | 2/2003 | Grey et al. | |
| 2003/0046179 | A1 | 3/2003 | Anabtawi et al. | |
| 2003/0046199 | A1 | 3/2003 | Murase et al. | |
| 2003/0055666 | A1 | 3/2003 | Roddy et al. | |
| 2003/0061137 | A1 | 3/2003 | Leung et al. | |
| 2003/0061158 | A1 | 3/2003 | Guy et al. | |
| 2003/0069837 | A1 | 4/2003 | Mills et al. | |
| 2003/0074296 | A1 | 4/2003 | Blanchard et al. | |
| 2003/0101087 | A1 | 5/2003 | Walker et al. | |
| 2003/0110112 | A1 | 6/2003 | Johnson et al. | |
| 2003/0120509 | A1 | 6/2003 | Bruch et al. | |
| 2003/0120586 | A1 | 6/2003 | Litty | |
| 2003/0126047 | A1 | 7/2003 | Hollar et al. | |
| 2003/0126048 | A1 | 7/2003 | Hollar et al. | |
| 2003/0126098 | A1 | 7/2003 | Hine et al. | |
| 2003/0130966 | A1 | 7/2003 | Thompson et al. | |
| 2003/0135447 | A1 | 7/2003 | Blanz et al. | |
| 2003/0139985 | A1 | 7/2003 | Hollar et al. | |
| 2003/0139993 | A1 | 7/2003 | Feuerverger | |
| 2003/0140057 | A1 | 7/2003 | Thomas et al. | |
| 2003/0154142 | A1 | 8/2003 | Ginsburg et al. | |
| 2003/0177133 | A1 | 9/2003 | Hikida | |
| 2003/0187765 | A1 * | 10/2003 | Sgaraglio | 705/35 |
| 2003/0200151 | A1 | 10/2003 | Ellenson et al. | |
| 2003/0216976 | A1 | 11/2003 | Ehrman et al. | |
| 2003/0216995 | A1 * | 11/2003 | DePauw et al. | 705/37 |
| 2003/0225643 | A1 | 12/2003 | Kakoschke | |
| 2003/0225707 | A1 | 12/2003 | Ehrman et al. | |
| 2004/0015394 | A1 | 1/2004 | Mok et al. | |
| 2004/0019516 | A1 | 1/2004 | Puskorius et al. | |
| 2004/0036716 | A1 | 2/2004 | Jordahl | |
| 2004/0039504 | A1 | 2/2004 | Coffee et al. | |
| 2004/0039678 | A1 | 2/2004 | Fralic | |
| 2004/0064393 | A1 | 4/2004 | Luenberger | |
| 2004/0073468 | A1 | 4/2004 | Vyas et al. | |
| 2004/0078318 | A1 | 4/2004 | Miller | |
| 2004/0088104 | A1 | 5/2004 | Izbicki et al. | |
| 2004/0111330 | A1 | 6/2004 | Stanton | |
| 2004/0122621 | A1 | 6/2004 | Vezzu et al. | |
| 2004/0133456 | A1 | 7/2004 | Nagelvoort | |
| 2004/0148241 | A1 | 7/2004 | Qi et al. | |
| 2004/0172227 | A1 | 9/2004 | Aragones | |
| 2004/0172304 | A1 | 9/2004 | Joao | |
| 2004/0186620 | A1 | 9/2004 | Chirnomas | |
| 2004/0215630 | A1 | 10/2004 | Parekh et al. | |
| 2005/0171900 | A1 | 8/2005 | Onneken | |
| 2005/0216385 | A1 | 9/2005 | Schneider | |
| 2005/0228756 | A1 | 10/2005 | Bealke et al. | |
| 2005/0234792 | A1 * | 10/2005 | Gagnon et al. | 705/36 |
| 2006/0265235 | A1 | 11/2006 | Schuchardt et al. | |

FOREIGN PATENT DOCUMENTS

| | | |
|---|---|---|
| WO | 2007062047 | 5/2007 |

OTHER PUBLICATIONS

Leasing and Credit Risk. Steve Grenadier. Journal of Financial Economics 42 (1996) 333-364.*

Enterprise Rent-A-Car Company; "Prosecution History U.S. Appl. No. 09/714,702;" Filed Nov. 16, 2000; Title: Apparatus And Method For Tracking And Managing Physical Assets; Applicant: J. Bly.

Enterprise Rent-A-Car Company; "Prosecution History U.S. Appl. No. 09/503,671;" Filed Feb. 14, 2007; Title: System And Method For Disposing Of Assets; Applicant: Brent Parent.

"AA0010: Lease Payment History", Oct. 1994.

"AA0165: Leasing Customer Lookup by Customer Number", Dec. 14, 1994.

"AA0175: Leasing Customer Lookup by Customer Name", Dec. 14, 1994.
"AA0177: Customer Sub-Company Lookup", Apr. 18, 1995.
"AA0200: Cash Receipts Display", Mar. 1992.
"AACH01: Leasing Customer Hierarchy Print", May 1993.
"AACM04: New Customer Numbering System (Master Company)", Mar. 31, 1998.
"AACM04: New Customer Numbering System (Sub-Company)", Mar. 31, 1998.
"AACM05: Lease Past Due Exemption", Jun. 1991.
"AACM06: GP Lease/Fleet Cust Add/Update", Apr. 1992.
"AALA01: Lease Settlement Adjustment Direct Entry", Apr. 8, 1997.
"AALD01: Lease Unit Settlement", Jun. 1996.
"AAUM14: Lease Extensions", Nov. 1994.
"Credit Policy—Reporting", 1996, 2 pages.
"Credit Review", 2004, 2 pages.
Edge Classic/Edge Powerbuilder, Design Documents, 1188 pages, 1999-2002—part 1.
Edge Classic/Edge Powerbuilder, Design Documents, 1188 pages, 1999-2002—part 2.
Edge Classic/Edge Powerbuilder, Design Documents, 1188 pages, 1999-2002—part 3.
Edge Classic/Edge Powerbuilder, Design Documents, 1188 pages, 1999-2002—part 4.
Edge Classic/Edge Powerbuilder, Design Documents, 1188 pages, 1999-2002—part 5.
Edge II Screens, 2002, 5 pages.
"Enhanced Fleet Services Web Site Is Hit With Customers", Free Enterprise, Spring 2004, 1 page.
"Enterprise Fleet Services: Analysis and Review for ABC Dry Cleaning Services", Date Prepared May 22, 2001, 19 pages.
"Fleet Profitability Analysis", 2000, 2 pages.
"Fleet Services: Credit Policy and Guidelines: Credit Approval Limits", 1999, 1 page.
"Fleet Services: Credit Policy and Guidelines: Guidelines for Credit Extension", 2000, pp. 1-4.
"Lease Management AS/400 Documentation of Original LM System", 1985-1995, pp. 1-42.

* cited by examiner

| Credit Review | | | | | |
|---|---|---|---|---|---|
| GPBR | Customer Name | Customer # | Last Review | Completed | Next Review |
| GPBR | The Company | 123456 | 11/18/2003 | 10/22/2004 | 10/1/2005 |

| Credit Limits | Credit Limit Amount | Veh Limit | Max Per Veh Amt | Max AME Amount | Maint Mgt Amt | RiskMgt Amount |
|---|---|---|---|---|---|---|
| Curr | 600,000 | 35 | 32,000 | 2,000 | 0 | 0 |
| Req | 1,200,000 | 51 | 32,000 | 2,000 | 0 | 0 |

| Standard Lease Term Depreciation % | 12 mo | 24 mo | 36 mo | 48 mo | 60 mo |
|---|---|---|---|---|---|
| Curr | 3.45 | 2.30 | 1.95 | 1.66 | 1.67 |
| Req | 3.45 | 2.30 | 1.95 | 1.66 | 1.67 |

| Credit Conditions | Credit Rating | Deposit Amt or % | Cap Price Amt or % | Req Mos Rent # | LOC | Bank Name | Direct Debit | LT&T Billed |
|---|---|---|---|---|---|---|---|---|
| Curr | 2 | 0 | 0 | 0 | No | | No | Yes |
| Req | 2 | 0 | 0 | 0 | No | | No | Yes |

Description of Company & Business
*(Include detailed company description and industry outlook)*

| | | | | | |
|---|---|---|---|---|---|
| **Year Company Started:** | 1979 | **Ownership Type:** | S-Corp | **Business Type:** | Construction |
| **Ownership Tenure Began:** | 1979 | | | **Management Tenure Began:** | 1979 |

The Company is a commercial steel erector in the United States and has been in business for 25 years. Sales have remained relatively flat over the past 3 years, but the industry appears to be rebounding and the Company has a solid name in the business.

Enterprise Relationship
*(Include payment history notes)*

| | | | | | |
|---|---|---|---|---|---|
| **Lessee Name:** | The Company | | **Guarantor Name:** | N/A | |
| **Customer Since:** | 5/20/1996 | **MTD Average Days to Pay:** | 3.12 | **PTD Average Days to Pay:** | 3.12 |
| **Curr Experian Score:** | 95.83 | **High Experian Score:** | 96.05 | **Low Experian Score:** | 76.13 |

The Company has a prompt pay history over the last 8 years.

Financial Condition (000's)
*(Include debt structure, covenant compliance and significant notes to financial statements)*

| | | | | | |
|---|---|---|---|---|---|
| **Financial Statement Period End:** | 12/31/2003 | **Financial Statement Type:** | Audited | | |
| **Sales:** | 21,419 | **Net Income / (Loss):** | 132 | **Operating Cash Flow:** | 215 |
| **Working Capital:** | 1,476 | **Intangibles:** | 0 | **Total Debt to Equity:** | 2.06 |
| **Equity:** | 2,150 | **Retained Earnings:** | 1,980 | **Net Equity:** | 2,150 |

The Company has a $2.0 million line of credit with interest payable at Prime with the balance outstanding as of 12/31/2003 of $936,000. The Company had $23.7 million in new contracts during 2003, compared to $18.7 million in 2002. Revenue recognized from long-term contracts is based on percentage of completion with backlog as of 12/31/2003 – i.e. the amount of revenue the Company expects to realize from work to be performed on uncompleted contracts – at $5.4 million.

Fleet Profile
*(Include method used to estimate projected fleet risk)*

Vehicle Use & Type

| Vehicle Type | Poten Units | Deliv Price Amt | AME Amount | Cap Price Red Amt | LT | Term | Annual Miles | Depr % | Total Gross / Unit Amt | Max Risk / Unit Amt | Max Risk (month) | Risk B/E (month) |
|---|---|---|---|---|---|---|---|---|---|---|---|---|
| Site Ford F-250 | 35 | 29,458 | 0 | 0 | E | 48 | 15,000 | 1.67 | 3,077 | 6,657 | 6 | 39 |
| Service Silverado | 16 | 26,780 | 0 | 0 | E | 48 | 15,000 | 1.67 | 2,824 | 6,075 | 6 | 39 |
| | | | | | | | | | | | | |
| | | | | | | | | | | | | |

Analysis of Fleet Risk During Next 12 Months

| | Current Fleet | Units to be Delivered | Units to Delete | Req Vehicle Limit |
|---|---|---|---|---|
| # of Units | 38 | 38 | 25 | 51 |
| Total (Risk) or Equity Amt | 50,931 | (246,564) | 123,940 | (319,573) |
| (Risk) or Equity Amt per Unit | 1,340 | (6,488) | 4,958 | (6,266) |

Projected fleet risk is based on estimates per Corporate Open-end Lease Exception Criteria. The Company is projected to take delivery of 13 additional and 25 renewal units during the next 12 months and has agreed to roll equity on all renewal units.

Figure 23(a)

Credit Review

| GPBR | Customer Name | Customer # | Last Review | Completed | Next Review |
|---|---|---|---|---|---|
| GPBR | The Company | 123456 | 11/18/2003 | 10/22/2004 | 10/1/2005 |

Financial Summary

| Financial Statement Type<br>Statement Period | Compiled<br>2003 | | Audited<br>2002 | | Reviewed<br>2001 | | Internal<br>2000 | | Tax Return<br>2000 | |
|---|---|---|---|---|---|---|---|---|---|---|
| **Operations (000's)** | | | | | | | | | | |
| Net Sales | 1,234,567 | 0% | 1,234,567 | 0% | 1,234,567 | 0% | 1,234,567 | 0% | 1,234,567 | 0% |
| Gross Margin | 1,234,567 | 0% | 1,234,567 | 0% | 1,234,567 | 0% | 1,234,567 | 0% | 1,234,567 | 0% |
| Interest Expense | 1,234,567 | 0% | 1,234,567 | 0% | 1,234,567 | 0% | 1,234,567 | 0% | 1,234,567 | 0% |
| Income Before Taxes | 1,234,567 | 0% | 1,234,567 | 0% | 1,234,567 | 0% | 1,234,567 | 0% | 1,234,567 | 0% |
| Net Income | 1,234,567 | 0% | 1,234,567 | 0% | 1,234,567 | 0% | 1,234,567 | 0% | 1,234,567 | 0% |
| | ======= | 100% | ======= | 100% | ======= | 100% | ======= | 100% | ======= | 100% |
| **Balance Sheet (000's)** | | | | | | | | | | |
| Cash & ST Investments | 1,234,567 | 0% | 1,234,567 | 0% | 1,234,567 | 0% | 1,234,567 | 0% | 1,234,567 | 0% |
| Accounts Receivable–Trade | 1,234,567 | 0% | 1,234,567 | 0% | 1,234,567 | 0% | 1,234,567 | 0% | 1,234,567 | 0% |
| Inventory | 1,234,567 | 0% | 1,234,567 | 0% | 1,234,567 | 0% | 1,234,567 | 0% | 1,234,567 | 0% |
| Total Current Assets | 1,234,567 | 0% | 1,234,567 | 0% | 1,234,567 | 0% | 1,234,567 | 0% | 1,234,567 | 0% |
| Net Fixed Assets | 1,234,567 | 0% | 1,234,567 | 0% | 1,234,567 | 0% | 1,234,567 | 0% | 1,234,567 | 0% |
| Intangibles | 1,234,567 | 0% | 1,234,567 | 0% | 1,234,567 | 0% | 1,234,567 | 0% | 1,234,567 | 0% |
| Total Assets | 1,234,567 | 0% | 1,234,567 | 0% | 1,234,567 | 0% | 1,234,567 | 0% | 1,234,567 | 0% |
| | ======= | 100% | ======= | 100% | ======= | 100% | ======= | 100% | ======= | 100% |
| Accounts Payable – Trade | 1,234,567 | 0% | 1,234,567 | 0% | 1,234,567 | 0% | 1,234,567 | 0% | 1,234,567 | 0% |
| Current Maturities | 1,234,567 | 0% | 1,234,567 | 0% | 1,234,567 | 0% | 1,234,567 | 0% | 1,234,567 | 0% |
| Total Current Liabilities | 1,234,567 | 0% | 1,234,567 | 0% | 1,234,567 | 0% | 1,234,567 | 0% | 1,234,567 | 0% |
| Long-term Debt | 1,234,567 | 0% | 1,234,567 | 0% | 1,234,567 | 0% | 1,234,567 | 0% | 1,234,567 | 0% |
| Total Liabilities | 1,234,567 | 0% | 1,234,567 | 0% | 1,234,567 | 0% | 1,234,567 | 0% | 1,234,567 | 0% |
| Preferred Stock | 1,234,567 | 0% | 1,234,567 | 0% | 1,234,567 | 0% | 1,234,567 | 0% | 1,234,567 | 0% |
| Retained Earnings | 1,234,567 | 0% | 1,234,567 | 0% | 1,234,567 | 0% | 1,234,567 | 0% | 1,234,567 | 0% |
| Total Equity | 1,234,567 | 0% | 1,234,567 | 0% | 1,234,567 | 0% | 1,234,567 | 0% | 1,234,567 | 0% |
| Total Liabilities & Equity | 1,234,567 | 0% | 1,234,567 | 0% | 1,234,567 | 0% | 1,234,567 | 0% | 1,234,567 | 0% |
| | ======= | | ======= | | ======= | | ======= | | ======= | |
| Net Equity | 1,234,567 | 100% | 1,234,567 | 100% | 1,234,567 | 100% | 1,234,567 | 100% | 1,234,567 | 100% |
| | ======= | | ======= | | ======= | | ======= | | ======= | |
| **Cash Flow / Burn (000)** | | | | | | | | | | |
| Depreciations & Amortization | 1,234,567 | | 1,234,567 | | 1,234,567 | | 1,234,567 | | 1,234,567 | |
| Cash Flow | 1,234,567 | | 1,234,567 | | 1,234,567 | | 1,234,567 | | 1,234,567 | |
| | ======= | | ======= | | ======= | | ======= | | ======= | |
| Capital Expenditures | 1,234,567 | | 1,234,567 | | 1,234,567 | | 1,234,567 | | 1,234,567 | |
| Amt From Sale of Capital Equip | 1,234,567 | | 1,234,567 | | 1,234,567 | | 1,234,567 | | 1,234,567 | |
| Cash Burn | 1,234,567 | | 1,234,567 | | 1,234,567 | | 1,234,567 | | 1,234,567 | |
| | ======= | | ======= | | ======= | | ======= | | ======= | |
| **Ratio Analysis (000)** | | | | | | | | | | |
| Working Capital | 1,234,567 | ↑ | 1,234,567 | | 1,234,567 | ↓ | 1,234,567 | ↑ | 1,234,567 | |
| Current Ratio | 1,234,567 | ↑ | 1,234,567 | ↓ | 1,234,567 | ↑ | 1,234,567 | ↓ | 1,234,567 | |
| Quick Ratio | 1,234,567 | | 1,234,567 | ↓ | 1,234,567 | | 1,234,567 | | 1,234,567 | |
| AR Turnover (Days) | 1,234,567 | ↑ | 1,234,567 | | 1,234,567 | ↓ | 1,234,567 | ↑ | 1,234,567 | |
| Inventory Turnover (Days) | 1,234,567 | ↑ | 1,234,567 | ↓ | 1,234,567 | ↑ | 1,234,567 | ↓ | 1,234,567 | |
| Total Debt/Equity | 1,234,567 | | 1,234,567 | ↓ | 1,234,567 | | 1,234,567 | | 1,234,567 | |
| Long Term Debt/Equity | 1,234,567 | ↑ | 1,234,567 | | 1,234,567 | ↓ | 1,234,567 | ↑ | 1,234,567 | |
| EBIT/Interest Expense | 1,234,567 | ↑ | 1,234,567 | ↓ | 1,234,567 | ↑ | 1,234,567 | ↓ | 1,234,567 | |

Figure 23(b)

| Credit Review | | | | | |
|---|---|---|---|---|---|
| GPBR | Customer Name | Customer # | Last Review | Completed | Next Review |
| GPBR | The Company | 123456 | 11/18/2003 | 10/22/2004 | 10/1/2005 |

| Vehicle Data | | | | | |
|---|---|---|---|---|---|
| Vehicle Data | Veh Type 1 | Veh Type 2 | Veh Type 3 | Veh Type 4 | Totals |
| User Entered Description | 2005 Ford F250 | 2005 Ford F150 | 2005 Ford Ranger | | |
| Fleet Potential | 64 | 8 | 8 | | 80 |
| Lease Type | Equity | Equity | Equity | | |
| Lease Term | 48 | 48 | 48 | | |
| Delivered Price Amt | 23,006 | 20,074 | 16,952 | | |
| Adjusted Standard Min Depreciation | 1.61% | 1.61% | 1.61% | | |
| As Quoted Depreciation | 1.50% | 1.50% | 1.50% | | |
| Total Lease Payment | 567.29 | 508.34 | 487.18 | | |
| 6 Month Wholesale Value Percent | 70% | 70% | 70% | | |
| | | | | | |
| Risk Analysis | | | | | |
| Estimated Mileage | Per Unit | | | | |
| Vehicle Age | 2005 Ford F250 | 2005 Ford F150 | 2005 Ford Ranger | | |
| 6 | 7,500 | 7,500 | 7,500 | - | |
| 12 | 15,000 | 15,000 | 15,000 | - | |
| 18 | 22,500 | 22,500 | 22,500 | - | |
| 24 | 30,000 | 30,000 | 30,000 | - | |
| 30 | 37,500 | 37,500 | 37,500 | - | |
| 36 | 45,000 | 45,000 | 45,000 | - | |
| 42 | 52,500 | 52,500 | 52,500 | - | |
| 48 | 60,000 | 60,000 | 60,000 | - | |
| 54 | - | - | - | - | |
| 60 | - | - | - | - | |
| 66 | - | - | - | - | |
| 72 | - | - | - | - | |
| Estimated Wholesale Value | Per Unit | | | | |
| Vehicle Age | 2005 Ford F250 | 2005 Ford F150 | 2005 Ford Ranger | | |
| 6 | 16,104 | 14,052 | 11,866 | - | |
| 12 | 15,000 | 12,902 | 10,896 | - | |
| 18 | 13,683 | 11,753 | 9,925 | - | |
| 24 | 13,200 | 10,604 | 8,954 | - | |
| 30 | 11,883 | 9,454 | 7,984 | - | |
| 36 | 10,566 | 8,305 | 7,013 | - | |
| 42 | 9,248 | 7,156 | 6,043 | - | |
| 48 | 6,883 | 6,006 | 5,072 | - | |
| 54 | - | - | - | - | |
| 60 | - | - | - | - | |
| 66 | - | - | - | - | |
| 72 | - | - | - | - | |
| Equity / (Risk) Summary | Per Unit | | | | Fleet Potential |
| Vehicle Age | 2005 Ford F250 | 2005 Ford F150 | 2005 Ford Ranger | | |
| 6 | (5,285) | (4,521) | (3,865) | - | (405,319) |
| 12 | (4,369) | (3,781) | (3,241) | - | (335,800) |
| 18 | (3,563) | (2,954) | (2,543) | - | (271,994) |
| 24 | (1,820) | (2,039) | (1,771) | - | (146,953) |
| 30 | (808) | (1,037) | (924) | - | (67,383) |
| 36 | 307 | 52 | (4) | - | 20,016 |
| 42 | 1,525 | 1,230 | 991 | - | 115,351 |
| 48 | 1,798 | 2,494 | 2,060 | - | 151,511 |
| 54 | - | - | - | - | - |
| 60 | - | - | - | - | - |
| 66 | - | - | - | - | - |
| 72 | - | - | - | - | - |

Figure 23(c)

| Credit Review | | | | | |
|---|---|---|---|---|---|
| GPBR | Customer Name | Customer # | Last Review | Completed | Next Review |
| GPBR | The Company | 123456 | 11/18/2003 | 10/22/2004 | 10/1/2005 |

| Approval History | | | |
|---|---|---|---|
| Approver Name | Action Date | Action | Notes |
| Prepared By | 9/13/2004 | Submit For Approval | |
| RSM | 9/13/2004 | Review | |
| GSM | 9/14/2004 | Review | |
| Fleet BM | 9/14/2004 | Review | |
| Group VP | 9/15/2004 | Review | |
| GM | 9/15/2004 | Review | |
| Corp | 9/18/2004 | Final Approval | |

Figure 23(d)

CLIENT-SERVER ARCHITECTURE FOR MANAGING CUSTOMER VEHICLE LEASING

FIELD OF THE INVENTION

The present invention relates to an improved client-server system for managing customer vehicle leases. In particular, the present invention relates to an improved web-enabled client-server system for managing the customer's credit in connection with customer vehicle leases.

BACKGROUND AND SUMMARY OF THE INVENTION

At any given time, a fleet management company may lease numerous vehicles to a plurality of customers for use in the customers' respective vehicle fleets. For example, a given company may lease several vehicles for use by its sales personnel. Another company may lease vehicles not only for use by its sales personnel but also for use by its field service personnel. Yet another company may lease vehicles not only for use by its sales personnel and field service personnel, but also for its executives. A fleet management company may be hired by these companies to manage the companies' leased vehicle fleets. The types of vehicles being leased and the types of leases may vary not only from customer company to customer company, but also within a single customer company. For many customers, both large and small, the needs of their leased vehicle fleets are complex and constantly shifting over time, which inevitably creates complex management issues for fleet managers who are tasked with making management decisions for multiple customers, each of which has its own unique fleet of leased vehicles.

Among the issues that face fleet managers is the delicate matter of determining appropriate credit limits for a customer in connection with that customer's leased vehicle fleet. By allowing customers to lease too many vehicles, a fleet manager may create a situation where the customer's ability to meet its lease payment obligations is threatened. At the same time, by placing too many limits on a customer's leasing ability, a fleet manager may not only alienate the customer but also negatively impact the fleet management company by not realizing the full business potential of the fleet manager's relationship with that customer. It is often the case that the standard credit reports provided by third vendors are insufficient to meet the needs of fleet managers who are assessing the credit to be extended to lease customers.

These issues become particularly acute for fleet managers in connection with customers that are small to medium-sized businesses. Unlike large corporations, financial information about small to medium-sized businesses can be harder to obtain. Furthermore, the margin of error for fleet managers when making decisions on how much credit to extend to small businesses or medium-sized businesses is often less comfortable than it is with respect to large companies because the funds available to such businesses to pay leasing costs are typically significantly less than the funds that a large corporation can access. As such, the inventors herein believe that a tool is needed that allows fleet managers to conduct detailed assessments of their customers' credit profiles so that those fleet managers can make more informed decisions when extending credit to their customers.

In a previous system operated by the assignee of the present invention, fleet managers did not have access to an integrated tool that provided those fleet managers with detailed views of their customers' financial situations and fleet investments and from which those fleet managers could assess a customer's credit situation. For example, no standardized technique was used to determine the risk associated with each customer's fleet. Each fleet manager was essentially free to make independent decisions with respect to his/her customer's credit situation. Moreover, the acquisition and display of customer financial data was not uniform; no standardized technique was available to identify the reliability of the customer financial data. Moreover, this system was limited in the degree to which it could communicate the reliability of the customer's stored financial information in that the system only noted whether financial statements or tax returns were available for the customer (and for how many previous years this data was available). No indicators were systematically provided as to the reliability of that financial data.

In an effort to meet the delicate credit profile management needs for managers of leased vehicle fleets, disclosed herein is an integrated system that provides fleet managers with efficient access to vast stores of financial information about a customer and further allows fleet managers with multiple levels of approval authority to submit requests for changes to a customer's credit profile, review those requests, and take final actions on such requests (i.e., approve or reject the requests). Credit reviews are performed in the context of projected leased vehicle needs of the customer to enable a determination of whether the customer's credit profile supports those needs. The inventive system preferably also allows fleet managers to perform periodic reviews of a customer's credit profile.

Through use of the invention which provides the set of graphical user interfaces (GUIs) disclosed herein, users of the present invention can obtain valuable and detailed views of specific aspects of the customer's various credit limits, the customer's current fleet of leased vehicles, the customer's projected fleet needs, the risk associated with both the customer's current fleet and projected fleet, as well as a wide array of financial information about the customer. Through use of the information displayed in these GUIs, fleet managers can make informed decisions when extending credit to customers.

As such, according to one aspect of the present invention, disclosed herein is a system for managing a credit profile for a customer having a fleet of leased vehicles, the system comprising: (a) a client computer; (b) a server in communication with the client computer; and (c) a database in communication with the server, the database being configured to store a plurality of customer credit profiles; and wherein the server is configured to (1) provide a plurality of GUIs for display on the client computer, wherein at least one of the GUIs is configured to submit a request for a change to a customer's credit profile in response to user input, at least one of the GUIs is configured to display at least a portion of the customer's credit profile in response to user input, and at least one of the GUIs is configured to receive input from the user corresponding to an action to take on the submitted request, and (2) update the customer's credit profile in accordance with the action input. As used herein, the term "credit profile" refers to stored data about a customer company's creditworthiness in connection with vehicle leasing, and includes at least a credit limit corresponding to a maximum amount of monetary credit that has been authorized for extension to the customer and a leased vehicle limit corresponding to a maximum number of leased vehicles that are authorized for the customer's leased vehicle fleet. However, in addition to these fields, the credit profile may also include other limits placed on customers (e.g., a per vehicle credit limit, a per vehicle aftermarket equipment (AME) credit limit, a maximum maintenance management amount, and a maximum risk management amount), as described in greater detail below. The increased number of such limits is believed to be particularly valuable when making decisions in connection with extending credit to small and medium-sized customers.

According to another aspect of the present invention, disclosed herein is a method for managing a credit profile for a customer having a fleet of leased vehicles, the method comprising: (a) providing at least one GUI through which a user can submit a request to review a proposed change to a customer's stored credit profile; (b) providing at least one GUI through which a user can view data stored in a customer's credit profile in response to a submitted credit review request; (c) providing at least one GUI through which a user can provide input corresponding to an approval or rejection of the credit profile change request; and (d) updating the customer's stored credit profile in accordance with the user's approval or rejection input.

According to yet another aspect of the present invention, the financial information about the customer that may be stored in each customer's credit profile is preferably accompanied by an identifier that indicates the level of scrutiny that was applied to that financial information, preferably by an external auditor. Preferably a plurality of identifiers exist, each of which corresponds to a different level of scrutiny. These financial information scrutiny indicators are particularly valuable in connection with managing the credit profiles for customers that are smaller in scale than typical large corporations. For many small to medium-sized businesses, fully audited financial statements are not always readily available, but credit decisions will nevertheless have to be made. By providing the scrutiny indicators for customer financial information discussed above, fleet managers are provided with the ability to make better informed decisions when extending credit to their customers.

The method preferably further comprises providing at least one GUI through which a user can selectively choose to request a change in either or both of the customer's credit limit and the customer's vehicle limit, and optionally other credit profile parameters as disclosed in greater detail below.

These and other feature of the invention will be in part apparent and in part pointed out to those of ordinary skill in the art upon a review of the teachings herein. The below described preferred embodiment is meant to be illustrative of the invention and not limiting. Instead the invention is intended to be limited only by the claims and their legal equivalents.

BRIEF DESCRIPTION OF THE DRAWINGS

FIGS. 23(*a*)-(d) illustrate an exemplary credit report produced by the preferred embodiment of the present invention;

DETAILED DESCRIPTION OF THE PREFERRED EMBODIMENT

Figure 1:
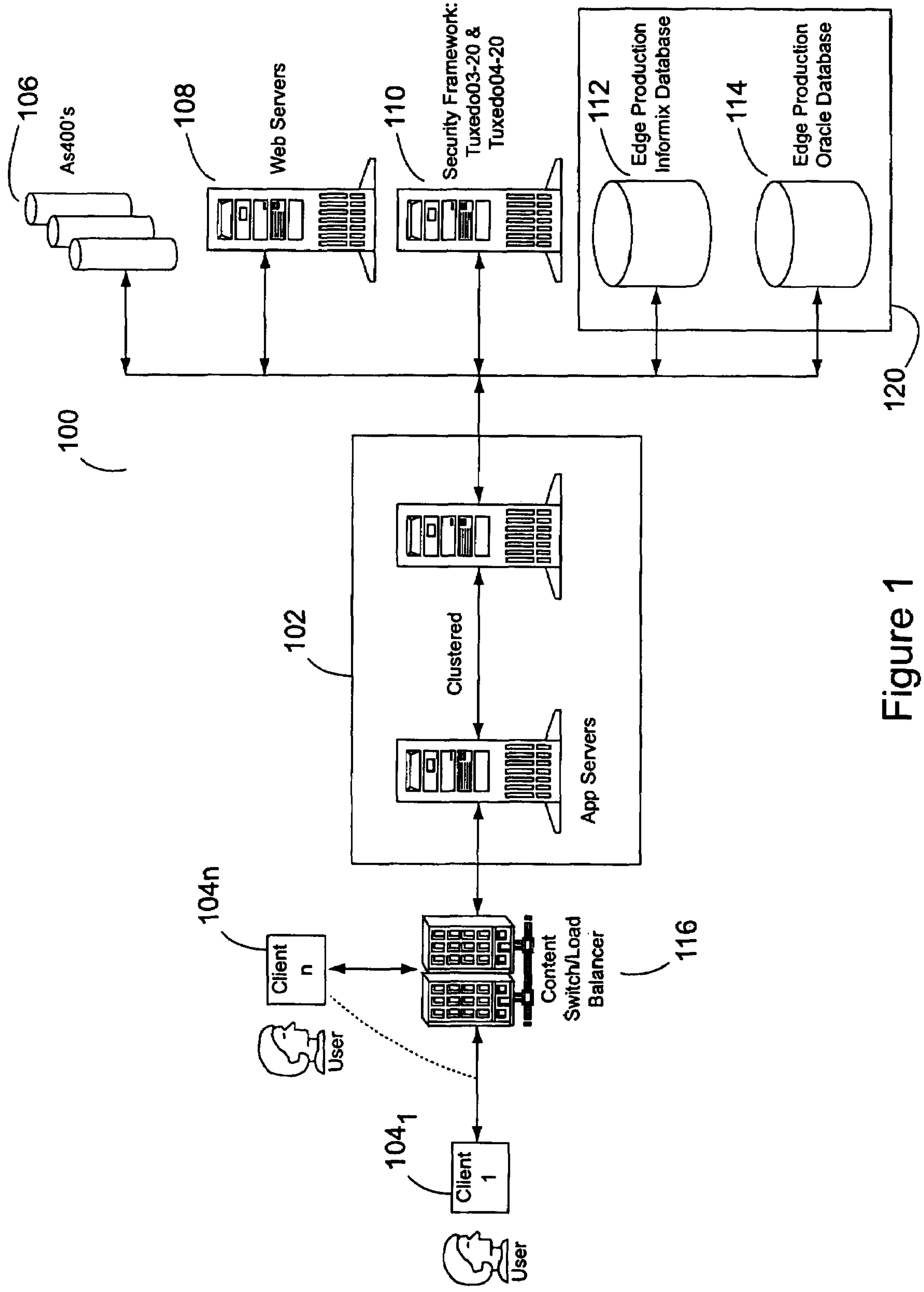
FIG. 1 illustrates a preferred hardware environment for the preferred embodiment of the present invention.

FIG. 1 depicts a suitable hardware architecture for the preferred embodiment of the present invention. The system 100 comprises an application server 102 (preferably clustered servers) in communication with, at the front end, a plurality of client computers $\mathbf{104}_1$ through $\mathbf{104}_n$ (preferably via a content switch/load balancer 116 that acts as a network traffic cop as is known in the art). The client computers 104 can interconnect with the application server 102 via any known technique for data communication, although a local area network (LAN) connection such as with an intranet is preferred. At the back end, the application server 102 is preferably in communication with one or more databases and other servers via TCP/IP over an Ethernet connection. Once again, any known technique for data communication can be used by the application server 102 to communicate with the one or more databases and backend servers.

Application server 102 can preferably access database 120, wherein database 120 is preferably configured to store the customer credit profiles and data related thereto, such as data about the customer's current and planned leased vehicle fleets, including but not limited to data such as quote data and order data for each customers fleet. Database 120 may comprise one or more databases. As shown in FIG. 1, database 120 comprises a database 112 in which the majority of the customer data is stored and a database 114 in which vehicle-specific data from a third party provider such as Autodata is stored. Database 112 may be an Informix production database on a Sun E4500 running Solaris 2.6 and database 114 may be an Oracle production database on an IBM RS6000 running AIX 5.2. If desired, the data stored in databases 112 and 114 can be combined into a single Oracle database. However, it should be understood by those of ordinary skill in the art that still other data storage arrangements could be used. For example, the data stored in databases 112 and 114 could be stored in several distributed databases.

The application server 102 may also be in communication with a plurality of AS/400's 106, which are preferably configured to maintain vehicle information for leased vehicles from activation through lease deletion. Furthermore, the application server may also be in communication with one or more web servers 108. which are preferably configured to access any vehicle image data that may be needed, as well as a security framework system 110. The security framework server 110 preferably is configured to control which users have access to which GUIs as well as what actions each user can take on each GUI. As explained in greater detail below, this security is preferably based on assigned security clearances for various users.

Preferred hardware for the application server 102 and web servers 108 comprise IBM RS6000 servers running AIX 5.2. Preferred hardware for the client computers 104 are standard desktop PCs. Preferred hardware for the content switch/load balancer 116 is a Cisco 11503 running a 5.0.0 OS. Preferred hardware for the AS/400s 106 are IBM AS/400s. Preferred hardware for the security framework system servers 110 are HP Proliant DL360 G3 servers running Windows 2000. However, it should be understood by those having ordinary skill in the art that any of a number of hardware platforms are also suitable for use in the practice of the present invention depending on the processing needs and resources that are available to a practitioner of the present invention. Moreover, system configurations other than that shown in FIG. 1 may also be used in the practice of the present invention.

Application servers 102 preferably execute credit management software that allows users of the client computers 104 to interact with the various databases on the backend of system 100 and manage the credit profile of a customer who leases a fleet of vehicles from one or more lessors. Preferably the client computer users are employees of a fleet management company, which is preferably also the lessor of the leased vehicles. However, this need not be the case as the lessor could be one or more outside entities. Through software installed on the client computers 104 (preferably standard browser software), the client computer users can access the credit management software to manage lease customers' credit profiles via a plurality of interactive graphical user interfaces (GUIs) that are displayed on the client computer by the credit management software.

As explained in greater detail in connection with FIGS. 2-23(*d*) and the enclosed exhibits, this credit management software allows the client computer users to, among other things, efficiently evaluate the creditworthiness of lease customers, submit requests for changes in a lease customer's credit profile, and approve or reject such submitted requests.

Figure 2:
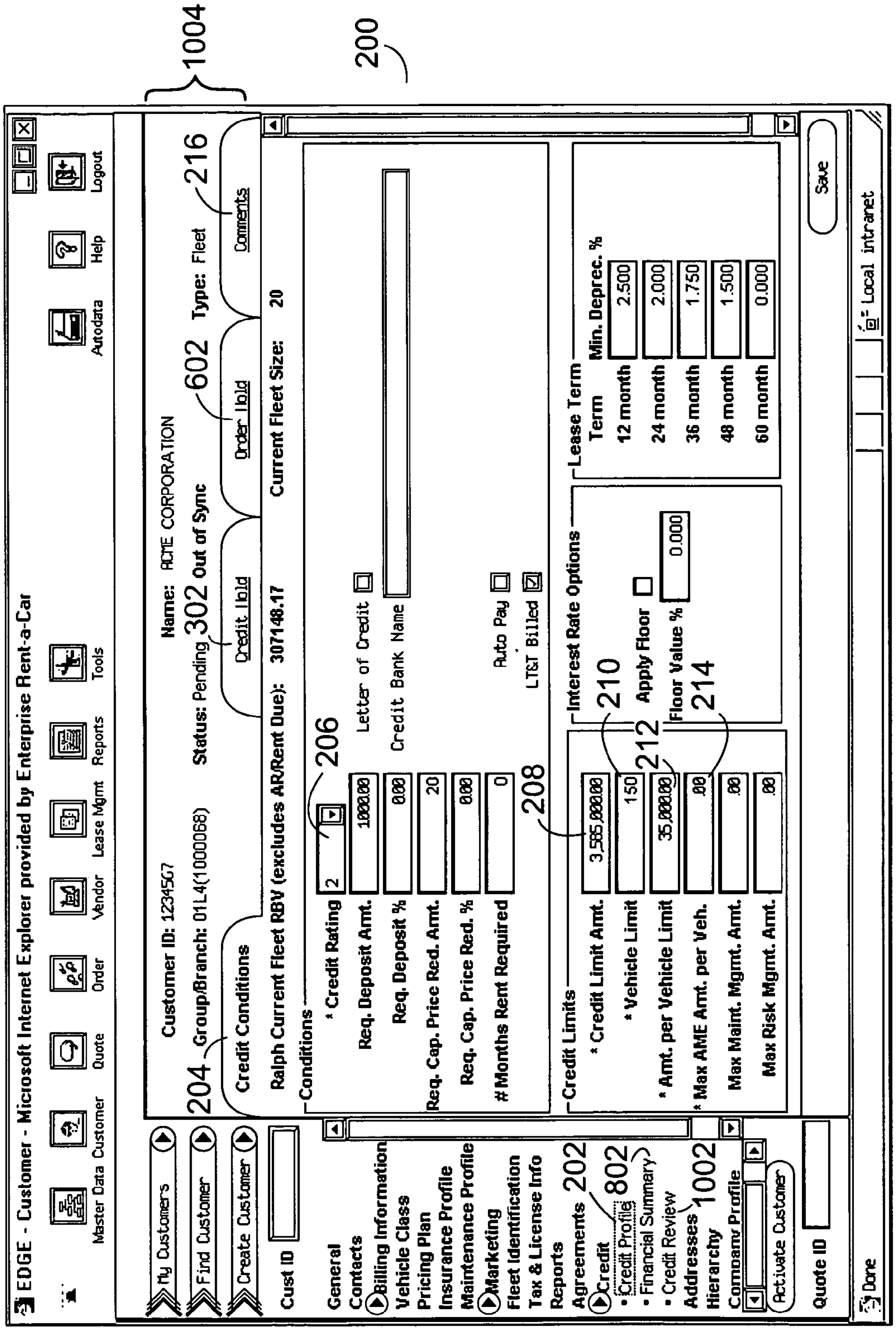
FIG. 2 illustrates an exemplary preferred credit conditions page.

FIGS. 2-7 depict various preferred GUI pages through which the user can create and revise a customer's credit profile as well as place and release various holds on the customer's credit and ability to order new leased vehicles. These pages can be accessed by the user upon selection of the "credit profile" link 202 displayed on the left hand side of the GUIs. Page 200 of FIG. 2 is displayed after user selection of the credit conditions folder tab 204. For customers that do not already have a credit profile stored in database 120, page 200 allows the user to enter data for the various fields shown to establish the customer's credit profile. These fields include a credit rating 206 for the customer (preferably an integer value between 1 and 3, with "1" representing a best rating for the customer's creditworthiness, with "3" representing a worst rating for the customer's creditworthiness, and with "2" representing a middle rating for the customer's creditworthiness). However, it should be understood that other rating scales could readily be used in the practice of the present invention. The customer's credit rating controls the level of scrutiny that is applied to orders for leased vehicles placed by a customer; preferably, the better the credit rating, the less scrutiny that is applied and the poorer the credit rating, the more scrutiny that is applied. The fields also include a credit limit amount 208 which represents a maximum amount of credit that can be extended to the customer. In the context of vehicle lease management, this credit limit amount effectively translates to the maximum sum of the delivered prices (or capitalized prices) for the customer's leased vehicles based on the customer's needs over a 12 month period. The fields on page 200 also include a vehicle limit 210, which represents the maximum number of leased vehicles that are authorized by the credit profile for the customer's fleet. Additional fields on page 200 include a value 212 that represents that maximum amount of risk allowed by the credit profile for any given vehicle in the customer's fleet and a value 214 that represents a maximum amount of risk allowed by the credit profile for the aftermarket equipment (AME) added to any given vehicle in the customer's fleet. Additional fields on page 200 include a required deposit amount which represents per vehicle security deposit amount, a required deposit percentage which represents a per vehicle percentage of a delivered vehicle's invoice price that is to be used as a security deposit, a required capitalized price reduction amount which represents money paid down, per vehicle, by the customer that reduces the vehicles' delivered prices, a maximum required capitalized price reduction percentage which represents a percentage of money paid down, per vehicle, by the customer that goes toward reducing the vehicles' delivered prices, the number of months of rent required which is essentially an alternate form of sizing the customer's security deposit, whether a letter of credit from a financial institution (bank) is required, the name of the financial institution providing the letter of credit, whether direct debit is to be used, whether license, tax, and title (LT&T) is to be billed, a maximum maintenance management amount which represents a maximum number of customer vehicles for which the fleet management company will cover maintenance costs with unsecured credit (e.g., providing costs to cover maintenance services for vehicles that the customer possesses but are unsecured vis-à-vis the fleet management company, and a maximum risk management amount which represents a maximum number of customer vehicles for which the fleet management company will provide risk management services with unsecured credit, whether an interest rate floor is to be applied, and a percentage for the floor interest rate percentage, and the 12/24/36/48/60 month depreciation percentage values for the lease term. Page 200 may also include a field for indicating whether equity rollover is required. Page 200 also preferably displays, in a display-only format, the overall reduced book value (RBV) for the customer's current fleet of leased vehicles (preferably excluding any account receivable rent that is due) and the number of leased vehicles in the customer's current fleet.

Once the customer's credit profile has been created, page 200 preferably becomes display-only, with any changes to the customer's credit profile being initiated through the credit review process described below in connection with FIGS. 10-22. However, this need not be the case.

Figure 3:
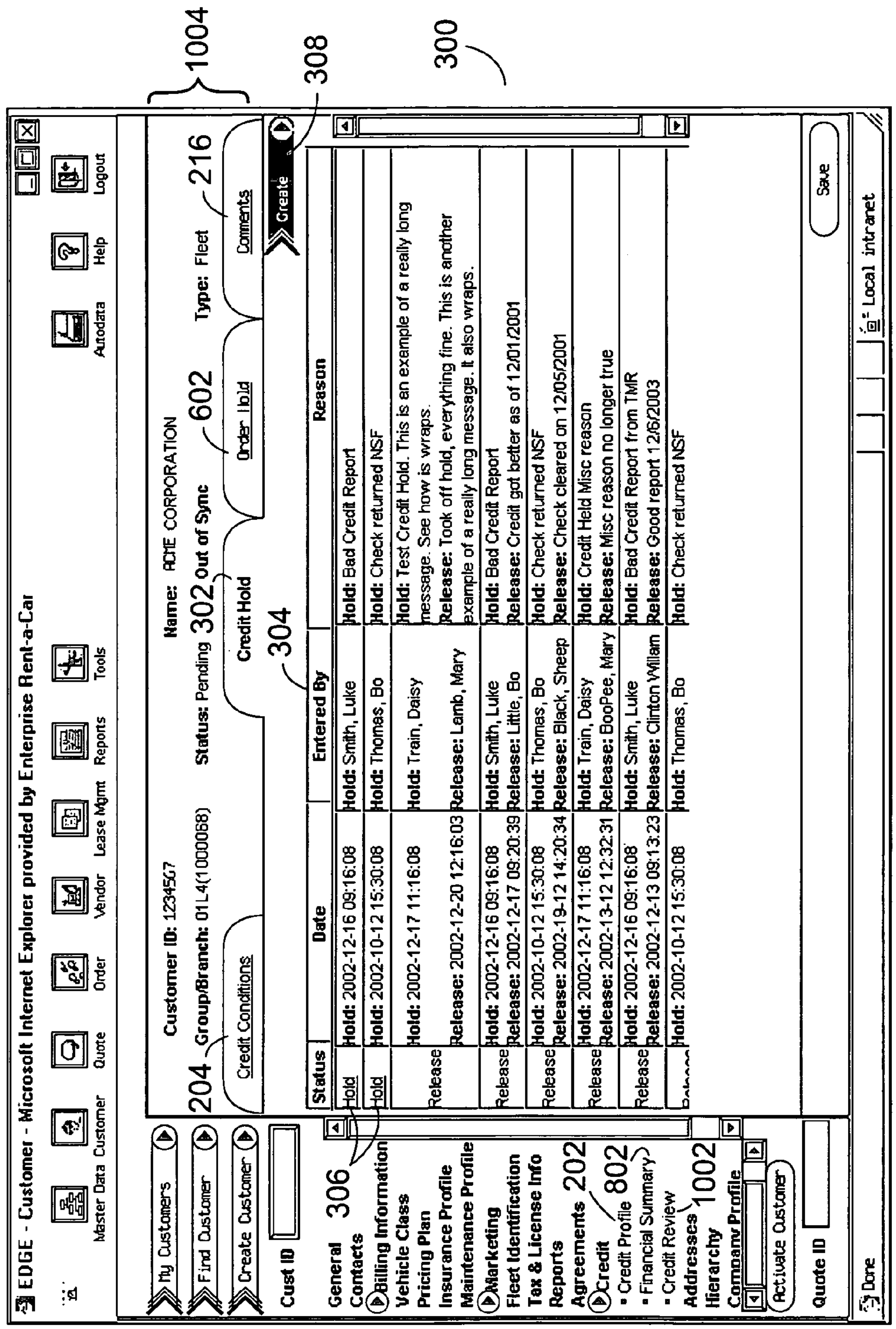
FIG. 3 illustrates an exemplary preferred credit hold summary page.

Page 300 of FIG. 3 is displayed after user selection of the credit hold folder tab 302. Page 300 preferably displays a table 304 that summarizes the credit hold history for the customer. A credit hold represents a decision by the fleet management company to no longer provide new quotes or place orders for a given customer. Credit holds are typically put in place if a fleet manager has significant credit concerns about the customer. Credit holds can be released by fleet managers with appropriate authority based on the fleet manager's assessment of the customer's financial situation. Table 304 preferably displays not only current credit holds (whose status is indicated in table 304 by the "hold" link 306), but also previous credit holds (whose status is indicated in table 304 with the "release" denomination). Table 304 preferably also identifies, for each credit hold, the hold creation date (and release date where applicable), the name of the user who created the credit hold, and the reason that the credit hold was created. Links 306 are preferably provided in table 304 to call up, upon user selection, a page that allows the user to take an action (such as a release action or a maintain hold action) on a given credit hold. Furthermore, create button 308 is preferably provided for user selection to create a new credit hold for the customer.

Figure 4:
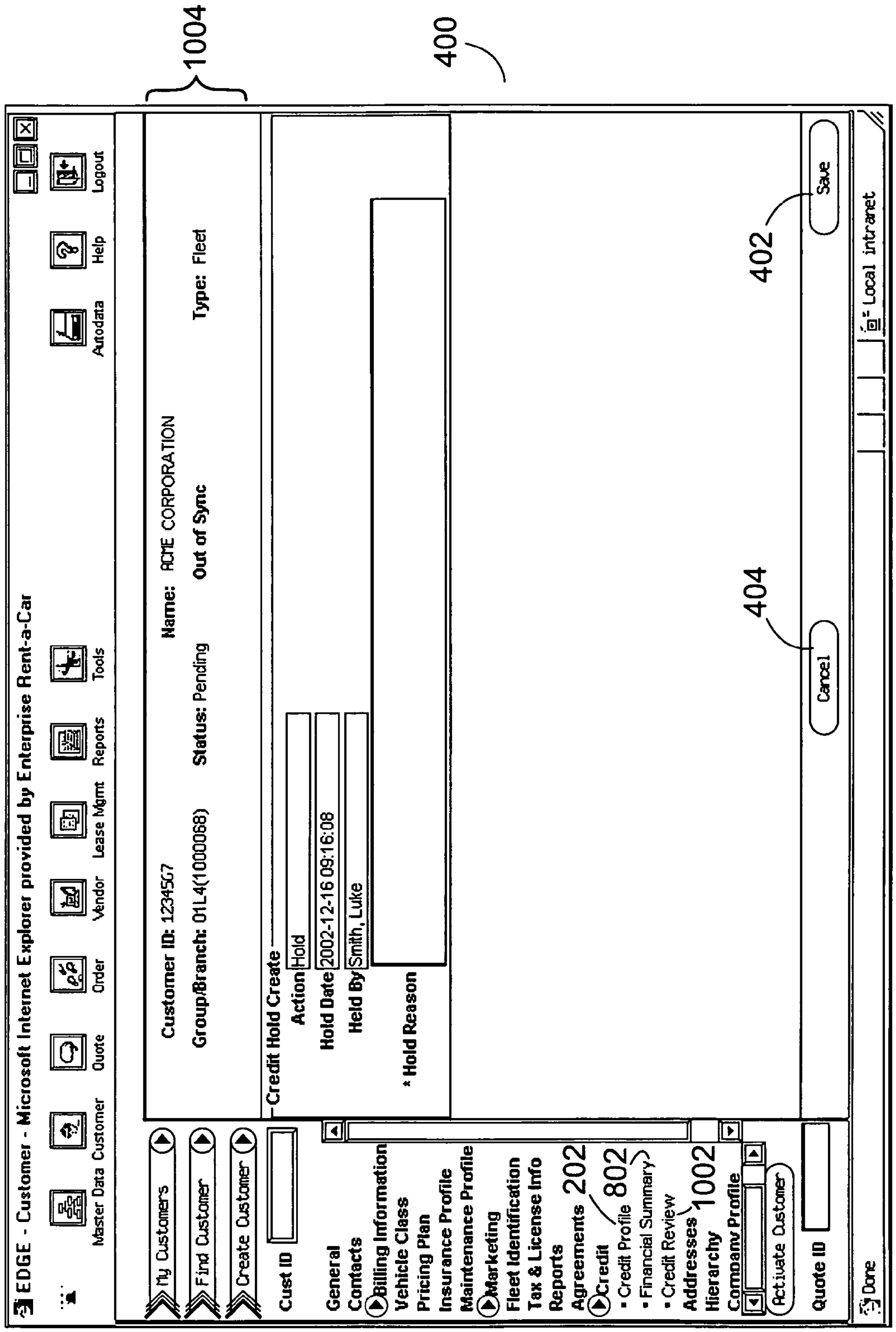
FIG. 4 illustrates an exemplary preferred credit hold creation page.

Page 400 of FIG. 4 is preferably displayed upon user selection of the create button 308 on page 300. Page 400 is a create credit hold GUI. Page 400 preferably identifies that the user intends to create a credit hold, displays the name of the user creating the credit hold, and displays the current date in a display-only fashion. Another field is preferably provided for user entry of the reason why the credit hold is being created. After the user has entered such a reason on the page, the user can select the save button 402 to save the credit hold in the system. Alternatively, the user can choose to not create the credit hold by selecting the cancel button 404.

Figure 5:
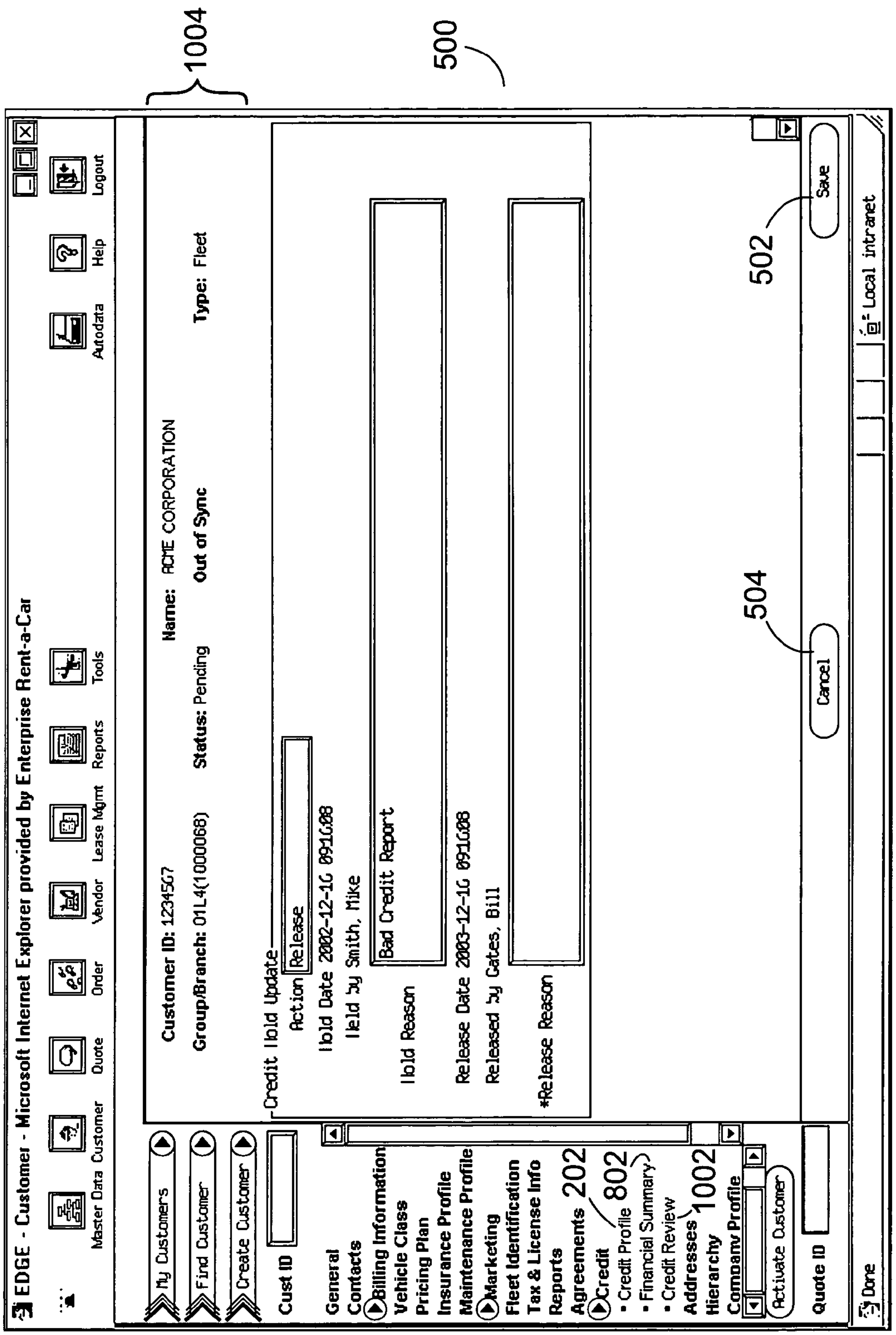
FIG. 5 illustrates an exemplary preferred credit hold update page.

Page 500 of FIG. 5 is preferably displayed upon user selection of a hold link 306 on page 300. Page 500 is a create credit hold update GUI that allows the user take action on the existing credit hold that corresponds to the link 306 selected in table 304. Page 500 preferably identifies that the user intends to release a credit hold, displays the date on which the credit hold was created, displays the name of the user who created the credit hold, displays the reason why the credit hold was created, displays the name of the user releasing the credit hold, and displays the current date in a display-only fashion. Another field is preferably provided for user entry of the reason why the credit hold is being released. After the user has entered a reason for the release on the page, the user can select the save button 502 to save the credit hold release in the system. Alternatively, the user can choose to maintain the credit hold by selecting the cancel button 504 rather than the save button 502.

Figure 6:
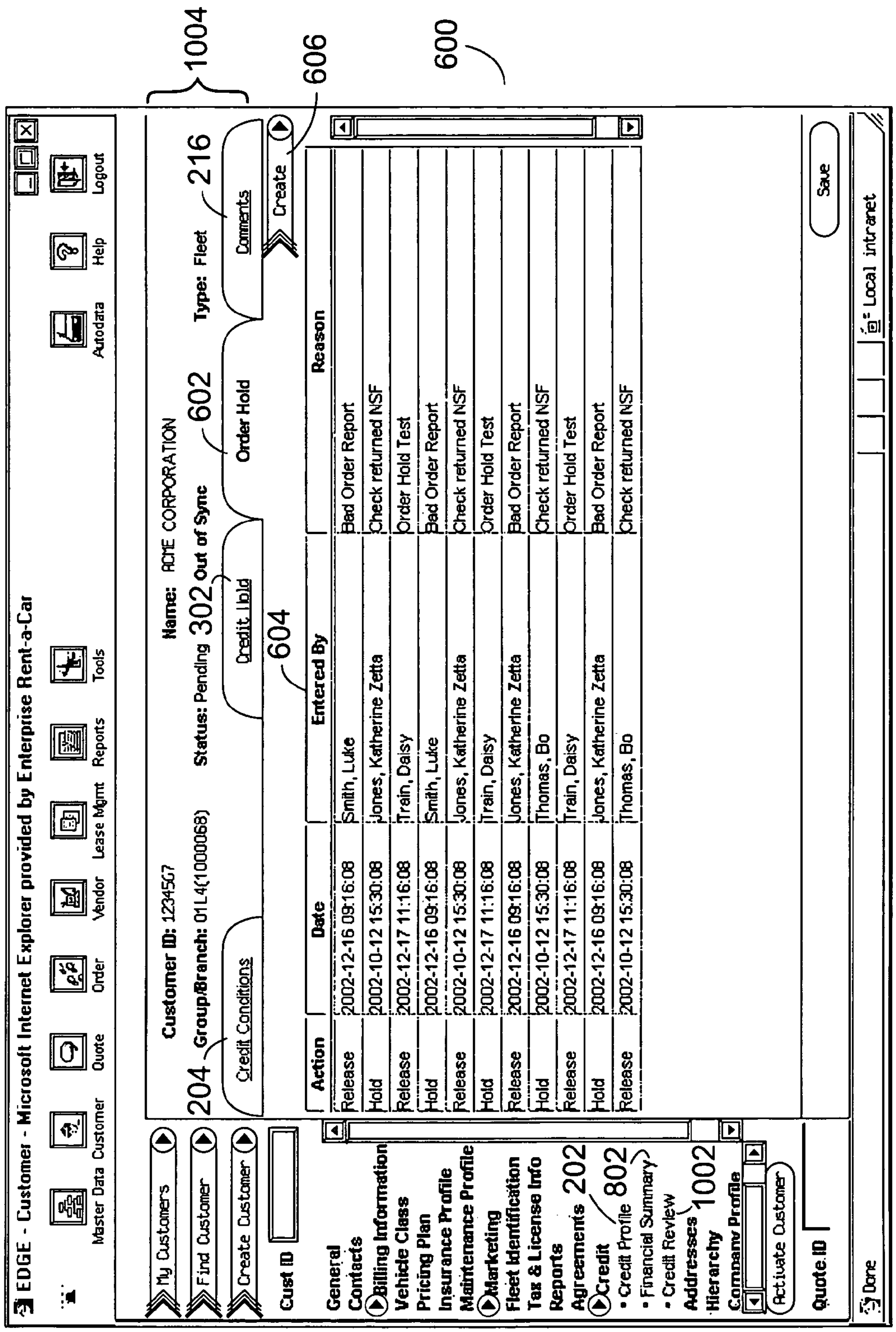
FIG. 6 illustrates an exemplary preferred order hold summary page.

Page 600 of FIG. 6 is displayed after user selection of the order hold folder tab 602. Page 600 preferably displays a table 604 that summarizes the order hold history for the customer. An order hold represents a decision by the fleet management company to no longer place new orders for a given customer. Order holds are typically put in place when conditions are less dire than the conditions for a credit hold. Order holds can be released by fleet managers with appropriate authority based on the fleet manager's assessment of the customer's financial situation. Table 604 preferably displays not only current order holds (whose status is indicated in table 604 by the "hold" denomination), but also previous order holds (whose status is indicated in table 604 with the "release" denomination). Table 604 preferably also identifies, for each order hold, the order hold creation date (or release date where applicable), the name of the user who created the order hold, and the reason that the order hold was created. Furthermore, create button 606 is preferably provided for user selection to create a new order hold or an order hold release for the customer.

Figure 7:
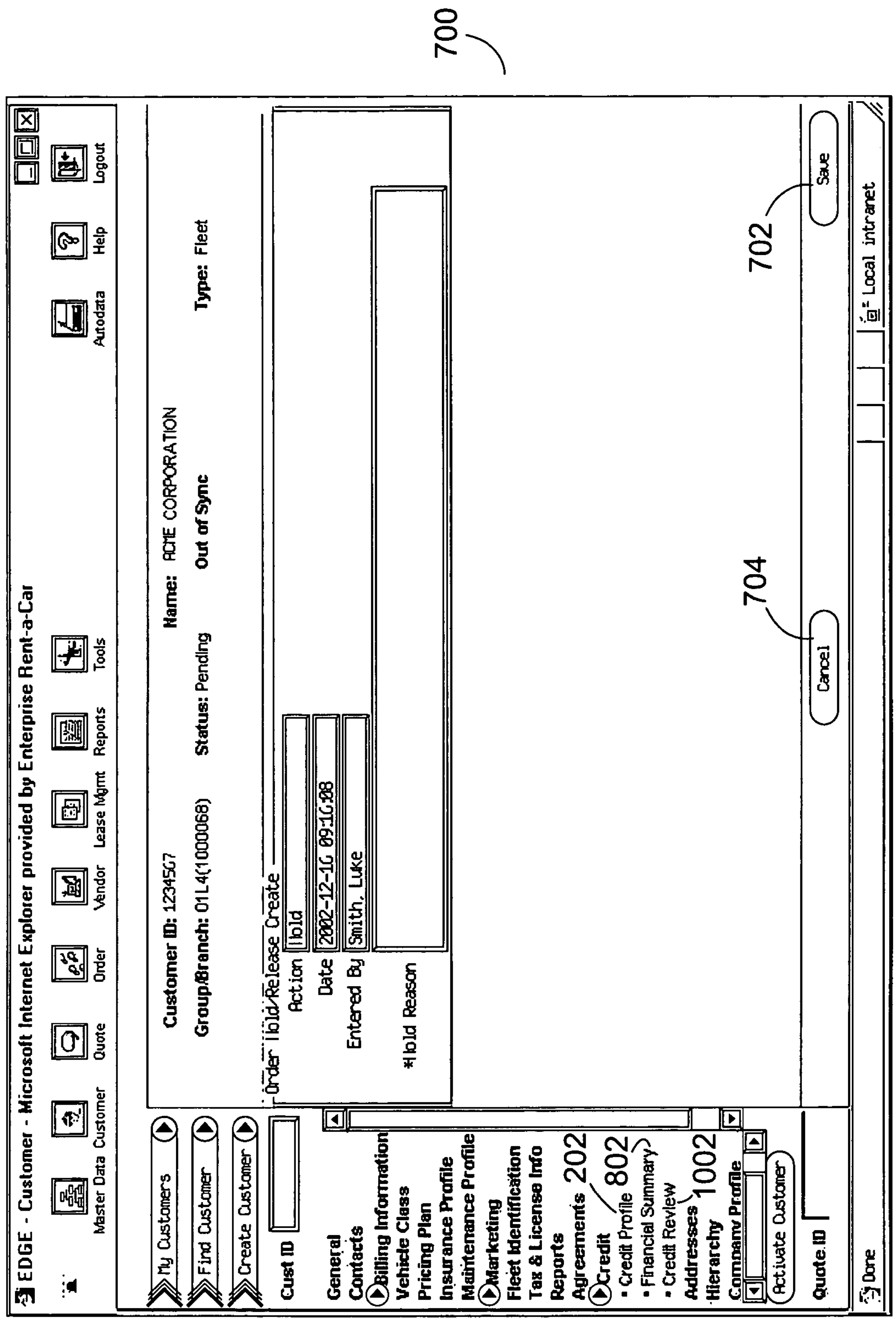
FIG. 7 illustrates an exemplary preferred order hold creation/release page.

Page 700 of FIG. 7 is preferably displayed upon user selection of the create button 606 on page 600. Page 700 is a create/release order hold GUI. Page 700 preferably includes a field in which the user can specify whether a hold or a release is being created, displays the name of the user creating the order hold, and displays the current date in a display-only fashion. Another field is preferably provided for user entry of the reason why the order hold is being created or released. After the user has entered such a reason on the page, the user can select the save button 702 to save the order hold in the system. Alternatively, the user can choose to not create the order hold by selecting the cancel button 704.

Also, user selection of the comments tab 216 on any of the pages shown in FIGS. 2, 3, and 6 is preferably effective to display a page (not shown) that allows the user to enter and store any comments he/she may have about the customer's credit profile. Additional details about the system in connection with FIGS. 2-7 are described in Exhibit A appended hereto.

Figure 8A:
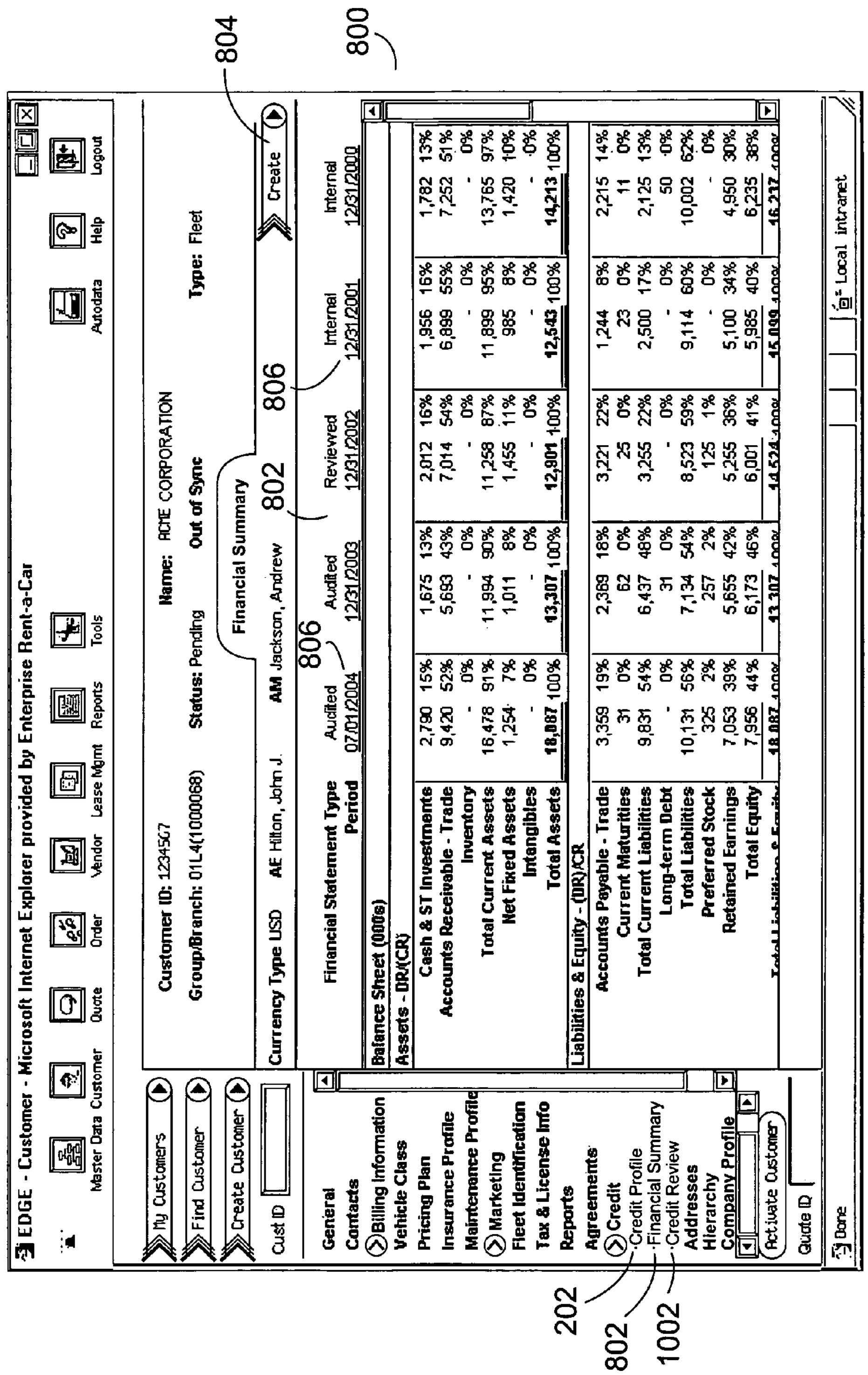
FIGS. 8(*a*)-(*c*) illustrate an exemplary preferred financial summary display page.
Figure 8B:
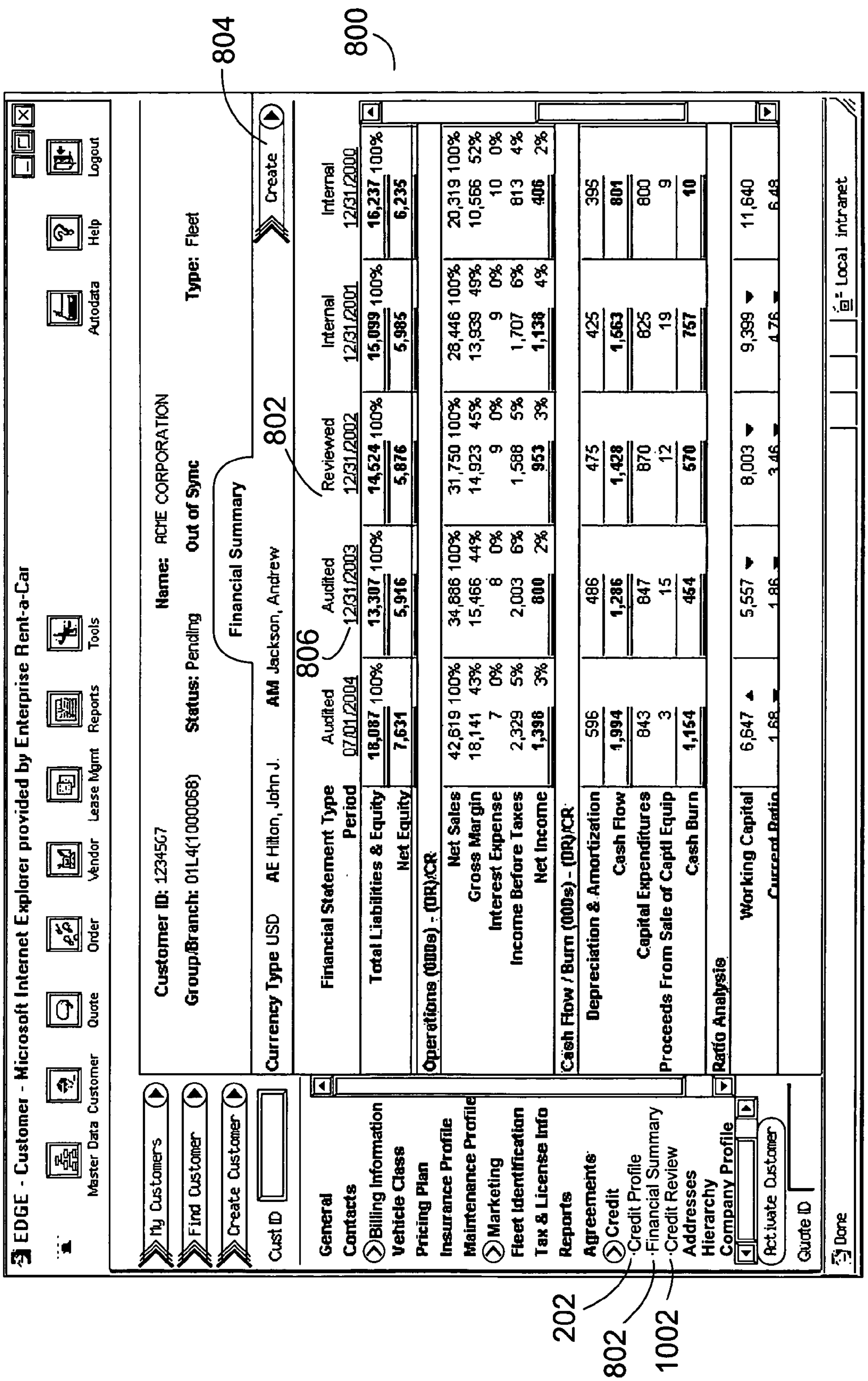
Figure 8C:
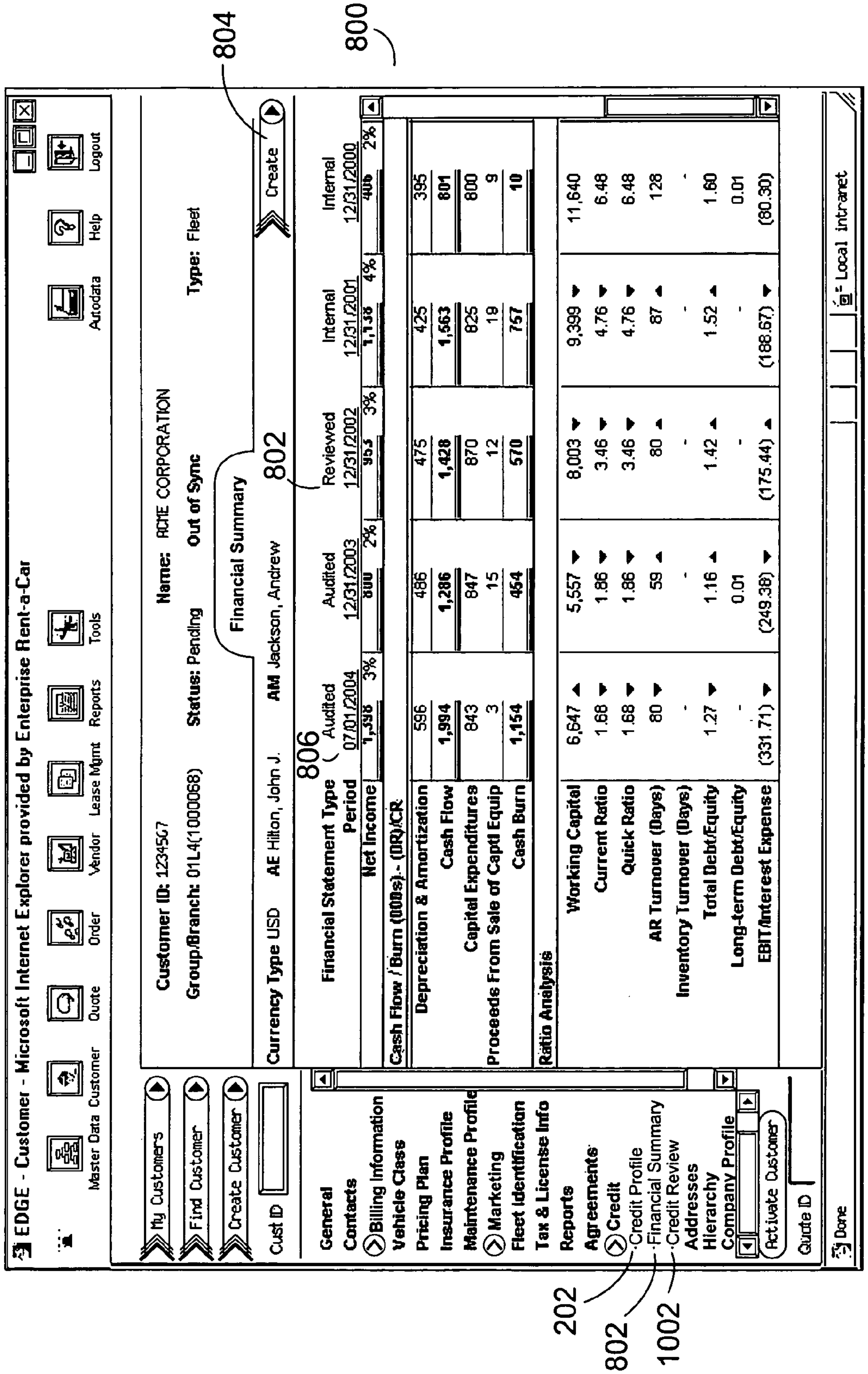
Figure 9A:
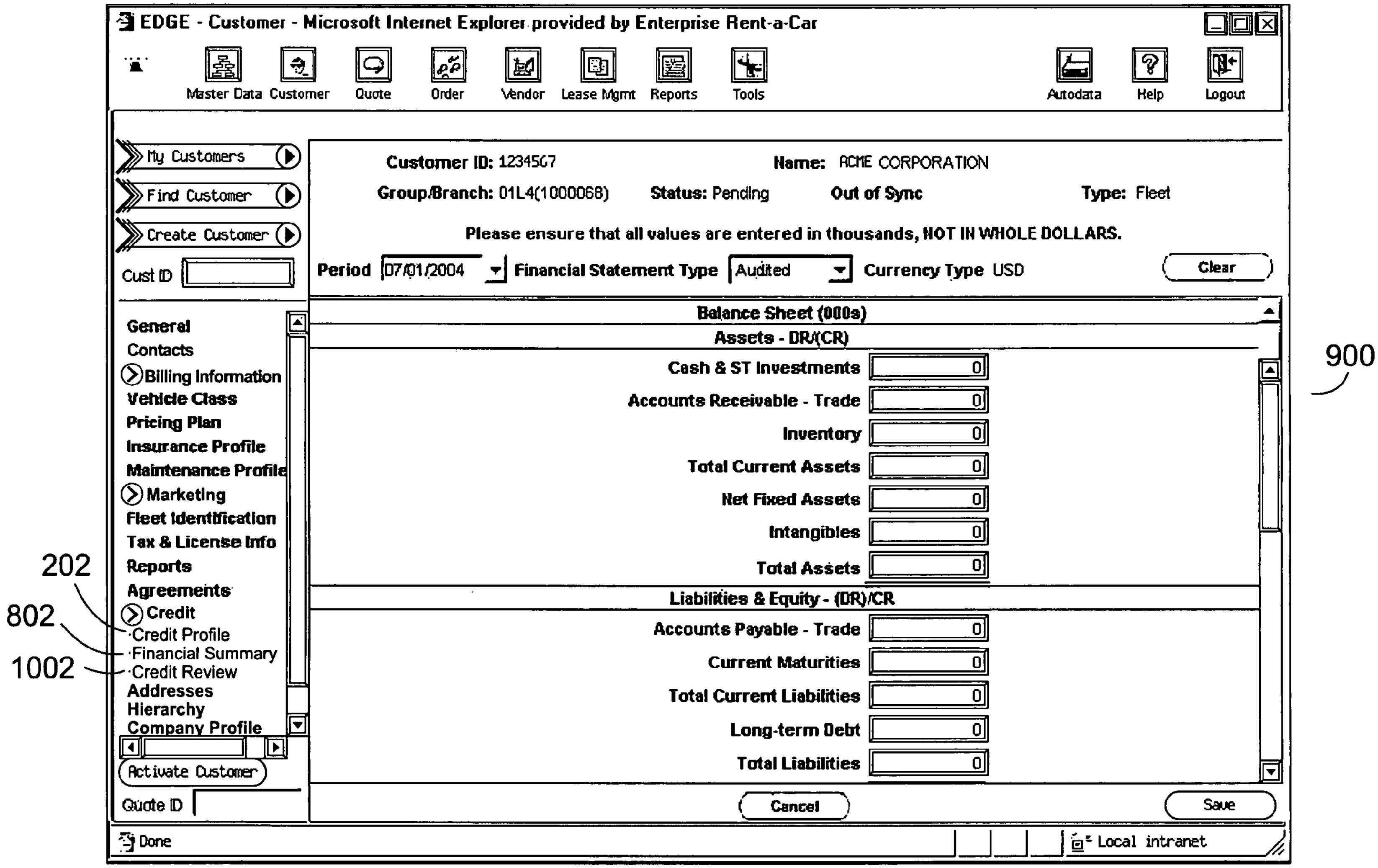
FIGS. 9(*a*)-(*c*) illustrate an exemplary preferred financial summary creation page
Figure 9B:
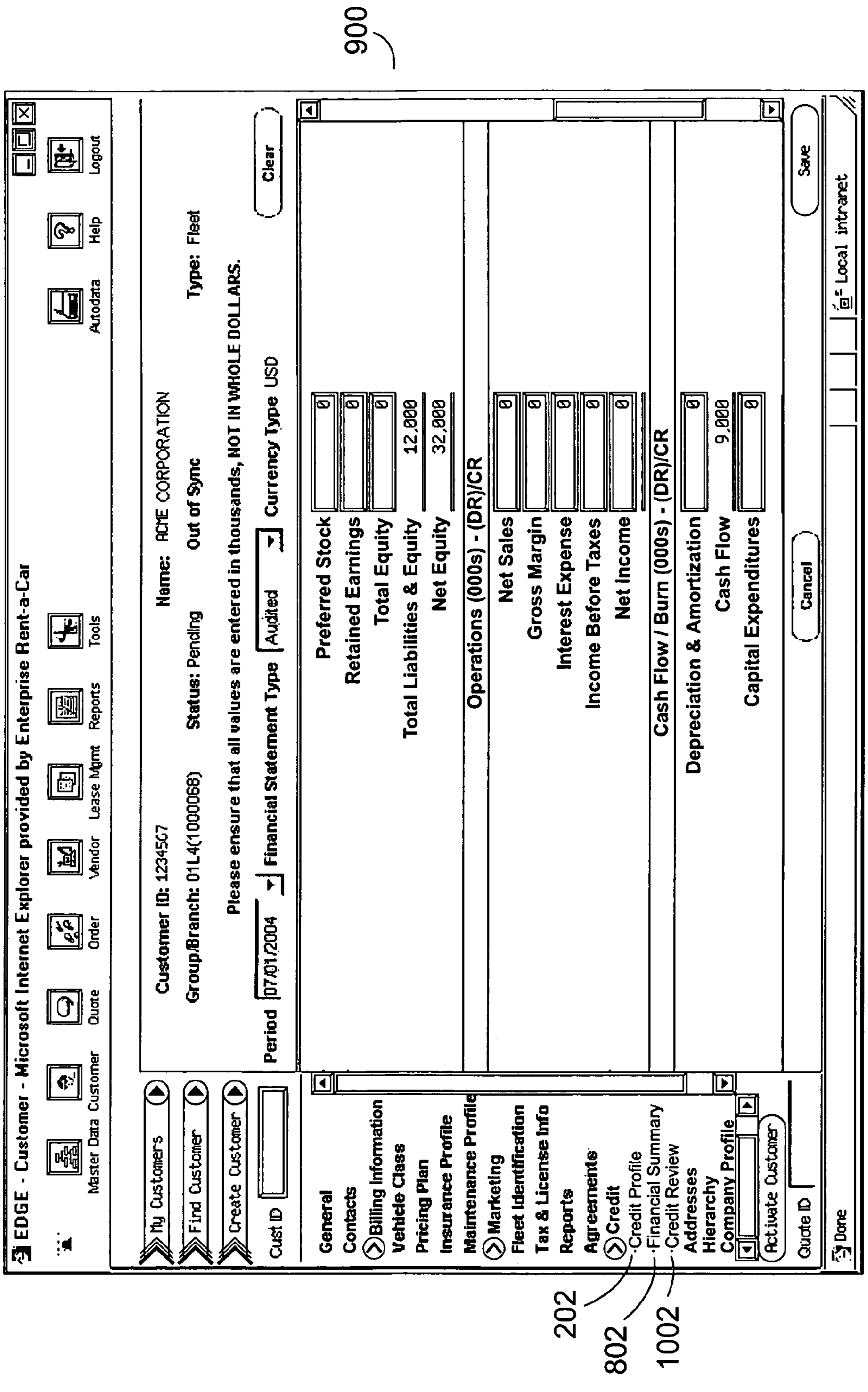
Figure 9C:
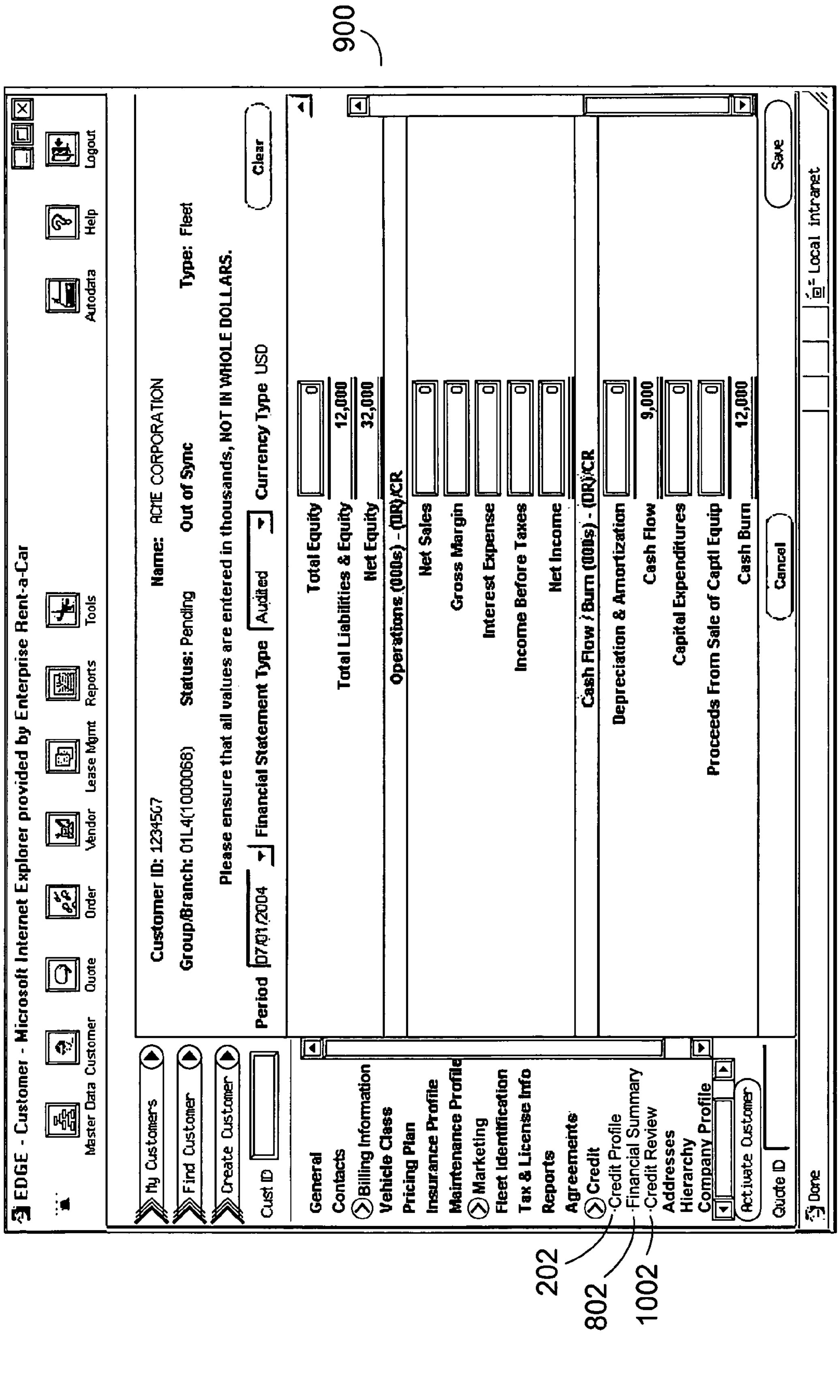

In the event the user selects the "financial summary" link 802 displayed on the left hand side of the GUIs, the GUI page 800 of FIGS. 8(*a*)-(*c*) is preferably displayed. As shown in FIGS. 8(*a*)-(*c*), table 802 of page 800 preferably provides a detailed summary of the customer's financial information. This information is preferably displayed in a display-only manner. Table 802 preferably provides this financial information for not only the most recent financial statement date, but also for several of the previous months or years.

Further still, table 802 preferably identifies the level of scrutiny that was applied to the financial information. Financial information that was audited by a third party auditor is preferably designated by an "audited" indicator. Financial information that has been reviewed by a third party auditor, but has not been fully audited, is preferably designated by a "reviewed" indicator. Financial information that has been compiled by a third party accountant or auditor, but not yet reviewed or audited, is preferably designated by a "compiled" indicator. Financial information that has been created internally by the customer and not subject to any third party auditing is preferably designated by an "internal" indicator. Lastly, financial information that is a tax return for the customer is preferably designated by a "tax return" indicator. These indicators for the different levels of scrutiny that have been applied to customer financial information is particularly important in connection with managing the credit profiles for customers that are smaller in scale than typical large corporations. For many small to medium-sized businesses, fully audited financial statements are not always readily available, but credit decisions will nevertheless have to be made. By providing the scrutiny indicators for customer financial information discussed above, fleet managers are provided with the ability to make better informed decisions when extending credit to their customers.

If the customer does not already have financial information stored in database 120, or if the user wants to add a new financial information to an existing customer, the user can select the create button 804 on page 800. User selection of button 804 is effective to display page 900 of FIGS. 9(*a*)-(*c*). Page 900 includes several pre-defined fields in which the user can enter financial data about the customer. Further, the user can identify the date for which the financial data being entered on page 900 is applicable. Further still, within field 904, the user can identify the type of financial statement from which the financial data being entered on page 900 came. Button 906 is effective upon user selection to clear the fields of the user-entered values. Button 910 is effective upon user selection to return the user to page 800 without making any changes to the customer's stored financial information. Button 908 is effective upon user selection to save the financial information entered on page 900 into the system to update the customer's stored financial information.

In the event the user wishes to update an existing financial statement displayed in table 802 of page 800, the user can select the link 806 applicable to that statement. User selection of a link 806 is preferably effective to display a page like that shown in FIGS. 9(*a*)-(*c*) in which the customer can modify one or more of the financial information data values. Additional details about the system in connection with FIGS. 8(*a*)-9(*c*) are described in Exhibit B appended hereto.

Figure 10:
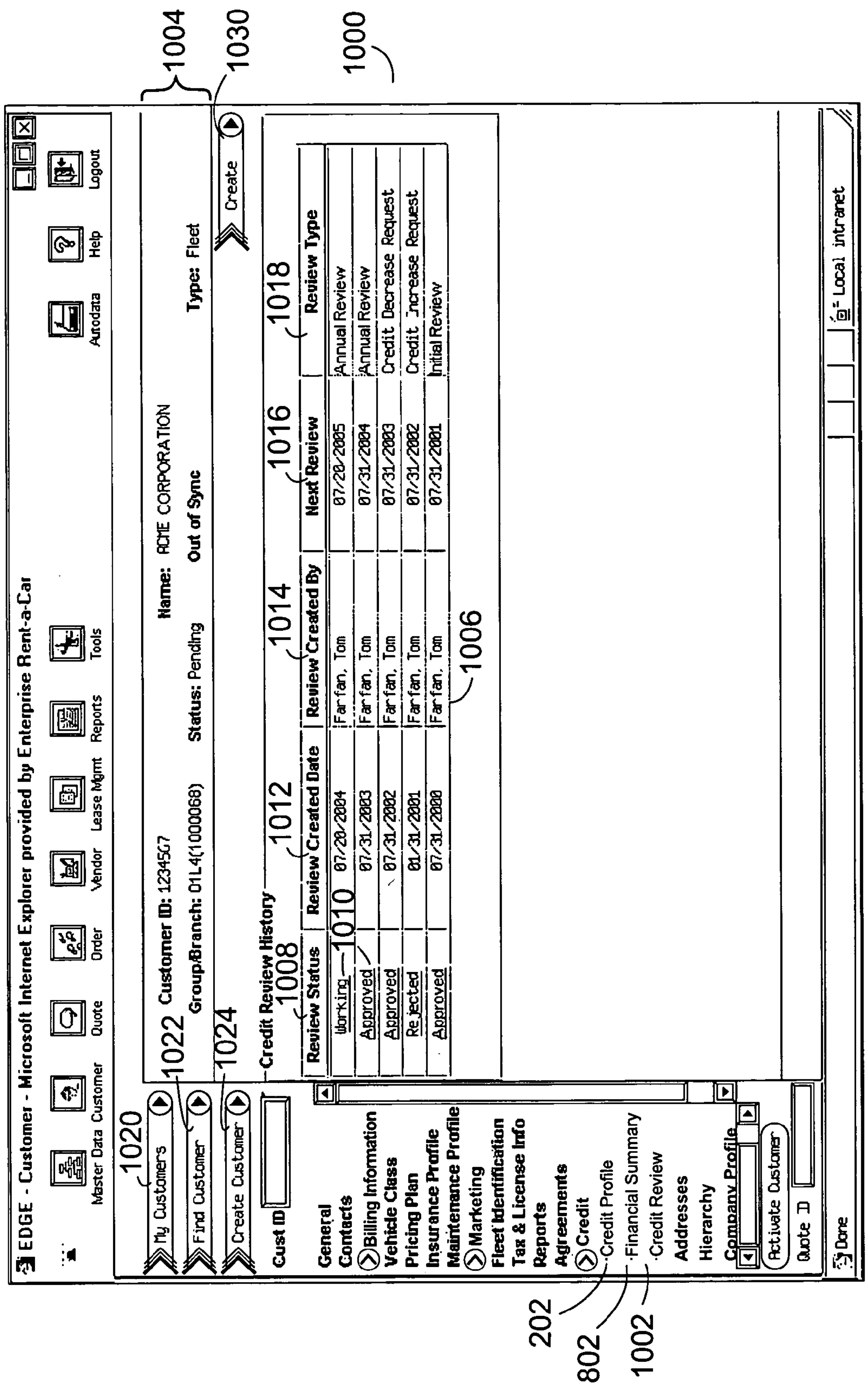
FIG. 10 illustrates an exemplary preferred credit review history page.

User selection of the "credit review" link 1002 displayed in the left hand side of the GUIs is effective to display credit review history page 1000 of FIG. 10. Page 1000 preferably provides users with a window and link into any past credit reviews performed on a customer as well as any credit review that is currently being performed. Display section 1004 preferably identifies information about the credit review history shown in table 1006, particularly the name and customer identifier for which the credit reviews are applicable. The user can reach page 1000 for the customer whose credit will be reviewed via a variety of selection mechanisms, including the "my customers" button 1020 that is effective upon user selection to display a page that lists all of the customers that have been assigned to a particular user (in a preferred embodiment, different fleet managers are assigned different customers, and database 120 preferably stores data that associates each customer with one or more fleet managers). User selection of a customer or customer number that is listed on such a page is preferably effective to display a page in the customer credit review process for that customer, such as page 1000. The GUIs can also include a "find customer" button 1022 that is effective upon user selection to display a search page for finding customers that match a user-specified search query, a customer identifier search field 1026 for finding customers by their identifiers, and a "create customer" button 1024 through which the user can begin the process of adding a new customer to the system.

Table 1006 lists the credit review history for the customer identified in section 1004. Column 1008 identifies the review status for each credit review. Preferably, the possible review status values are "working" (for pending credit reviews), "approved" (for previous credit review of a type that was approved), and "rejected" (for previous credit reviews relating to a type that was rejected). These values are displayed as links 1010 within column 1008. Upon user selection of a link 1010, the user is preferably routed to page 1100 described below. Additional read-only columns of table 1006 include a "review created date" column 1012 for identifying the date on which the pertinent credit review was created, a "review created by" column 1014 for identifying the user who created the pertinent credit review, a "next review" column 1016 for identifying a date on which a next credit review is to take place, and a "review type" column 1018 for identifying the type for the pertinent credit review (e.g., an annual credit review, an initial credit review, and credit reviews related to requested increases/decreases in credit).

Figure 11:
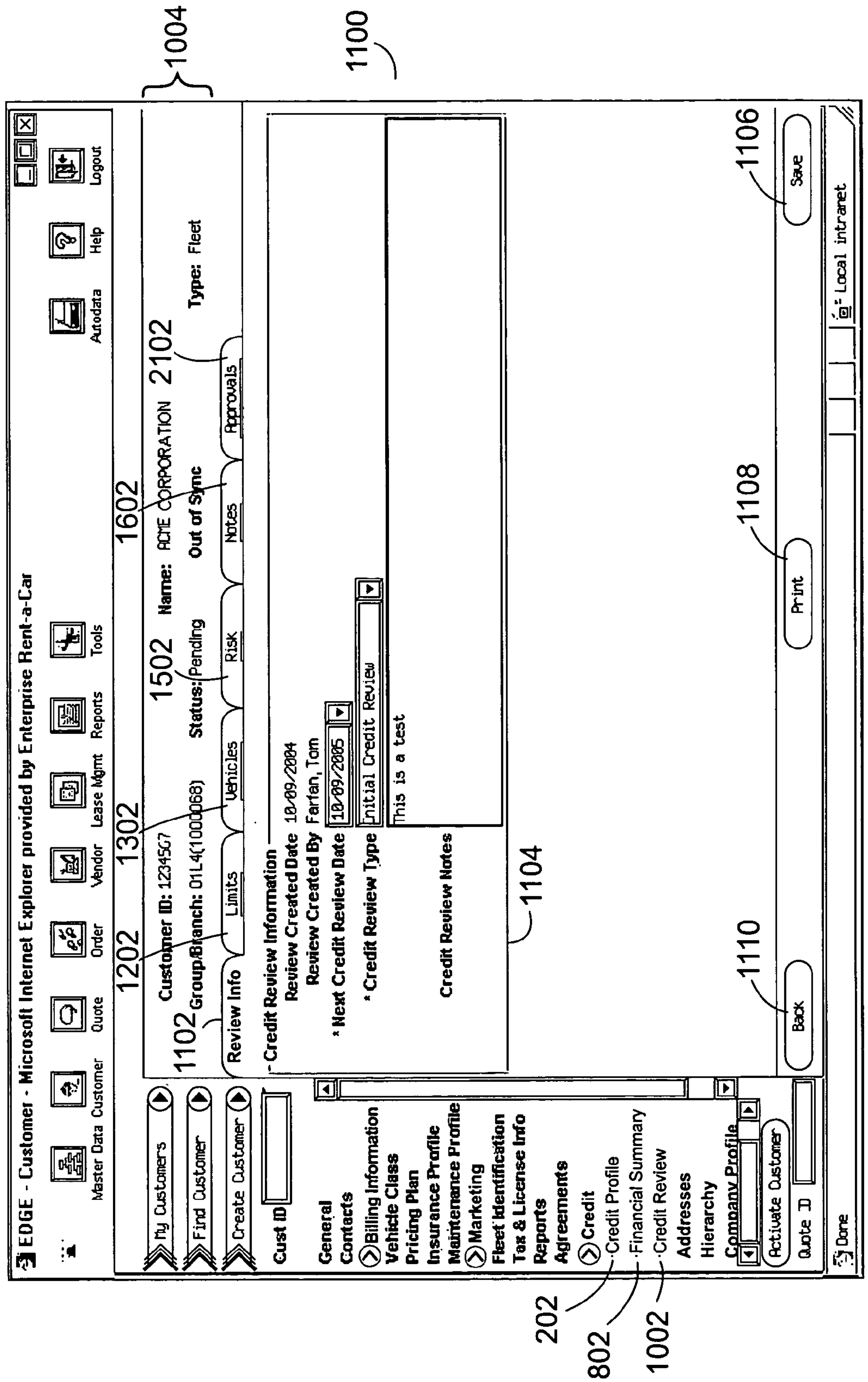
FIG. 11 illustrates an exemplary preferred credit review creation page.

User selection of the create button 1030 is preferably effective to display a page through which the user can create a new credit review for the customer identified in section 1004. Preferably, button 1030 is disabled if there is already an open credit review for that customer. FIG. 11 depicts a preferred credit review creation page 1100 that is displayed after selection of button 1030. The page 1100 also displays the following folder tabs: review information tab 1102 (for displaying page 1100), limits tab 1202 (discussion to follow in connection with FIGS. 12(*a*) and (*b*)), vehicle tab 1302 (discussion to follow in connection with FIGS. 13, 14(*a*), and 14(*b*)), risk tab 1502 (discussion to follow in connection with FIG. 15), notes tab 1602 (discussion to follow in connection with FIGS. 16-20), and approvals tab 2102 (discussion to follow in connection with FIG. 21). When page 1100 is first displayed, preferably only tab 1102 is active.

Section 1104 of page 1100 provides credit review information for the credit review to be created. Section 1104 identifies the creation date, the user who created the credit review, the date on which the next credit review is to occur (which preferably defaults to the one year anniversary of the creation date, but can preferably be modified by user action), the credit review type (which preferably defaults to an "initial credit review", but can preferably be modified by user action), and a credit review notes text field in which the user can enter any notes about the created credit review. Possible selections for credit review type preferably include initial credit review, annual credit review, credit increase request, and credit decrease request. Once the user has chosen a next credit review date and selected a type for the credit review (and optionally entered notes for the credit review), the user can select the save button 1106 to activate the folder tabs other than the review information tab 1102. User selection of the back button 1110 is effective to return the user to page 1000. User selection of the print button 1108 is effective to display a page from which the user is provided with the ability to selectively print the different sections of the credit profile report shown in FIGS. 23(*a*)-(*d*), preferably in any combination of section. The credit report of FIGS. 23(*a*)-(*d*) essentially provides, in a single hard copy report, all of the information that is available for display to the user via the pages 800, 1200, 1300, 1400, 1500, 1700, 1800, 1900 and 2100. Additional details about the system in connection with FIGS. 10 and 11 is described in Exhibit C appended hereto.

Figure 12A:
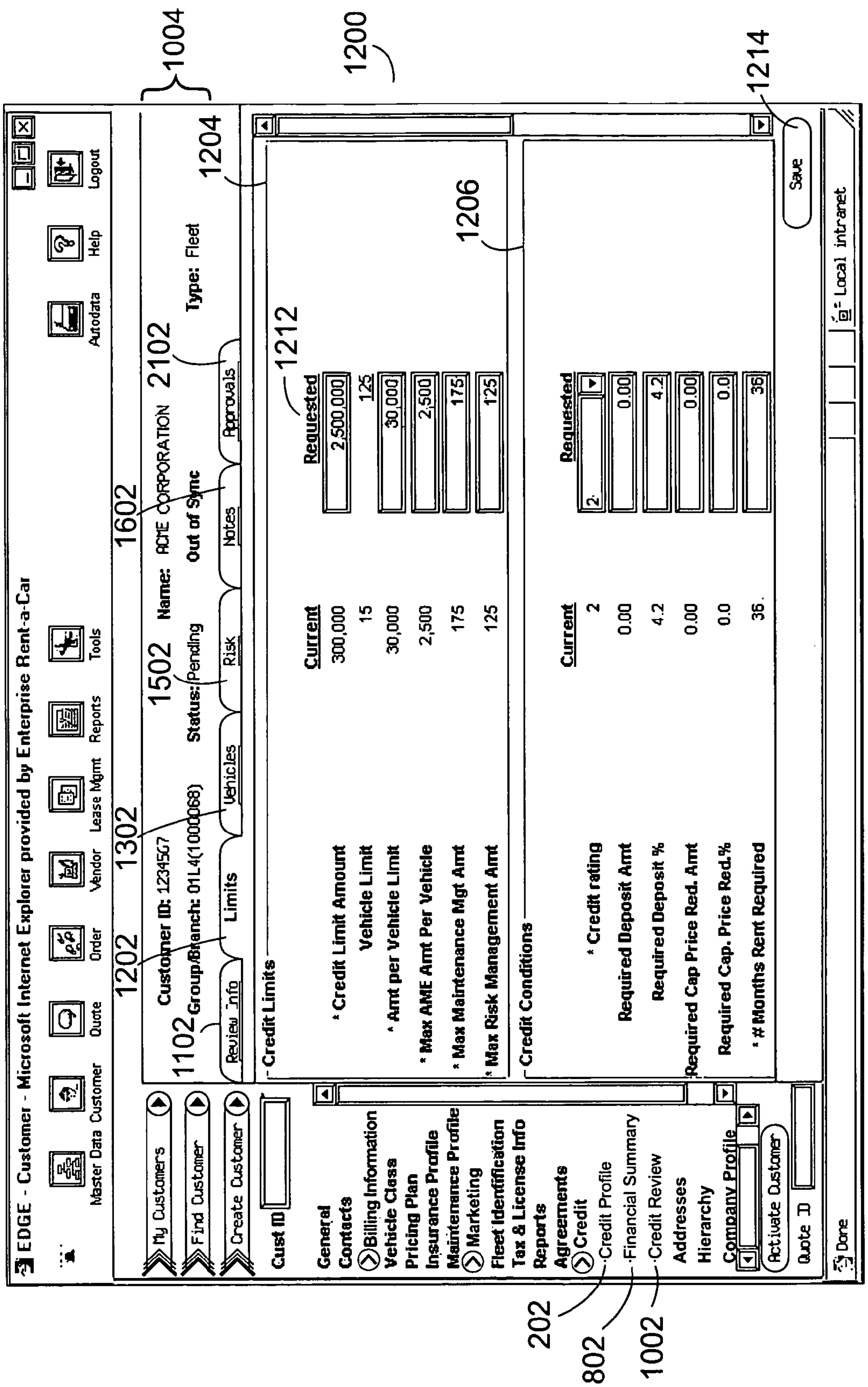
FIGS. 12(*a*) and 12(*b*) illustrate an exemplary preferred customer credit limits page.
Figure 12B:
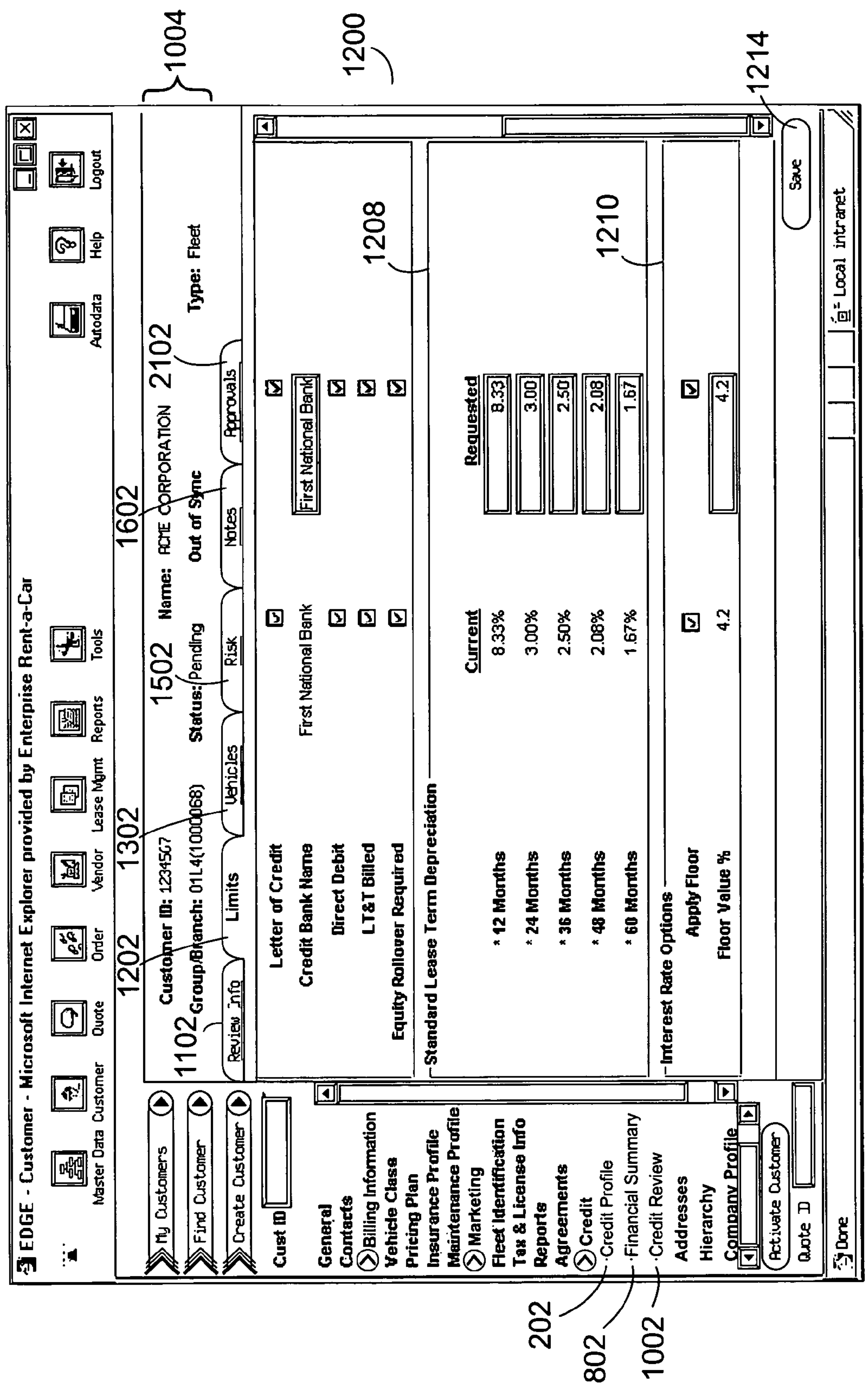

FIGS. 12(*a*) and (*b*) depict the credit limits page 1200 that is displayed upon user selection of the limits tab 1202. Page 1200 preferably displays the current values stored in the customer's credit profile for the customer's credit limits (section 1204), credit conditions (section 1206), standard lease term depreciation (section 1208), and interest rate options (section 1210). Page 1200 also preferably allows the user to request modifications to the different data fields within these different sections of the customer's credit profile, wherein the request is subject to approval by a user with appropriate security and approval authority. However, the requested vehicle limit value in column 1212 of section 1204 is preferably a calculated value, wherein this value is calculated from data entered on the risk analysis page 1500 shown in FIG. 15. Among the changes that the user can request via page 1200 are changes to the customer's credit limit, amount per vehicle limit, maximum after market equipment (AME) amount per vehicle, maximum maintenance management amount, maximum risk management amount, credit rating, required deposit amount, required deposit percentage, required capitalized price reduction amount, maximum required capitalized price reduction percentage, the number of months of rent required, whether a letter of credit from a financial institution (bank) is required, the name of the financial institution providing the letter of credit, whether direct debit is to be used, whether license, tax, and title (LT&T) is to be billed, whether equity rollover is required, the 12/24/36/48/60 month depreciation percentage values, whether an interest rate floor is to be applied, and a percentage for the floor interest rate percentage.

User selection of the save button 1214, the credit review data for the requested credit data for the customer is updated in accordance with the data entered by the user in the various fields of page 1200. Additional details about the system in connection with FIG. 12 are described in Exhibit D appended hereto.

Figure 13:
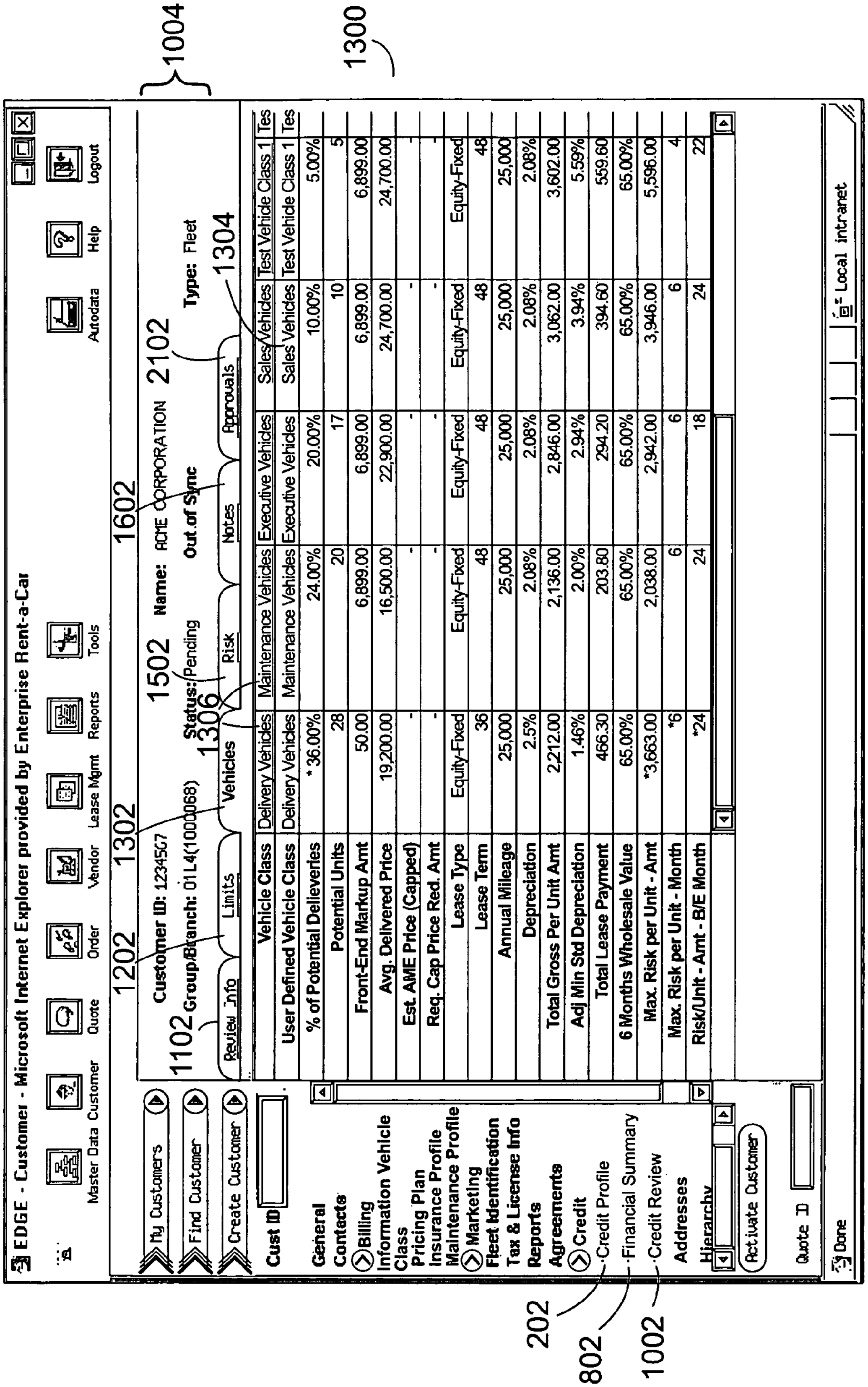
FIG. 13 illustrates an exemplary preferred customer leased vehicle plan page.
Figure 14A:
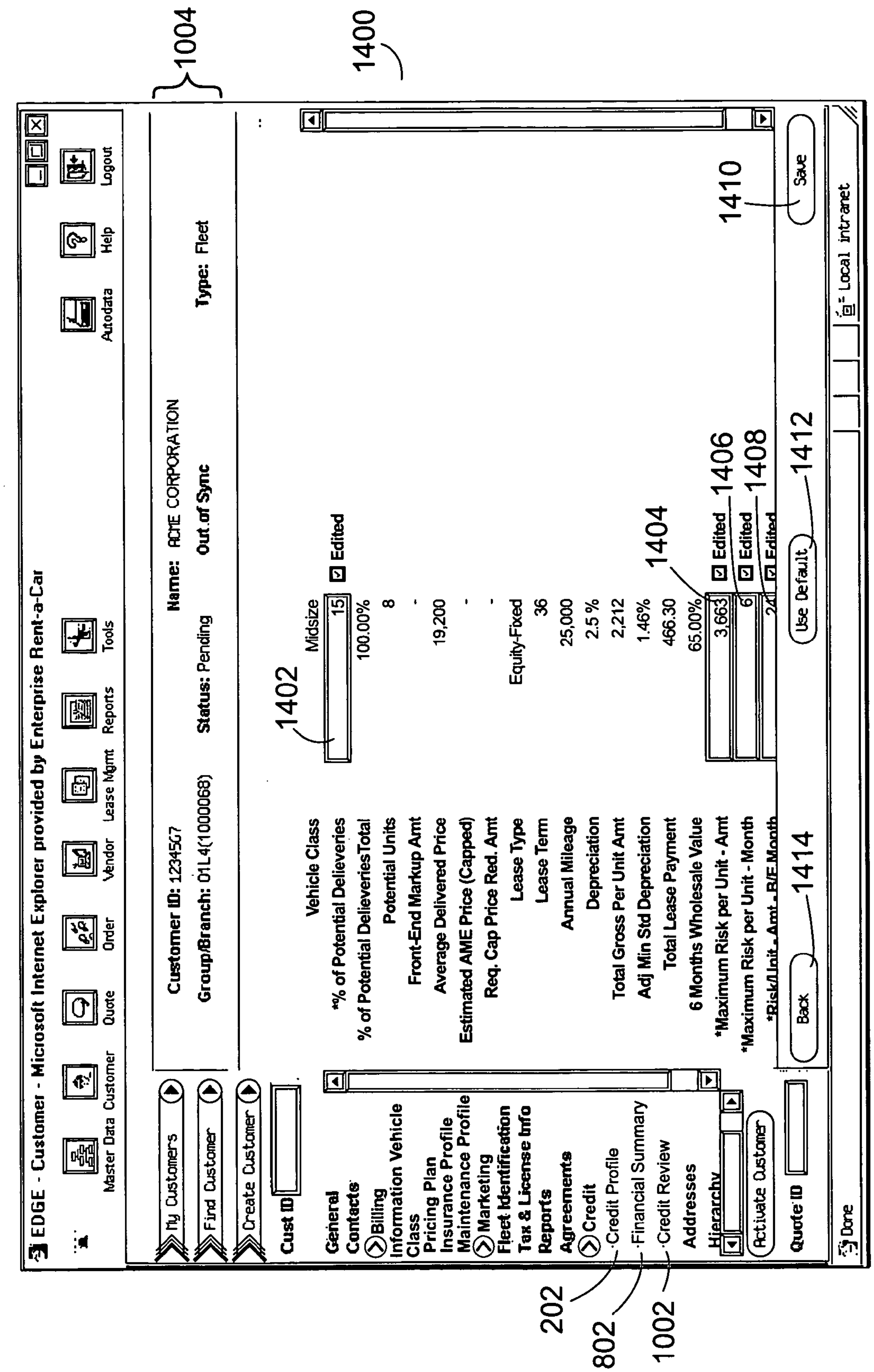
FIGS. 14(*a*) and 14(*b*) illustrate an exemplary preferred leased vehicle plan details page.
Figure 14B:
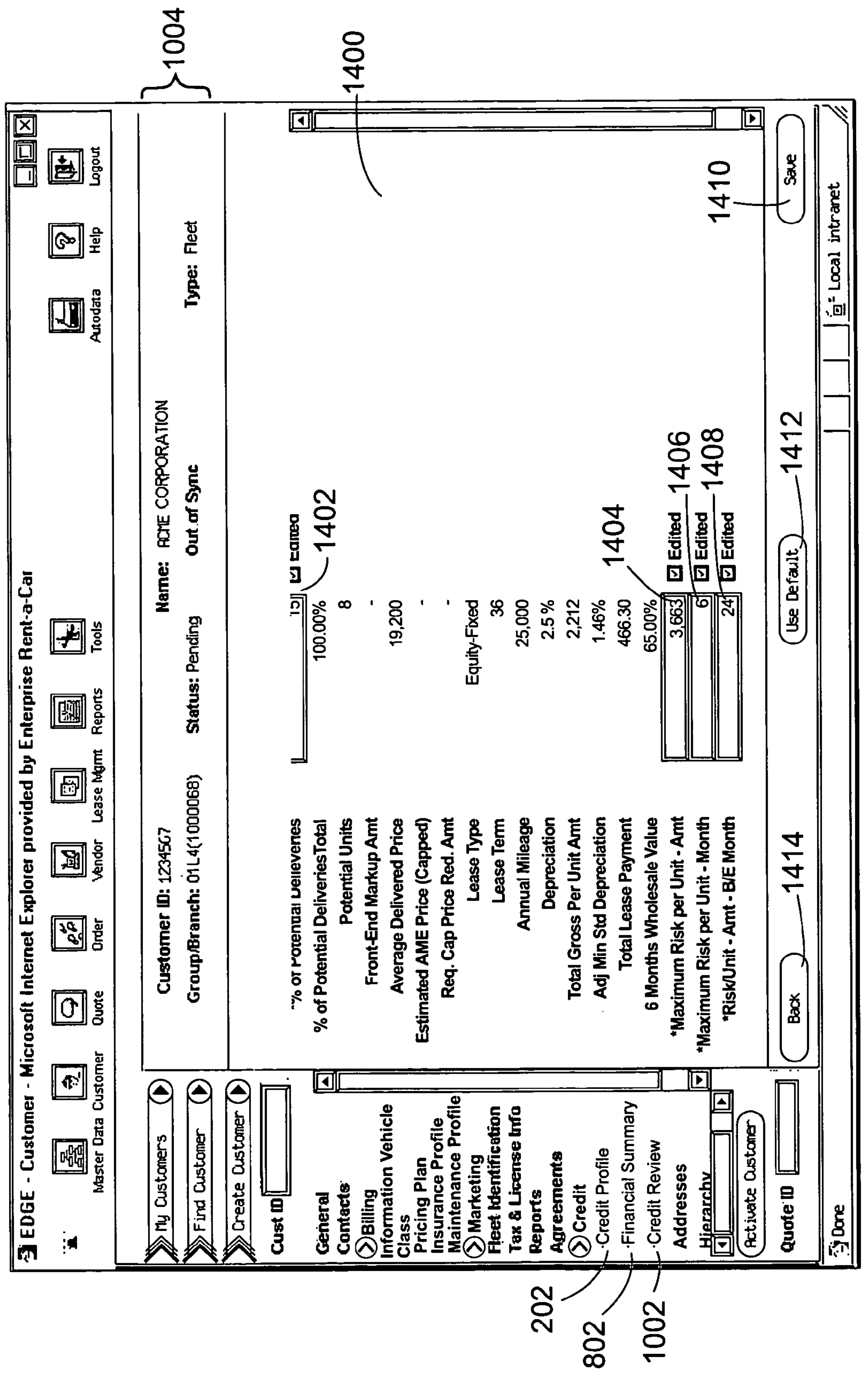

FIG. 13 depicts the vehicles plan page 1300 that is displayed upon user selection of the vehicles tab 1302. Page 1300 preferably includes a table 1304 that displays data corresponding to the customer's planned fleet of leased vehicles. The data in table 1304 is preferably broken down such that each column corresponds to a different vehicle class. From this page, the user can get a sense of the customer's fleet mix and overall fleet investment. The vehicle class identifiers in each column are preferably links 1306 to a vehicle plan details page 1400 for entering vehicle lease plan data, such as that shown in FIGS. 14(*a*) and (*b*).

Through the vehicle plan details page 1400, the user can enter pertinent data for planned vehicle leases, preferably broken down by vehicle class. However, this need not be the case, as page 1400 could also be designed to enter data on a vehicle-by-vehicle basis. Within field 1402, the user can enter a percentage that corresponds to how much of the customer's leased fleet will be made up of leased vehicles of the selected vehicle class. As would be readily understood by those of ordinary skill in the art, this data can also be entered as an integer representing the number of vehicles within the fleet that will be comprised of vehicles matching the selected vehicle class. Within field 1404, the user can specify a maximum risk amount per vehicle for the selected vehicle class which represents the greatest monthly difference between a vehicle's RBV and estimated actual market value. Within field 1406, the user can specify the lease month in which the maximum risk amount per vehicle for the selected vehicle class is to occur. Within field 1408, the user can specify the break/even (B/E) lease month for risk per vehicle for the selected vehicle class, which signifies the lease month where the vehicle's RBV first becomes equal to or lower than the vehicle's estimated actual market value.

Alongside each field on page 1400 in which the user can enter data, an edited checkbox is preferably provided, wherein user placement of a check within the checkbox is effective to open up the corresponding field for data entry. The remaining data fields of page 1400 are preferably display-only data values that are retrieved from stored information for the customer. Button 1410 is effective upon user selection to save the vehicle class details entered on page 1400. User selection of button 1412 is effective to revert the various data fields of page 1400 that the user may have modified back to their default settings. Button 1414 is effective upon user selection to return the user to page 1300 of FIG. 13. Additional details about the system in connection with FIGS. 13, 14(*a*) and 14(*b*) are described in Exhibit E appended hereto.

Figure 15:
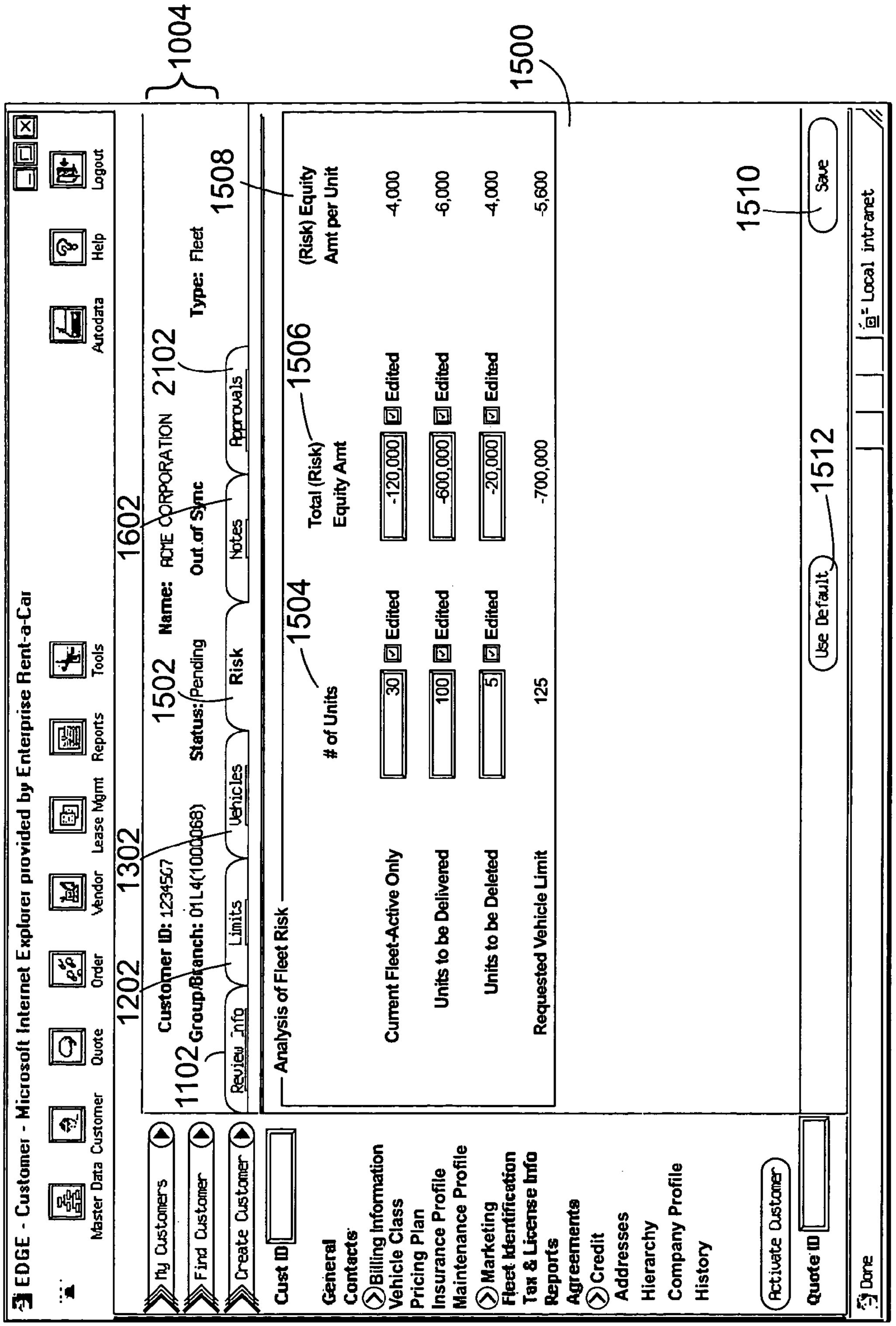
FIG. 15 illustrates an exemplary preferred fleet risk analysis page.

FIG. 15 depicts the risk analysis page 1500 that is displayed upon user selection of the risk tab 1502. Page 1500 preferably interacts with the user to set the requested number of leased vehicles for the customer's fleet and identify the total risk/equity amount for the customer (wherein risk is preferably expressed as a negative number and wherein equity is preferably expressed as a positive number) corresponding to the requested number of leased vehicles. Within the fields of column 1504, the user can enter the number of leased vehicles for each of the following three categories—the number of active units in the customer's current fleet of leased vehicles, the number of new units to be added to the customer's fleet of leased vehicles over a rolling 12 month period, and the number of units to be deleted from the customer's fleet of leased vehicles. Initially, these values are pre-set to default values. These default values can be retrieved from data stored in database 120 corresponding to the customer's current fleet size as well as data corresponding to planned deliveries to the customer's fleet and planned deletions from the customer's fleet over a 12 month period. However, via the edited checkbox, the user can enter new values therefor. The requested vehicle limit value in column 1504 is preferably a display only value that is calculated as the current number of units plus the number of new units to be delivered minus the number of units to be deleted. This value represents the number of vehicles that will be present in the customer's fleet of leased vehicles if the credit profile change request is approved.

Within the fields of column 1506, the user can enter monetary risk/equity amounts for each of the same three categories described in connection with column 1504. Initially, these values are pre-set to default values. Any of a number of techniques can be used to calculate the default risk values, as would be understood by those having ordinary skill in the art, none of which are preferred in the practice of the present invention so long as these default risk values are reasonably based on the factors discussed below. Market values for vehicles are often calculated using past sales experience, either internally or as determined by a third party data source, for that vehicle or previous year make model and series (MMSs) in combination with an expected vehicle utilization, which includes factors such as the cost of the vehicle, the length of the lease term, lease structure, anticipated mileage for the vehicle during the lease term, and any additional equipment that may be present on the vehicle. The risk values in turn can be determined from the market values based on vehicle depreciation tables, as would be understood by those of ordinary skill in the art. It is worth noting that those of ordinary skill in the art may choose to use more or fewer factors when determining risk values. Via the edited checkbox, the user can enter new values for the risk amount. The requested vehicle limit amount in column 1506 is preferably a display-only value that is calculated as the sum of the values in the three categories of column 1506 that are described above.

The values in column 1508 are per unit risk/equity amounts that are calculated by dividing the values for each category in column 1506 by that category's corresponding unit count in column 1504.

User selection of the save button 1510 is effective to update the credit review for the customer in accordance with the data entered on page 1500. User selection of button 1512 is effective to return the data on page 1500 to their default values. Additional details about the system in connection with FIG. 15 are described in Exhibit F appended hereto.

Figure 16:
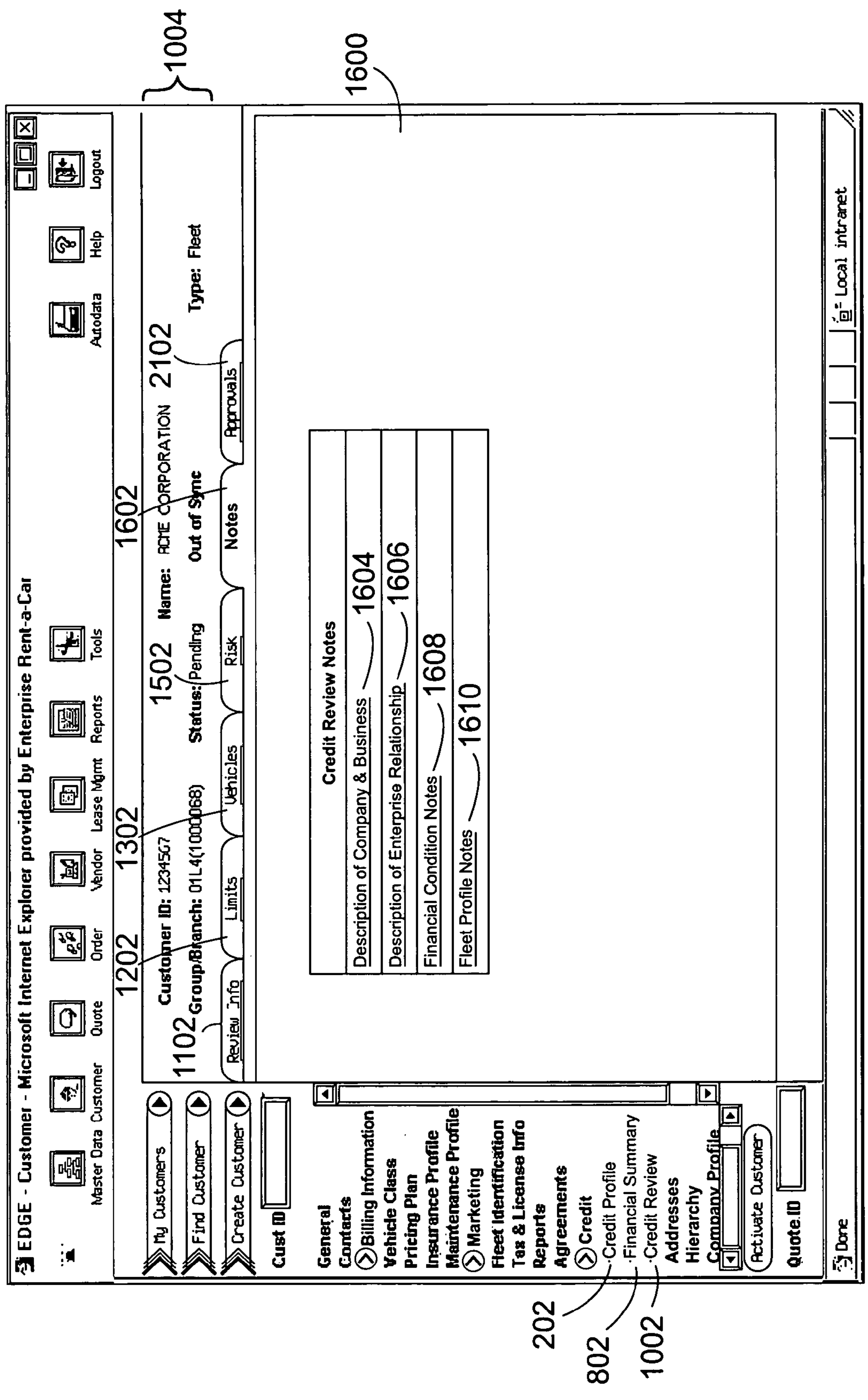
FIG. 16 illustrates an exemplary preferred credit review notes introduction page.
Figure 17:
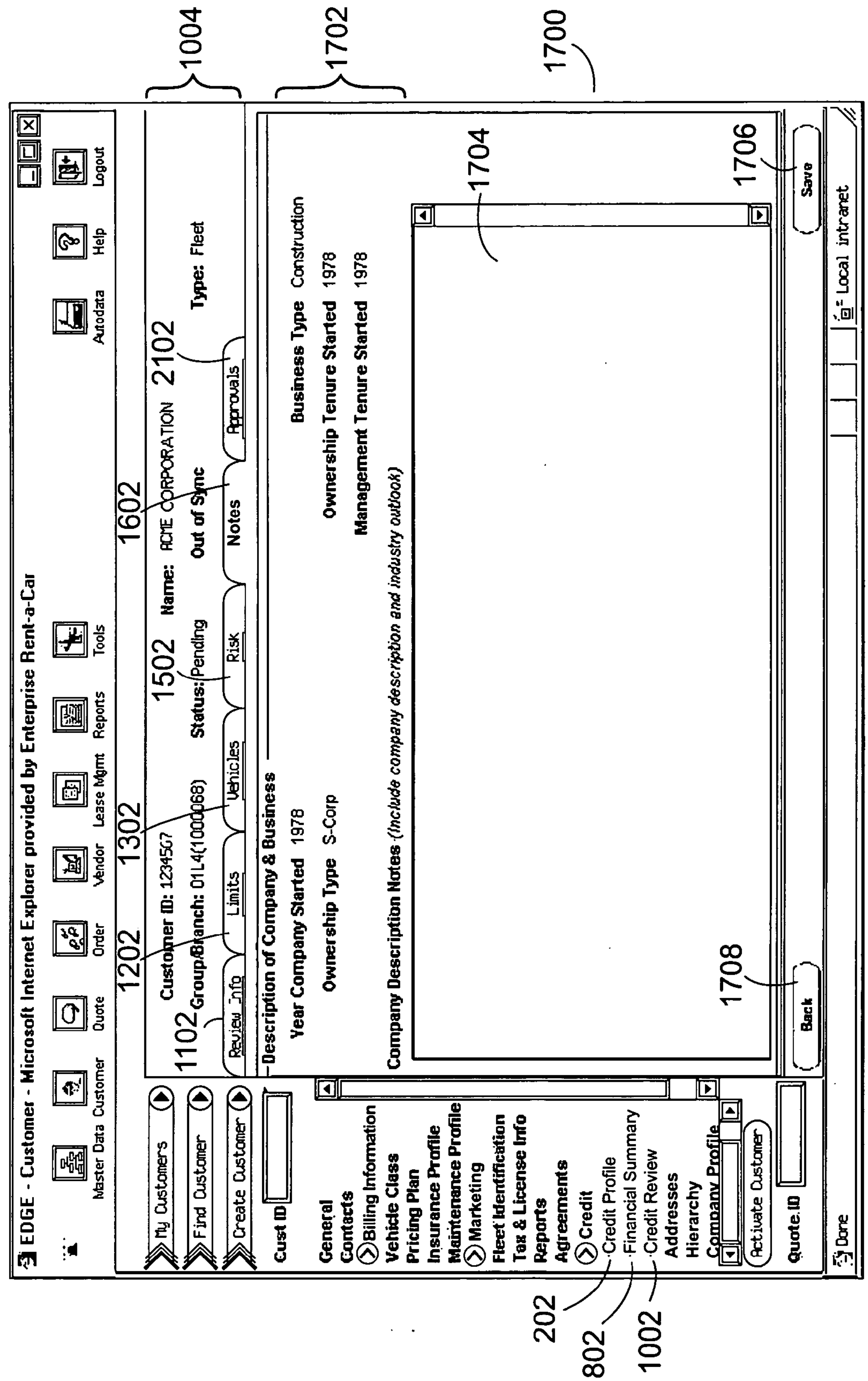
FIG. 17 illustrates an exemplary preferred customer description notes page.

FIG. 16 depicts a notes index page 1600 that is displayed upon user selection of the notes tab 1602. Page 1600 preferably displays a list of pages that are available for display that summarize various notes about the identified customer. For example, link 1604 is user-selectable to call up page 1700 of FIG. 17. Within section 1702, page 1700 displays various biographical data about the identified customer (e.g. year the customer company was founded, the type of business the customer company is engaged in, etc.). Within field 1704, the user can type in any notes that the user wishes to add about the customer company. Button 1706 is effective upon user selection to save any notes that have been added in field 1704 and button 1708 is effective upon user selection to return the user to page 1600.

Figure 18:
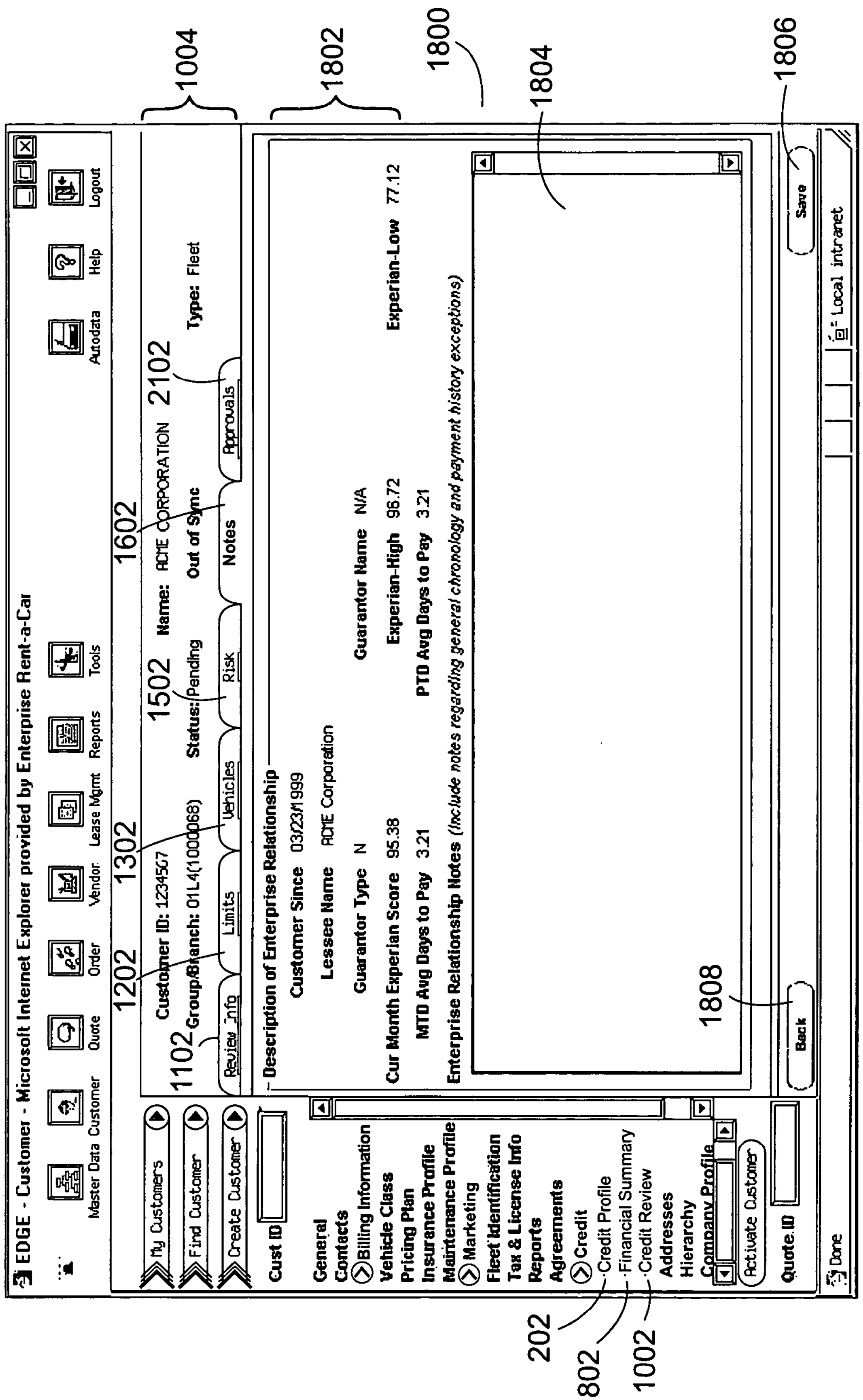
FIG. 18 illustrates an exemplary preferred customer-lessor relationship description page.

Via link 1606 on page 1600, the user can call up page 1800 of FIG. 18. Within section 1802, page 1800 preferably displays various data about the customer's relationship with the fleet management company (e.g., how long the customer has been a customer, the average amount of time that it takes for the customer to pay its bills to the fleet management company, etc.). Within field 1804, the user can type in any notes that the user wishes to add about the customer company. Button 1806 is effective upon user selection to save any notes that have been added in field 1804 and button 1808 is effective upon user selection to return the user to page 1600.

Figure 19:
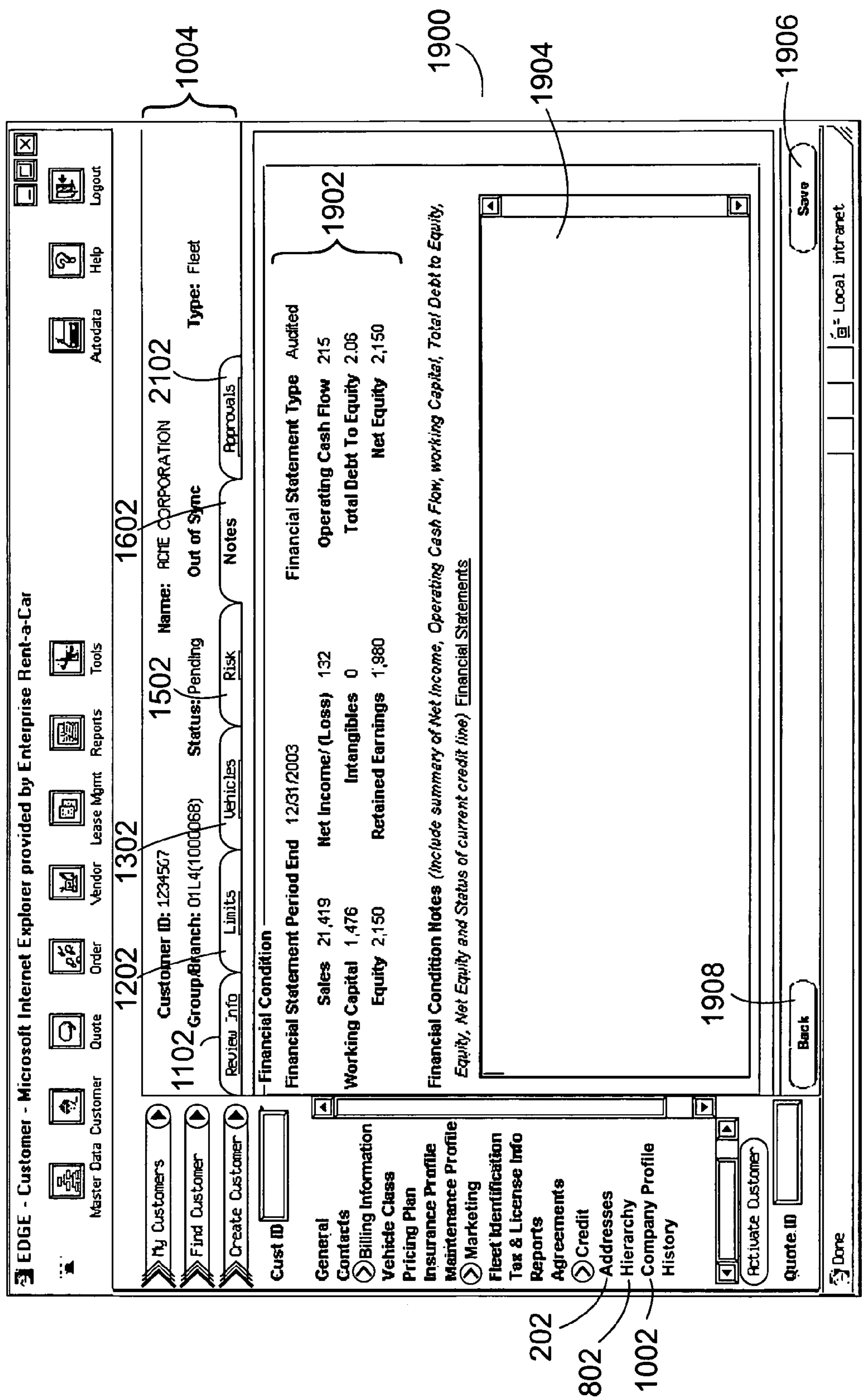
FIG. 19 illustrates an exemplary preferred customer financial condition description page.

Via link 1608 on page 1600, the user can call up page 1900 of FIG. 19. Within section 1902, page 1900 preferably displays various financial information about the customer (e.g., the customer's sales revenue for the latest reporting period, net income/losses, the customer's working capital, etc.). Within field 1904, the user can type in any notes that the user wishes to add about the customer company. Button 1906 is effective upon user selection to save any notes that have been added in field 1904 and button 1908 is effective upon user selection to return the user to page 1600. Page 1900 may optionally include a link to view a page that displays greater financial information about the customer.

Figure 20:
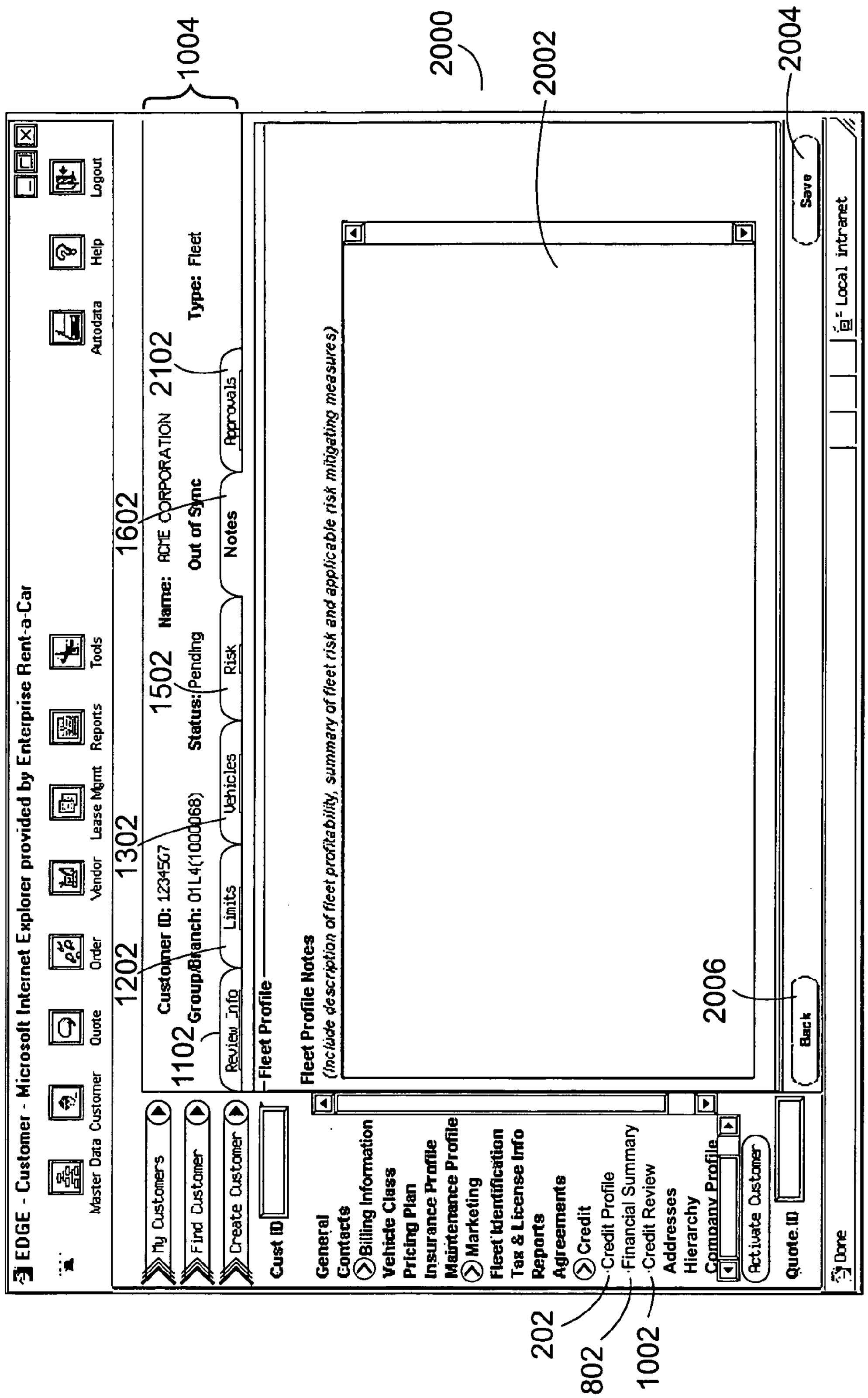
FIG. 20 illustrates an exemplary preferred fleet profile notes page.

Lastly, via link 1610 on page 1600, the user can call up page 2000 of FIG. 20. Within field 2002, the user can type in any notes that the user wishes to add about the customer company, particularly about the customer's fleet of leased vehicles. Button 2004 is effective upon user selection to save any notes that have been added in field 2002 and button 2006 is effective upon user selection to return the user to page 1600.

Thus, through page 1600, 1700, 1800, 1900, and 2000, the user is provided with easy access to information that can be of value when evaluating a customer's credit and further possesses the ability to add notes that may subsequently aid analysis of the customer's creditworthiness. Additional details about the system in connection with FIGS. 16-20 are described in Exhibit G appended hereto.

Figure 21:
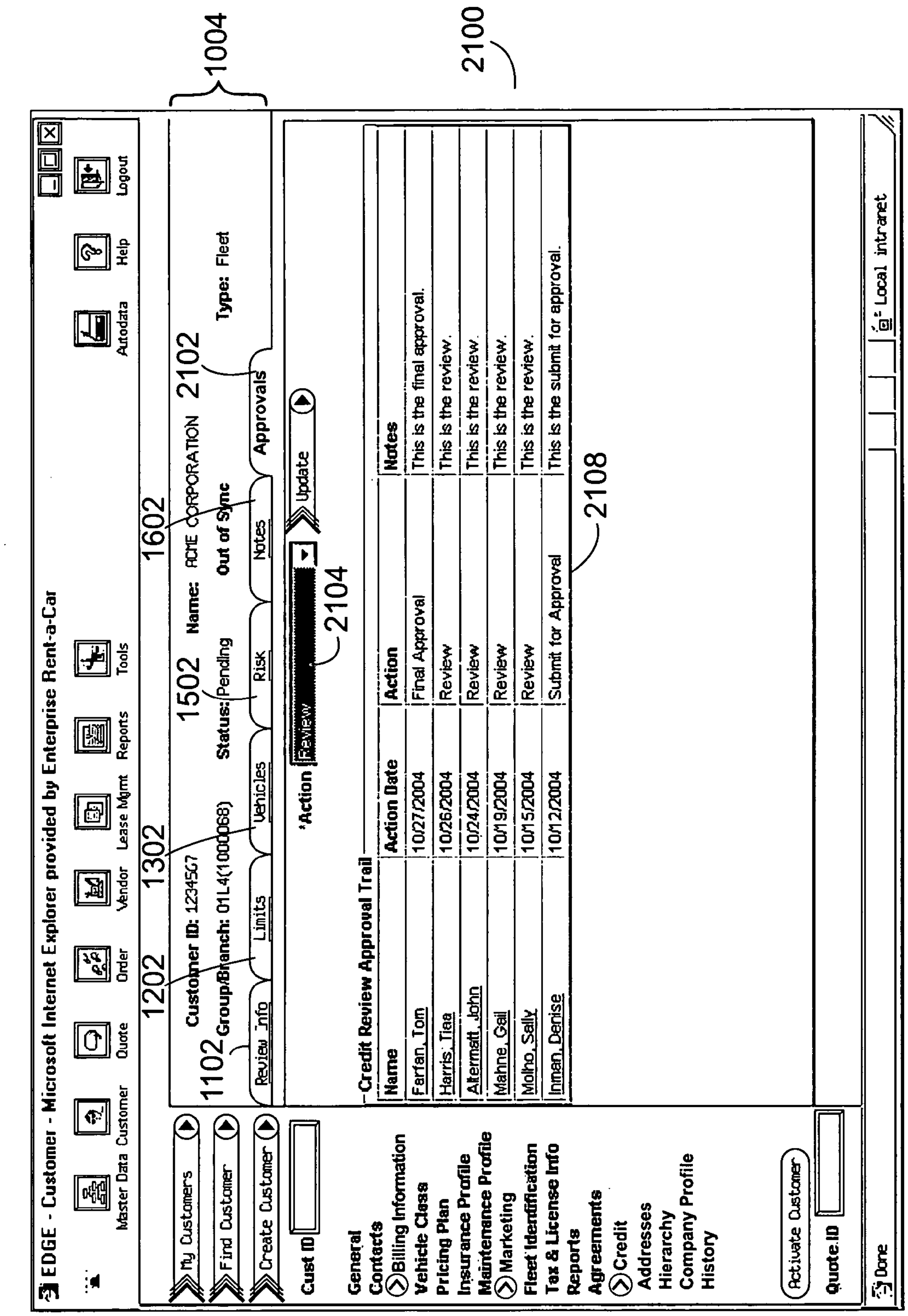
FIG. 21 illustrates an exemplary preferred credit review approvals page.
Figure 22:
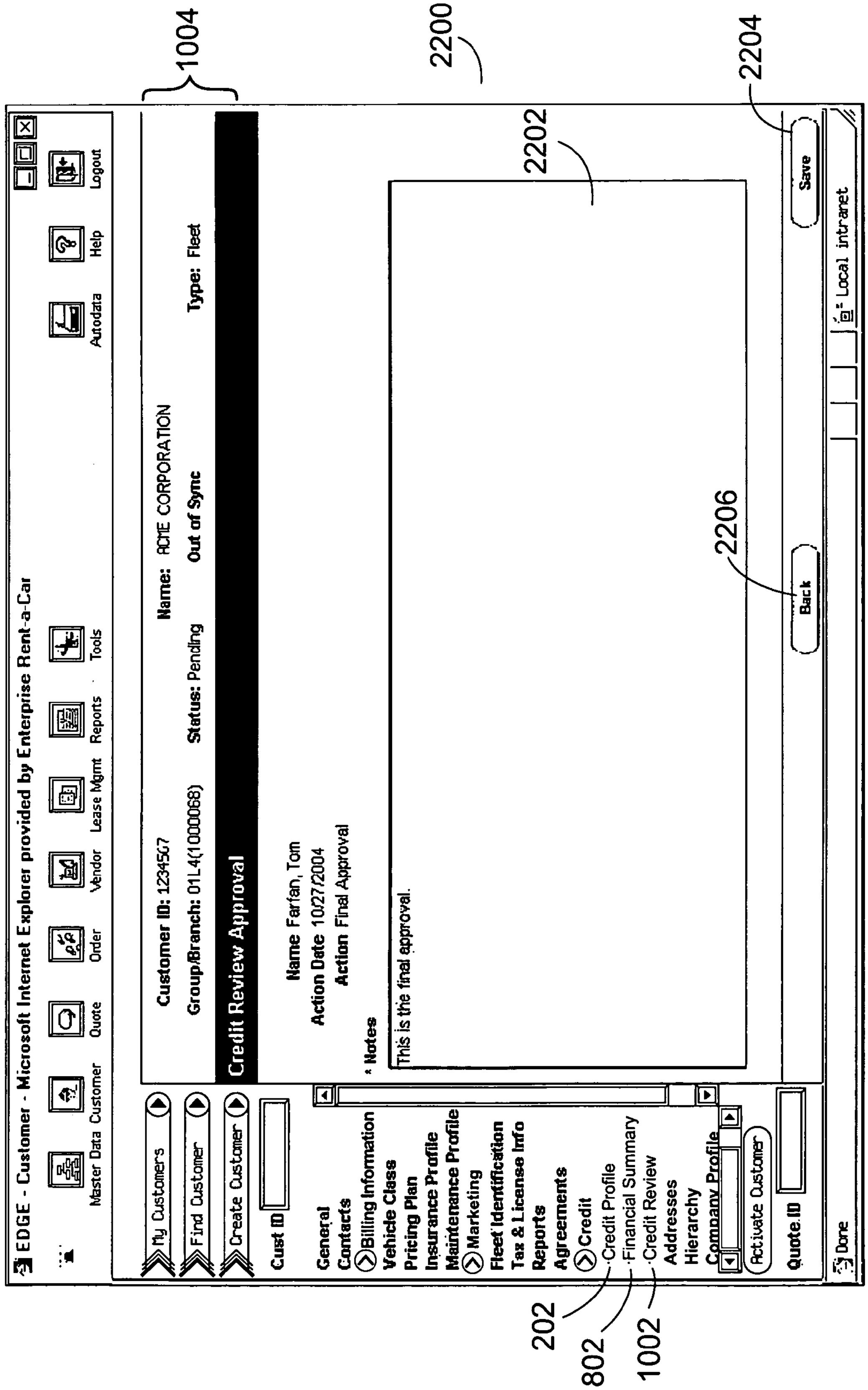
FIG. 22 illustrates an exemplary preferred credit review approvals update page.

FIG. 21 depicts a credit review approvals page 2100 that is displayed upon user selection of the approvals tab 2102. Page 2100 preferably shows a list of users who have taken an action in the selected credit review and further allows users to update any notes on that user's own actions (as well as view other user's actions). The user preferably identifies the action that he/she is taking on the credit review via field 2104 and its associated drop down menu. User selection of the "update" button on page 2100 is preferably effective to update the credit profile in accordance with the action identified by field 2104. The preferred choices of action include: (1) submitting a credit review for approval, (2) reviewing a credit review, (3) rejecting a credit review, (4) providing final approval for a credit review. FIG. 22 illustrates an exemplary page 2200 that is displayed after a user takes action via field 2104. Within page 2200, the action to be taken by the user is identified and a notes field 2202 is provided in which the user can enter notes regarding his/her action. Button 2204 is provided for finalizing the action to be taken and button 2206 is provided for returning the user to page 2100. Upon selection of the save button 2204, the status of the credit review is updated in accordance with the action taken by the user.

Table 2108 preferably shows the credit review approval trail for the identified customer. The table columns are preferably (1) the name of the user who took action on the credit review, (2) the date on which each user took action, (3) the action taken by each user, and (4) the notes entered by the user upon taking action. User selection of one of the links in the name column of table 2108 is preferably effective to call up a page that displays the comments in full for that linked name.

In the event the user either provides final approval or rejects a credit review, a snapshot of the credit review data is preferably saved at that time and subsequent accesses to that credit review are of a display-only variety. Preferably, only users with sufficient authority to approve or reject a credit review are given the ability to take such actions from page 2100.

If the user provides final approval, it is preferred that the customer's credit profile be updated in accordance with the approved credit review (e.g., updating the customer's credit limit to a new value). Furthermore, upon approval, it is preferred that the system automatically perform a credit check against the updated credit profile for any outstanding quotes or orders for that customer that have a status of "pending approval", "pending pre-approval" or the like. Additional details about the system in connection with FIGS. 21-22 are described in Exhibit H appended hereto.

As discussed above, each customer is preferably assigned to one or more users who may be called upon to review the customer's credit profile. Each user who has the ability to take action on a credit review (as opposed to users whose access is limited to a read-only view of the GUIs or limited to credit review initiation) preferably has an associated assigned credit approval level that is stored by the system. This assigned credit approval level preferably identifies either or both of a maximum number of lease vehicles for a customer's fleet that the user can approve and a maximum amount of risk for a given customer that the user can approve. By storing such approval limits for each user, the fleet management company can maintain control over the system users, preferably by assigning greater approval powers to more experienced fleet managers and lesser approval powers to less experienced fleet managers or to sales personnel. In turn, customer credit profile reviews can be assigned to different fleet managers based on the level of approval commensurate with the customer's credit needs. That is, a credit profile review for a customer having a fleet of 25 vehicles and a credit limit of $500,000 would preferably be assigned to a user who has sufficient authority to take action on a fleet or credit limit of that size, rather than being assigned to a user who only has sufficient authority to take approval action for fleets of less than 15 vehicles or $300,000. Software can be readily configured within the system, preferably within either or both the security framework system 110 or application server 102 to automatically assign and route customer credit reviews to users based on the users' assigned approval limits such that the credit profiles assigned to each user for review is of a scope that is commensurate with that user's credit approval limit. In turn, upon logging onto the system, the user can be presented with a page that lists credit reviews that have been assigned to him/her.

It is also worth noting that in many cases, the customer for whom the credit profile exists is a business entity having many subsidiaries and related companies that also maintain a fleet of leased vehicles. In such cases, that business entity can be referred to as a master customer, and the master customer's credit profile will preferably control credit decisions for all of the master customer's subsidiaries and related companies, each of which can be referred to as a subcustomer. As such, when assembling a credit profile or performing a credit review, this customer hierarchy will be taken into account by treating all of the subcustomer data as if it were master customer data. Thus, the master customer's credit profile preferably includes all of the financial information and vehicle information for the subcustomers within the master customer's hierarchy. Subcustomers preferably will not have an associated credit profile.

However, this need not be the case. In an alternative embodiment, each subcustomer (including any business unit of the master customer that is classified as a profit center) can have its own associated credit profile. This in turn, would provide users of the inventive system with the ability to make separate credit decisions for each subcustomer.

While the present invention has been described above in relation to its preferred embodiment, various modifications may be made thereto that fall within the invention's scope, as would be recognized by those of ordinary skill in the art. Such modifications to the invention will be recognizable upon review of the teachings herein by those of ordinary skill in the art. As such, the full scope of the present invention is to be defined solely by the appended claims and their legal equivalents.

Exhibit A

Customer Module

Functional Requirements Specification

Credit Profile

Table of Contents

I. Functional Requirements Specification Introduction

II. Screen Print(s)

A. Credit Conditions

B. Credit Hold—List

C. Credit Hold—Create

D. Credit Hold—Release

E. Order Hold—List

F. Order Hold—Create/Release

III. Detail Tables

A. Field Mapping Tables

1. Credit Conditions

2. Credit Hold—List

3. Credit Hold—Create

4. Credit Hold—Release

5. Order Hold—List

6. Order Hold—Create/Release

B. Business Validation/System Generated Notes

1. Credit Conditions

2. Credit Hold—Create

3. Credit Hold—Release

4. Order Hold—Create/Release

C. Page Actions

1. Credit Conditions

2. Credit Hold—List

3. Credit Hold—Create

4. Credit Hold—Release

5. Order Hold—List

6. Order Hold—Create/Release

Screen Action Specification

I. Functional Requirements Specification Introduction

Credit profile is applicable to Company Customers only and will be comprised of a five-tab screen. The Credit Conditions tab will allow the user to input critical credit parameters. The Credit Review tab will allow the user to input credit review information. The Credit Hold tab will allow the user to put a customer on credit hold and also release the existing credit holds for the customer. The Order Hold tab allows the user to put a customer on order hold or release a customer from order hold. The Comments tab allows the user to enter additional information for the customer. Only the Credit Conditions tab will initially be enabled for new customers. The other tabs will become available once the initial Credit Conditions are saved.

Comments are also a part of Credit Profile. See the screen action spec Common—Comments.doc for the details regarding comments.

II. Screen Print(s)

Figure 24:
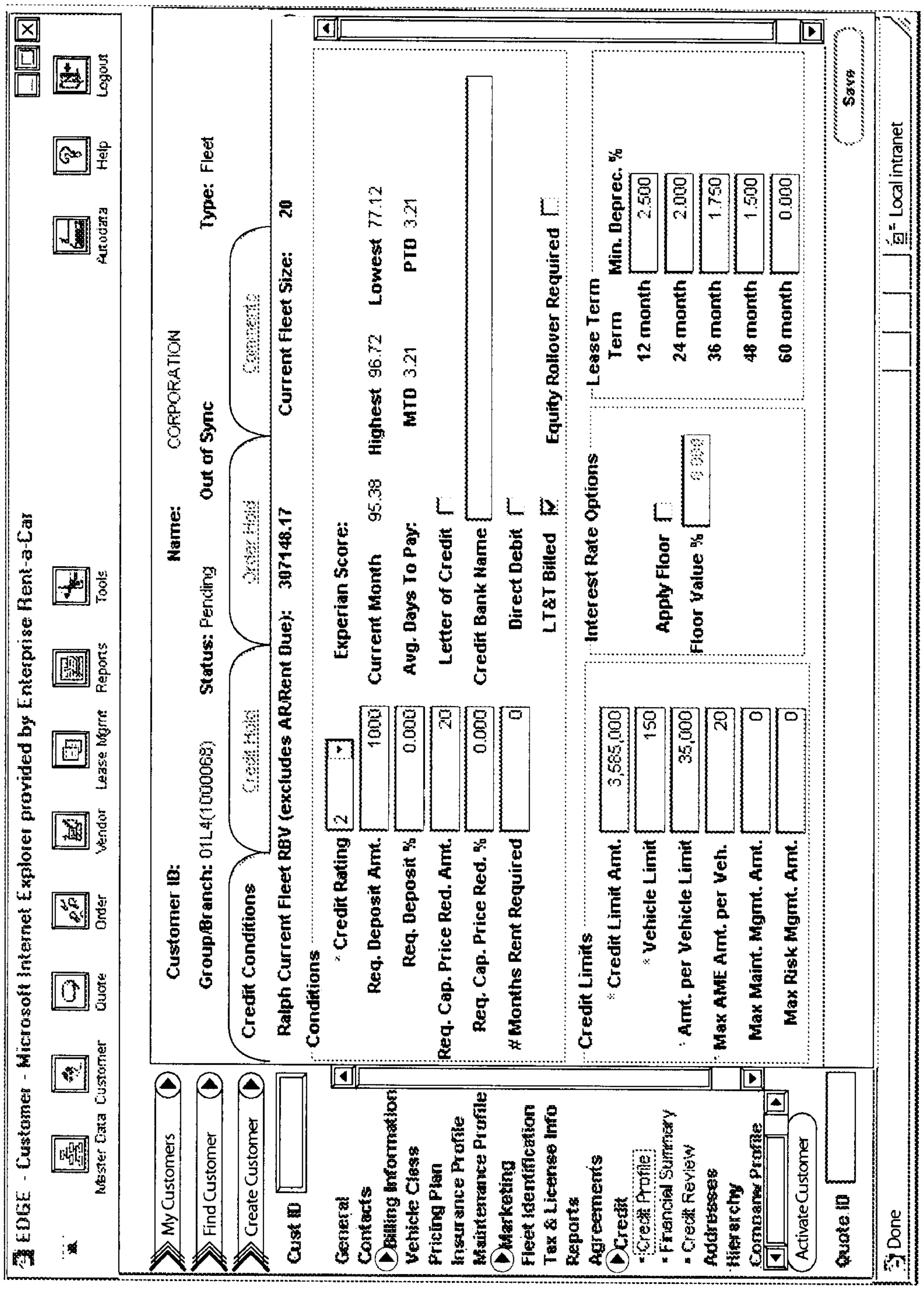
FIGS. 24-29 depict screenshots described in Exhibit A below.

A. Credit Conditions—see FIG. 24

Figure 25:
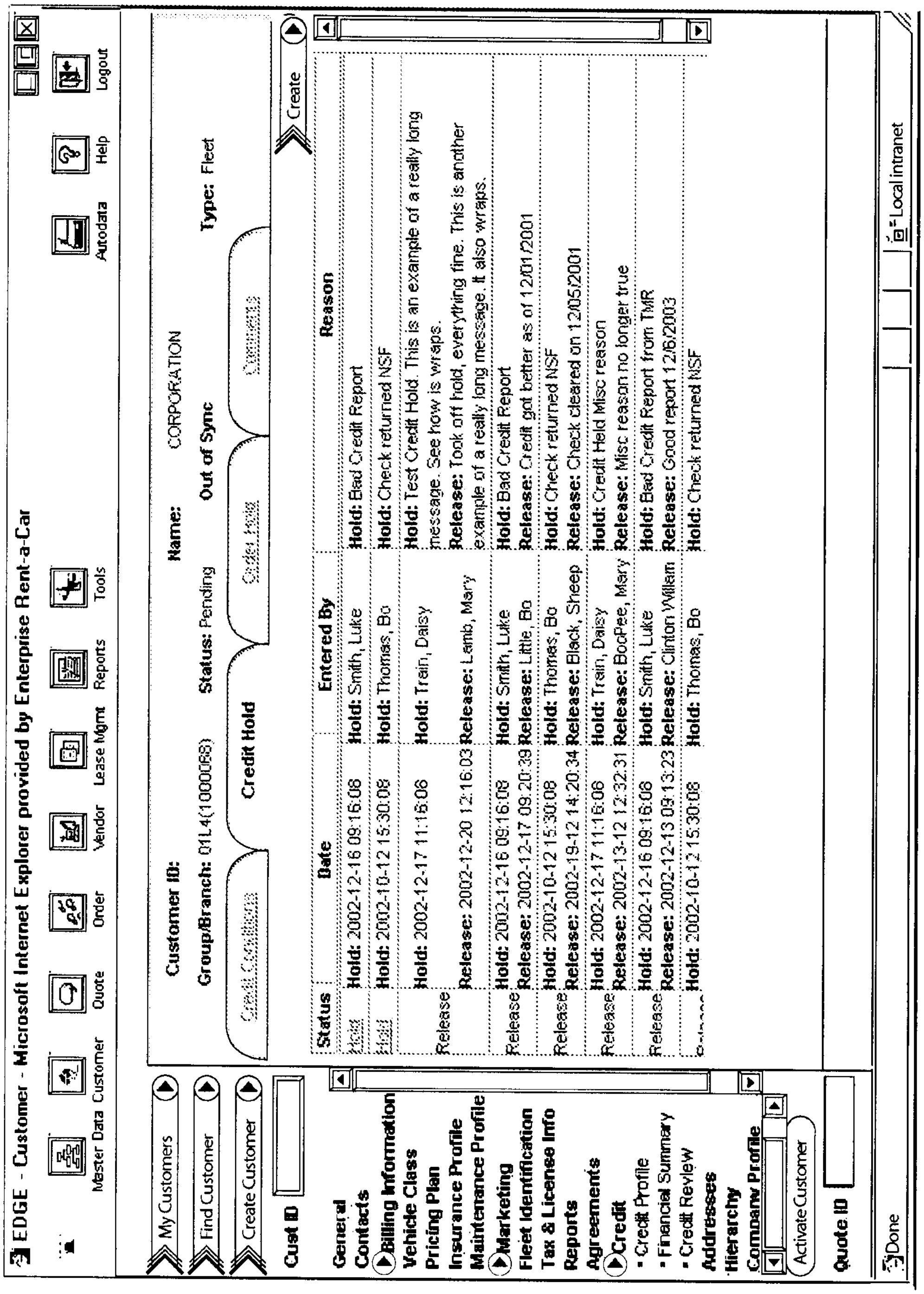

B. Credit Hold—List—see FIG. 25

Figure 26:
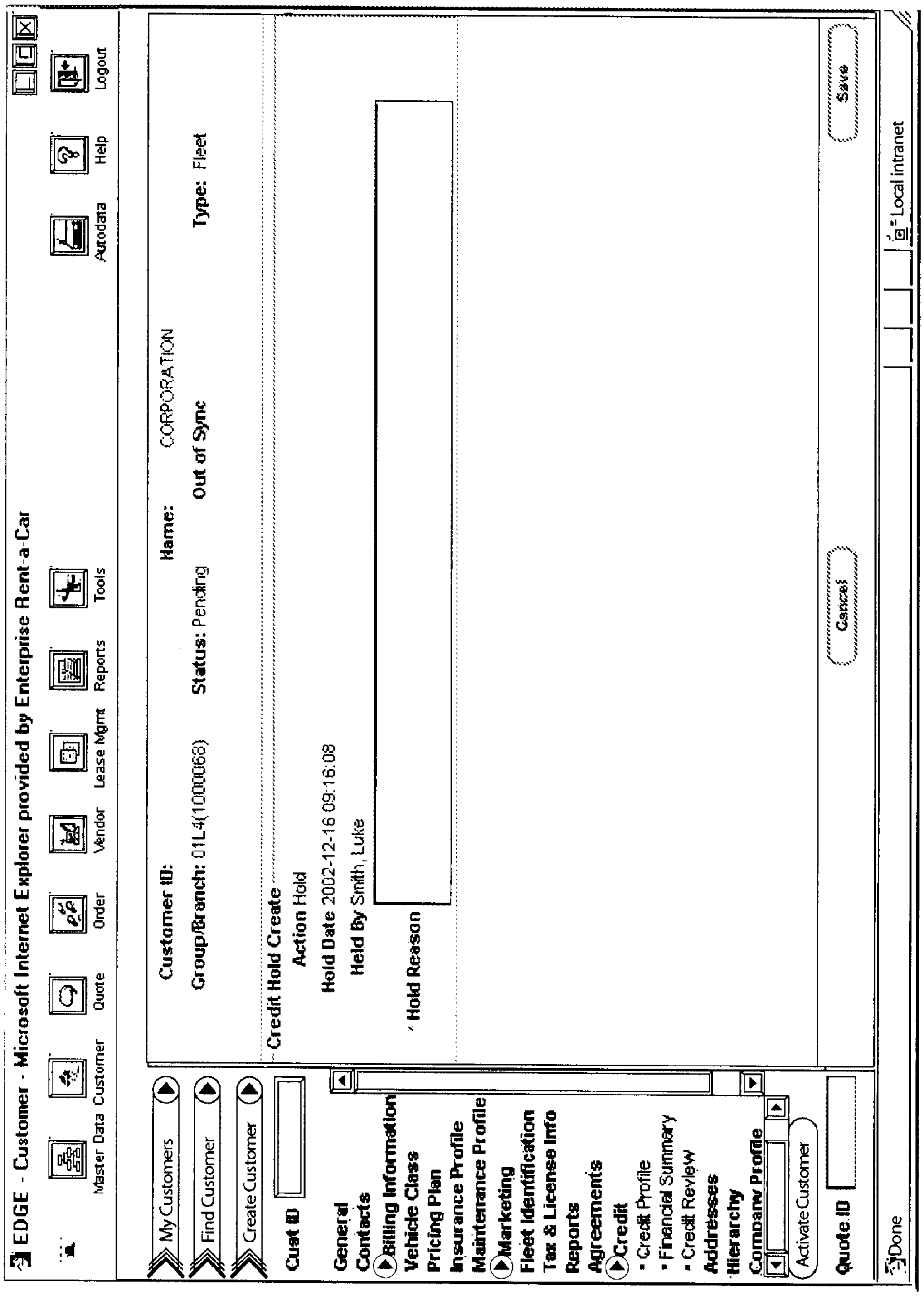

C. Credit Hold—Create—see FIG. 26

Figure 27:
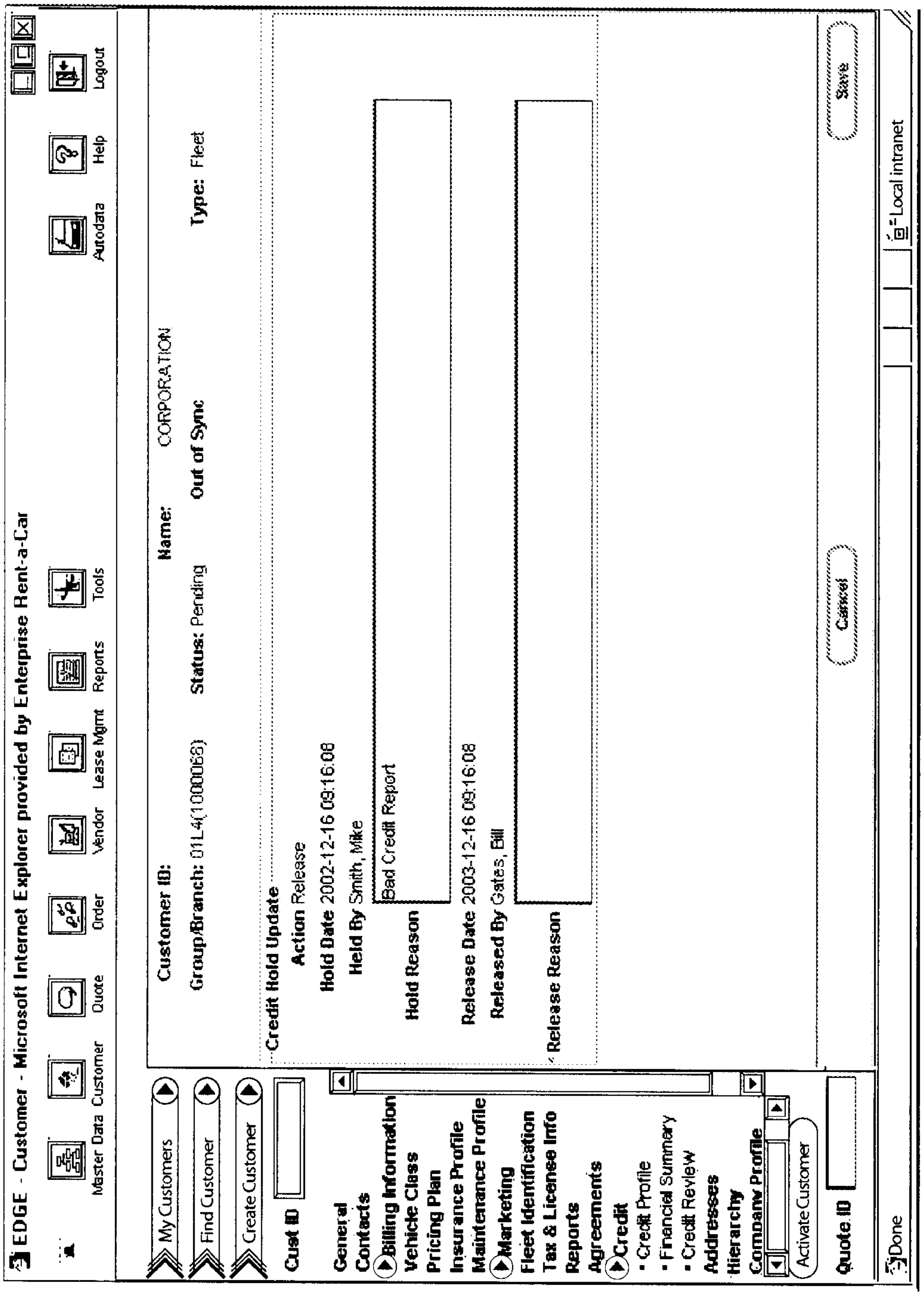

D. Credit Hold—Release—see FIG. 27

Figure 28:
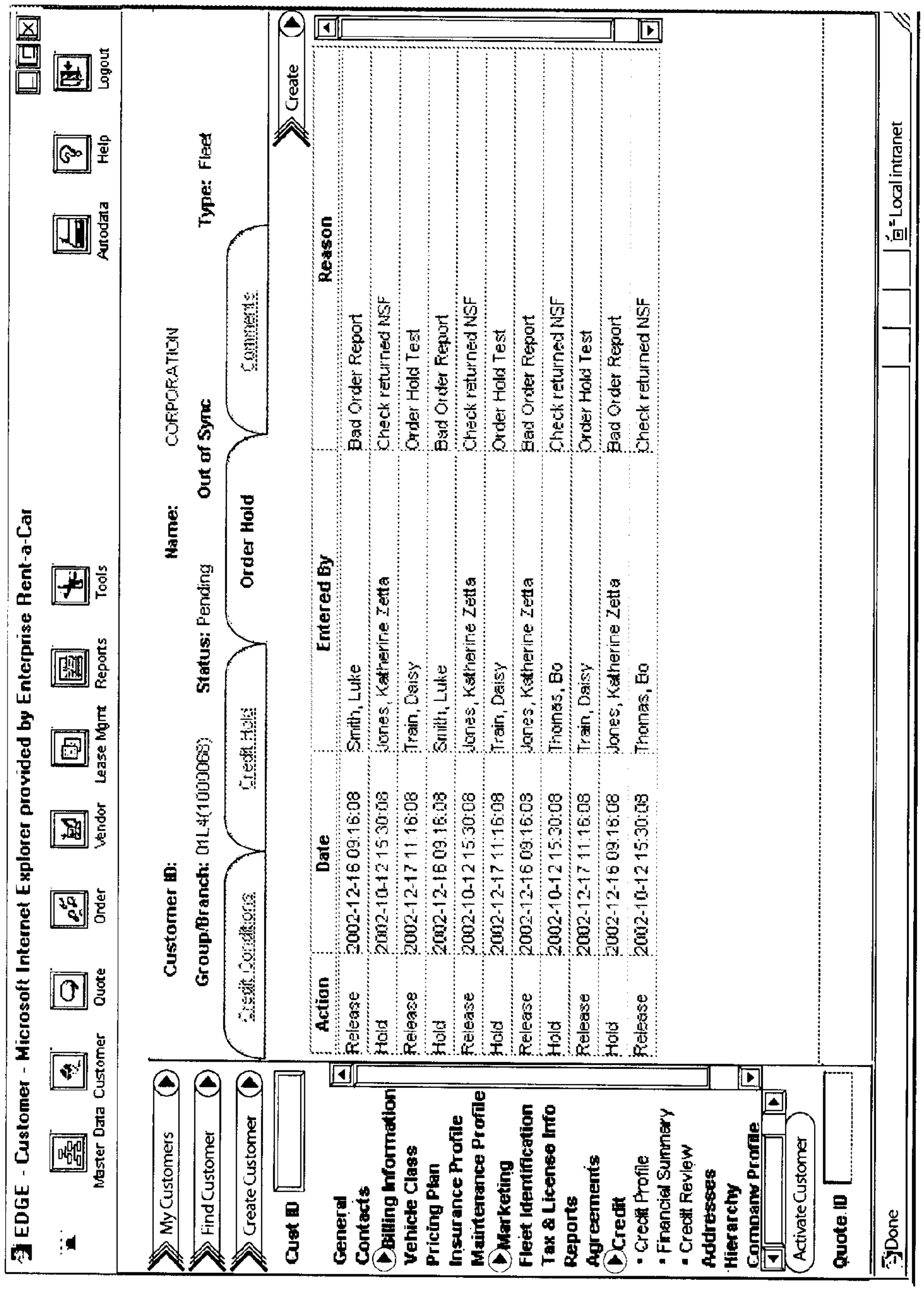

E. Order Hold—List—see FIG. 28

Figure 29:
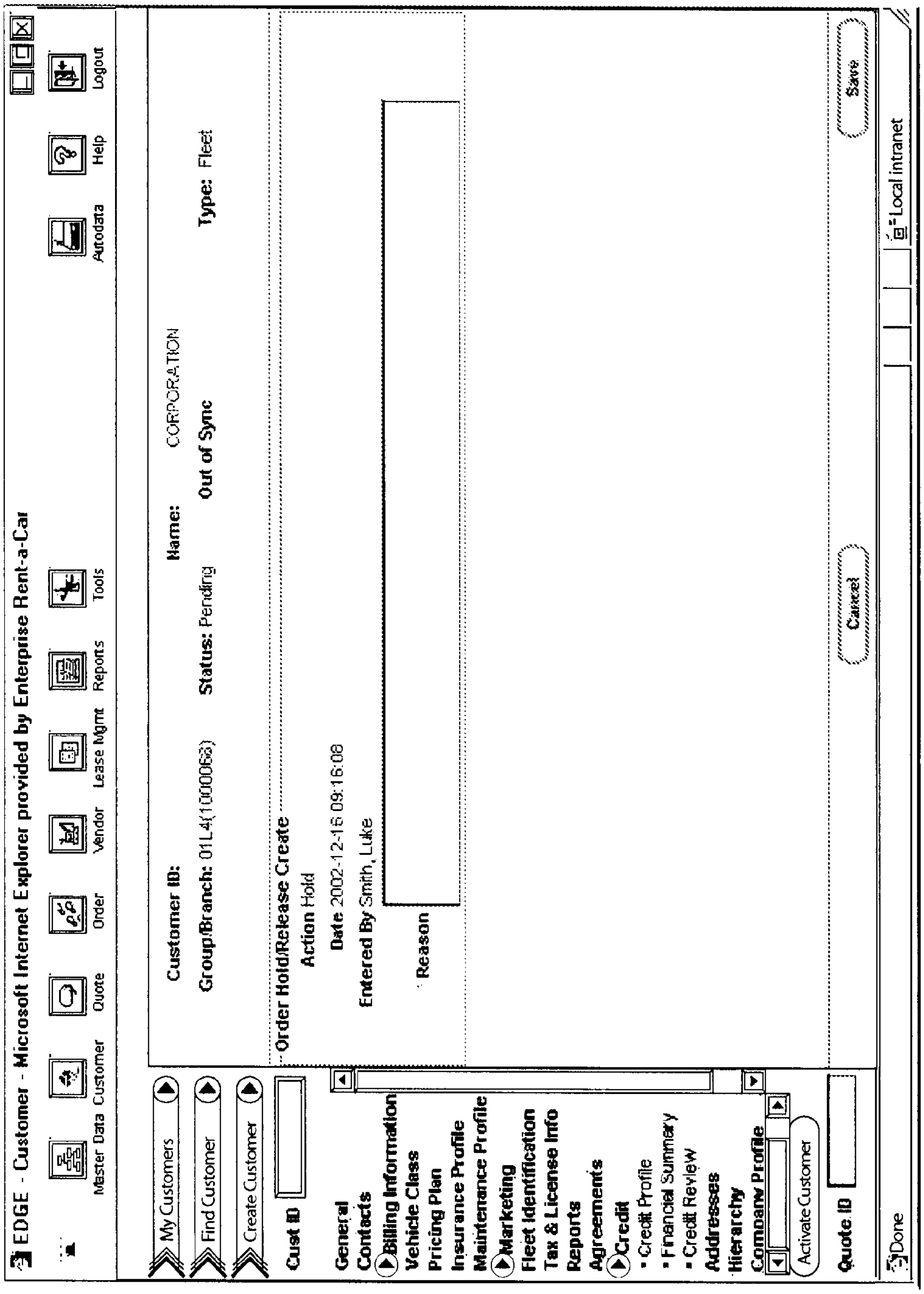

F. Order Hold—Create/Release—see FIG. 29

III. Detail Tables

A. Field Mapping Tables

1. Credit Conditions

| Field Name | Required | Control Type | Format | Specific Rules | Data Source Details |
|---|---|---|---|---|---|
| Ralph current RBV (excludes AR/Rent Due) | | Read Only | | | CustomerEntity.currentFleetRbv |
| Current Fleet Size | | Read Only | | | CustomerEntity.currentFleetSize |
| Credit Rating | Required | Drop Down | | | CustomerEntity.creditProfile.creditRating |
| Req. Deposit Amt. | | Text Entry | Standard Currency Format | | CustomerEntity.creditProfile.required DepositAmount. |
| Req. Deposit | | Text Entry | Standard Percentage Format | | CustomerEntity.creditProfile.required DepositPercentage |
| Req. Cap. Cost Red. | | Text Entry | Standard Percentage Format | | CustomerEntity.creditProfile.required CapCostReductionPercentage |
| Req. Cap. Cost Red. Amt. | | Text Entry | Standard Currency Format | | CustomerEntity.creditProfile.required CapCostReductionAmount |
| # Months Rent Required | | Text Entry | Standard Numeric Format | | CustomerEntity.creditProfile.months RentRequired |

-continued

| Field Name | Required | Control Type | Format | Specific Rules | Data Source Details |
|---|---|---|---|---|---|
| Current Month Experian Score | | Read only | Numeric 3,2 | | CustomerEntity.creditProfile. currentExperianScore |
| Highest Experian Score | | Read only | Numeric 3,2 | | Customer Entity.creditProlile. highestExperianScore |
| Lowest Experian Score | | Read only | Numeric 3,2 | | CustomerEntity.creditProfile. lowestExperianScore |
| MTD Average Days to Pay | | Read only | Numeric 3,2 | | CustomerEntity.creditProfile. mtdAverageDaysToPay |
| PTD Average Days to Pay | | Read only | Numeric 3,2 | | CustomerEntity.creditProfile. ptdAverageDaystoPay |
| Letter of Credit | | Check Box | | | CustomerEntity.creditProfile.letterOf Credit |
| Credit Bank Name | | Text Entry | Alpha Numeric (50) | Disabled until Letter of Credit checkbox is checked. Does not clear if Letter of Credit is unchecked | CustomerEntity.creditProfile.letterOf CreditBankName |
| Direct Debit | | Check Box | | | CustomerEntity.creditProfile.directDebit |
| LT&T Billed | | Check Box | | Defaults to 'selected'. | CustomerEntity.creditProfile. licenseTaxTitleBilled |
| Credit Limit | Required | Text Entry | Numeric 8,0 | | CustomerEntity.creditProfile.credit Limit |
| Vehicle Limit | Required | Text Entry | Standard Numeric Format | | CustomerEntity.creditProfile.vehicles Limit |
| Amt. Per Vehicle Limit | Required | Text Entry | Numeric 6,0 | | CustomerEntity.creditProfile.amount PerVehicleLimit |
| Max AME per Veh. | Required | Text Entry | Numeric 5,0 | | CustomerEntity.creditProfile.maximum AmePerVehicle |
| Max Maint. Mgmt. Amt. | | Text Entry | Standard Currency Format | | CustomerEntity.creditProtile.maximum MaintenanceManagementAmount |
| Max Risk Mgmt. Amt. | | Text Entry | Standard Currency Format | | CustomerEntity.creditProfile.maximumRisk ManagementAmount |
| Apply Floor | | Check Box | | | CustomerEntity.creditProtile.interest RateFloor |
| Floor value | | Text Entry | Standard Percentage Format | Enabled only when Apply Floor is checked. Defaults to the group rate default if it exists, otherwise defaults to the corporate rate default rate. | CustomerEntity.creditProfile.interest RateFloorPercentage |
| 12 month (Min Deprec.) | | Text Entry | Standard Percentage Format | Defaults to 2.50% | CustomerEntity.depreciationTermLimits. minimumDepreciationPercentage |
| 24 month (Min. Deprec.) | | Text Entry | Standard Percentage Format | Defaults to 2.00% | CustomerEntity.depreciationTermLimits. minimumDepreciationPercentage |
| 36 month (Min. Deprec.) | | Text Entry | Standard Percentage Format | Defaults to 1.75% | CustomerEntity.depreciationTermLimits. minimumDepreciation Percentage |
| 48 month (Min. Deprec.) | | Text Entry | Standard Percentage Format | Defaults to 1.50% | CustomerEntity.depreciationTermLimits. minimumDepreciationPercentage |
| 60 month (Min. Deprec.) | | Text Entry | Standard Percentage Format | Defaults to 0.00% | CustomerEntity.depreciationTermLimits. minimumDepreciationPercentage |

2. Credit Hold—List

| Field Name | Required | Control Type | Format | Specific Rules | Data Source Details |
|---|---|---|---|---|---|
| Status | | Read Only/Link | | Link is available for items with a status of Hold. | CustomerCreditHoldEntity.isOnHold |
| Date (Hold) | | Read Only | | Contains hold date. | CustomerCreditHoldEntity.holdDate |

-continued

| Field Name | Required | Control Type | Format | Specific Rules | Data Source Details |
|---|---|---|---|---|---|
| Date (Release) | | Read Only | | Contains release date. | CustomerCreditHoldEntity.releaseDate |
| Entered By (Hold) | | Read Only | | Contains Entered By for hold. | CustomerCreditHoldEntity.heldBy |
| Entered By (Release) | | Read Only | | Contains Entered By for release. | CustomerCreditHoldEntity.releasedBy |
| Reason (Hold) | | Read Only | | Contains Reason for hold. | CustomerCreditHoldEntity.holdReason |
| Reason (Release) | | Read Only | | Contains Reason for release. | CustomerCreditHoldEntity.releaseReason |

3. Credit Hold—Create

| Field Name | Required | Control Type | Format | Specific Rules | Data Source Details |
|---|---|---|---|---|---|
| Action | | Read Only | | Defaults to Hold. | CustomerCreditHoldEntity.isOnHold |
| Date | | Read Only | | Defaults to the current date | CustomerCreditHoldEntity.holdDate |
| Entered By | | Read Only | | Defaults to the current user. | CustomerCreditHoldEntity.heldBy |
| Reason | Required | Text Entry | Alpha Numeric (254) | | CustomerCreditHoldEntity.holdReason |

4. Credit Hold—Release

| Field Name | Required | Control Type | Format | Specific Rules | Data Source Details |
|---|---|---|---|---|---|
| Action | | Read Only | | Defaults to Release | CustomerCreditHoldEntity.isOnHold |
| Hold Date | | Read Only | | | CustomerCreditHoldEntity.holdDate |
| Held By | | Read Only | | | CustomerCreditHoldEntity.heldBy |
| Hold Reason | | Read Only | | | CustomerCreditHoldEntity.holdReason |
| Release Date | | Read Only | | Defaults to the current date. | CustomerCreditHoldEntity.releaseDate |
| Released By | | Read Only | | Defaults to the current user. | CustomerCreditHoldEntity.releasedBy |
| Release Reason | Required | Text Entry | Alpha Numeric (254) | | CustomerCreditHoldEntity.releaseReason |

5. Order Hold—List

| Field Name | Required | Control Type | Format | Specific Rules | Data Source Details |
|---|---|---|---|---|---|
| Action | | Read Only | | Contains Current action | |
| Date | | Read Only | | Contains date the action was completed | |
| Entered By | | Read Only | | Contains user who performed the action | |
| Reason | | Read Only | | Contains reason the action was performed | |

6. Order Hold—Create/Release

| Field Name | Required | Control Type | Format | Specific Rules | Data Source Details |
|---|---|---|---|---|---|
| Action | | Read Only | | If status is hold, default to Release. If status is released, default to Hold. | CustomerCreditHoldEntity.isOnHold. (if onHold = true, status is Hold else status is release |
| Date | | Read Only | | Defaults to the current date. | CustomerOrderHoldEntity.holdReleaseDate |
| Entered By | | Read Only | | Defaults to the current user. | CustomerCreditHoldEntity.enteredBy |
| Reason | Required | Text Entry | Alpha Numeric (254) | | CustomerCreditHoldEntity.holdReleaseReason |

B. Business Validation/System Generated Notes

1. Credit Conditions

| Validation | Save Msg Type | Property Key |
|---|---|---|
| Credit Rating is required. | Error | |
| Credit limit is required. | Error | |
| Vehicle Limit is required. | Error | |
| Amt. per Vehicle is required. | Error | |
| Max AME per Veh. is required. | Error | |
| Unauthorized to save a credit profile at this Credit Rating. | Error | |
| Unauthorized to save a credit profile at this Credit Limit Amount. | Error | |
| Unauthorized to save a credit profile at this Vehicle Limit. | Error | |
| Unauthorized to save a credit profile at this Amt. per Vehicle Limit. | Error | |
| Unauthorized to save a credit profile at this Max AME per Veh. | Error | |
| Req. Deposit Amt. must be greater than or equal to zero. | Error | |
| Req. Deposit Percentage must be greater than or equal to zero and less than 100. | Error | |
| Req. Cap Cost Red. Percentage must be greater than or equal to zero and less than 100. | Error | |
| Req. Cap Cost Red. Amt. must be greater than or equal to zero. | Error | |
| Months Rent Required must be greater than or equal to zero up to the lease term value. | Error | |
| Lease Term Minimum Depreciation values must be greater than or equal to zero and less than 100. | Error | |
| EFT/Direct Deposit is required for this Customer Warning on Credit conditions when Direct Debit is checked and the EFT/Direct Debit information is not filled in on the Billing Options page. Error if attempting to activate a unit AND the Direct Debit is checked AND the Bank name is not entered on the Billing Options page. | Warning/Error | |

2. Credit Hold—Create

| Validation | Save Msg Type | Property Key |
|---|---|---|
| Reason is required. | Error | |

3. Credit Hold—Release

| Validation | Save Msg Type | Property Key |
|---|---|---|
| Reason is required. | Error | |

4. Order Hold—Create/Release

| Validation | Save Msg Type | Property Key |
|---|---|---|
| Reason is required. | Error | |

C. Page Actions

1. Credit Conditions

| Description | Action Type | Action-Specific Rules | Actions/Data Source |
|---|---|---|---|
| Save | Button | Refreshes and redisplays Credit Conditions page. | |
| Credit Hold | Link | Goes to the Credit Hold page. | |
| Order Hold | Link | Goes to the Order Hold page. | |
| Comments | Link | Goes to the Comments page. | |

2. Credit Hold—List

| Description | Action Type | Action-Specific Rules | Actions/Data Source |
|---|---|---|---|
| Create | Button | Goes to the Credit Hold - Create page. | |

-continued

| Description | Action Type | Action-Specific Rules | Actions/Data Source |
| --- | --- | --- | --- |
| Hold (list item) | Link | Goes to the Credit Hold - Release page for the particular item. | |

3. Credit Hold—Create

| Description | Action Type | Action-Specific Rules | Actions/Data Source |
| --- | --- | --- | --- |
| Save | Button | Performs Save action, then redisplays the Credit Hold List. | |
| Cancel | Button | Redisplays the Credit Hold List without saving. | |

4. Credit Hold—Release

| Description | Action Type | Action-Specific Rules | Actions/Data Source |
| --- | --- | --- | --- |
| Save | Button | Performs Save action, then redisplays the Credit Hold List. | |
| Cancel | Button | Redisplays the Credit Hold List without saving. | |

5. Order Hold—List

| Description | Action Type | Action-Specific Rules | Actions/Data Source |
| --- | --- | --- | --- |
| Create | Button | Goes to the Order Hold/ Release page. | |

6. Order Hold—Create/Release

| Description | Action Type | Action-Specific Rules | Actions/Data Source |
| --- | --- | --- | --- |
| Save | Button | Performs Save action, then re-displays the Order Hold List. | |
| Cancel | Button | Redisplays the Order Hold List without saving. | |

Customer Module
Use Case Specification
Maintain Credit Profile

Table of Contents

I. Create/Update a Credit Profile
A. Brief Description

II. Flow of Events
A. Basic Flow—Update a Credit Profile
B. Alternate Flow—Credit Conditions
C. Alternate Flows—Credit Hold
D. Alternate Flows—Order Hold
E. Alternate Flows—Comments
F. Alternative Flows—Other III. Special Requirements
A. Updates to Credit Conditions Tab come from the Credit Review Process IV. Pre-Conditions V. Post-Conditions VI. BR—Credit Profile
A. General Credit Profile Business Rules
B. Credit Condition to Tab Business Rules
C. Credit Hold Tab Business Rules
D. Order Hold Business Rules Software Requirements Definition Section 1

Use Case

I. Create/Update a Credit Profile

A. Brief Description

The credit profile identifies information on the customer's credit rating and provides a way to identify critical credit profile parameters. It also the user to hold and release a customer from credit hold, hold and release a customer from order hold, and provides an area for comments. The function of creating and updating the credit profile are very similar with the main difference being that the credit check is performed with the update.

As of the EAM 3.4 release, the Customer Financial Summary has been removed from Credit Profile and exists as its own function.

As of the EAM 3.5 release, the Credit Review process has removed from Credit Profile and exists as its own function.

II. Flow of Events

Creating a Credit Profile

When creating a new credit profile (this can only be done once), only the Credit Conditions information will be available; all tabs will be disabled. The user will be required to tab through all of the required fields populating them with the appropriate values. Once the user has populated all required fields, the user can save the record. Once the save is successfully performed, the window will return to an update mode with the newly added record displayed and all previously disabled tabs will be enabled. See the Business Rules section for the details of the default values.

Updating a Credit Profile

Once a customer credit profile record has been created, the user will be allowed to edit the record. The user will be able to change any of the fields associated with the credit profile, depending on their Credit Approval Level.

A. Basic Flow—Update a Credit Profile

Beginning with EAM 3.5, the only way to change Credit Profile Values is to generate and gain Final Approval for a Credit Review.

The exception to this is that EDGE Master Role (Security Role only assigned to Group 77 (corporate) users) may still directly update Credit Profile.

1. The use case begins when the user selects a customer number:

a) The user may enter a customer number b) The user may select a customer from the list of customers assigned to him/her c) The user may search for a customer.

2. The user then selects to work with the Credit Profile a) If the customer number is a sub-customer, the system displays a read only version of the Master's credit profile.

b) The system provides an indicator showing that this is the master's credit profile.

c) The available tabs are: Credit Conditions, Credit Hold, Order Hold, and Comments.

d) The system defaults to the Credit Conditions tab.

e) If the credit profile is being created, the system loads the default values.

f) If the credit profile already exists, the system loads the saved values.

3. The user chooses the Credit Profile area to update or review (See the Alternate Flows):

a) Credit Conditions b) Credit Hold Activities c) Order Hold Activities d) Comments Activities 4. When the user has completed the desired actions, the use case ends.

B. Alternate Flow—Credit Conditions:

This tab defines critical credit parameters for the customer.

1. The "Ralph Current Fleet RBV" and "Current Fleet Size" are shown as read only.

2. Conditions Information:
- a) The user must select a credit rating, 1, 2, or 3, for the customer.
  - (1) Credit rating 1 is the highest (best) rating and 3 is the lowest (worst) rating.
- b) If the customer will be required to post a security deposit based on a dollar amount on each lease, the user may enter that amount for "Required Deposit Amount".
  - (1) If the Required Deposit Amount is entered, the Required Deposit % is not allowed.
- c) If the customer will be required to post a security deposit based on a percentage of each lease, the user may enter that percentage for "Required Deposit %".
  - (1) If the Required Deposit % is entered, the Required Deposit Amount is not allowed.
- d) If the customer will be required to meet a minimum capital price reduction amount for each lease, the user may enter that amount for "Required Capital Price Reduction Amount".
  - (1) If Required Capital Price Reduction Amount is entered, Required Capital Price Reduction % is not allowed.
- e) If the customer will be required to meet a minimum capital Price reduction percentage for each lease, the user may enter that percentage for "Required Capital Price Reduction %".
  - (1) If Required Capital Price Reduction % is entered, Required Capital Price Reduction Amount is not allowed.
- f) If the customer is required to post a certain number of months rent at lease inception, the user enters the Number of Months Rent Required.
- g) The system displays Experian Scores (indicates relative financial health of a company)
  - (1) Current Month Experian Score
  - (2) Highest Experian Score (Best)
  - (3) Lowest Experian Score (Worst)
- h) The system displays the Average Days to Pay for the Customer
  - (1) Month-to-Date Average Days to Pay
  - (2) Period-to-Date Average Days to Pay
- i) If a letter of credit from a financial institution exists, the user checks the letter of credit checkbox
  - (1) When the Letter of Credit checkbox is checked, the user may enter the Credit Bank Name.
- j) If the customer will be required to provide Electronic Funds Transfer (EFT), the user checks the Direct Debit checkbox
  - (1) The system displays a message letting the user know that the bank information is required on the Billing Options screen.
    - (a) See Billing Options and Billing Addresses Use Cases for the detailed Business Rules associated with Autopay.
- k) The user selects whether or not the LT&T costs are billed.
  - (1) This value is defaulted to bill LT&T upon entry.
- l) The user selects whether or not Equity Rollover is Required 3. Credit Limits Information:
- a) The user must enter the Credit Limit Amount.
- b) The user must enter the maximum allowed number of Vehicles (Vehicle Limit).
- c) The user must enter the maximum vehicle cost value (Amount per Vehicle Limit).
- d) The user must enter the maximum value allowable for Aftermarket Equipment (AME) (Maximum AME Amount per Vehicle).
- e) The user may enter the Maximum Maintenance Management Amount.
- f) The user may enter the Maximum Risk Management Amount.

4. Interest Rate Options:
- a) The user selects whether or not an interest rate floor applies for this customer.
  - (1) If the interest rate floor does apply, the system allows the floor percentage to be updated
  - (2) If the interest rate floor does NOT apply the user may not modify the floor interest rate percentage.

5. Lease Term Information:
- a) The user may modify the defaulted values for the 12, 24, 36, 48, and 60-month minimum depreciation values.

6. The user attempts to save the data by selecting the 'Save' button.
- a) The system validates that the user's credit approval level is greater than zero.
  - (1) If the user's approval level is set to zero, the system displays a messages telling the user the data could not be saved due to the credit approval level.
- b) The system validates that the following values are within the user's credit limit:
  - (a) Credit Limit Amount
  - (b) Vehicle Limit
  - (c) Amount per Vehicle Limit
  - (d) Maximum AME Amount per Vehicle c) If the user's credit approval level is less than the customer's limits, the system displays a messages telling the user the data could not be saved due to the credit approval level.

d) If the values are within the user's credit approval levels, the system saves the data.

(1) This is a Phase II customer item. If the save is an update to a previous value for the following items, the system creates a comment that states what was changed, the "from" and "to" values, who changed the value, and the time and date that the value was modified.

(a) Credit Rating
(b) Required deposit amount
(c) Required deposit %
(d) Required cap Price reduction amount
(e) Required cap Price reduction %
(f) # months rent required
(g) Credit limit amount
(h) Vehicle limit
(i) Amount per vehicle limit
(j) Max AME per vehicle
(k) Max maintenance management amount per vehicle
(l) Max risk management amount per vehicle
(m) Apply floor flag
(n) Floor percentage value
(o) Minimum deprecation % and corresponding lease term 7. The use case ends C. Alternate Flows—Credit Hold This tab allows users to add a customer to Credit Hold and/or release a customer from Credit Hold. Security measures will be implemented to restrict access to the Release function.

1. Display Credit Holds a) The system displays all existing Credit Holds for the customer b) Status—Values (1) "Hold" indicates that there is an active Credit Hold for this customer (a) Multiple "Hold" items may be active at any given time (b) Selecting a "hold" record initiates the release of that Credit Hold (2) "Release" indicates that a Credit Hold is no longer active for this customer.

(a) Once released, a Credit Hold cannot be reactivated; a new Credit Hold must be created.

c) Date—Values (1) The Hold Date indicates when the Credit Hold was initiated.

(2) The Release Date indicates when the Credit Hold was cleared.

(a) If the Credit Hold is active, no information is displayed for Release Date d) Entered By—Values (1) The Held by indicates the user who initiated the Credit Hold (2) The Release Entered By indicates the user who cleared the Credit Hold (a) If the Credit Hold is active, no information is displayed for Release Entered By e) Reason—Values (1) The Hold Reason indicates why the Credit Hold was initiated (2) The Release Reason indicates why the Credit Hold was released (a) If the Credit Hold is active, no information is displayed for Release Reason f) The user reviews the information and the use case ends.

2. Credit Hold—Create a) The user selects to Create a new credit hold for the current customer b) The system verifies that the user is allowed to create a Credit Hold (1) If the user is not authorized to create a Credit Hold, the system displays a message and the use case ends.

c) The system provides some information which can not be changed:

(1) Action="Hold"
(2) Hold Date=Current System Timestamp
(3) Held By=Current System User d) The user must enter a reason for the Credit Hold being initiated.

e) The user selects to save the data.

(1) If the user selects to Cancel the Credit Hold Create before selecting Save, the system does not save the data and the Credit Hold list is redisplayed.

f) The system validates that there has been some data added to the Credit Hold Reason (1) If no data is entered in the Credit Hold Reason, a message is displayed and the data is not saved g) The system saves the Credit Hold Information and redisplays the list of all Credit Holds for this customer.

h) The use case ends.

3. Credit Hold Update (Release)

a) The user selects the active Credit Hold that is to be released.

b) The system provides some information which can not be changed:

(1) Action=Release
(2) Hold Date=The date of the original Credit Hold
(3) Held By=The user that entered the original Credit Hold
(4) Hold Reason=The original Hold Reason for this Credit Hold
(5) Release Date=The current System Date
(6) Released By=The current system user.

c) The user must enter a Credit Hold Release Reason d) The user selects to save the data.

(1) If the reason is not specified, the system will display a message telling the user that the reason is required and the data will not be saved.

(2) If the user does NOT want to release this Credit Hold, they select to Cancel and the system redisplays the Credit Hold List.

e) The system validates that the user's credit approval level is greater than zero.

(1) If the user's approval level is set to zero, the system displays a messages telling the user the data could not be saved due to the credit approval level.

(a) The system validates that the following values are within the user's credit limit:

(i) credit dollar amount
(ii) maximum vehicle count
(iii) vehicle cost
(iv) AME (2) If the user's credit approval level is less than the customer's limits, the system displays a messages telling the user the data could not be saved due to the credit approval level.

(3) If the values are within the user's credit approval levels, the system saves the data.

f) The system updates the Release information and moves the released Credit Hold to the released holds section.

g) The system saves the data (1) Clears the released section (2) Displays the status as Release (3) Displays the Hold Date & Release Date (4) Displays the Held by & Hold Release By (5) Displays the Hold Reason & Release Reason h) When the final hold record is released, the customer Credit Hold status overlay is removed and the Customer status displays the current customer status (Pending, Active, or Incomplete).

i) The use case ends.

D. Alternate Flows—Order Hold

This tab allows users to assign or release a customer from Order Hold.

1. Order Hold Display a) The system displays the history of Order Holds for this customer (1) These values can not be changed on this page.

(2) The list is sorted in descending Hold Date/Release Date.

(3) Action—Hold or Release (4) Date—Date Order Hold was initiated or Date Order Hold was Released (5) Entered By—Order Held by or Order Hold Release Entered By (6) Reason—Reason Held or Reason Released b) The user reviews the data and the use case ends.

2. Review Hold—A modified version of Order Hold a) Create Review Hold (1) Review hold is created when a process, outside of EDGE, runs based on the rules defined below. The process will:

(a) Only update customers who are not already on Order Hold or Review Hold.

(b) Only customers that are active will be considered for Order Hold.

(c) Compare each customer's latest approved credit review date to the current date (i) If the difference is greater than the number of months defined as the credit review hold limit, the system creates an Order Hold for the customer and all its sub customers.

(ii) For an order hold created by the system, the following information will display for the order hold (a) Action—Hold (b) Date—date the system put the customer on order hold (c) Entered by—System (d) Reason—Customer's credit has not been reviewed/approved in X months.

(i) Where X is the number of months since the customer's last approved credit review.

b) The system overlays the customer status with Review Hold for the Master and all the sub customers.

(1) A customer can only be removed from Review Hold by the completion and final approval of the Credit Review.

c) The use case ends

3. Order Hold—Create a) The user selects to create an Order Hold for the customer (1) If the customer is already on Order Hold the system generates a Release transaction See the Order Hold—Release section below.

b) The system displays the following which can not be changed (1) Action=Hold (2) Date=Current system timestamp (3) Entered By=Current system user c) The user must enter a Reason explaining why the Order Hold is being initiated d) The user selects to saves the data.

(1) If the user does not input an Order Hold Reason, the system will display a message stating that the Reason is required and the updates are not saved.

(2) If the user does not want to initiate the Order Hold, they may select to Cancel and the system will NOT save the updates.

e) The system displays the new data in the Order Hold Display f) The system overlays the customer status with Order Hold g) The use case ends 4. Order Hold—Release a) The user selects to Release the customer from Order Hold (1) If the customer is not currently on Order Hold, the system generates a Hold transaction. See the Order—Hold section above.

(2) If the customer is on Review Hold (modified version of Order Hold), the user cannot Release the Order Hold.

b) The system displays the following which can not be changed:

(1) Action=Release (2) Date=Current system timestamp (3) Entered By=Current system user c) The user must enter an Order Hold Release Reason d) The user selects to save the data (1) If the user does not input an Order Hold Release Reason, the system will display a message stating that the Reason is required and the updates are not saved.

(2) If the user does not want to Release the Order Hold, they may select to Cancel and the system will NOT save the updates.

e) The system validates that the user's credit approval level is greater than zero.

(1) If the user's approval level is set to zero, the system displays a messages telling the user the data could not be saved due to the credit approval level.

f) The system validates that the following values are within the user's credit limit:

(a) credit dollar amount (b) maximum vehicle count (c) vehicle cost (d) AME (2) If the user's credit approval level is less than the customer's limits, the system displays a messages telling the user the data could not be saved due to the credit approval level.

(3) If the values are within the user's credit approval levels, the system saves the data.

g) The system removes the Order Hold overlay h) The system displays the Order Hold Display with the Release entry included.

i) The use case ends

E. Alternate Flows—Comments

Allows users to enter general comments or additional information about the customer.

1. Comments Display:

a) The system displays the following for all comments previously entered for a customer, which can not be changed.

(1) Comments—Text information logged by the user regarding the customer (2) Entered By—The person that entered the Comments (3) Date Entered—The system timestamp from the entry of the comment (4) Comments are displayed in ascending order by Date Entered b) The user reviews the comments and the use case ends.

2. Comments Create a) The user selects to Create a comment for the customer.

b) See the Common functions for details.

c) The Use Case Ends

F. Alternative Flows—Other

1. Moving between tabs or leaving the screen for all tabs a) If the user attempts to change tabs or leave the screen and the data is not saved, the system will display a response message requesting the user to save the data.

(1) A 'Yes' reply performs validations and saves the updates if the validations pass (2) A 'No' reply will discard all updates.

b) The Use Case Ends

2. Perform the credit checks on outstanding quotes with updates on the Credit Conditions tab a) If the credit dollar amount, vehicle count, vehicle cost, or AME limits on the credit conditions tab are updated, the system will perform the credit check on all Pending Approval or Pending Re-approval quotes for the customer.

(1) If the quote passes the credit check, the system will approve the quote.

(2) If the quote does not pass the credit check, the system will not change the quote status.

b) The Use Case Ends

III. Special Requirements

A. Updates to Credit Conditions Tab Come from the Credit Review Process

1. Beginning with EAM 3.5, the only way to change Credit Profile Values is to generate and gain Final Approval for a Credit Review.

a) The exception to this is that Corporate users (Gp 77) can update Credit Profile with proper security clearance via the EDGE Master role.

IV. Pre-Conditions

1. The user must be logged on to EDGE and have appropriate security access to create and update a credit profile.

V. Post-Conditions

1 The customer credit profile is established/updated with the appropriate information.

Section 2

Business Rules

VI. BR—Credit Profile

The following business rules apply to creating and updating the customer credit profile.

A. General Credit Profile Business Rules

Beginning with EAM 3.5, the only way to change Credit Profile Values is to generate and gain Final Approval for a Credit Review.

1. The credit profile is only applicable for fleet and commercial customers.

2. The credit profile does not apply to individual or employee customer types.

3. The system will validate that the credit profile values for credit dollar limit, number of vehicles, vehicle amount limit, and maximum AME limit are within the user's credit approval level established in master data, user security.

4. The credit profile values are only editable for customers in the user's group.

5. For customers outside the user's group, the credit profile values will be read only except for corporate users who have full access to customers in all groups pending proper security setup.

6. The credit profile for fleet customers is only applicable for master customers. Sub-customers do not have their own credit profile.

B. Credit Condition Tab Business Rules

1. Defaults:

a) All values should default to NULL/Unchecked if no previous value has been entered except:

(a) Minimum Depreciation values which will default as follows:

For NEW customers that have NO Credit Profile established, the Depreciation Rates come from the Default Rates for the Group.

(i) If the Group has no default rates, then use the Corporate (Group 77) Default Rates.

(2) Floor Value %—At create, this will default from the Corporate/Group Rate Default.

(a) Once the user checks "Apply Floor", the value entered at the time of the save will be saved to the database and redisplayed from there; even if the "Apply Floor" is Unchecked later.

(b) If the user does not check "Apply Floor" during the initial create, the value for Floor Value % will continue to default from the Corporate/Group Rate Default. The value has no meaning unless the "Apply Floor" is also checked.

2. A note stating, "excludes AR/Rent Due," must be displayed under the current RALPH fleet RBV.

3. Credit rating is required. Valid values are 1, 2, and 3.

4. A user must have a credit approval authority of 35 or more units to assign a credit rating of 1.

5. The Credit Bank Name is not enabled until the Letter of Credit checkbox is checked.

6. Required deposit amount is a numeric, currency field containing two decimal places and allowing numbers greater than or equal to zero.

7. Required deposit percent is a numeric field containing two decimal places and allowing numbers greater than or equal to zero and less than 100.

8. Required cap Price reduction percent is a numeric field containing two decimal places and allowing numbers greater than or equal to zero and less than 100.

9. Required cap Price reduction amount is a numeric, currency field containing two decimal places and allowing numbers greater than or equal to zero.

10. The number of month rent is an integer value allowing numbers greater than or equal to zero up to the lease term value and representing the number of months rent to be collected up-front.

11. Credit Limit dollar amount is a numeric currency field allowing numbers greater than or equal to zero and representing the total dollar amount of outstanding credit allowed for this customer. Credit Limit dollar amount is required.

12. The Vehicle Limit is an integer value allowing numbers greater than zero and representing the total number of Enterprise owned leased vehicles allowed for the customer. Vehicle Limit is required.

13. The Amount per Vehicle limit is a numeric currency value containing two decimal places and allowing numbers greater than or equal to zero and representing the maximum single vehicle value allowed for the customer.

14. The Maximum AME amount per vehicle is a numeric currency value containing two decimal places and allowing numbers greater than or equal to zero and representing the maximum total capitalized AME allowed on a single vehicle for the customer.

15. The Maximum maintenance management amount is a numeric currency value containing two decimal places and allowing numbers greater than or equal to zero and representing the total maximum outstanding maintenance management amount allowed for the customer.

16. The Maximum risk management amount is a numeric currency value containing two decimal places and allowing numbers greater than or equal to zero and representing the total maximum outstanding risk management amount allowed for the customer.

17. The Bill LT&T indicator defaults to selected.

18. The floor indicator will allow the user to select Apply Floor
  a) The floor indicator will default to selected.

19. The floor interest rate will only display if the Apply Floor is selected.
  a) The floor interest value defaults to the group rate default, if available and to the corporate rate default is no group rate default is defined.

20. The Minimum depreciation is a numeric value containing two decimal places and allowing numbers greater than or equal to zero but less than 100. This value represents the minimum depreciation by term allowed for any lease for the customer.

21. Phase II item—A comment will be written to include the name of the value that was changed, the from and to values, the user who made the change, and the date/time of the change when any of the credit condition values, except the letter of credit information C. Credit Hold Tab Business Rules 1. Upon entering the tab, the following rules apply:
  a) The Credit Hold list is non-editable.
  b) The Credit Hold list will contain:
    (1) Credit Hold creation timestamp—a value that contains the date and time the customer was placed on Credit Hold status.
    (2) Credit Hold Release timestamp—a value that contains the date and time the customer was released from Credit Hold status.
    (3) Credit Hold Reason—an alphanumeric value containing the reason the customer was placed on hold with a maximum character length of 255.
    (4) Credit Hold Release Reason—an alphanumeric value containing the reason the customer was released from Credit Hold with a maximum character length of 255.
    (5) Credit Held by (name of the user who added the Credit Hold record)—an alphanumeric value containing a concatenation of the user's last name, first name, and middle initial
    (6) Credit Hold Release Entered By (name of the user who released the Credit Hold record)—an alphanumeric value containing a concatenation of the user's last name, first name, and middle initial
  c) The Release information will be blank until a hold record is released.
  d) Multiple Credit Holds may be active at any one time.
  e) The History list is populated with any prior hold notices that have been released. These items will be listed in descending order by date released.

2. The user can create a Credit Hold for Fleet Master customers and Commercial customers only.

3. A Credit Hold can be created regardless of the status of the Out-Of-Sync flag.

4. Placing the Fleet Master customer on Credit Hold, restricts the entire customer hierarchy from any further sales activity until the Credit Hold has been released.

5. The system will NOT allow a sub customer (and/or its branches) to be placed on Credit Hold independently.

6. Credit Hold records can NOT be deleted. They must be released if they are not accurate.

D. Order Hold Business Rules

1. When a Master customer is put on Order Hold, the entire hierarchy is put on Order Hold.

2. A sub customer cannot be put on Order Hold independently of the master customer.

3. When a customer is on Order Hold, mandatory credit approval is required even if the quote passes the credit checks.

4. With proper management approval on a quote, a customer on order hold can obtain new vehicles. The customer does not need to be released from order hold to have vehicles ordered and delivered.

5. Quote creation is allowed when a customer in on Order Hold.

6. Entered By is a system-filled, read-only text field containing the creating user's last name, first name, and middle initial.

7. The Reason field is a required alphanumeric value. Additions are allowed, but deletes and updates are not allowed.

8. Date is a system-filled read-only date field.

9. Order Hold Display is a system-filled read-only text field listing the Action, Date, the user who put the customer on Order Hold or released the customer from Order Hold, and the Comments associated with the transaction.

10. When a customer is put on Order Hold, the customer status will show Order Hold. Order hold overrides all customer statuses (Pending, Active, or Incomplete).

a) If a customer is also on Credit Hold, the customer status will show Credit Hold because credit hold overrides all statuses.

11. When a customer is released from Order Hold, the customer status will display the actual customer status (Pending, Active, or Incomplete) unless the customer is on credit hold at which point Credit Hold will overlay the normal status.

12. If a save is performed and the required fields are not filled in, the system will provide a message requesting the user to fill the required fields.

Exhibit B

Customer

Functional Requirements Specification

Maintain Financial Summary

Table of Contents

I. Functional Requirements Specification Introduction

II. Screen Print(s)

A. Financial Summary List (top)

B. Financial Summary List (middle)

C. Financial Summary List (bottom)

D. Financial Summary Create (top)

E. Financial Summary Create (middle)

F. Financial Summary Create (bottom)

G. Financial Summary Update (top)

H. Financial Summary Update (middle)

I. Financial Summary Update (bottom)

III. Detail Tables

A. Field Mapping Tables

1. Financial Summary List

2. Financial Summary Create

3. Financial Summary Update

B. Business Validation/System Generated Notes

1. Financial Summary Create

2. Financial Summary Update

C. Page Actions

1. Financial Summary List

2. Financial Summary Create

3. Financial Summary Update

IV. Exceptions from Standards

Screen Action Specification

I. Functional Requirements Specification Introduction

The user may Create/Update/Delete Financial Summary records for a customer. The 5 most recent financial summary records will be displayed on the list screen. The user may create new financial summary records, update or delete any of the 5 most recent records that are shown on the screen. All values are entered and displayed in thousands (i.e. If 10,000 is the actual number, 10 is entered and displayed).

II. Screen Print(s)

Figure 30:
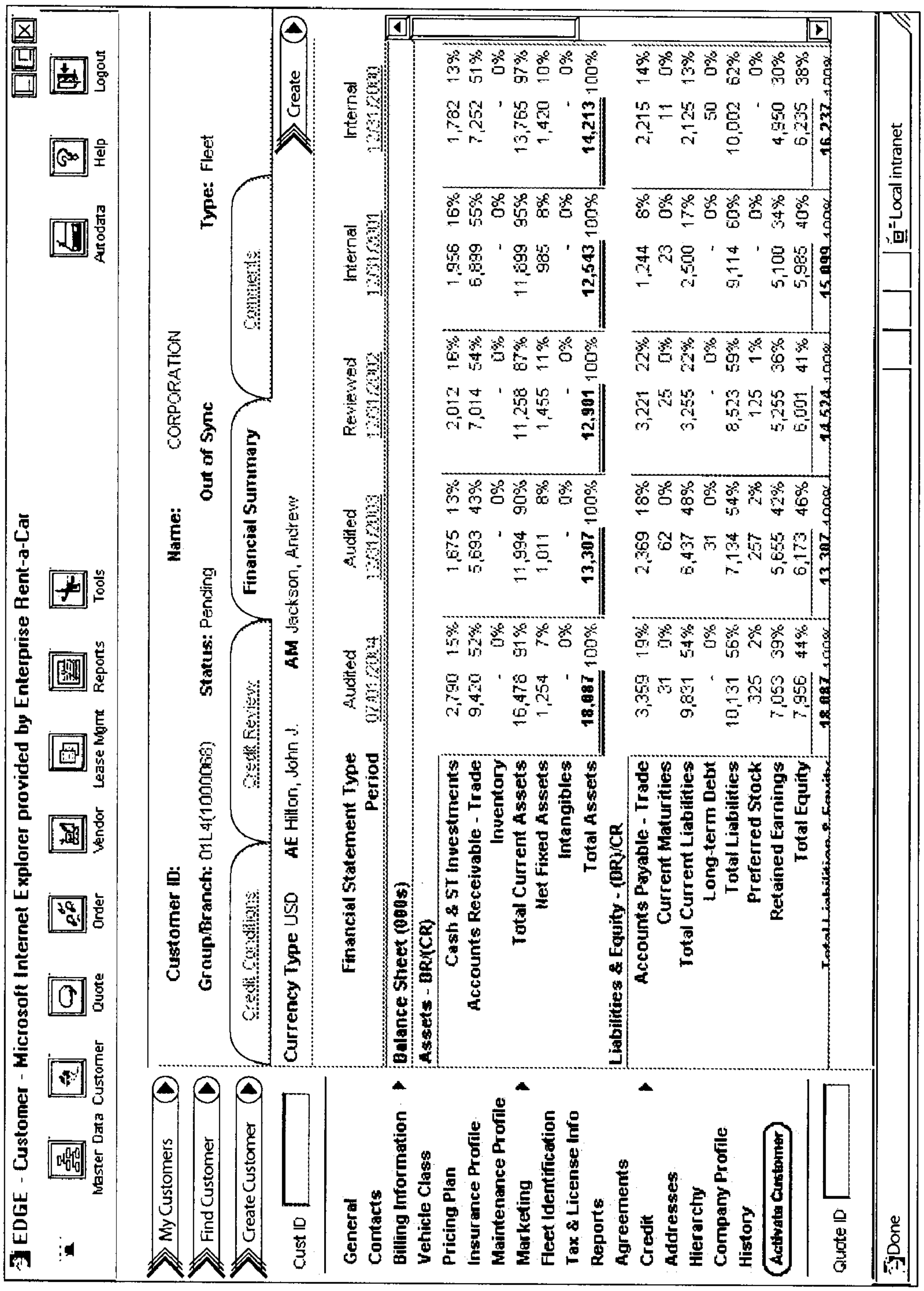
FIGS. 30-38 depict screenshots described in Exhibit B below.

A. Financial Summary List (top)—see FIG. 30

Figure 31:
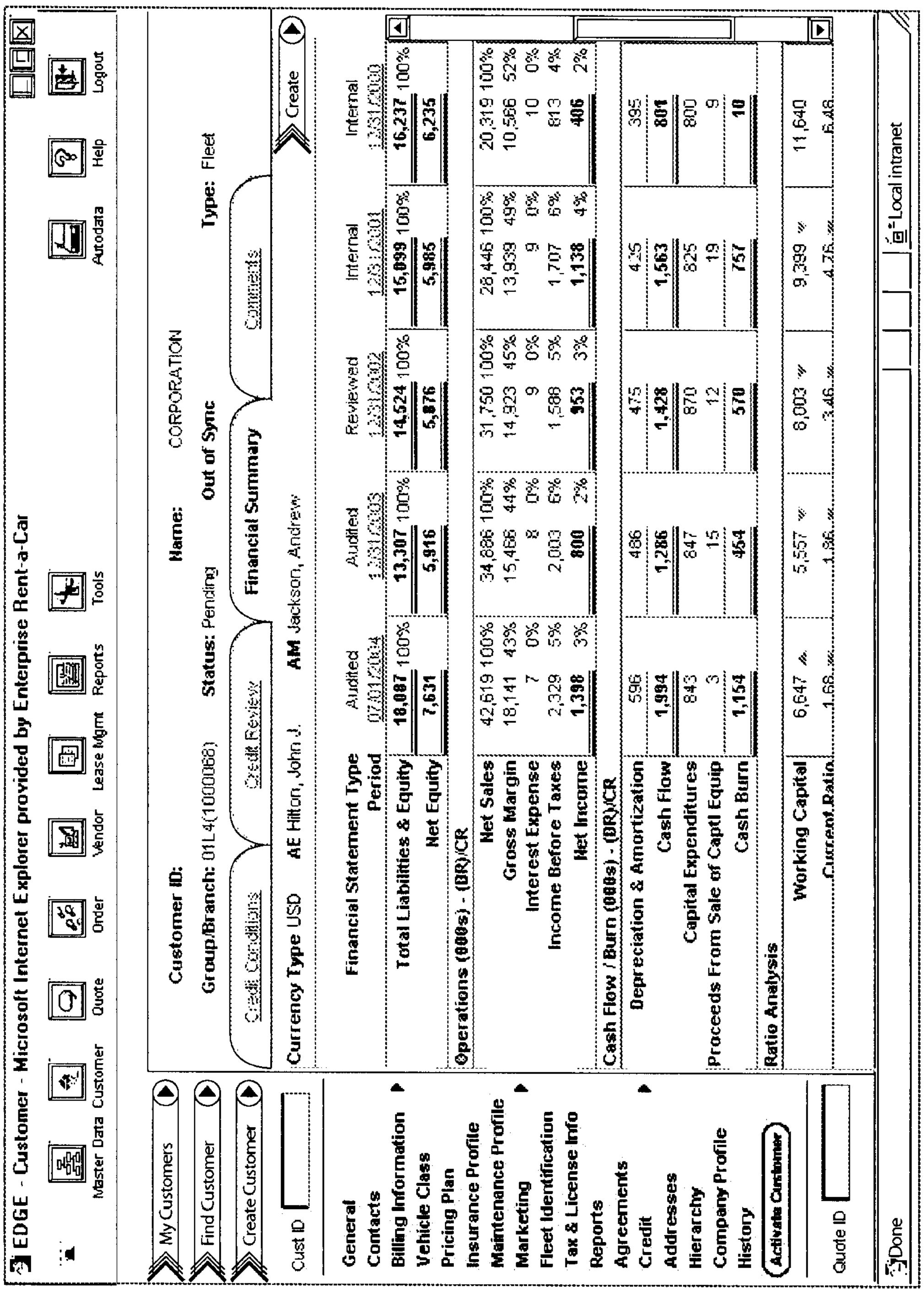

B. Financial Summary List (middle)—see FIG. 31

Figure 32:
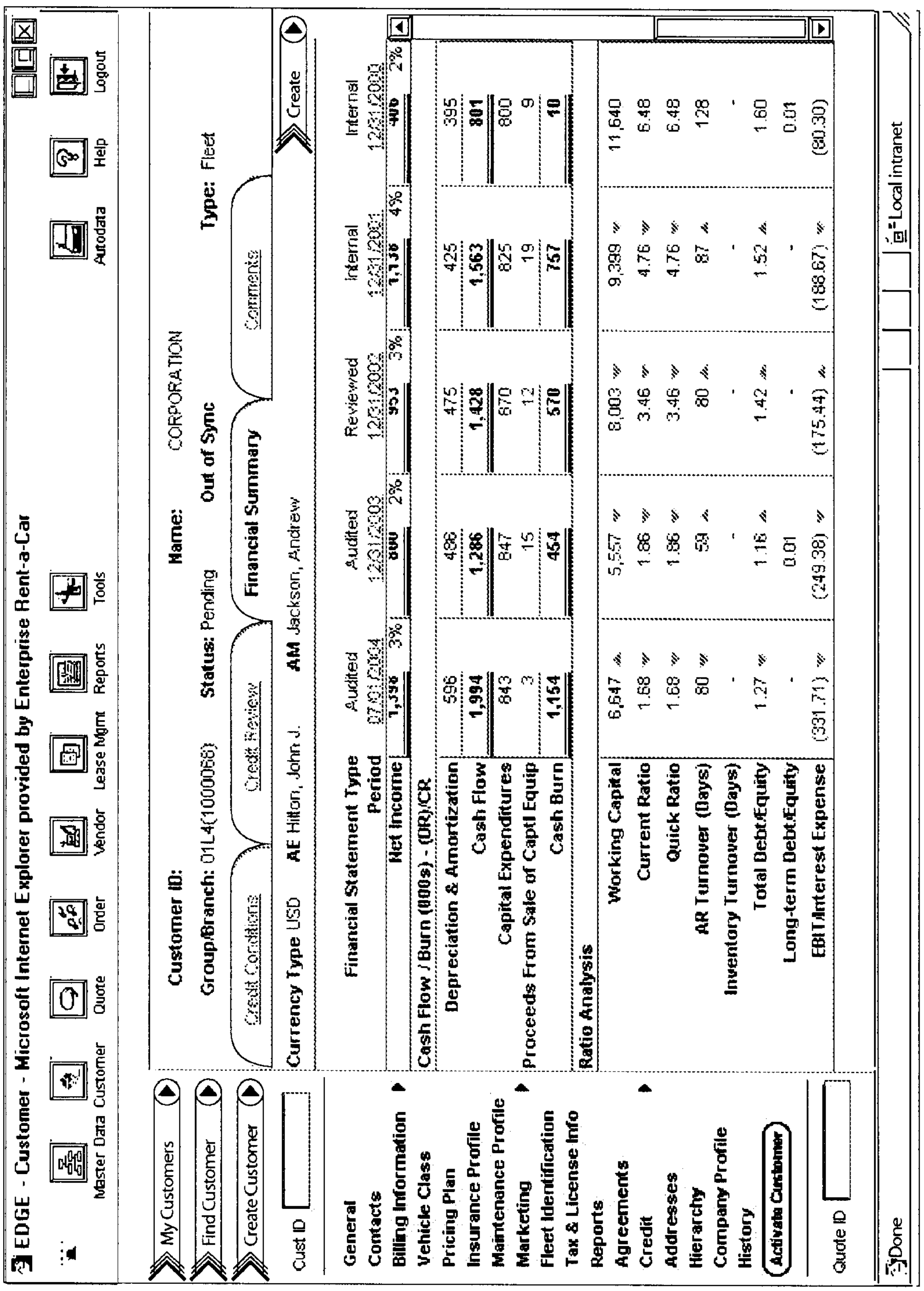

C. Financial Summary List (bottom)—See FIG. 32

Figure 33:
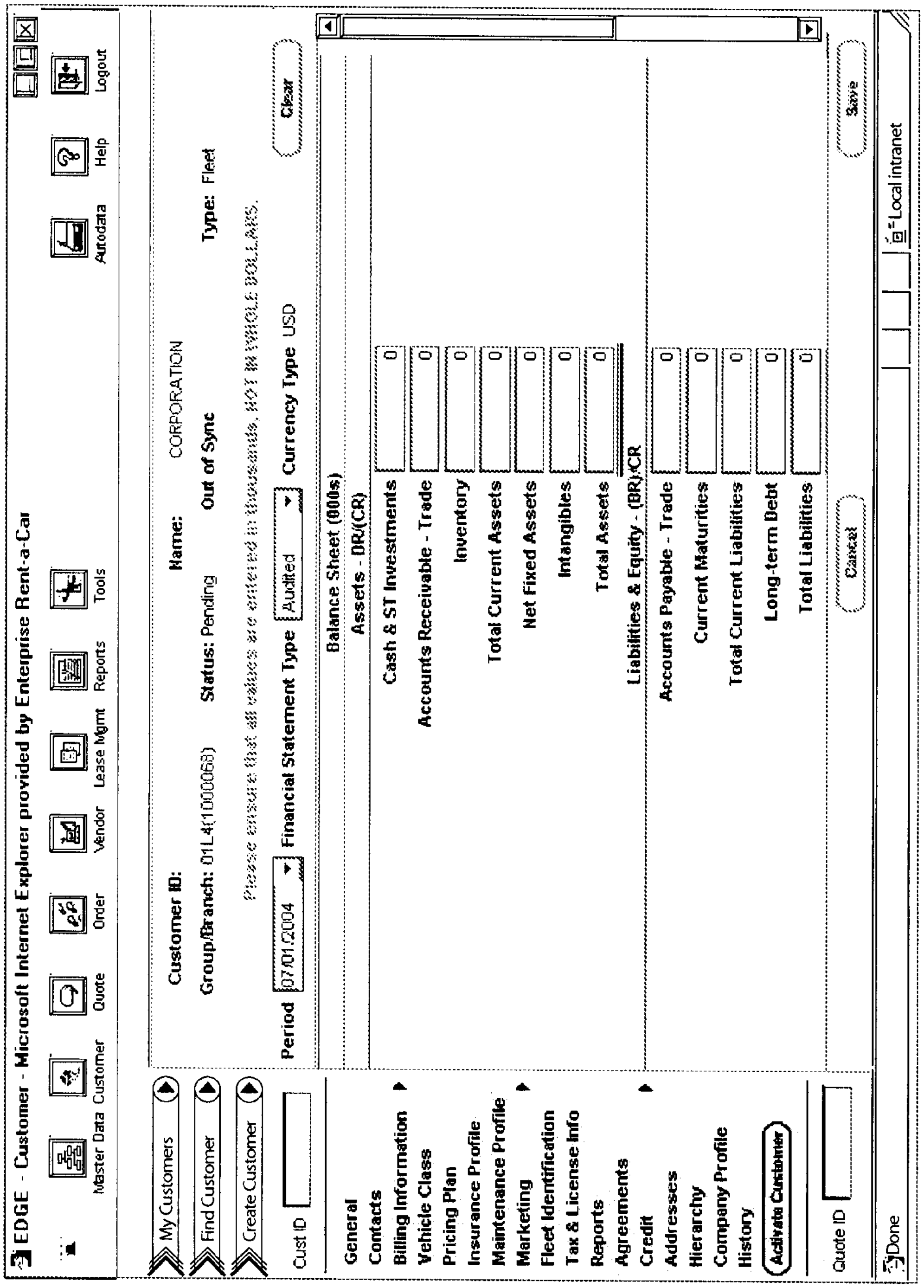

D. Financial Summary Create (top)—see FIG. 33

Figure 34:
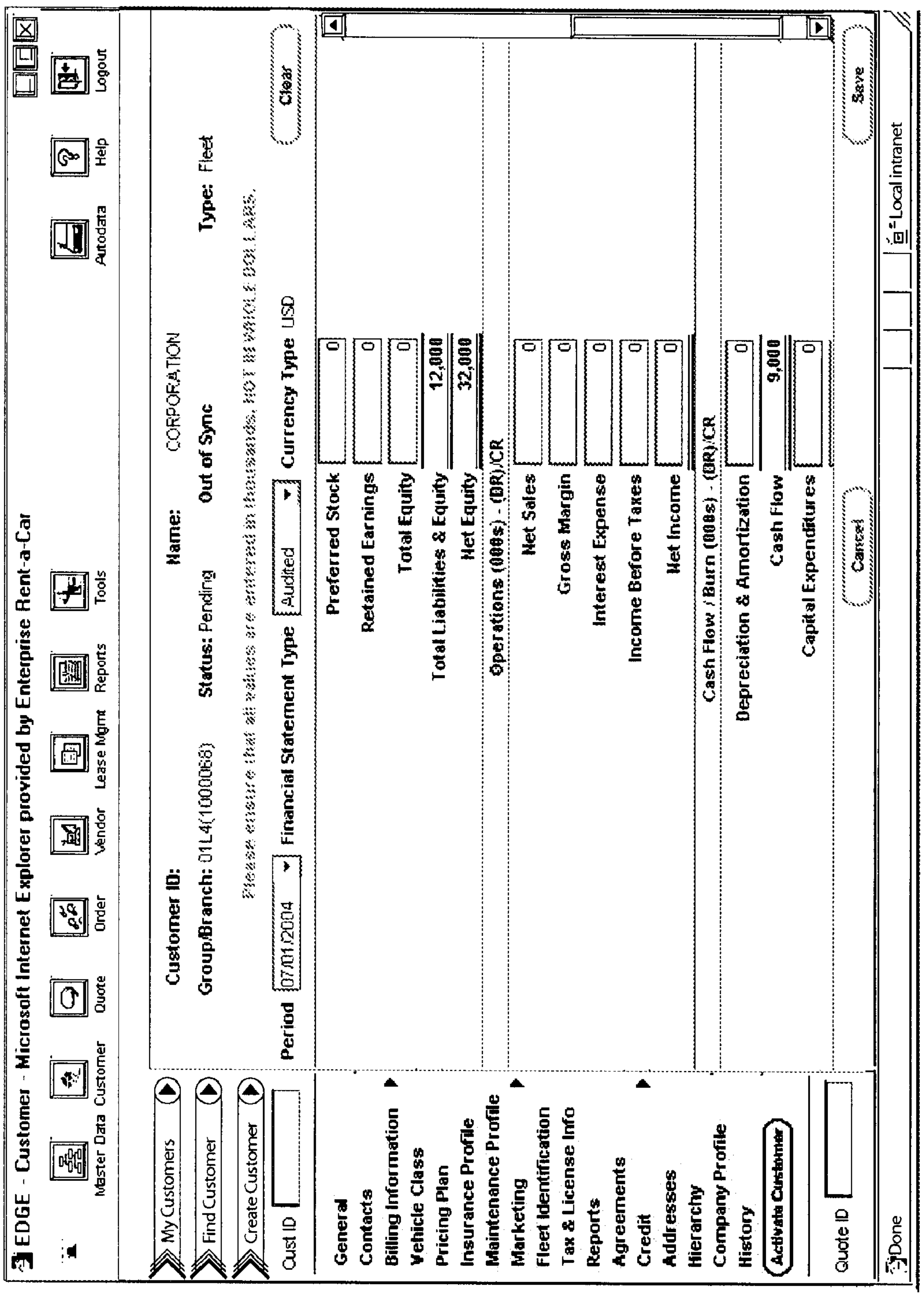

E. Financial Summary Create (middle)—see FIG. 34

Figure 35:
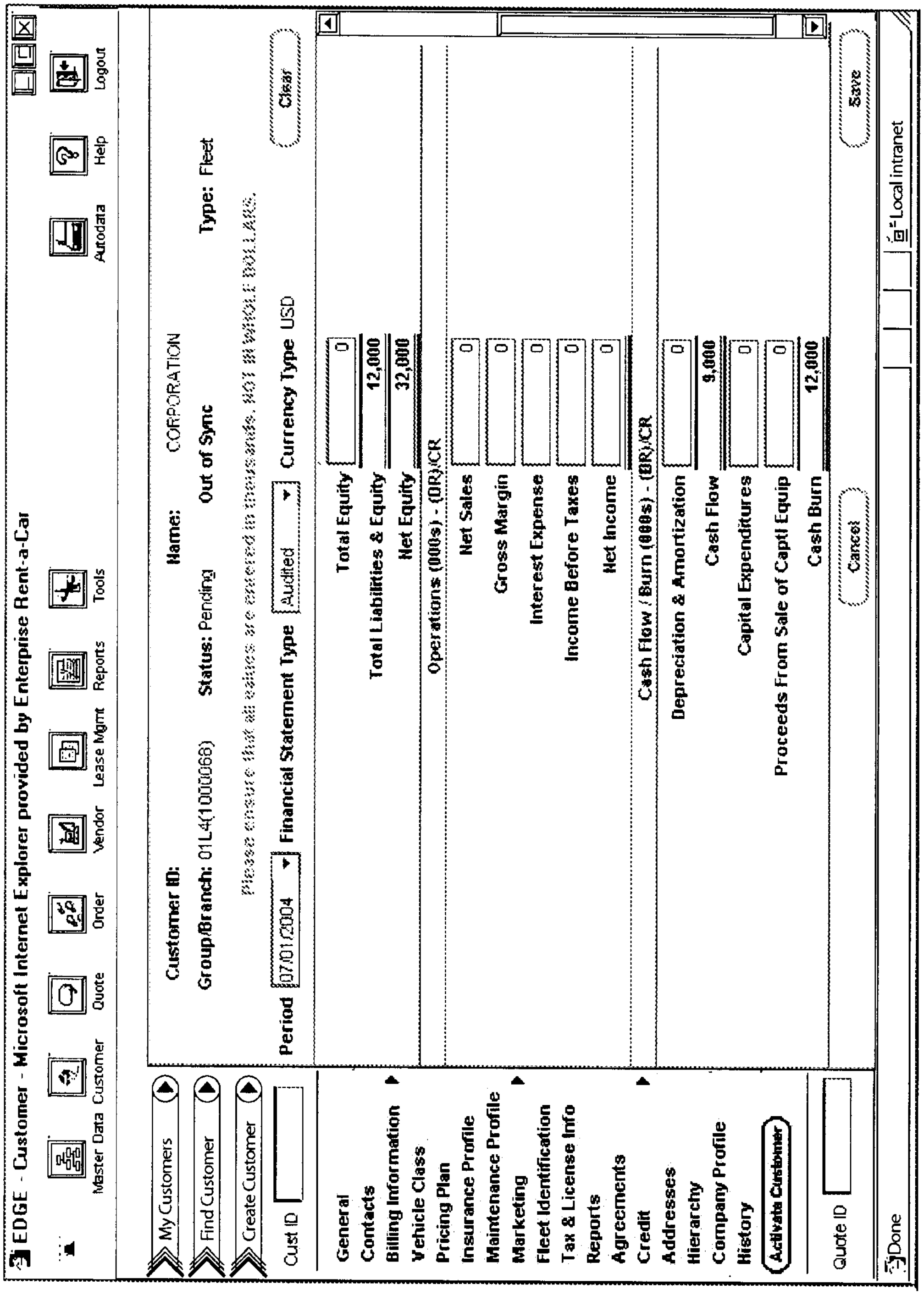

F. Financial Summary Create (bottom)—see FIG. 35

Figure 36:
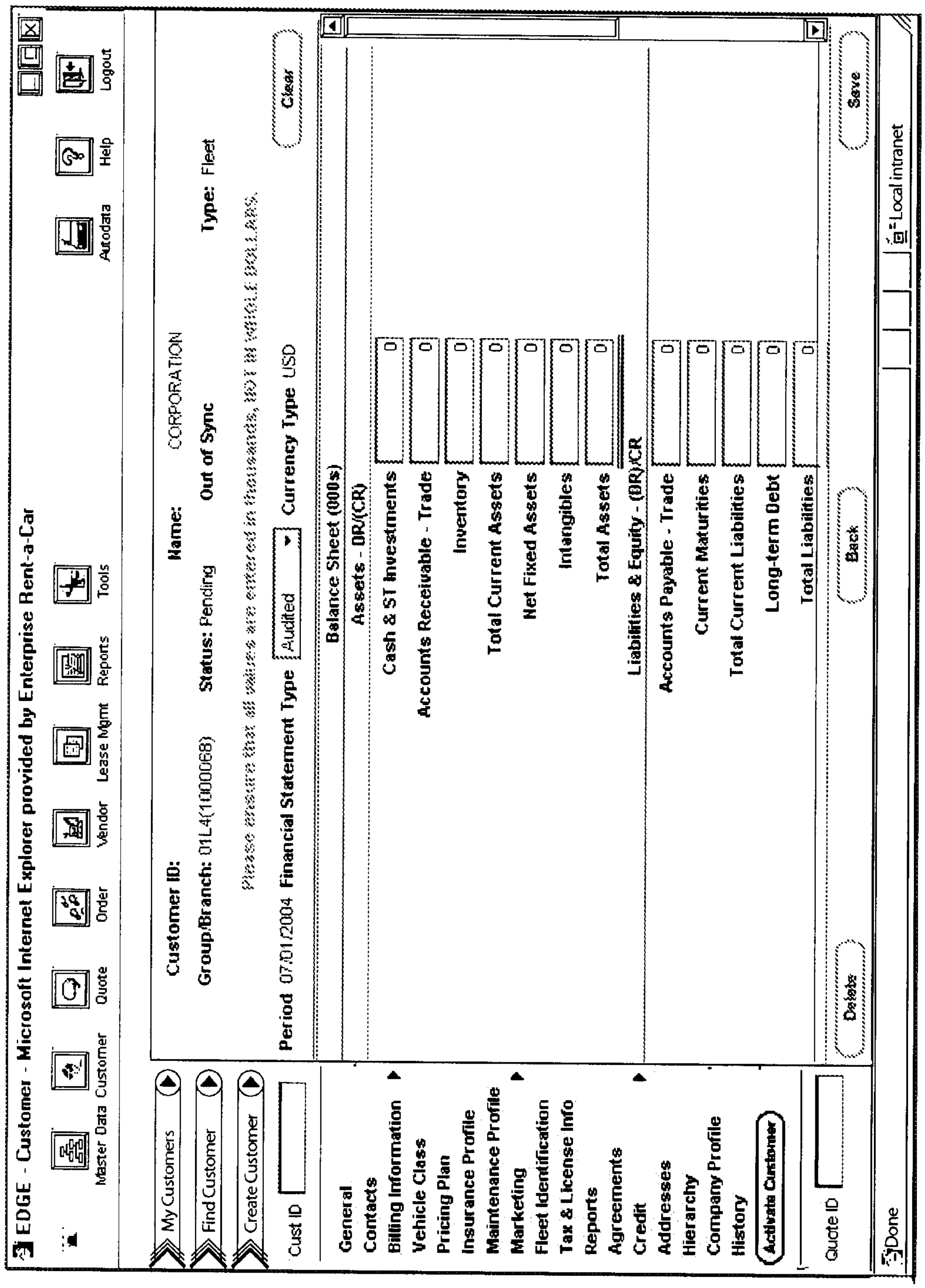

G. Financial Summary Update (top)—see FIG. 36

Figure 37:
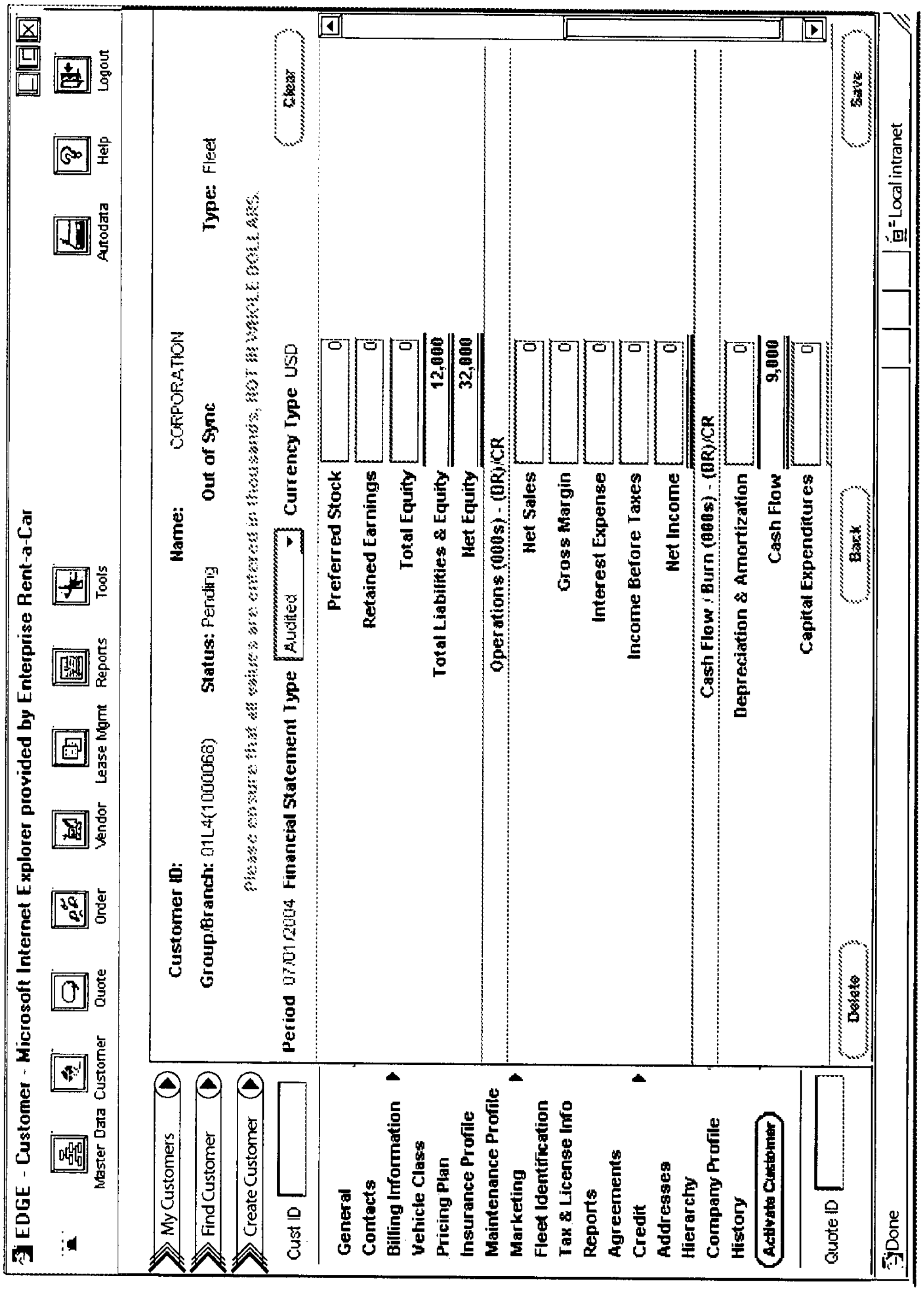

H. Financial Summary Update (middle)—see FIG. 37

Figure 38:
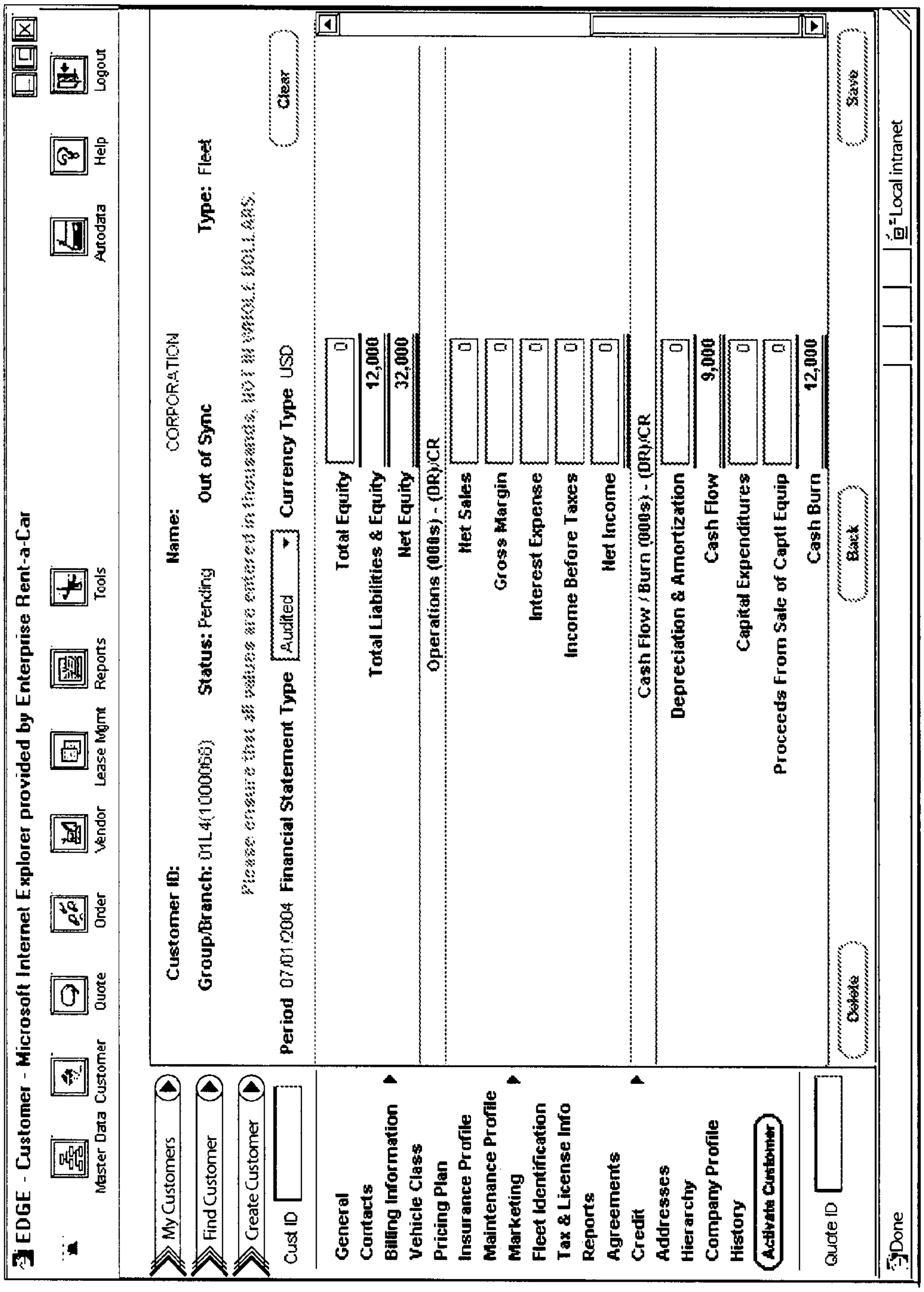

I. Financial Summary Update (bottom)—see FIG. 38

III. Detail Tables

A. Field Mapping Tables

1. Financial Summary List

| Field Name | Required | Control Type | Format | Specific Rules | Data Source Details |
|---|---|---|---|---|---|
| Currency Type | | Read Only | Text | | |
| AE | | Read Only | Text | | Customer.salespeople.ae.fullname |
| AM | | Read Only | Text | | Customer.salespeople.am.fullname |
| Financial Statement Type | | Read Only | Text | | financialSummary.type.description |
| Period | | Link | Standard Date | | financialSummary.period |
| Balance Sheet - Assets | | | | | |
| Cash & ST Investments (amt) | | Read Only | Numeric (11, 0) | Displays parenthesis for negative amounts. Displays - (dash) if empty. | financialSummary.cash.AndStInvestments |
| Cash & ST Investments (%) | | Read Only | Percentage (3, 0) | | financialSummary.cashAndStInvestmentsPercent |
| Accounts Receivable - Trade (amt) | | Read Only | Numeric (11, 0) | Displays parenthesis for negative amounts. Displays - (dash) if empty. | financialSummary.accountsReceivable LessTrade |
| Accounts Receivable - Trade (%) | | Read Only | Percentage (3, 0) | LeseTradePercent | financialSummary.accountsReceivable |
| Inventory (amt) | | Read Only | Numeric (11, 0) parenthesis for | Displays negative amounts. Displays - (dash) if empty. | financialSummary.inventory |
| Inventory (%) | | Read Only | Percentage (3, 0) | | financialSummary.InventoryPercent |

-continued

| Field Name | Required | Control Type | Format | Specific Rules | Data Source Details |
|---|---|---|---|---|---|
| Total Current Assets (amt) | | Read Only | Numeric (11, 0) | Displays parenthesis for negative amounts. Displays - (dash) if empty. | financialSummary.totalCurrentAssets |
| Total Current Assets (%) | | Read Only | Percentage (3, 0) | | financialSummary.totalCurrentAssetsPercent |
| Net Fixed Assets (amt) | | Read Only | Numeric (11, 0) | Displays parenthesis for negative amounts. Displays - (dash) if empty. | financialSummary.netFixedAssets |
| Net Fixed Assets (%) | | Read Only | Percentage (3, 0) | | financialSummary.netFixedAssetsPercent |
| Intangibles (amt) | | Read Only | Numeric (11, 0) | Displays parenthesis for negative amounts. Displays - (dash) if empty. | financialSummary.Intangibles |
| Intangibles (%) | | Read Only | Percentage (3, 0) | | financialSummary.IntangiblesPercent |
| Total Assets (amt) | | Read Only | Numeric (11, 0) | Displays parenthesis for negative amounts. Displays - (dash) if empty. | financialSummary.totalAssets |
| Total Assets (%) | | Read Only | Percentage (3, 0) | | Constant = 100% |
| Balance Sheet - Liabilities & Equity | | | | | |
| Accounts Payable - Trade (amt) | | Read Only | Numeric (11, 0) | Displays parenthesis for negative amounts. Displays - (dash) if empty. | financialSummary.accountsPayableLessTrade |
| Accounts Payable - Trade (%) | | Read Only | Percentage (3, 0) | | financialSummary.accountsPayableLessTradePercent |
| Current Maturities (amt) | | Read Only | Numeric (11, 0) | Displays parenthesis for negative amounts. Displays - (dash) if empty. | financialSummary.currentMaturities |
| Current Maturities (%) | | Read Only | Percentage (3, 0) | | financialSummary.currentMaturitiesPercent |
| Total Current Liabilities (amt) | | Read Only | Numeric (11, 0) | Displays parenthesis for negative amounts. Displays - (dash) if empty. | financialSummary.totalCurrentLiabilities |
| Total Current Liabilities (%) | | Read Only | Percentage (3, 0) | Percent | financialSummary.totalCurrentLiabilities |
| Long-term Debt (amt) | | Read Only | Numeric (11, 0) | Displays parenthesis for negative amounts. Displays - (dash) if empty. | financialSummary.longTermDebt |
| Long-term Debt (%) | | Read Only | Percentage (3, 0) | | financialSummary.longTermDebtPercent |
| Total Liabilities (amt) | | Read Only | Numeric (11, 0) | Displays parenthesis for negative amounts. Displays - (dash) if empty. | financtalSummary.totalLiabilities |
| Total Liabilities (%) | | Read Only | Percentage (3, 0) | | financialSummary.totalLiabilitiesPercent |
| Preferred Stock (amt) | | Read Only | Numeric (11, 0) | Displays parenthesis for negative amounts. Displays - (dash) if empty. | financialSummary.preferredStock |
| Preferred Stock (%) | | Read Only | Percentage (3, 0) | | financialSummary.preferredStockPercent |
| Retained Earnings Earnings (amt) | | Read Only | Numeric (11, 0) | Displays parenthesis for negative amounts. Displays - (dash) if empty. | financialSummary.retainedEarnings |
| Retained Earnings (%) | | Read Only | Percentage (3, 0) | | financialSummary.retainedEarningsPercent |

-continued

| Field Name | Required | Control Type | Format | Specific Rules | Data Source Details |
|---|---|---|---|---|---|
| Total Equity (amt) | | Read Only | Numeric (11, 0) | Displays parenthesis for negative amounts. Displays - (dash) if empty. | financialSummary.totalEquity |
| Total Equity (%) | | Read Only | Percentage (3, 0) | | financialSummary.totalEquityPercent |
| Total Liabilities & Equity (amt) | | Read Only | Numeric (11, 0) | Displays parenthesis for negative amounts. Displays - (dash) if empty. | financialSummary.totalLiabilitiesAndEquity |
| Total Liabilities & Equity (%) | | Read Only | Percentage (3, 0) | | Constant = 100% |
| Net Equity (amt) | | Read Only | Numeric (11, 0) | Displays parenthesis for negative amounts. Displays (dash) if empty. | financialSummary.netEquity |
| Operations | | | | | |
| Net Sales (amt) | | Read Only | Numeric (11, 0) | Displays parenthesis for negative amounts. Displays - (dash) if empty. | financialSummary.netSales |
| Net Sales (%) | | Read Only | Percentage (3, 0) | | Constant = 100% |
| Gross Margin (amt) | | Read Only | Numeric (11, 0) | Displays parenthesis for negative amounts. Displays - (dash) if empty. | financialSummary.grossMargin |
| Gross Margin (%) | | Read Only | Percentage (3, 0) | | financialSummary.grossMarginPercent |
| Interest Expense (amt) | | Read Only | Numeric (11, 0) | Displays parenthesis for negative amounts. Displays - (dash) if empty. | financialSummary.InterestExpense |
| Interest Expense (%) | | Read Only | Percentage (3, 0) | | financialSummary.interestExpensePercent |
| Income Before Taxes (amt) | *p1034X | Read Only | Numeric (11, 0) | Displays parenthesis for negative amounts. Displays - (dash) if empty. | financialSummary.IncomeBeforeTaxes |
| (%) | | Read Only | Percentage (3, 0) | | financialSummary.incomeBeforeTaxes Percent |
| Net Income (amt) | | Read Only | Numeric (11, 0) | Displays parenthesis for negative amounts. Displays - (dash) if empty. | financialSummary.netincome |
| Net Income (%) | | Read Only | Percentage (3, 0) | | financialSummary.netincomePercent |
| Cash Flow/Burn | | | | | |
| Depreciation & Amortization | | Read Only | Numeric (11, 0) | Displays parenthesis for negative amounts. Displays - (dash) if empty. | financialSummary.depreciationAndAmortization |
| Cash Flow | | Read Only | Numeric (11, 0) | Displays parenthesis for negative amounts. Displays - (dash) if empty. | financialSummary.cashFlow |
| Capital Expenditures | | Read Only | Numeric (11, 0) | Displays parenthesis for negative amounts. Displays - (dash) if empty. | financialSummary.capitalExpenditures |
| Proceeds From Sale of Captl Equip | | Read Only | Numeric (11, 0) | Displays parenthesis for negative amounts. Displays - (dash) if empty. | financialSummary.proceedsFromSaleOfCapitalEquipment |
| Cash Burn | | Read Only | Numeric (11, 0) | Displays parenthesis for | financialSummary.cashBurn |

-continued

| Field Name | Required | Control Type | Format | Specific Rules | Data Source Details |
| --- | --- | --- | --- | --- | --- |
| | | | | negative amounts. Displays - (dash) if empty. | |
| Ratio Analysis | | | | | |
| Working Capital (amt) | | Read Only | Numeric (11, 0) | Displays parenthesis for negative amounts. Displays - (dash) if empty. | financialSummary.workingCaptal |
| Working Capital (ind) | | Image | | Displays green up arrow if current > previous. displays red down arrow if current < previous. | financialSummary.workingCapitalTrend |
| Current Ratio (amt) | | Read Only | Numeric (11, 0) | Displays parenthesis for negative amounts. Displays - (dash) if empty. | financialSummary.currentRatio |
| Current Ratio (ind) | | Image | | Displays green up arrow if current > previous. displays red down arrow if current < previous. | financialSummary.currentRatioTrend |
| Quick Ratio (amt) | | Read Only | Numeric (11, 0) | Displays parenthesis tor negative amounts. Displays - (dash) if empty. | financialSummary.quickRatio |
| Quick Ratio (ind) | | Image | | Displays green up arrow if current > previous. displays red down arrow if current < previous. | financialSummary.quickRatioTrend |
| AR Turnover (Days) (amt) | | Read Only | Numeric (11, 0) | Displays parenthesis for negative amounts. Displays - (dash) if empty. | financialSummary.arTurnover |
| AR Turnover (Days) (ind) | | Image | | Displays green up arrow if current < previous. Displays red down arrow if current > previous. | financialSummary.arTurnoverTrend |
| Inventory Turnover (Days) (amt) | | Read Only | Numeric (11, 0) | Displays parenthesis for negative amounts. Displays - (dash) if empty. | financialSummary.inventoryTurnover |
| Inventory Turnover (Days) (ind) | | Image | | Displays green up arrow if current < previous. Displays red down arrow if current > previous. | financialSummary.inventoryTurnoverTrend |
| Total Debt/Equity (amt) | | Read Only | Numeric (11, 0) | Displays parenthesis for negative amounts. Displays - (dash) if empty. | financialSummary.totalDebtEquity |
| Total Debt/Equity (ind) | | Image | | Displays green up arrow if current < previous. Displays red down arrow if current > previous. | financialSummary.totalDebtEquityTrend |
| Long-term Debt/Equity (amt) | | Read Only | Numeric (11, 0) | Displays parenthesis for negative amounts. Displays - (dash) if empty. | financialSummary.longTermDebtEquity |

-continued

| Field Name | Required | Control Type | Format | Specific Rules | Data Source Details |
|---|---|---|---|---|---|
| Long-term Debt/Equity (ind) | | Image | | Displays green up arrow if current < previous. Displays red down arrow if current > previous. | financialSummary.longTermDebtEquity Trend |
| EBIT/Interest Expense (amt) | | | Numeric (11, 0) | Displays parenthesis for negative amounts. Displays - (dash) if empty. | financialSummary.ebitInterestExpense |
| EBIT/Interest Expense (ind) | | | | Displays green up arrow if current > previous. displays red down arrow if current < previous. | financialSummary.ebitInterestExpense Trend |

2. Financial Summary Create

| Field Name | Required | Control Type | Format | Specific Rules | Data Source Details |
|---|---|---|---|---|---|
| Currency Type | | Read Only | | | |
| Financial Statement Type | Yes | Drop Down | | Defaults to blank | financialSummary.type.description |
| Period | Yes | Text Entry/ Calendar Selector | Standard Date | | financialSummary.period |
| Balance Sheet - Assets | | | | | |
| Cash & ST Investments (amt) | | Text Entry | Numeric (11,0) | | financialSummary.cashAndStInvestments |
| Accounts Receivable - Trade (amt) | | Text Entry | Numeric (11,0) | | financialSummary.accountsReceivable LessTrade |
| Inventory (amt) | | Text Entry | Numeric (11,0) | | financialSummary.inventory |
| Total Current Assets (amt) | | Text Entry | Numeric (11,0) | | financialSummary.totalCurrent Assets |
| Net Fixed Assets (amt) | | Text Entry | Numeric (11,0) | | financialSummary.netFixedAssets |
| Intangibles (amt) | | Text Entry | Numeric (11,0) | | financialSummary.intangibles |
| Total Assets (amt) | | Text Entry | Numeric (11,0) | | financialSummary.totalAssets |
| Balance Sheet - Liabilities & Equity | | | | | |
| Accounts Payable - Trade (amt) | | Text Entry | Numeric (11.0) | | financialSummary.accountsPayableLessTrade |
| Current Maturities (amt) | | Text Entry | Numeric (11,0) | | financialSummary.currentMaturities |
| Total Current Liabilities (amt) | | Text Entry | Numeric (11,0) | | financialSummary.totalCurrentLiabilities |
| Long-term Debt (amt) | | Text Entry | Numeric (11,0) | | financialSummary.longTermDebt |
| Total Liabilities (amt) | | Text Entry | Numeric (11,0) | | financialSummary.totalLiabilities |
| Preferred Stock (amt) | | Text Entry | Numeric (11,0) | | financialSummary.preferredStock |
| Retained Earnings (amt) | | Text Entry | Numeric (11,0) | | financialSummary.retainedEarnings |
| Total Equity (amt) | | Text Entry | Numeric (11,0) | | financialSummary.totalEquity |
| Total Liabilities & Equity (amt) | | Read Only | Numeric (11,0) | | financialSummary.totalLiabilitiesAndEquity |
| Net Equity (amt) | | Read Only | Numeric (11,0) | | financialSummary.netEquity |

-continued

| Field Name | Required | Control Type | Format | Specific Rules | Data Source Details |
|---|---|---|---|---|---|
| Operations | | | | | |
| Net Sales (amt) | | Text Entry | Numeric (11,0) | | financialSummary.netSales |
| Gross Margin (amt) | | Text Entry | Numeric (11,0) | | financialSummary.grossMargin |
| Interest Expense (amt) | | Text Entry | Numeric (11,0) | | financialSummary.interest Expense |
| Income Before Taxes (amt) | | Text Entry | Numeric (11,0) | | financialSummary.incomeBeforeTaxes |
| Net Income (amt) | | Text Entry | Numeric (11,0) | | financialSummary.netIncome |
| Cash Flow/ Burn | | | | | |
| Depreciation & Amortization | | Text Entry | Numeric (11,0) | | financialSummary.depreciationAndAmortization |
| Cash Flow | | Read Only | Numeric (11,0) | | financialSummary.cashFlow |
| Capital Expenditures | | Text Entry | Numeric (11,0) | | financialSummary.capitalExpenditures |
| Proceeds From Sale of Captl Equip | | Text Entry | Numeric (11,0) | | financialSummary.proceedsFromSaleOf CapitalEquipment |
| Cash Burn | | Read Only | Numeric (11,0) | | financialSummary.cashBurn |

3. Financial Summary Update

| Field Name | Required | Control Type | Format | Specific Rules | Data Source Details |
|---|---|---|---|---|---|
| Currency Type | | Read Only | | | |
| Financial Statement Type | | Drop Down | | | financialSummary.type.description |
| Period | | Read Only | | | financialSummary.period |
| Balance Sheet - Assets | | | | | |
| Cash & ST Investments (amt) | | Text Entry | Numeric (11,0) | | financialSummary.cashAndStInvestments |
| Accounts Receivable - Trade (amt) | | Text Entry | Numeric (11,0) | | financialSummary.accountsReceivable LessTrade |
| Inventory (amt) | | Text Entry | Numeric (11,0) | | financialSummary.inventory |
| Total Current Assets (amt) | | Text Entry | Numeric (11,0) | | financialSummary.totalCurrent Assets |
| Net Fixed Assets (amt) | | Text Entry | Numeric (11,0) | | financialSummary.netFixed Assets |
| Intangibles (amt) | | Text Entry | Numeric (11,0) | | financialSummary.intangibles |
| Total Assets (amt) | | Text Entry | Numeric (11,0) | | financialSummary.totalAssets |
| Balance Sheet - Liabilities & Equity | | | | | |
| Accounts Payable - Trade (amt) | | Text Entry | Numeric (11,0) | | financiatSummary.accountsPayableLessTrade |
| Current Maturities (amt) | | Text Entry | Numeric (11,0) | | financialSummary.currentMaturities |
| Total Current Liabilities (amt) | | Text Entry | Numeric (11,0) | | financialSummary.totatCurrentLiabilities |
| Long-term Debt (amt) | | Text Entry | Numeric (11,0) | | financialSummary.longTermDebt |
| Total Liabilities (amt) | | Text Entry | Numeric (11,0) | | financialSummary.totalLiabilities |
| Preferred Stock (amt) | | Text Entry | Numeric (11,0) | | financialSummary.preferredStock |
| Retained Earnings (amt) | | Text Entry | Numeric (11,0) | | financialSummary.retainedEarnings |

-continued

| Field Name | Required | Control Type | Format | Specific Rules | Data Source Details |
|---|---|---|---|---|---|
| Total Equity (amt) | | Text Entry | Numeric (11,0) | | financialSummary.totalEquity |
| Total Liabilities & Equity (amt) | | Read Only | Numeric (11,0) | | financialSummary.totalLiabilitiesAndEquity |
| Net Equity (amt) | | Read Only | Numeric (11,0) | | financialSummary.netEquity |
| Operations | | | | | |
| Net Sales (amt) | | Text Entry | Numeric (11,0) | | financialSummary.netSales |
| Gross Margin (amt) | | Text Entry | Numeric (11,0) | | financialSummary.grossMargin |
| Interest Expense (amt) | | Text Entry | Numeric (11,0) | | financialSummary.interestExpense |
| Income Before Taxes (amt) | | Text Entry | Numeric (11,0) | | financialSummary.incomeBeforeTaxes |
| Net Income (amt) | | Text Entry | Numeric (11,0) | | financialSummary.netIncome |
| Cash Flow/ Burn | | | | | |
| Depreciation & Amortization | | Text Entry | Numeric (11,0) | | financialSummary.depreciationAndAmortization |
| Cash Flow | | Read Only | Numeric (11,0) | | financialSummary.cashFlow |
| Capital Expenditures | | Text Entry | Numeric (11,0) | | financialSummary.capitalExpenditures |
| Proceeds From Sale of Captl Equip | | Text Entry | Numeric (11,0) | | financialSummary.proceedsFromSaleOf Capital Equipment |
| Cash Burn | | Read Only | Numeric (11,0) | | financialSummary.cashBurn |

B. Business Validation/System Generated Notes

1. Financial Summary Create

| Save | | |
|---|---|---|
| Validation | Msg Type | Property Key |
| Duplicate Record Exists for this period. | Error | |
| Date should be current system date or earlier | Error | |
| Financial Summary Period is required. | Error | |
| Financial Statement Type is required. | Error | |
| Invalid Amount. | Error | |
| Invalid Date. | Error | |

2. Financial Summary Update

| Save | | |
|---|---|---|
| Validation | Msg Type | Property Key |
| Financial Statement Type is required. | Error | |
| Invalid Amount. | Error | |

C. Page Actions

1. Financial Summary List

| Description | Action Type | Action-Specific Rules | Actions/Data Source |
|---|---|---|---|
| Create | Button | | System displays Financial Summary Create page and a popup to remind the user to enter the amounts in thousands, not whole dollars. |

2. Financial Summary Create

| Description | Action Type | Action-Specific Rules | Actions/Data Source |
|---|---|---|---|
| Clear | Button | | Confirmation message is displayed. If response is ok, entries are cleared. If response is cancel, entries are not cleared. Screen remains on the create page. |
| Save | Button | Validations are done. | Displays confirmation popup asking if the user entered the amounts in thousands, not whole dollars. If yes, performs validation, saves the Financial Summary Entry, computes calculated fields and |

-continued

| Description | Action Type | Action-Specific Rules | Actions/Data Source |
|---|---|---|---|
| | | | redisplays the Financial Summary Update Page with the updated calculations. If no, remains on the Financial Summary Create Page. |
| Cancel | Button | | System displays Financial Summary List page. |

3. Financial Summary Update

| Description | Action Type | Action-Specific Rules | Actions/Data Source |
|---|---|---|---|
| Clear | Button | | Confirmation message is displayed. If response is ok, entries are cleared. If response is cancel, entries are not cleared. Screen remains on the update page. |
| Save | Button | Validations are done. | Displays confirmation pop up asking if the user entered the amounts in thousands, not whole dollars. If yes, performs validation, saves the Financial Summary, computes calculated fields and redisplays the Financial Summary Update Page with the updated calculations. If no, remains on the Financial Summary Update Page. |
| Delete | Button | | System displays a delete confirmation message "Are you sure you want to delete this Financial Summary Record?" If Yes, the Financial Summary will be deleted and the system displays the Financial Summary List page. If No, the system will stay on the Financial Summary Update page. |
| Back | Button | | System displays a warning if there is unsaved data. If clicks ok, then the system displays the Financial Summary List page. |

IV. Exceptions from Standards

1. Numeric values are in thousands instead of whole dollars (i.e. 10,000 is displayed and entered as 10).

2. Percentages are shown as whole percentage with no decimal places (i.e. 100%).

3. Negative amounts are entered with '−' symbol (i.e. "−1234"), but displayed on the list page with parenthesis (i.e. "(1234)").

4. Trend indicators are not generically "up" or "down" which would be the same direction for all indicators. Instead the trend indicators are "good" or "bad", therefore the direction of the arrow is dependent on which item you are looking at as well as the direction of the trend. (i.e. A number that has increased from the last period may be represented by an "up" arrow for working capital, however an increase in debt equity would be represented by a "down" arrow).

Customer Module

Use Case Specification

Maintain Financial Summary Information

Table of Contents

I. Customer—Maintain Financial Summary Information
A. Brief Description
II. Flow of Events—Maintain Financial Summary
B. Basic Flow—Create A New Period of Financial Information
III. Alternate Flows
A. Alternate Flow—Review/Update Financial Information For Selected Period
B. Alternate flow—Delete A Single Financial Summary Period
C. Alternate flow—Clear A Financial Summary Period
D. Alternate Flow—View Customer's Financial Summary Comparison
IV. Special Requirements
V. Pre-Conditions
VI. Post-Conditions
VII. Business Rules Definitions
A. Financial Summary Information
B. Access Authority
C. Customer Financial Summary Comparison
D. Negative Values
E. Financial Summary Reference Information
F. Calculations Use Case Specification Section 1
Use Case I. Customer—Maintain Financial Summary Information A. Brief Description The Financial Information is entered for each Master Customer (Fleet and Commercial) to provide insight into the financial condition and credit decisions that are being made for both new customers and extensions to credit for existing customers.

This information will provide the business (over time) the ability to make better, more informed decisions, as well as provide a common interface to financial information and reporting to management. All dollar amounts are entered in thousands.

II. Flow of Events—Maintain Financial Summary

A. Basic Flow—Create A New Period of Financial Information

1. The user selects to view the Customer's Financial Summary Comparison.
 a) The user must have proper authority to view or update this information.
 b) For Fleet or Commercial customers, the user may view or modify the Master customer Financial information. For Sub-customers, the information will be read-only and not available for update.

2. The system displays the following customer information for reference (as the header);
 a) Customer ID
 b) Customer Name
 c) Group/Br (Peoplesoft Dept ID)
 d) Customer Status
 e) Customer Type 3. The system displays the existing Customer's Financial Summary Comparison. (Refer to Alternate Flow—Display Customer Financial Summary Comparison).
 a) See Business rules section for calculated values.

Create Financial Period.

4. The user selects to create a new period of financial information.
 (1) The system provides a reminder to the user to ensure that all values are entered in thousands, not in whole dollars.
 (2) The user selects to continue.

5. The system displays the following information for reference:
 a) A message stating, "Please ensure that all values are entered in thousands, NOT IN WHOLE DOLLARS."
 b) Currency Code: (USD or CAN) based on customer's address country code.

6. The user must select the Financial Period ending date (month, day, year).

7. The user must select the Financial Statement type. Valid values are:
 a) Audited
 b) Reviewed
 c) Compiled
 d) Internal
 e) Tax Returns 8. The user enters the Balance Sheet—Assets values:
 a) The system provides a way to indicate to the user that Debits are entered as positive values and Credits as negative values DR/(CR).
  (1) Cash & ST Investments
  (2) Accounts Receivable—Trade
  (3) Inventory
  (4) Total Current Assets
  (5) Net Fixed Assets
  (6) Intangibles
  (7) Total Assets 9. The user enters the Balance Sheet—Liabilities & Equity values:
 a) The system provides a way to indicate to the user that Debits are entered as negative values and Credits as positive values (DR)/CR.
  (1) Accounts Payable—Trade
  (2) Current Maturities
  (3) Total Current Liabilities
  (4) Long-term Debt
  (5) Total Liabilities
  (6) Preferred Stock
  (7) Retained Earnings
  (8) Total Equity 10. The user enters the Operations values:
 a) The system provides a way to indicate to the user that Debits are entered as negative values and Credits as positive values (DR)/CR.
  (1) Net Sales
  (2) Gross Margin
  (3) Interest Expense
  (4) Income Before Taxes
  (5) Net Income 11. The user enters the following Cash Flow/Burn values:
 a) The user can only enter positive values for the Cash Flow/Burn section.
  (1) Depreciation and Amortization
  (2) Capital Expenditures
  (3) Proceeds from Sale of Captl. Equip.

12. The user selects to save the data, return to the customer financial summary, or clear values.
 a) If the user selects to save:
  (1) The system provides a reminder to the user to verify that all values are entered in thousands, not in whole dollars.
   (a) The user selects to continue.
    (i) The system performs the following data validations:
     (a) If the user has not filled all required fields, the system provides a message and the user must enter the appropriate data.
     (b) If the selected Financial Period ending date already exists in the system, the system provides a message and the user must modify the Financial Period ending date before successfully saving.
     (c) If the Total Assets is not equal to the sum of Total Liabilities and Total Equity, the system provides a message and the data must be corrected before saving successfully.
    (ii) The system saves the data.
    (iii) The system calculates and redisplays the updated customer's single financial period information.
   (b) The user selects to cancel.
    (i) The system does not save the data and redisplays the customer's single financial period information as previously modified.
 b) If the user selects to return to the customer financial summary, the system returns to the Customer's Financial Summary Comparison and the information is not saved.
 c) If the user selects to Clear Values, refer to Alternate Flow—Clear A Financial Summary Period.

13. After a successful save and redisplay of data, the user can create another period of financial data:

a) The user selects a new Financial Period ending date b) The user enters new values and successfully saves.

c) Another financial period record is created.

14. When the user selects to return to the Customer's Financial Summary Comparison, the use case ends.

III. Alternate Flows

A. Alternate Flow—Review/Update Financial Information For Selected Period

1. From the Customer's Financial Summary Comparison, the user may select a Financial Period to review or update.

2. The system displays the following information for reference:

a) A message stating, "Please ensure that all values are entered in thousands, NOT IN WHOLE DOLLARS."

b) Financial Period ending date c) Currency Code: (USD or CAN) based on customer's address country code.

3. The system displays the selected Financial Period.

4. The system displays the selected Financial Summary information.

a) If no changes are required, the user views the data, chooses to return to the customer financial summary and the use case ends 5. The user may modify any of the values displayed (refer to Create Financial Summary Information for the list of values and rules that apply).

6. The user cannot modify the Financial Period ending date.

7. The user may modify any or all Balance Sheet—Assets values:

a) The system provides a way to indicate to the user that Debits are entered as positive values and Credits as negative values DR/(CR).

8. The user may modify any or all Balance Sheet—Liabilities & Equity values:

a) The system provides a way to indicate to the user that Debits are entered as negative values and Credits as positive values (DR)/CR.

9. The user may modify any or all Operations values:

a) The system provides a way to indicate to the user that Debits are entered as negative values and Credits as positive values (DR)/CR.

10. The user may modify any or all Cash Flow/Burn values:

a) The system provides a way to indicate to the user that Debits are entered as negative values and Credits as positive values (DR)/CR.

11. The user may select to clear all values for the selected period.

a) Refer to Alternate Flow—Clear A Financial Summary Period.

12. The user may select to delete the selected financial period information.

a) Refer to Alternate Flow—Delete A Single Financial Summary Period.

13. The user may select to return to the Customer's Financial Summary Comparison.

14. The user selects to save the modifications.

a) The system provides a reminder to the user to verify that all values are entered in thousands, not in whole dollars.

b) The user selects to continue.

(1) The same validations that apply for creating a financial period of information apply when updating a selected financial period.

(2) The system calculates the Total Liabilities and Equity amount.

(3) The system calculates the Net Equity amount.

(4) The system calculates the Cash Burn amount.

(5) The system calculates and redisplays the updated customer's single financial period information.

c) The user selects to cancel.

(1) The system does not save the data and redisplays the customer's single financial period information as previously modified.

15. The use case ends.

B. Alternate Flow—Delete a Single Financial Summary Period

1. When viewing a customer's single financial period information, the user may select delete the period.

2. The system displays a message confirming that the user wants to delete the entire period.

a) If the user chooses to not delete, the system does not delete the information and redisplays the financial period details. The user may then select to go back to the Customer's Financial Summary Comparison.

b) If the user confirms the period deletion, the period is removed from the system and the user is returned to the Customer's Financial Summary Comparison.

3. The flow ends.

C. Alternate Flow—Clear a Financial Summary Period

1. When the system displays the customer's single financial period information, the user may select to clear the selected period information.

2. The system displays a message confirming that the user wants to clear the information.

a) If the user chooses to not clear, the system does not clear the information and redisplays the single financial period information. The user may then select to go back to the Customer's Financial Summary Comparison.

b) If the user confirms the to clear the data, all entered and calculated data is cleared and the user is returned to the customer's single financial period for further entry.

3. The flow ends.

D. Alternate Flow—View Customer's Financial Summary Comparison

1. The user selects to view the Customer's Financial Summary Comparison Information.

2. The system displays a summary of the five (5) most recent available financial periods for the customer in descending order (most recent to least recent).

3. The system displays the following information for reference:

a) Account Executive Name b) Account Manager Name c) Currency Code: (USD or CAN) based on customer's address country code.

d) Financial Statement Type e) Period (MM-DD-YYYY)

4. The system displays the Balance Sheet Amount and calculated percentages for each period:
  a) The system indicates that amount values are displayed in thousands (000's).
  b) For the following items, Credit values that were entered as negatives will be displayed in parenthesis.
    (1) Cash & ST Investments
    (2) Accounts Receivable—Trade
    (3) Inventory
    (4) Total Current Assets
    (5) Net Fixed Assets
    (6) Intangibles
    (7) Total Assets
  c) For the following items, Debit values that were entered as negatives will be displayed in parenthesis.
    (1) Accounts Payable—Trade
    (2) Current Maturities
    (3) Total Current Liabilities
    (4) Long-term Debt
    (5) Total Liabilities
    (6) Preferred Stock
    (7) Retained Earnings
    (8) Total Equity
    (9) The system calculates the Total Liabilities & Equity amount (Refer to business rules)
    (10) The system calculates the Net Equity amount (Refer to Business Rules)

5. The system displays the Operations amounts and calculated percentages for each period:
  a) The system indicates that amount values are displayed in thousands (000's).
  b) Debits that were entered as negative values will be displayed in parenthesis. The following values are displayed:
    (1) Net Sales amount and percentage
    (2) Gross Margin amount and percentage
    (3) Interest Expense amount and percentage
    (4) Income Before Taxes amount and percentage
    (5) Net Income amount and percentage 6. The system displays the Cash Flow/Burn values:
  a) The system indicates that amount values are displayed in thousands (000's).
  b) For the following items, Debit values that were entered as negatives will be displayed in parenthesis.
    (1) Depreciation and Amortization
    (2) The system calculates the Cash Flow amount (Refer to Business Rules)
    (3) Capital Expenditures
    (4) Proceeds from Sale of Captl. Equip.
    (5) The system calculates the Cash Burn amount (Refer to Business Rules)

7. The system calculates and displays the following Ratio Analysis values for each period (Refer to business rules for calculations).
  a) The system indicates if the trend is positive or negative when compared to the previous period's value.
    (1) Working capital
    (2) Current Ratio
    (3) Quick Ratio
    (4) AR Turnover (Days)
    (5) Inventory Turnover (Days)
    (6) Total Debt/Equity
    (7) Long Term Debt/Equity
    (8) EBIT/Interest Expense IV. Special Requirements

N/A

V. Pre-Conditions

1. The user must be logged on the EDGE and have object security access to maintain Financial Summary Information.

2. With Update access, the user can create, update, delete, and view address information.
  a) Corporate users have access to update all group/branches.
  b) Group/branch users have access to update all customers within their group, but only view access to other group's customers.
  c) With View access, the user can view the existing Customer's Financial Summary Information for any group/branch.

3. With no access defined, the Financial Summary information tab will not be available within the Customer Credit Profile.

VI. Post-Conditions

1. The Customer's Financial Summary Information are created, updated, or deleted in EDGE.

Section 2

Business Rules

VII. Business Rules Definitions

A. Financial Summary Information

1. The Financial Summary information is applicable to Master Customers (Fleet and Commercial types).

2. Sub-customers will display the master's information for viewing only.

3. Financial Summary information is not applicable to Individual or Employee type customers.

B. Access Authority

1. Users will need proper authority to view or update the Customer's Financial Summary Comparison.

C. Customer Financial Summary Comparison

1. The Customer's Financial Summary Comparison consists of the five (5) most recent periods of financial summary information.

2. The financial periods are displayed from most recent to least recent.

3. If a sixth (6th) financial period is added, the oldest period drops off and is no longer available for viewing. If an intermediate period is deleted, the (previously) 6th period will be redisplayed as the 5th period in the summary.

D. Negative Values

1. When entering negative values in the individual period creation/editing, the negative sign will be entered.

2. When displaying negative values in the summary, the values are displayed in parenthesis.

E. Financial Summary Reference Information

1. The Currency Code should default based on the customer's address country code. (i.e. USD or CAN).

2. The Financial Period ending date must be entered on the period details (i.e. Oct. 24, 2004) and must be today's date or earlier.

3. The Financial Statement Type must be entered on the period details. Valid values are:

a) Audited
b) Reviewed
c) Compiled
d) Internal
e) Tax Returns

F. Calculations

1. The following total amount calculations are applicable to each period:

| Calculated values | Amounts | Formula |
|---|---|---|
| Balance Sheet | Total Liabilities & Equity | Total Liabilities + Total Equity |
| | Net Equity | Total Equity − Preferred Stock − Intangibles |
| Cash Flow/ Burn | Cash Flow | Net Income + Depreciation and Amortization |
| | Cash Burn | Cash Flow − Capital Expenditures + Proceeds from Sale of Captl. Equip. |

2. The following Percentage calculations are applicable to each period:

| Calculated Values | Percentages | Formula |
|---|---|---|
| Operations | Net Sales % | 100% |
| | Gross Margin % | If Net Sales Amount = 0 Default to zero Otherwise Gross Margin Amount/Net Sales Amount |
| | Interest Expense % | If Net Sales Amount = 0 Default to zero Otherwise Interest Expense/Net Sales Amount |
| | Income before Taxes % | If Net Sales Amount = 0 Default to zero Otherwise Income before Taxes/Net Sales Amount |
| | Net Income % | If Net Sales Amount = 0 Default to zero Otherwise Net Income/Net Sales Amount |
| Balance Sheet | Cash and ST Investments % | If Total Assets = 0 Default to zero Otherwise Cash and ST Investments/Total Assets |
| | Accounts Receivable - Trade % | If Total Assets = 0 Default to zero Otherwise Accounts Receivable-Trade/ Total Assets |

-continued

| Calculated Values | Percentages | Formula |
|---|---|---|
| | Inventory % | If Total Assets = 0 Default to zero Otherwise Inventory/Total Assets |
| | Total Current Assets % | If Total Assets = 0 Default to zero Otherwise Total Current Assets/Total Assets |
| | Net Fixed Assets % | If Total Assets = 0 Default to zero Otherwise Net Fixed Assets/Total Assets |
| | Intangibles % | If Total Assets = 0 Default to zero Otherwise Intangibles/Total Assets |
| | Total Assets % | 100% |
| | Accounts Payable - Trade % | If Total Liabilities & Equity = 0 Default to zero Otherwise Accounts Payable-Trade/Total Liabilities & Equity |
| | Current Maturities % | If Total Liabilities & Equity = 0 Default to zero Otherwise Current Maturities/Total Liabilities & Equity |
| | Total Current Liabilities % | If Total Liabilities & Equity = 0 Default to zero Otherwise Total Current Liabilities/Total Liabilities & Equity |
| | Long-term Debt % | If Total Liabilities & Equity = 0 Default to zero Otherwise Long-Term Debt/Total Liabilities & Equity |
| | Total Liabilities % | If Total Liabilities & Equity = 0 Default to zero Otherwise Total Liabilities/Total Liabilities & Equity |
| | Preferred Stock % | If Total Liabilities & Equity = 0 Default to zero Otherwise Preferred Stock/Total Liabilities & Equity |
| | Retained Earnings % | If Total Liabilities & Equity = 0 Default to zero Otherwise Retained Earnings/Total Liabilities & Equity |
| | Total Equity % | If Total Liabilities & Equity = 0 Default to zero Otherwise Total Equity/Total Liabilities & Equity |
| | Total Liabilities & Equity | 100% |

3. The following Ratio Analysis Calculated values are applicable to each period:

| Amounts | Formula | Indicators |
|---|---|---|
| Working Capital | Total Current Assets - Total Current Liabilities | A positive trend is indicated if the Current Period is greater than the Previous Period. A negative trend is indicated if the Current Period is less than the |

-continued

| Amounts | Formula | Indicators |
|---|---|---|
| | | Previous Period.<br>No trend is indicated if the Current Period is equal to the Previous Period. |
| Current Ratio | If Total Current Liabilities = 0<br>Default to zero<br>Otherwise<br>Total Current Assets/Total Current Liabilities | A positive trend is indicated if the Current Period is greater than the Previous Period.<br>A negative trend is indicated if the Current Period is less than the Previous Period.<br>No trend is indicated if the Current Period is equal to the Previous Period. |
| Quick Ratio | If Total Current Liabilities = 0<br>Default to zero<br>Otherwise<br>(Total Current Assets − Inventory)/Total Current Liabilities | A positive trend is indicated if the Current Period is greater than the Previous Period.<br>A negative trend is indicated if the Current Period is less than the Previous Period.<br>No trend is indicated if the Current Period is equal to the Previous Period. |
| AR Turnover (Days) | If the Net Sales of Accounts Receivable-Trade Amount = 0<br>Default to zero<br>Otherwise<br>360/(Net Sales/Accounts Receivable-Trade) | A positive trend is indicated if the Current Period is less than the Previous Period.<br>A negative trend is indicated if the Current Period is greater than the Previous Period.<br>No trend is indicated if the Current Period is equal to the Previous Period. |
| Inventory Turnover (Days) | If Net Sales or Inventory Amount = 0<br>Default to zero<br>Otherwise<br>360/(Net Sales/Inventory) | A positive trend is indicated if the Current Period is less than the Previous Period.<br>A negative trend is indicated if the Current Period is greater than the Previous Period.<br>No trend is indicated if the Current Period is equal to the Previous Period. |
| Total Debt/ Equity | If Total Equity = 0<br>Default to zero<br>Otherwise<br>Total Liabilities/Total Equity | A positive trend is indicated if the Current Period is less than the Previous Period.<br>A negative trend is indicated if the Current Period is greater than the Previous Period.<br>No trend is indicated if the Current Period is equal to the Previous Period. |
| Long Term Debt/ Equity | If Total Equity = 0<br>Default to zero<br>Otherwise<br>Long Term Debt/Total Equity | A positive trend is indicated if the Current Period is less than the Previous Period.<br>A negative trend is indicated if the Current Period is greater than the Previous Period.<br>No trend is indicated if the Current Period is equal to the Previous Period. |
| EBIT/Interest Expense | If Interest Expense = 0<br>Default to zero<br>Otherwise<br>(Income Before Taxes − Interest Expense)/((−1) * Interest Expense) | A positive trend is indicated if the Current Period is greater than the Previous Period.<br>A negative trend is indicated if the Current Period is less than the Previous Period.<br>No trend is indicated if the Current Period is equal to the Previous Period. |

Exhibit C

Lease Management

Functional Requirements Specification

Credit Review and History

Table of Contents

I. Functional Requirements Specification Introduction

II. Screen Print(s)

A. Credit Review History

B. Create Credit Review History

C. Update Credit Review History

III. Detail Tables

A. Field Mapping Tables

1. Credit Review History List

2. Create Credit Review History

3. Update Credit Review History

B. Business Validation/System Generated Notes

1. Credit Review History List

2. Create/Update Credit Review History

C. Page Actions

1. Credit Review History List

2. Create Credit Review History

3. Update Credit Review History

Screen Action Specification

I. Functional Requirements Specification Introduction

This Credit Review History will provide a window into any past Credit Reviews performed on a Customer as well as the Credit Review currently being performed. Since only one Credit Review may be active at once, most of the information will be historical. Upon Final Approval, a snapshot is taken of all data relevant to the Credit Review. This snapshot of the data is what the user will see when they view Historical Credit Review Information.

II. Screen Print(s)

Figure 39:
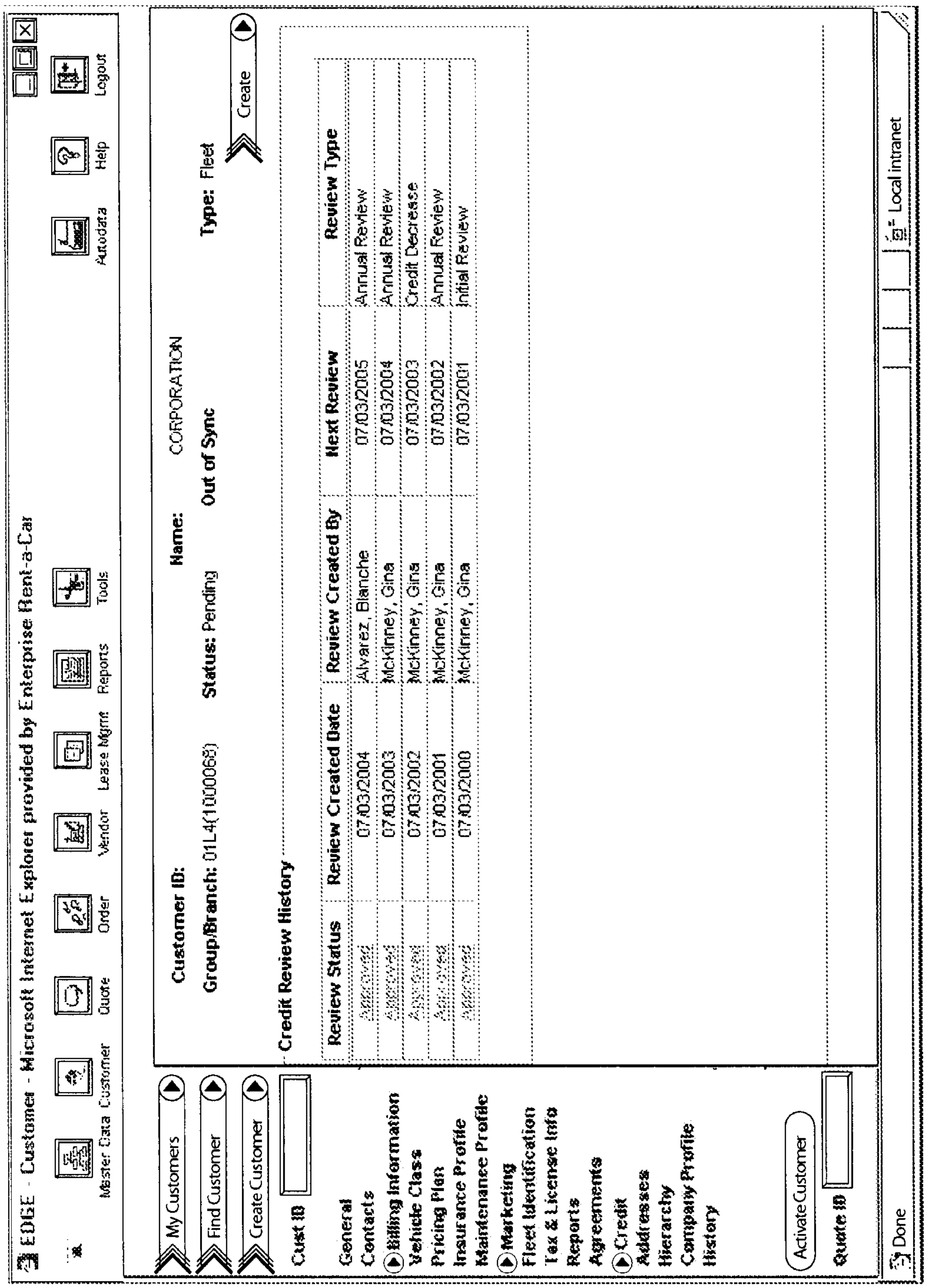
FIGS. 39-41 depict screenshots described in Exhibit C below.

A. Credit Review History—see FIG. 39

Figure 40:
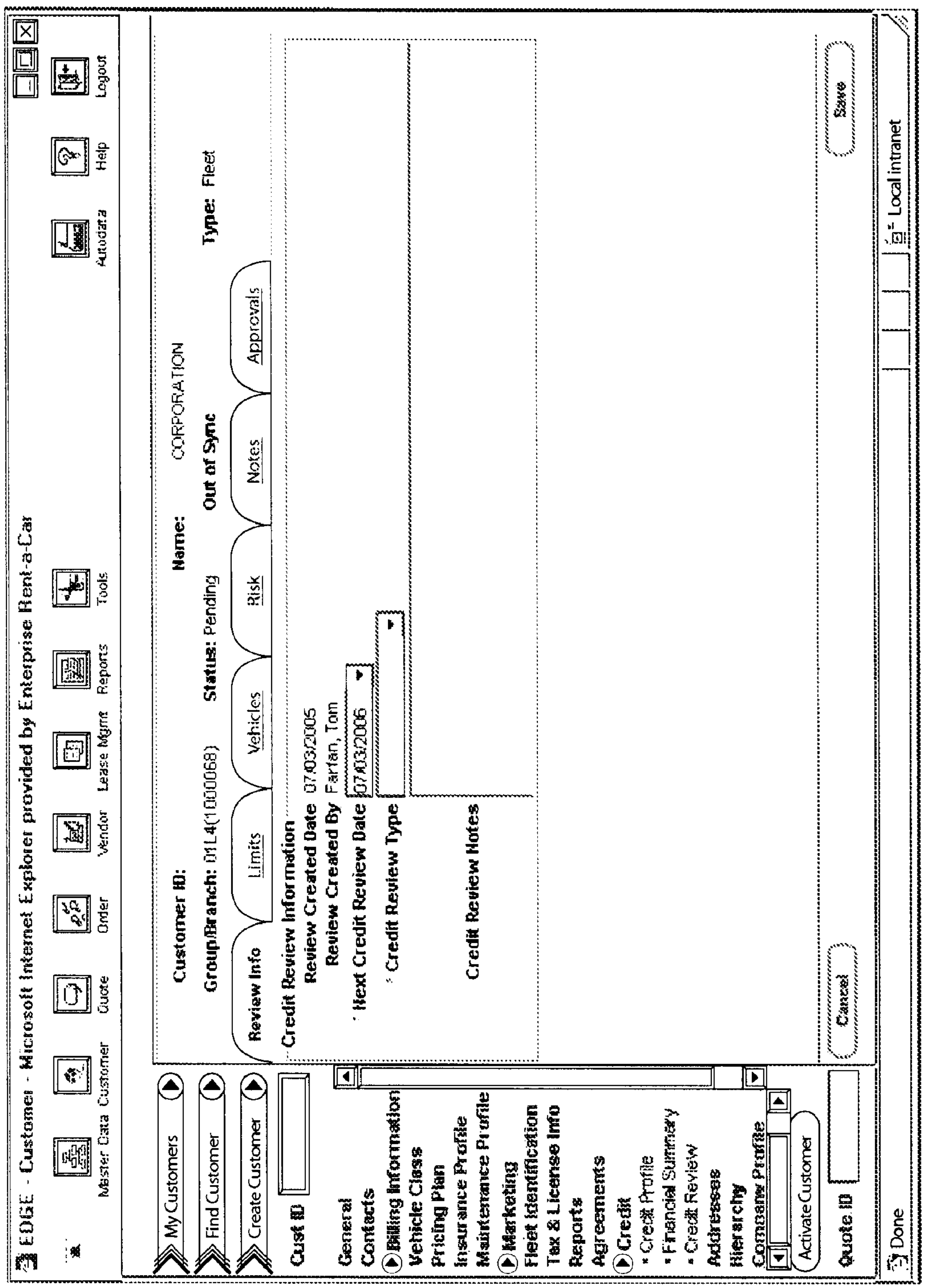

B. Create Credit Review History—see FIG. 40

Figure 41:
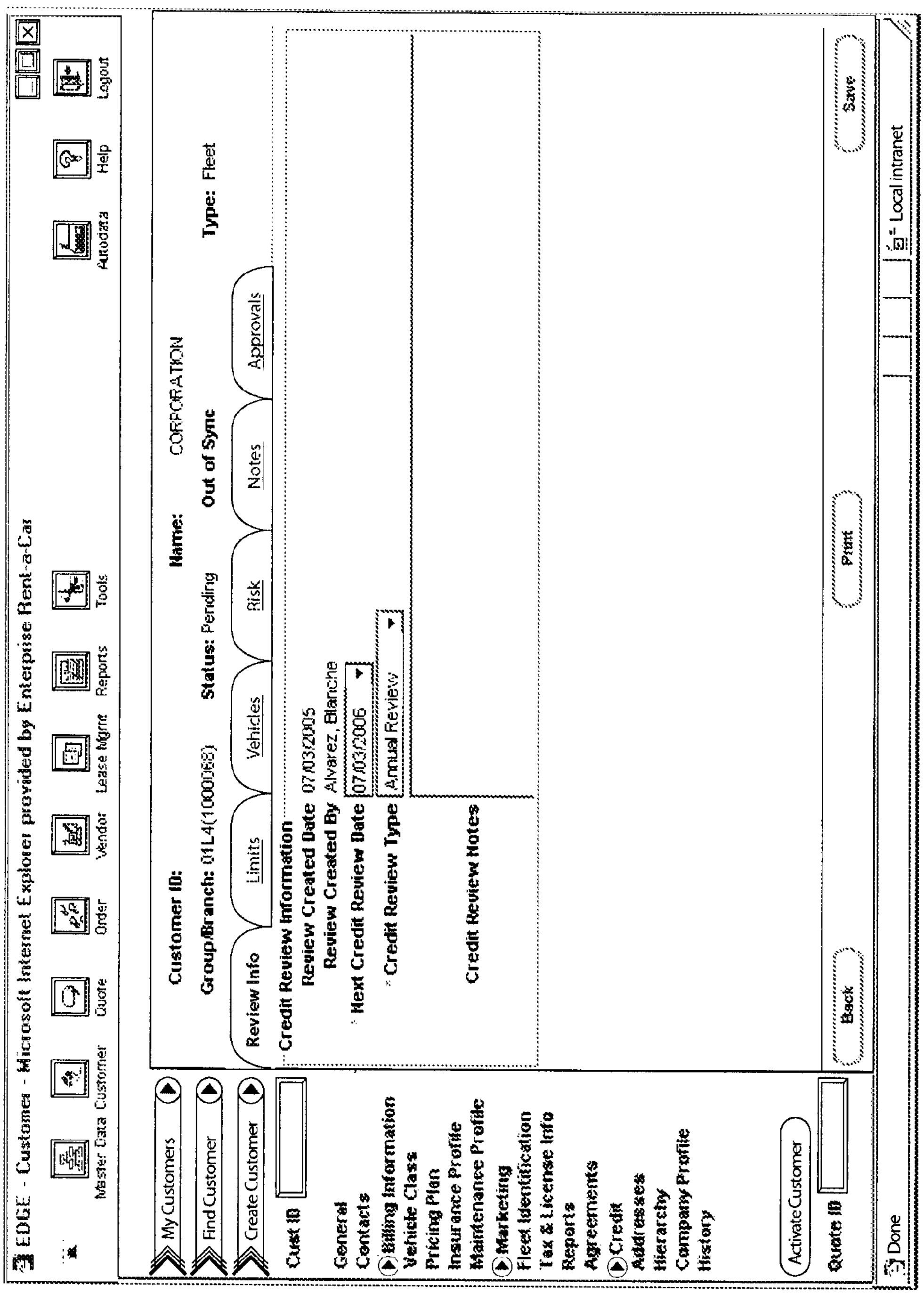

C. Update Credit Review History—see FIG. 41

III. Detail Tables

A. Field Mapping Tables

1. Credit Review History List

| Field Name | Required | Control Type | Format | Specific Rules | Data Source Details |
|---|---|---|---|---|---|
| Review Status | | Link | Hyperlink | | creditReview.reviewStatus.description |
| Review Created Date | | Read Only | Standard Date | | creditReview.createTimestamp |
| Review created by | | Read Only | Standard Name Format | | creditReview.createdBy |
| Next Review | | Read Only | Standard Date | | creditReview.nextReviewDate |
| Review Type | | Read Only | Alpha | | creditReview.reviewType.description |

2. Create Credit Review History

| Field Name | Required | Control Type | Format | Specific Rules | Data Source Details |
|---|---|---|---|---|---|
| Review Created Date | | Read Only | Standard Date | | DateUtil.currentDate |
| Review created by | | Read Only | Standard Name Format | | EmployeeEntity.currentUser |
| Next Credit Review Date | Required | Pop up calendar | Standard Date | | DateUtils.addYears(DateUtil.currentDate( ), 1) |
| Credit Review Type | Required | Drop down | Alpha | | creditReviewType.findAll |
| Credit Review Notes | | Text Area | Alphanumeric | | creditReview.reviewNotes |

3. Update Credit Review History

| Field Name | Required | Control Type | Format | Specific Rules | Data Source Details |
|---|---|---|---|---|---|
| Review Created Date | | Read Only | Standard Date | | creditReview.reviewCreatedDate |
| Review created By | | Read Only | Standard Name Format | | creditReview.createdByName |
| Next Credit Review Date | Required | Pop up calendar | Standard Date | | creditReview.nextReviewDate |
| Credit Review Type | Required | Drop down | Alpha | | creditReview.reviewType |

-continued

| Field Name | Required | Control Type | Format | Specific Rules | Data Source Details |
|---|---|---|---|---|---|
| Credit Review Notes | | Text Area | Alphanumeric | | creditReview.reviewNotes |

B. Business Validation/System Generated Notes

1. Credit Review History List

| Create | | |
|---|---|---|
| Validation | Msg Type | Property Key |
| Only one active Credit Review is allowed for a customer | Error | |

2. Create/Update Credit Review History

| Save | | |
|---|---|---|
| Validation | Msg Type | Property Key |
| Next Credit Review Date can not be a past date. | Error | |
| Next Credit Review Date is required. | Error | |
| Credit Review Type is required. | Error | |

C. Page Actions

1. Credit Review History List

| Description | Action Type | Action-Specific Rules | Actions/Data Source |
|---|---|---|---|
| Review Status | Link | | Displays details of that Credit Review record by clicking on the link. |
| Create | Button | Button would be disabled if there's already an open Credit review for a particular customer. | Displays a screen where user can enter the information to create a record for a particular review status. |

2. Create Credit Review History

| Description | Action Type | Action-Specific Rules | Actions/Data Source |
|---|---|---|---|
| Cancel | Button | | Takes the user back to the Credit Review History list page without saving. Doesn't give an unsaved data warning message. |
| Save | Button | Button would be disabled if the review is approved or rejected. | Creates a Credit Review record for a particular review status, keeps the user on the same screen & makes the rest of the tabs accessible to the user. |

3. Update Credit Review History

| Description | Action Type | Action-Specific Rules | Actions/Data Source |
|---|---|---|---|
| Back | Button | | Takes the user back to the Credit Review History list page without saving. Gives an unsaved data warning message if the data has been modified but not saved. |
| Print | Button | | Displays the Input page for the Credit Review Report selection. |
| Save | Button | | Creates a Credit Review record for a particular review status & the user remains on the same page. |

Customer Module

Use Case Specification

Maintain Credit Review and History

Table of Contents

I. View History, Create, Update a Credit Review
A. Brief Description
II. Flow of Events
A. Basic Flow—View Credit Review History
B. Alternate Flow—Maintain a Customer Credit Review
C. Alternate Flow—Initiate a Customer Credit Review
III. Special Requirements
IV. Pre-Conditions
V. Post-Conditions
VI. Business Rules—Credit Review Information
A. Fields Software Requirements Definition Section 1

Use Case

I. View History, Create, Update a Credit Review

A. Brief Description

The Credit Review History Page will provide a window into any past Credit Reviews performed on a Customer as well as the Credit Review currently being performed. Since only one Credit Review may be active at once, most of the information will be historical. Upon Final Approval (or if Rejected), a snapshot is taken of all data relevant to the Credit Review. This snapshot of the data is what the user will see when they view Historical Credit Review Information.

The Customer's Credit Review History includes:

Credit Review Information

Credit Limits

Credit Conditions

Lease Term Depreciation Percentages

Fleet Plan

Fleet Risk Analysis

Pricing Plan

All Notes from the Credit Review:

Description of the Customer's Company & Business

Customer's Relationship with Enterprise Fleet Services

Financial Condition

Fleet Profile

Credit Review Approval Information

II. Flow of Events

A. Basic Flow—View Credit Review History

1. The use case begins when the user selects to view the Credit Review information.

a) If the Current Customer selected is a sub-Customer, the Credit Review is not available (hidden).

2. The system displays a list of existing Credit Reviews (read only)

a) Review Status (1) This links the user to the details of the Credit Review (a) If the Review Status is Approved or Rejected, the Credit Review details may be viewed, but not updated (b) If the Review Status is Working, Pending Approval, or Reviewed, the Credit Review details may be updated by users with the appropriate security.

b) Current Review Date (Sorted with the most recent date first)

c) Review Created By Name d) Next Review Date e) Review Type

3. The user chooses one of the Credit Reviews a) If the Review Status is not Approved or Rejected (1) See the Alternate Flow—Maintain a Customer Credit Review b) If there are no active Credit Reviews for this Customer (1) The user may choose to begin a new Credit Review (a) See the Alternate Flow—Initiate a Customer Credit Review 4. The system displays the Credit Review Information Page a) All information is read-only for Approved or Rejected Credit Reviews b) All Credit Review pages are available for review 5. The user reviews the information a) The user may choose to print the Credit Review (1) See the Use Case—Publish the Credit Review Report 6. When finished, the user can return to the Credit Review History List 7. The use case ends B. Alternate Flow—Maintain a Customer Credit Review:

1. The user has selected an active Credit Review to maintain

2. The default page is Credit Review Information a) See the Business Rules Section of this document for more information on the Credit Review Information b) If the Credit Review Status is Approved or Rejected, this data may not be changed 3. The system displays the following read-only fields:

a) Review Date b) Review Created By

4. The user may change the following required fields:

a) Next Credit Review Date b) Credit Review Type

5. The user may change the following optional field:

a) Credit Review Notes

6. The user may choose to save the Credit Review Information

7. The user may choose to update other information for this Credit Review a) See the following Use Cases:

(1) Use Case—Credit Review Limits & Conditions (2) Use Case—Credit Review Vehicle Plan (3) Use Case—Credit Review Risk Analysis (4) Use Case—Credit Review Notes b) The user may choose to approve the Credit Review (1) See the Use Case—Credit Review Approvals c) Each of the Credit Review Detail pages allows the user to save data.

(1) The system stays on the page that was saved d) If the user chooses to print the Credit Review (1) See the Use Case—Publish the Credit Review Report 8. The user continues updating and saving information on the various Credit Review Pages until finished.

9. When finished, the user may return to the Credit Review History page from the Credit Review Information page.

10. This flow ends

C. Alternate Flow—Initiate a Customer Credit Review:

1. The user selects to Initiate a Customer Credit Review a) If there is already an active Credit Review (not Approved, not Rejected), an error message is displayed.

(1) This flow ends.

b) If the Customer is on Credit Hold, an error message is displayed (1) This flow ends.

2. The system displays the Credit Review Information page a) See the Business Rules Section for more information about these fields.

3. The user enters the following required information:

a) Next Credit Review Date b) Credit Review Type

4. The user may enter the following optional information:

a) Credit Review Notes

5. The user chooses to save the Credit Review Information a) If any of the required fields are blank or in error, the system provides a message and the initiation of the Credit Review stops.

(1) The user corrects the errors and may retry the save operation.

(2) This flow ends b) The user may choose to Cancel the creation of a Credit Review (1) This flow ends 6. After a successful save of the Credit Review Information
   a) The Credit Review Status is set to Working
   b) The system gathers all of the appropriate information to begin the Credit Review: See the Business Rules in the following use cases for initial defaults and rules.
      (1) Use Case—Credit Review Limits & Conditions
      (2) Use Case—Credit Review Vehicle Plan
      (3) Use Case—Credit Review Risk Analysis
      (4) Use Case—Credit Review Notes
   c) The user may modify Credit Review data as necessary
      (1) See the Alternate Flow—Maintain a Customer Credit Review 7. This flow ends.

III. Special Requirements

1. None

IV. Pre-Conditions

1. The user must be logged on to EDGE and have appropriate security access to create and update a Credit Review.

2. The customer selected must be a Master Customer. The Credit Review option will be hidden for sub-customers.

3. The customer selected must NOT be on Credit Hold.

V. Post-Conditions

1. The customer Credit Review is established or updated with the appropriate information

Section 2

Business Rules

VI. Business Rules—Credit Review Information

A. Fields

1. Credit Review Status (Driven by the Actions Taken within the Credit Review Function)
   a) Working
      (1) Newly created Credit Review
   b) Pending Approval
      (1) Credit Review Submitted for Approval
   c) Reviewed
      (1) Credit Review has been Reviewed, but not given Final Approval
   d) Approved
      (1) Final Approval has been secured . . . closes the review process
   e) Rejected
      (1) Approvers Reject the Credit for this customer . . . closes the review process.

2. Credit Review Type (Required)
   a) Initial Review
      (1) Creating a baseline Credit Relationship with a new Customer
   b) Annual Review
      (1) Normal, yearly review to confirm validity of Credit Relationship
   c) Credit Increase
      (1) Customer looks to expand their fleet or previously defined Credit Limits do not support the Customer's needs.
   d) Credit Decrease
      (1) Due to market conditions, or Customer's financial Situation, we may choose to tighten the Credit Limits
   e) This may be updated during the Credit Review process until the Credit Review reaches the Approved or Rejected Status.

3. Current Credit Review Date
   a) Date that the Credit Review was initiated—system supplied date.
   b) This may not be changed.

4. Credit Review Created By
   a) User who initiated the Credit Review was initiated—system supplied name.
   b) This may not be changed.

5. Next Credit Review Date
   a) Required
   b) Date of the next scheduled review.
   Must be a future date, in standard date format.
   d) Will default to one year from the Credit Review Date
   e) May be changed to make the Next Review sooner or later than one year.
   f) This may be updated during the Credit Review process until the Credit Review reaches the Approved or Rejected Status.

6. Credit Review Notes
   a) Optional
   b) This may be updated during the Credit Review process until the Credit Review reaches the Approved or Rejected Status.

Exhibit D

Credit Review

Functional Requirements Specification

Credit Limits

Table of Contents

I. Functional Requirements Specification Introduction

II. Screen Print(s)
   A. Credit Limits (top)
   B. Credit Limits (bottom)

III. Detail Tables
   A. Field Mapping Tables
   1. Current Credit Limits
   2. Requested Credit Limits
   B. Business Validation/System Generated Notes
   1. Credit Limits—Save
   C. Page Actions
   1. Credit Limits Screen Action Specification I. Functional Requirements Specification Introduction Credit Review Credit Limits shows the current values for a customer's credit limits, credit conditions, lease term depreciation and interest rate floor and allows the user to request modifications to them.

II. Screen Print(s)

Figure 42:
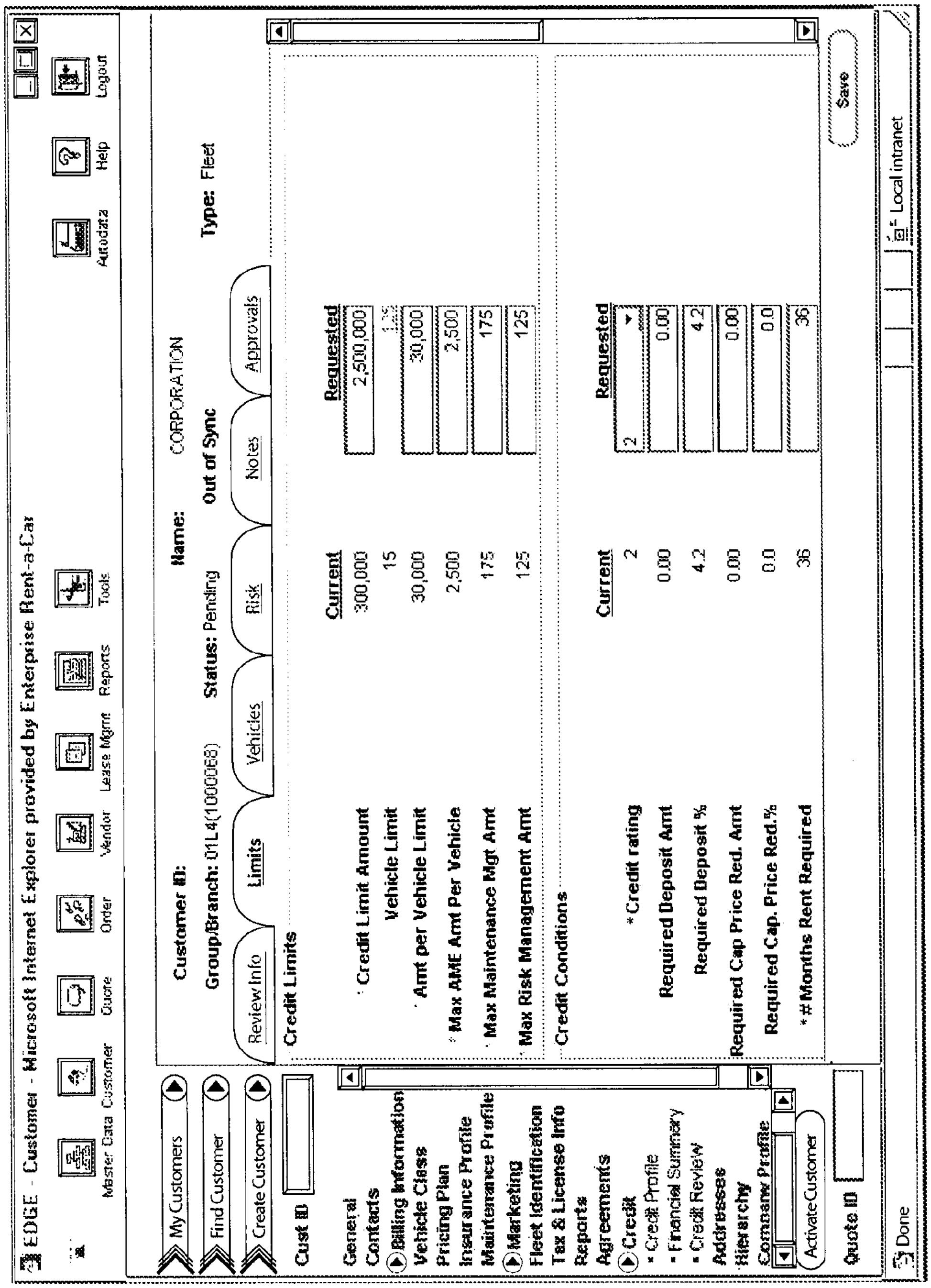
FIGS. 42-43 depict screenshots described in Exhibit D below.

A. Credit Limits (top)—see FIG. 42

Figure 43:
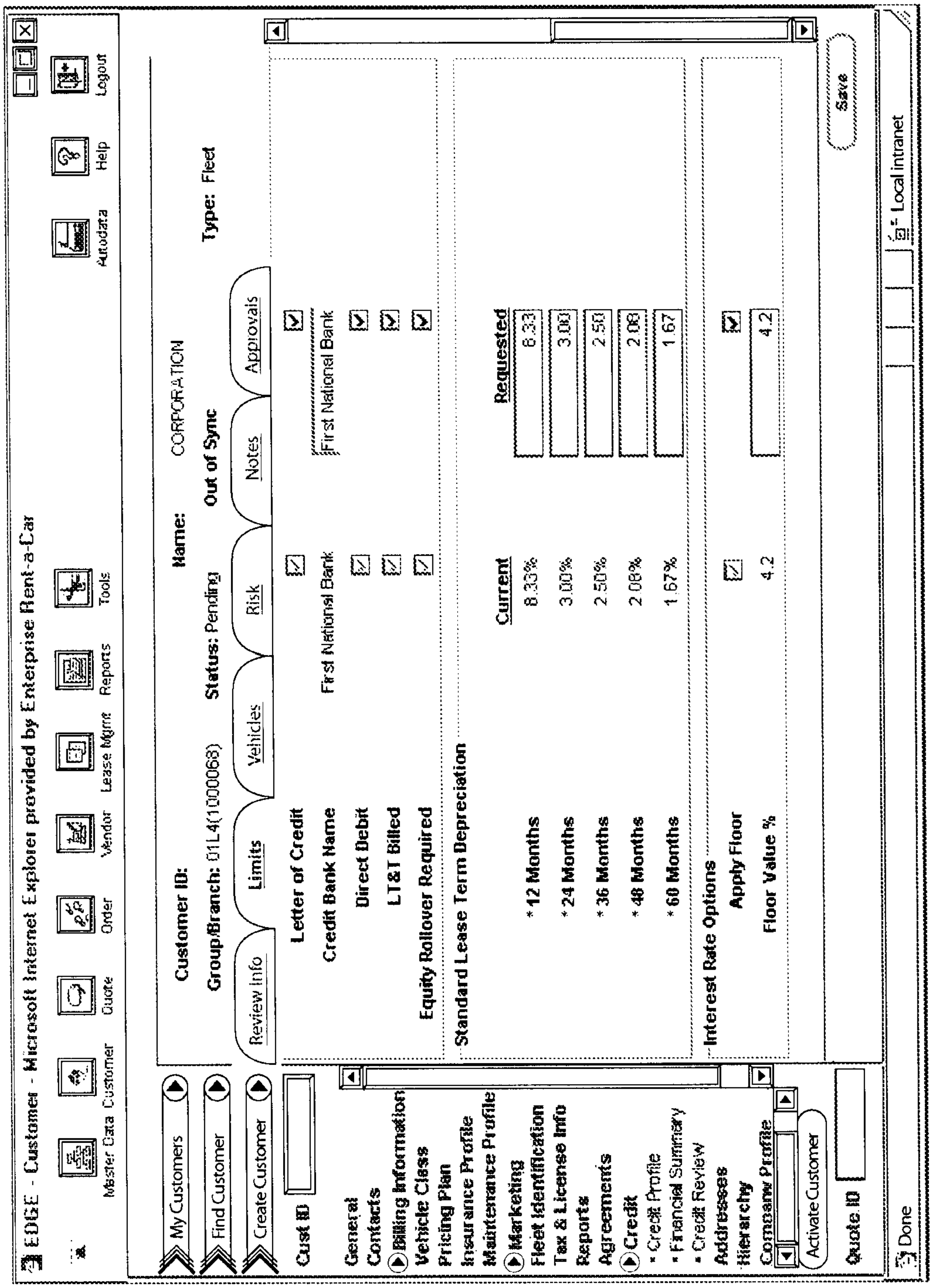

B. Credit Limits (bottom)—see FIG. 43

III. Detail Tables

A. Field Mapping Tables

1. Current Credit Limits

| Field Name | Required | Control Type | Format | Specific Rules | Data Source Details |
|---|---|---|---|---|---|
| Credit Limit Amount | | Read Only | Numeric (11, 0) | | creditReview.creditReviewLimits.currentCreditLimit.curCreditLimitAmt |
| Vehicle Limit | | Read Only | Numeric (11, 0) | | creditReview.creditReviewLimits.currentCreditLimitcurVehicleLimit |
| Amount Per Vehicle Limit | | Read Only | Numeric (11, 0) | | creditReview.creditReviewLimits.currentCreditLimit.curAmtPerVehicleLimit |
| Max AME Per Vehicle | | Read Only | Numeric (11, 0) | | creditReview.creditReviewLimits.currentCreditLimit.curMaxAmeAmtPerVehicle |
| Max Maintenance Mgmt | | Read Only | Numeric (11, 0) | | creditReview.creditReviewLimits.currentCreditLimit.curMaxMaintMgmtAmt |
| Max Risk Mgmt | | Read Only | Numeric (11, 0) | | creditReview.creditReviewLimits.currentCreditLimit.curMaxRiskMgmtAmt |
| Credit Rating | | Read Only | Numeric | | creditReview.creditReviewLimits.currentCreditCondition.creditRating |
| Required Deposit Amt | | Read Only | Numeric | | creditReview.creditReviewLimits.currentCreditCondition.requiredDepositAmt |
| Required Deposit Percent | | Read Only | Standard Percentage | | creditReview.creditReviewLimits.currentCreditCondition.requiredDepositPct |
| Required Cap Price Red Amt | | Read Only | Numeric | | creditReview.creditReviewLimits.currentCreditCondition.requiredCapPriceReductionAmt |
| Required Cap Price Red Percent | | Read Only | Standard Percentage | | creditReview.creditReviewLimits.currentCreditCondition.requiredCapPriceReductionPct |
| Months Rent Required | | Read Only | Numeric | | creditReview.creditReviewLimits.currentCreditCondition.monthsRentRequired |
| Letter of Credit | | Check Box | | | creditReview.creditReviewLimits.currentCreditCondition.letterOfCredit |
| Credit Bank Name | | Read Only | Alpha Numeric | | creditReview.creditReviewLimits.currentCreditCondition.creditBankName |
| Direct Debit | | Check Box | | | creditReview.creditReviewLimits.currentCreditCondition.directDebit |
| LT & T Billed | | Check Box | | | creditReview.creditReviewLimits.currentCreditCondition.licenseTaxTitleBilled |
| Equity Rollover Required | | Check Box | | | creditReview.creditReviewLimits.currentCreditCondition.equityRolloverRequired |
| 12 Month Depreciation | | Read Only | Numeric | | creditReview.CreditReviewMinDepr.curDepreciationPct |
| 24 Month Depreciation | | Read Only | Numeric | | creditReview.CreditReviewMinDepr.curDepreciationPct |
| 36 Month Depreciation | | Read Only | Numeric | | creditReview.CreditReviewMinDepr.curDepreciationPct |
| 48 Month Depreciation | | Read Only | Numeric | | creditReview.CreditReviewMinDepr.curDepreciationPct |
| 60 Month Depreciation | | Read Only | Numeric | | creditReview.CreditReviewMinDepr.curDepreciationPct |
| Apply Floor | | Read Only | Checkbox | | creditReview.creditReviewLimits.curApply InterestRateFloor |
| Floor Value % | | Read Only | Numeric | | creditReview.creditReviewLimits.curInterestRateFloorPct |

2. Requested Credit Limits

| Field Name | Required | Control Type | Format | Specific Rules | Data Source Details |
|---|---|---|---|---|---|
| Credit Limit | Required | Text Entry | Numeric (8, 0) | | creditReview.creditReviewLimits.curCreditLimitAmt |
| Vehicle Limit | | Link | Numeric | | creditReview.fleetRiskLimits.vehicleLimitNumber |
| Amount Per Vehicle Limit | Required | Text Entry | Numeric (6, 0) | | creditReview.creditReviewLimits.requestedCreditLimit.curAmtPerVehicleLimit |
| Max AME Per Vehicle | Required | Text Entry | Numeric (5, 0) | | creditReview.creditReviewLimits.requestedCreditLimit.curMaxAmeAmtPerVehicle |
| Max Maintenance Mgmt | Required | Text Entry | Numeric (8, 0) | | creditReview.creditReviewLimits.requestedCreditLimit.curMaxMaintMgmtAmt |
| Max Risk Mgmt | Required | Text Entry | Numeric (8, 0) | | creditReview.creditReviewLimits.requestedCreditLimit.curMaxRiskMgmtAmt |
| Credit Rating | Required | Drop Down | Numeric | | creditReview.creditReviewLimits.requestedCreditCondition.creditRating |

-continued

| Field Name | Required | Control Type | Format | Specific Rules | Data Source Details |
|---|---|---|---|---|---|
| Required Deposit Amt | | Text Entry | Numeric (8, 0) | Amt or pct, not both. | creditReview.creditReviewLimits.requestedCreditCondition.requiredDepositAmt |
| Required Deposit Percent | | Text Entry | Percentage (5, 3) | Amt or pct, not both. | creditReview.creditReviewLimits.requestedCreditCondition.requiredDepositPct |
| Required Cap Price Red Amt | | Text Entry | Numeric (8, 0) | Amt or pot, not both. | creditReview.creditReviewLimits.requestedCreditCondition.requiredCapPriceReductionAmt |
| Required Cap Price Red Percent | | Text Entry | Percentage (5, 3) | Amt or pct, not both. | creditReview.creditReviewLimits.requestedCreditCondition.requiredCapPriceReductionPct |
| Months Rent Required | Required | Text Entry | Numeric | | creditReview.creditReviewLimits.requestedCreditCondition.monthsRentRequired |
| Letter of Credit | | Check Box | | | creditReview.creditReviewLimits.requestedCreditCondition.letterOfCredit |
| Credit Bank Name | | Text Entry | Alpha Numeric | | creditReview.creditReviewLimits.requestedCreditCondition.creditBankName |
| Direct Debit | | Check Box | | | creditReview.creditReviewLimits.requestedCreditCondition.directDebit |
| LT & T Billed | | Check Box | | | creditReview.creditReviewLimits.requestedCreditCondition.licenseTaxTitleBilled |
| Equity Rollover Required | | Check Box | | | creditReview.creditReviewLimits.requestedCreditCondition.equityRolloverRequired |
| 12 Month Depreciation | Required | Text Entity | Percentage (5, 3) | | creditReview.CreditReviewMinDepr.reqDepreciationPct |
| 24 Month Depreciation | Required | Text Entity | Percentage (5, 3) | | creditReview.CreditReviewMinDepr.reqDepreciationPct |
| 36 Month Depreciation | Required | Text Entity | Percentage (5, 3) | | creditReview.CreditReviewMinDepr.reqDepreciationPct |
| 48 Month Depreciation | Required | Text Entity | Percentage (5, 3) | | creditReview.CreditReviewMinDepr.reqDepreciationPct |
| 60 Month Depreciation | Required | Text Entity | Percentage (5, 3) | | creditReview.CreditReviewMinDepr.reqDepreciationPct |
| Apply Floor | | Check Box | | | creditReview.creditReviewLimits.reqApplyInterestRateFloor |
| Floor Value % | | Text Entry | Percentage (5, 3) | | creditReview.creditReviewLimits.reqInterestRateFloorPct |

B. Business Validation/System Generated Notes

1. Credit Limits—Save

Credit Limits Save

| Validation | Msg Type | Property Key |
|---|---|---|
| Credit Limit is required. | Error | |
| Amt Per Vehicle Limit is required. | Error | |
| Max AME per Vehicle is required. | Error | |
| Max Maintenance Mgmt is required. | Error | |
| Max Risk Mgmt is required. | Error | |
| Credit Rating is required. | Error | |
| Months Rent Required is required. | Error | |
| 12 Month Depreciation is required. | Error | |
| 24 Month Depreciation is required. | Error | |
| 36 Month Depreciation is required. | Error | |
| 48 Month Depreciation is required. | Error | |
| 60 Month Depreciation is required. | Error | |
| Interest rate floor value is required if the interest rate apply floor is checked. | Error | |
| Invalid currency format (for all currency fields) | Error | |
| Invalid percent format (for all percent fields) | Error | |
| Req. Deposit Amt. Must be greater than or equal to zero. | Error | |
| Req. Deposit Percentage must be greater than or equal to zero and less than or equal to 100. | Error | |
| Req. Cap Price Red. Percentage must be greater than or equal to zero and less than or equal to 100. | Error | |
| Req. Cap Price Red. Amt. must be greater than or equal to zero. | Error | |
| Months Rent Required must be greater than or equal to zero up to the lease term value. | Error | |
| Lease Term Minimum Depreciation values must be greater than or equal to zero and less than 100. | Error | |
| Eft/Direct Deposit is required for this Customer. Warning on Credit Condition when Direct Debit is checked and the EFT/Direct Deposit information is not filled in on the Billing Options page. | Warning | |

C. Page Actions

1. Credit Limits

| Description | Action Type | Action-Specific Rules | Actions/Data Source |
|---|---|---|---|
| Save | Button | | Saves credit limit data and remains on the same page. |
| Requested Vehicle Limit | Link | | Goes to the Risk page. Return from the risk page replaces link value with the modifications made on the risk page. |

Customer Module

Use Case Specification

Credit Review Limits & Conditions

Table of Contents

I. Credit Review Limits & Conditions
A. Brief Description
II. Flow of Events
A. Basic Flow—Initiate a Credit Review
B. Alternate Flow—Update Credit Limits & Conditions
III. Special Requirements
IV. Pre-Conditions
V. Post-Conditions
VI. Business Rules
A. Field Information
B. Credit Limits
C. Credit Conditions
D. Lease Term Depreciation %

Software Requirements Definition

Section 1

Use Case

I. Credit Review Limits & Conditions

A. Brief Description

The Credit Review process allows Fleet Services to request new Limits, Conditions, and Lease Term Depreciation Percentages. This use case will cover both the creation and the update of these items within a Credit Review. When a Credit Review is given Final Approval, these items will be updated into the Customer's Credit Profile.

II. Flow of Events

A. Basic Flow—Initiate a Credit Review

1. This use case is an extension of the Customer—Maintain Credit Review and History use case.

2. When the user saves the Credit Review information during the Credit Review Initiation process, the Credit Limits & Conditions information is gathered:
   a) See the Business Rules for loading the fields and their default values.

3. The system displays the Credit Limits & Conditions information
   a) See the Business Rules Section for a list of all of the fields.

4. The user enters the Requested Credit Limits & Conditions information as appropriate.

5. The user chooses to Save the Credit Limits & Conditions information
   a) See the Business Rules Section for Required Fields and Rules 6. The system saves the data.
   a) The status of the Credit Review remains unchanged 7. The system redisplays the Credit Limits & Conditions information 8. The user may continue to modify and save the Credit Limits and Conditions information
   a) See the Alternate Flow—Update Credit Limits & Conditions 9. This flow ends.

B. Alternate Flow—Update Credit Limits & Conditions:

1. The user selects an existing Credit Review to update

2. The system displays the Credit Review Details:
   a) See the Business Rules Section for a list of all of the fields.
   b) If the selected Credit Review is closed (Status=Approved or Rejected)
      (1) The values are all displayed as read-only.

3. The user enters the Requested Values for Credit Limits & Conditions as appropriate.

4. The user chooses to Save the Credit Review Details
   a) If the user simply wanted to view the Credit Review Details,
      (1) They could simply go to any other Credit Review page
      (2) This flow ends.

5. The system saves the data.

6. The system redisplays the Credit Limits & Conditions page
   a) The user may choose to return to the Credit Review History page.

7. This flow ends

III. Special Requirements

1. Beginning with the EAM 3.5 Release, the Customer Credit Profile will only be updated through the Credit Review Function.

IV. Pre-Conditions

1. The user must be logged on to EDGE and have appropriate security access to create and update a Credit Review.

2. The Credit Review function is not available (hidden) for sub-customers.

V. Post-Conditions

1. The Customer Credit Review is established/updated with the appropriate information Section 2

Business Rules

VI. Business Rules

A. Field Information

1. For Open Credit Reviews, the following rules apply to all Credit Limits, Credit Conditions, and Lease Term Depreciation information
   a) The Current values always retrieves the most recent value for each field (defaults)
   b) The Requested values, initially, come from the defaults listed below
      (1) Upon save, the system captures the Requested data for this Credit Review
      (2) Requested values may be modified by Reviewers and Approvers until the Credit Review is Closed (Final Approval or Rejected)
         (a) Requested Vehicle Limit is an exception to this rule (see below)
      (3) All rules about the fields mentioned below apply only to the Requested fields.

2. For Closed Credit Reviews, the following rules apply to all Credit Limits, Credit Conditions, and Lease Term Depreciation information
   a) The Current and the Requested values are always retrieved from the snapshot of the Credit Review that was taken when the Credit Review was closed.

(1) No modifications are allowed to Closed Credit Reviews

B. Requested Credit Limits

1. Credit Limit Amount
   a) Initially default from Customer Credit Profile—Credit Limit Amount
   b) Required (value must be greater than or equal to zero)
2. Vehicle Limit
   a) Always a calculated value
   b) Calculation (all values for this calculation come from the Risk Analysis page)
      (1) Current Units plus Units to be Delivered minus Units to be Deleted
   c) This value may not be directly changed. The user must change the factors on the Risk Analysis page
3. Amount per Vehicle Limit
   a) Initially default from Customer Credit Profile—Amount Per Vehicle Limit
   b) Required (value must be greater than or equal to zero)
4. Maximum AME Amount Per Vehicle
   a) Initially default from Customer Credit Profile—Maximum AME Amount Per Vehicle
   b) Required (value must be greater than or equal to zero)
5. Maximum Maintenance Management Amount
   a) Initially default from Customer Credit Profile—Maximum Maintenance Management Amount
   b) Optional (if entered, value must be greater than or equal to zero)
6. Maximum Risk Management Amount
   a) Initially default from Customer Credit Profile—Maximum Risk Management Amount
   b) Optional (if entered, value must be greater than or equal to zero)

C. Requested Credit Conditions

1. Credit Rating
   a) Initially default from Customer Credit Profile—Credit Rating
   b) Required (value must be 1 or 2 or 3)
2. Required Deposit $
   a) Initially default from Customer Credit Profile—Required Deposit Amount
   b) Mutually exclusive with Required Deposit %
   c) Optional (if entered, value must be greater than or equal to zero)
3. Required Deposit %
   a) Initially default from Customer Credit Profile—Required Deposit Percentage
   b) Mutually exclusive with Required Deposit $
   c) Optional (if entered, value must be greater than or equal to zero and less than or equal to 100.000)
4. Required Capitalized Price Reduction $
   a) Initially default from Customer Credit Profile—Required Capitalized Cost Reduction Amount
   b) Mutually exclusive with Required Capitalized Price Reduction %
   c) Optional (if entered, value must be greater than or equal to zero)
5. Required Capitalized Price Reduction %
   a) Initially default from Customer Credit Profile—Required Capitalized Cost Reduction Percentage
   b) Mutually exclusive with Required Capitalized Price Reduction $
   c) Optional (if entered, value must be greater than or equal to zero and less than or equal to 100.000)
6. Number of Months Rent Required
   a) Initially default from Customer Credit Profile—# Months Rent Required
   b) Optional (if entered, value must be greater than or equal to zero)
7. Letter of Credit (Indicator)
   a) Initially default from Customer Credit Profile—Letter of Credit
   b) Required (Must be ON or OFF)—null is invalid
8. Bank Name
   a) Initially default from Customer Credit Profile—Credit Bank Name
   b) Required if the Letter of Credit indicator is ON.
9. Direct Debit (Indicator) (Replaces the term ACH—Automated Clearing House)
   a) Initially default from Customer Credit Profile—Direct Debit Auto Pay Indicator
   b) Required (Must be ON or OFF)—null is invalid
10. License Tax & Title Billed (Indicator)
   a) Initially default from Customer Credit Profile—LT&T Billed Indicator
   b) Required (Must be ON or OFF)—null is invalid
11. Must Roll Equity (Indicator)
   a) Initially default from Customer Credit Profile—Must Roll Equity Indicator
   b) Required (Must be ON or OFF)—null is invalid D. Requested Lease Term Depreciation %

1. 12 Month Depreciation %
   a) Initially default from Customer Credit Profile—12 month Minimum Depreciation %
   b) Required (value must be greater than or equal to zero and less than 100.00)
2. 24 Month Depreciation %
   a) Initially default from Customer Credit Profile—24 month Minimum Depreciation %
   b) Required (value must be greater than or equal to zero and less than 100.00)
3. 36 Month Depreciation %
   a) Initially default from Customer Credit Profile—36 month Minimum Depreciation %
   b) Required (value must be greater than or equal to zero and less than 100.00)
4. 48 Month Depreciation %
   a) Initially default from Customer Credit Profile—48 month Minimum Depreciation %
   b) Required (value must be greater than or equal to zero and less than 100.00)
5. 60 Month Depreciation %
   a) Initially default from Customer Credit Profile—60 month Minimum Depreciation %
   b) Required (value must be greater than or equal to zero and less than 100.00)
6. For NEW customers that have NO Credit Profile established, the Depreciation Rates come from the Default Rates for the Group.
   a) If the Group has no default rates, then use the Corporate (Group 77) Default Rates.

E. Interest Rate Options

1. Apply Floor Indicator
   a) Initially default from Customer Credit Profile—Apply Floor indicator
   b) Required (Must be ON or OFF)—null is invalid
2. Floor Value %
   a) Initially default from Customer Credit Profile—Floor Value %
   b) If Apply Floor indicator is ON, this field is Required (value must be greater than or equal to zero and less than 100.00)
   c) If Apply Floor indicator is OFF, this field is not available.

Exhibit E

Customer

Functional Requirements Specification

Credit Review Vehicle Plan

Table of Contents

I. Functional Requirements Specification Introduction
II. Screen Print(s) Credit Review Vehicle Plans Screen
Credit Review—Vehicle Plan Details Screen—Part 1
III. Detail Tables
A. Field Mapping Tables
1. Display Vehicle Class
2. Update Vehicle Class
B. Business Validation/System Generated Notes
Page Actions
1. Display Credit Review Vehicle Class page
2. Update Credit Review Vehicle Class Details Screen Action Specification I. Functional Requirements Specification Introduction The Credit Review process includes the Customer's Vehicle Plan. The number of units on a Customer's Vehicle Plan supports the Requested Vehicle Limit for the Customer being reviewed. The Vehicle type and use data for the Vehicle Plan is based on information entered through the Customer Vehicle Class function. This part of the Credit Review displays the existing Vehicle Plan in a more compact format.

Figure 44:
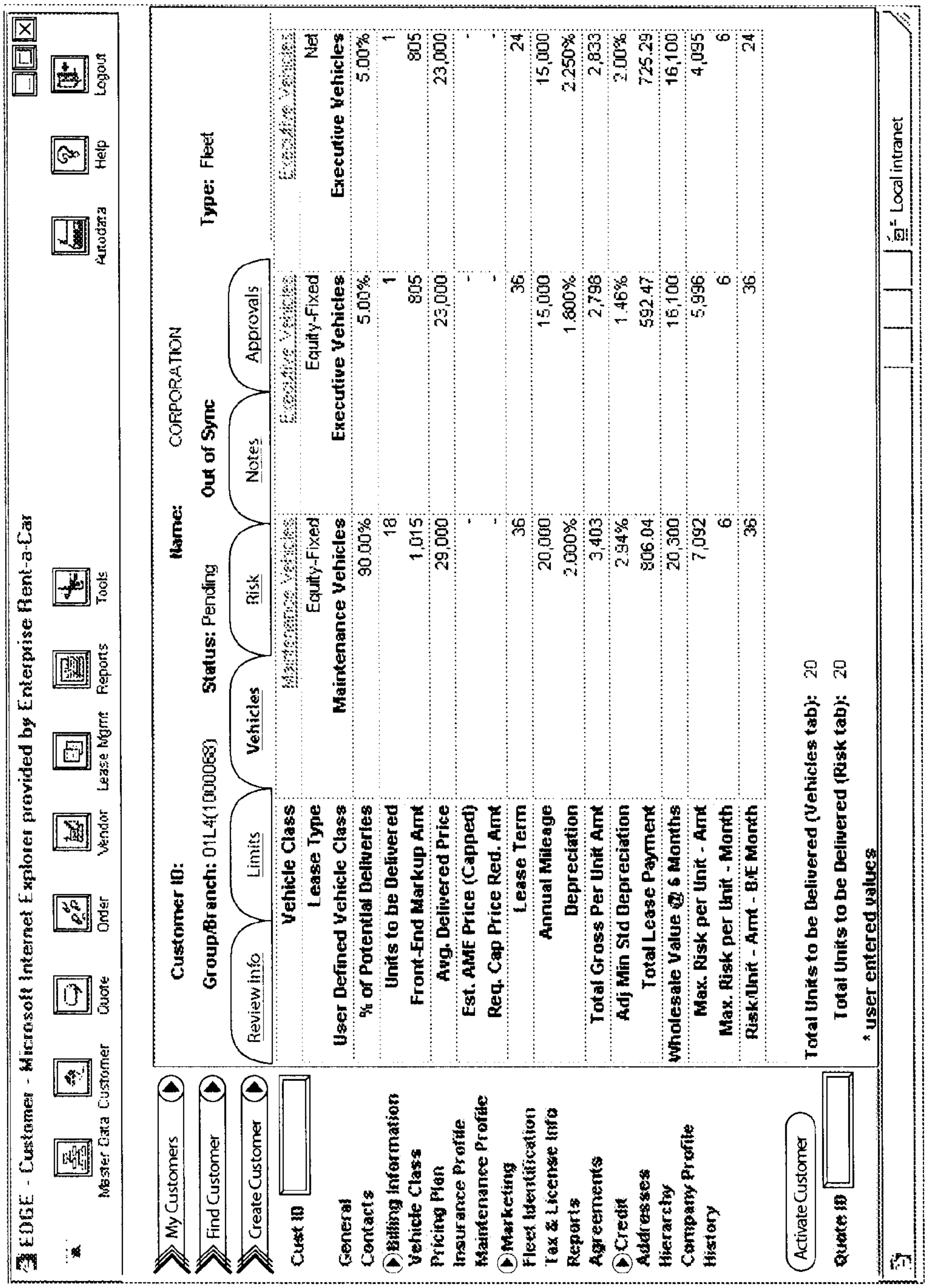
FIGS. 44-46 depict screenshots described in Exhibit E below.

II. Screen Print(s) Credit Review Vehicle Plans Screen—see FIG. 44

Figure 45:
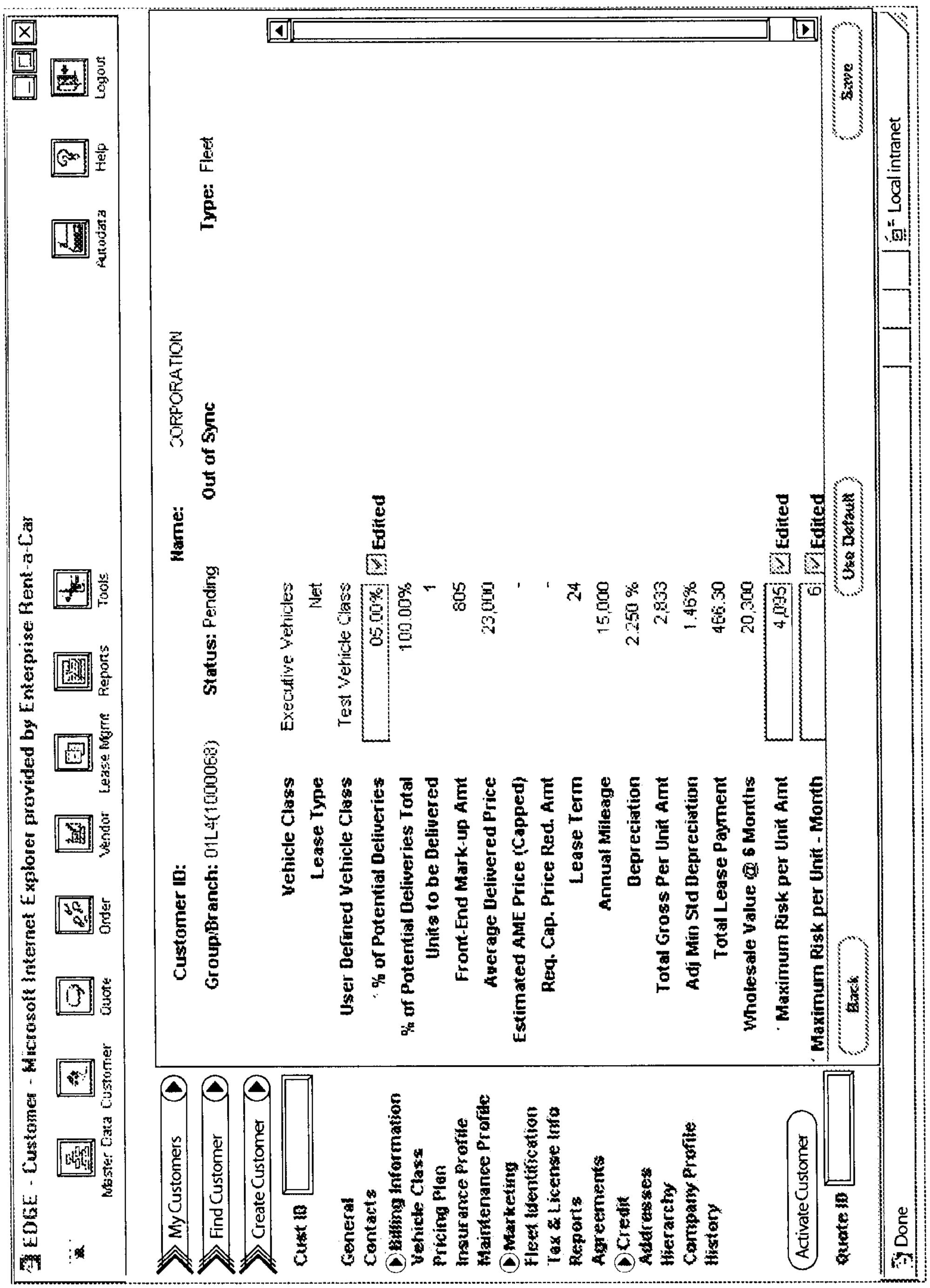

Credit Review—Vehicle Plan Details Screen—Part 1—see FIG. 45

Figure 46:
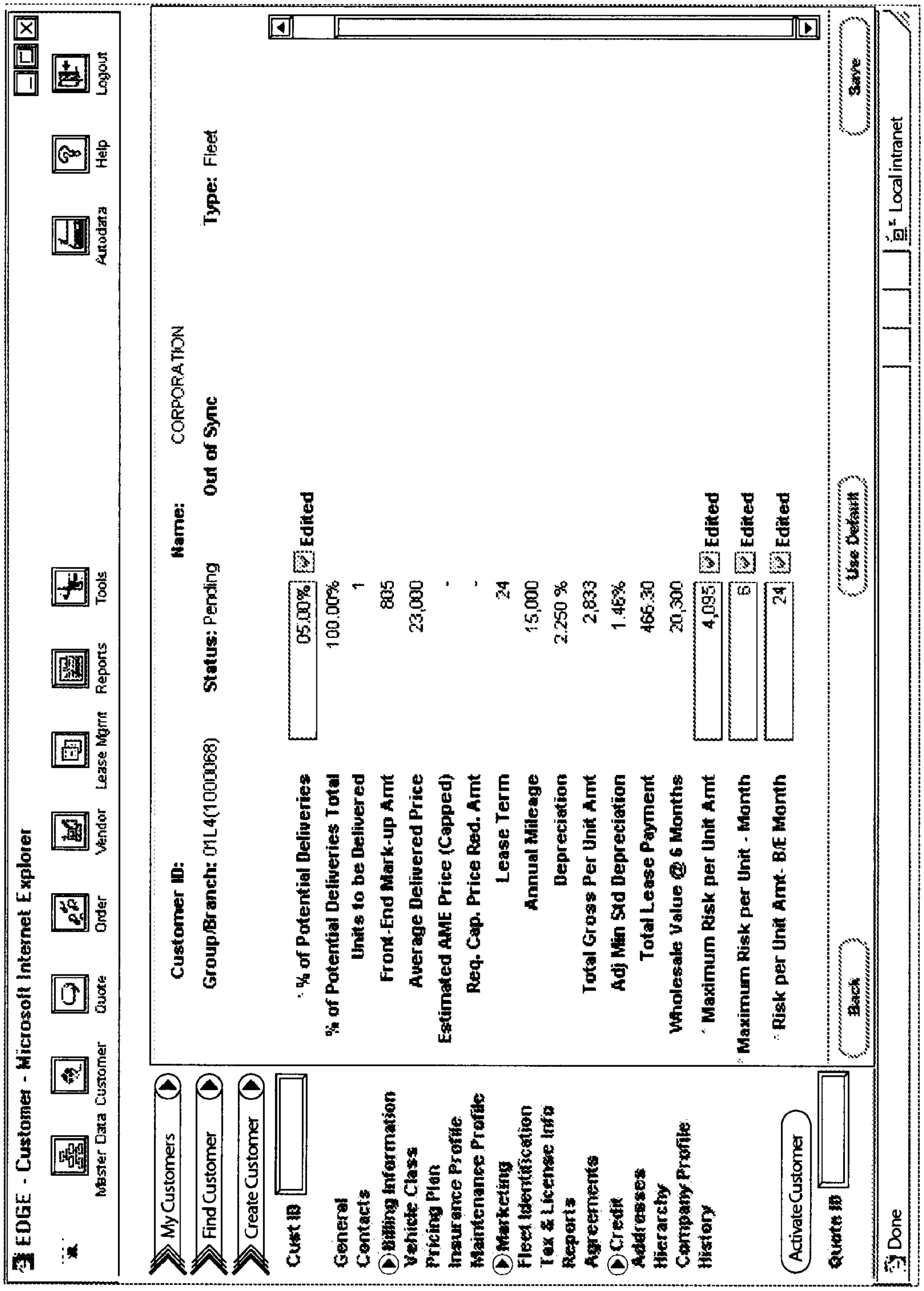

Credit Review—Vehicle Plan Details Screen—Part 2—see FIG. 46

III. Detail Tables

A. Field Mapping Tables

1. Display Vehicle Class

| Field Name | Required | Control Type | Format | Specific Rules | Data Source Details |
|---|---|---|---|---|---|
| Vehicle Class | | Link | Alpha | | vehicleClassViewHelper.getVehicleClassProductTypeDescription( ) |
| User Defined Vehicle Class | | Read Only | Alpha | | vehicleClassViewHelper.userDefinedVehicleClass |
| % of Potential Deliveries | | Read Only | Standard Percentage Format | | vehicleClassViewHelper.creditReviewPreference.percentageOfPotentialDeliveries |
| Potential Units | | Read Only | Numeric | | vehicleClassViewHelper.creditReviewPreference.potentialUnits |
| Front-End Mark-up Amt | | Read Only | Standard Currency Format | When credit review is approved or rejected, values are read from credit review vehicle class, otherwise pulled from customer vehicle class. | vehicleClassViewHelper.creditReviewPreference.frontEndMarkUpAmount |
| Average Delivered Price | | Read Only | Standard Currency Format | When credit review is approved or rejected, values are read from credit review vehicle class, otherwise pulled from customer vehicle class. | vehicleClassViewHelper.creditReviewPreference.averageDeliveredPrice |
| Estimated AME Price (Capped) | | Read Only | Standard Currency Format | When credit review is approved or rejected, values are read from credit review vehicle class, otherwise pulled from customer vehicle class. | vehicleClassViewHelper.creditReviewPreference.estimatedAmePriceCapped |
| Req. Cap. Price Red. Amt. | | Read Only | Standard Currency Format | | vehicleClassViewHelper.requiredCapCostReductionAmount |
| Lease Type | | Read Only | Alpha | When credit review is approved or rejected, values | vehicleClassViewHelper.leaseType |

-continued

| Field Name | Required | Control Type | Format | Specific Rules | Data Source Details |
|---|---|---|---|---|---|
| | | | | are read from credit review vehicle class, otherwise pulled from customer vehicle class. | |
| Lease Term | | Read Only | Numeric | When credit review is approved or rejected, values are read from credit review vehicle class, otherwise pulled from customer vehicle class. | vehicleClassViewHelper.leasePreference.leaseTerm |
| Annual Mileage | | Read Only | Numeric | When credit review is approved or rejected, values are read from credit review vehicle class, otherwise pulled from customer vehicle class. | vehicleClassViewHelper.leasePreference.annualMileage |
| Depreciation | | Read Only | Standard Percentage Format | When credit review is approved or rejected, values are read from credit review vehicle class, otherwise pulled from customer vehicle class. | vehicleClassViewHelper.leasePreference.depreciationPercentage |
| Total Gross Per Unit Amt | | Read Only | Standard Currency Format | | vehicleClassViewHelper.totalGrossPerUnitAmount |
| Adj Min Std Depreciation | | Read Only | Standard Percentage Format | | vehicleClassViewHelper.adjustedMinimumStandardDepreciaticn |
| Total Lease Payment | | Read Only | Standard Currency Format | | vehicleClassViewHelper.totalLeasePayment |
| Wholesale Value @ 6 Months | | Read Only | Standard Currency Format | | vehicleClassViewHelper.sixMonthsWholesaleValue |
| Maximum Risk Per Unit Amt | | Read Only | Standard Currency Format | | vehicleClassViewHelper.maximumRiskAmountPerUnit |
| Maximum Risk per Unit - Month | | Read Only | Numeric | | vehicleClassViewHelper.maximumRiskPerUnitMonth |
| Risk per Unit Amt - B/E Month | | Read Only | Numeric | | vehicleClassViewHelper.riskPerUnitAmountBreakEvenMonth |

* indicates the values are user entered (instead of system calculated values). This applies to all the fields on the screen with a “Edited” checkbox.

2. Update Vehicle Class

| Field Name | Required | Control Type | Format | Specific Rules | Data Source Details |
|---|---|---|---|---|---|
| Vehicle Class | | Read Only | Alpha | | vehicleClassViewHelper.getVehicleClass ProductTypeDescription( ) |
| % of Potential Deliveries | Conditionally Required | Text field Decimal (8, 5) | Standard Percentage Format | Defaults from Customer Vehicle Class lease preference | vehicleClassViewHelper.creditReviewPreference.percentageOfPotentialDeliveries |

-continued

| Field Name | Required | Control Type | Format | Specific Rules | Data Source Details |
|---|---|---|---|---|---|
| | | | | screen, percentage of Potential Units. When the checkbox is checked this value is required, if the review is in working status. | |
| Edited | | Checkbox | | When credit review is approved or rejected, values are read from credit review vehicle class, otherwise pulled from customer vehicle class. | vehicleClassViewHelper.creditReviewPref-erence.editedPercentageOfPotentialDeliveries |
| % of Potential Deliveries Total | | Read Only | Standard Percentage Format | | vehicleClassViewHelper.totalpotentialDeliveries |
| Potential Units | | Read Only | Numeric | | vehicleClassViewHelper.creditReviewPref-erence.potentialUnits |
| Front-End mark-up Amt | | Read Only | Standard Currency Format | When credit review is approved or rejected, values are read from credit review vehicle class, otherwise pulled from customer vehicle class. | vehicleClassViewHelper.creditReviewPref-erence.frontEndMarkUpAmount |
| Average Delivered Price | | Read Only | Standard Currency Format | When credit review is approved or rejeled, values are read from credit review vehicle class, otherwise pulled from customer vehicle class. | vehicleClassViewHelper.creditReviewPref-erence.averageDeliveredPrice |
| Estimate AME Pnce (Capped) | | Read Only | Standard Currency Format | When credit review is approved or rejected, values are read from credit review vehicle class, otherwise pulled from customer vehicle class. | vehicleClassViewHelper.creditReviewPref-erence.estimatedAmePriceCapped |
| Req. Cap. Price Red. Amt. | | Read Only | Standard Currency Format | | vehicleClassViewHelper.requiredCapCost ReductionAmount |
| Lease Type | | Read Only | Alpha | When credit review is approved or rejected, values are read from credit review vehicle class, otherwise pulled from customer vehicle class. | vehicleClassViewHelper.leaseType |
| Lease Term | | Read Only | Numeric | When credit review is approved or rejected, values are read from credit review vehicle class, otherwise pulled | vehicleClassViewHelper.leasePref-erence.leaseTerm |

-continued

| Field Name | Required | Control Type | Format | Specific Rules | Data Source Details |
|---|---|---|---|---|---|
| | | | | from customer vehicle class. | |
| Annual Mileage | | Read Only | Numeric | When credit review is approved or rejected, values are read from credit review vehicle class, otherwise pulled from customer vehicle class. | vehicleClassViewHelper.leasePreference.annualMileage |
| Depreciation | | Read Only | Standard Percentage Format | When credit review is approved or rejected, values are read from credit review vehicle class, otherwise pulled from customer vehicle class. | vehicleClassViewHelper.leasePreference.depreciation Percentage |
| Total Gross Per Unit Amt. | | Read Only | Standard Currency Format | | vehicleClassViewHelper.totalGrossPerUnitAmount |
| Adj Min Std Depredation | | Read Only | Standard Percentage Format | | vehicleClassViewHelper.adjustedMinimumStandardDepreciation |
| Total Lease Payment | | Read Only | Standard Currency Format | | vehicleClassViewHelper.totalLeasePayment |
| Wholesale Value @ 6 Months | | Read Only | Standard Currency Format | | vehicleClassViewHelper.sixMonthsWholesaleValue |
| Maximum Risk per Unit - Amt. | Conditionally Required | Text field Decimal (11, 2) | Standard Currency Format | When the checkbox is checked this value is required, if the review is in working status. | vehicleClassViewHelper.maximumRiskAmountPerUnit |
| Edited Maximum Risk per Unit | | Checkbox | | When credit review is approved or rejected, values are read from credit review vehicle class, otherwise pulled from customer vehicle class. | vehicleClassViewHelper.maximumRiskPerUnitAmountEdited |
| Maximum Risk per Unit - month | Conditionally Required | Text field Decimal (11) | Numeric | When the checkbox is checked this value is required, if the review is in working status. | vehicleClassViewHelper.maximumRiskPerUnitMonth |
| Edited Maximum Risk per Unit Month | | Checkbox | | When credit review is approved or rejected, values are read from credit review vehicle class, otherwise pulled from customer vehicle class. | vehicleClassViewHelper.maximumRiskPerUnitMonthEdited |
| Risk per Unit Amt - B/E Month | Conditionally Required | Text field Decimal (11) | Numeric | When the checkbox is checked this value is required, if the review is in working status. | vehicleClassViewHelper.RiskPerUnitAmountBreakEvenMonth |
| Edited Risk per Unit | | Checkbox | | When credit review is approved or rejected, values | vehicleClassViewHelper.riskPerUnitAmountBreakEvenMonthEdited |

-continued

| Field Name | Required | Control Type | Format | Specific Rules | Data Source Details |
|---|---|---|---|---|---|
| | | | | are read from credh review vehicle class, otherwise pulled from customer vehicle class. | |

Note: When the review status is "Accepted" or "Rejected" OR if the user doesn't have update access to the Vehicle Class Details Update screen, the entire screen becomes read-only.

B. Business Validation/System Generated Notes

| Validation | Msg Type | Property Key |
|---|---|---|
| | <Action Type/Name of Button> | |
| The % of Potential Deliveries is required. | Error | CommonErrorKeys.REQUIRED__DATA__MISSING |
| % of Potential Deliveries is an invalid percent format. Valid format is 12.345. | Error | CustomerErrorKeys.INVALID__POTENTIAL__DELIVERY |
| The maximum risk per unit value is required. | Error | CommonErrorKeys.REQUIRED__DATA__MISSING |
| The maximum risk per unit month value is required. | | CommonErrorKeys.REQUIRED__DATA__MISSING |
| Invalid value for Maximum Risk Per Unit Month. Valid value should be between 6 and 12 (inclusive). | Error | CustomerErrorKeys.INVALID__MAX__RISK__MONTH |
| The risk per unit (break even month) value is required. | Error | CommonErrorKeys.REQUIRED__DATA__MISSING |
| Invalid value for Risk Per Unit Amount Break Even Month. Valid values are 0 or 6 through Lease Term. | Error | CustomerErrorKeys.INVALID__RISK__BREAK__EVEN__MONTH |
| User exits the page without saving data. | Info | |

Page Actions

1. Display Credit Review Vehicle Class page

| Description | Action Type | Action-Specific Rules | Actions/Data Source |
|---|---|---|---|
| Vehicle Class | Link | | The Credit Review Vehicle Class details page is displayed. |

2. Update Credit Review Vehicle Class Details

| Description | Action Type | Action-Specific Rules | Actions/Data Source |
|---|---|---|---|
| Return to the Vehicle Class List page | Back | | Return to the Display Credit Review Vehicle Class page. |
| Refreshes the data to the default values | Use Default | | The system alerts the user first and then the default values are displayed. All the edited indicators are unchecked. Default values are saved automatically. |
| Save the Vehicle Class Details | Save | | The Update Credit Review Vehicle Class details page is redisplayed. |

Customer Module
Use Case Specification
Credit Review Vehicle Plan

Table of Contents

I. View the Credit Review Vehicle Plan
A. Brief Description
II. Flow of Events
A. Basic Flow—View the Customer's Vehicle Plan
B. Alternate Flow—Credit Review Vehicle Class Details
III. Special Requirements
IV. Pre-Conditions
V. Post-Conditions
VI. Business Rules—Vehicle Type
A. Vehicle Use & Type
B. Total Gross per Unit Calculation Software Requirements Definition Section 1

Use Case

I. View the Credit Review Vehicle Plan

A. Brief Description

The Credit Review process includes the Customer's Vehicle Plan. The number of units on a Customer's Vehicle Plan supports the Units to be Delivered for the Customer being reviewed. The Vehicle type and use data for the Vehicle Plan is based on information entered through the Customer Vehicle Class function. This part of the Credit Review displays the existing Vehicle Plan in a more compact (scenarios) format.

II. Flow of Events

A. Basic Flow—View the Customer's Vehicle Plan

1. The use case begins when the user selects to view the Customer's Vehicle Plan 2. The system gathers and displays the Credit Review Vehicle Class information
  a) The information is sorted in descending order of Units to be Delivered
    (1) The secondary sorts are on Delivered Price (descending) and Vehicle Class/Product Description (ascending)
  b) See the Business Rules for more information about retrieving, calculating, and displaying the Vehicle Class fields, 3. The user reviews the information
  a) If the user chooses to see the detail for a specific Credit Review Vehicle Class
    (1) The system displays the detail page for the Credit Review Vehicle Class
      (a) See the Alternate Flow—Credit Review Vehicle Class Details
    (2) The user can return to the Credit Review Vehicle Class display
  b) The user may choose modify Customer Vehicle Class information,
    (1) See the Use Case—Maintain Vehicle Class
    (2) Changes made in the Customer Vehicle Class will be reflected in the Credit Review Vehicle Class information.
      (a) See the Business rules for information and exceptions to this.

4. The user may choose to update Comments for the Credit Review Vehicle Plan in the Credit Review Notes page. (See the Use Case—Maintain Credit Review Notes)

5. The use case ends.

B. Alternate Flow—Credit Review Vehicle Class Details

1. The system displays the Details of a Credit Review Customer Vehicle Class
  a) Most fields are display-only and must be updated through the Master Customer's Vehicle Class page 2. Allow entry for the following fields
  a) % of Potential Deliveries
  b) Maximum Risk per Unit Amount
  c) Maximum Risk per Unit—Month
  d) Risk per Unit Amount—B/E Month
    (1) B/E stands for Break Even . . . this is the month of the lease where a unit in this class is expected to reach the Break Even point (changes from Risk to Equity)

3. The user may save the data
  a) The system stores the data and remains on the Credit Review Vehicle Class Details page
    (1) If the user modified the default values for any of the fields,
      (a) The system will indicated that the value has been edited.
      (b) User-edited values will not be recalculated 4. If the user removes the "Edited" indicator from a user edited value,
  a) When the page is saved, that value gets replaced with the default calculation
    (1) See the Business Rules for the default calculations for these fields.

5. If the user chooses the Reset to Defaults function,
  a) The system verifies that the user wants to Reset to Defaults for the Credit Review Vehicle Details page
  b) The system determines the default values for ALL fields that allow user-entry
  c) The system replaces the user-entered data with the defaults.
  d) The system removes the indicators for user edited data
  e) The system saves the default values.

6. The user may go back to the Vehicle Plan page

7. This flow ends.

III. Special Requirements

1. None

IV. Pre-Conditions

1. The user must be logged on to EDGE and have appropriate security access to create and update a Credit Review.

V. Post-Conditions

1. The customer Credit Review is established/updated with the appropriate information Section 2

Business Rules

VI. Business Rules—Vehicle Type

A. Vehicle Use & Type

1. Include ONLY the Vehicle Classes defined for the Master Customer. No Vehicle Class information is gathered from the sub customers.
  a) Include Vehicle Classes with the following Lease Types
    (1) Equity Lease—Fixed
    (2) Equity Lease—Variable
    (3) Equity II
    (4) Net Lease
  b) Exclude Vehicle Classes with the following Lease Types
    (1) Brokerage Vehicle
    (2) Purchase Disposal 2. Vehicle Class Description
  a) Data from Customer Vehicle Class—Vehicle Class
  b) Since Vehicle Class Descriptions can be very long, some truncation may occur.

3. User Defined Vehicle Class Description
  a) Data from Customer Vehicle Class—User Defined Name
  b) Since Vehicle Class Descriptions can be very long, some truncation may occur.

4. % of Potential Deliveries
  a) Data from Customer Vehicle Class—New Field
    (In Customer Vehicle Class, the label will be "% of Potential Fleet")
  b) It is the user's responsibility to make sure that Percentages add up to 100%

5. Units to be Delivered
  a) For each Vehicle Class,
    (1) Multiply the # of Units to be Delivered by the % of Potential Deliveries
      (a) Round to a whole number—no decimal places
  b) For Open Credit Reviews, Units to be Delivered is recalculated when
    (1) Every time the Credit Review is opened
    (2) When the # of Units to be Delivered is changed and saved
    (3) When the % of Potential Deliveries is changed and saved 6. Front-End Mark-up Amount
  a) Dollar amount can come directly from Customer Vehicle Class—New Field
    (1) Entered as whole dollars
  -OR-
  b) Dollar amount=Delivered Price multiplied by Front-End Mark-up Percentage
    (1) Front-End Mark-up Percentage comes from Customer Vehicle Class—New Field
    (2) Round to whole dollars
  c) If Customer Vehicle Class has zeros for both the Front-End Mark-up Amount and the Front-End Mark-up Percentage, then the Front-End Mark-Up Amount on the Credit Review Vehicle Plan page will be zero.

7. Delivered Price Amount
  a) Data from Customer Vehicle Class—New Field
  b) This is entered as the average Delivered Price for units in this Class
    (1) The average Delivered Price is determined by the user, not the system.

8. Estimated AME Price (Capitalized Amount)
  a) Data from Customer Vehicle Class—New Field
  b) This is the average Capitalized AME for units in this Class
    (1) The average Capitalized AME Price is determined by the user, not the system.

9. Required Capitalized Price Reduction Amount
  a) Data from Credit Review—Requested
    (1) If the Requested Required Capitalized Price Reduction Amount and the Requested Required Capitalized Price Reduction Percentage are both zero
      (a) Then this amount is zero.
    (2) If the Requested Required Capitalized Price Reduction Amount is greater than zero
      (a) Then use that amount
    (3) If the Requested Required Capitalized Price Reduction % is greater than zero
      (a) Then multiple that percentage by the Delivered Price Amount for the Vehicle Class 10. Lease Type
  a) Data from Customer Vehicle Class—Product (Lease Type)

11. Lease Term
  a) Data from Customer Vehicle Class—Lease Term

12. Annual Mileage
  a) Data from Customer Vehicle Class—Annual Mileage

13. Depreciation %
  a) Data from Customer Vehicle Class—Depreciation %
    (1) This is the "As Quoted" Depreciation %

14. Total Gross per Unit Amount
  a) Calculations are described in the next section 15. Adjusted Minimum Standard Depreciation—For Wholesale Value
  a) See the Maintain Minimum Expected Depreciation use case for more information 16. Total Lease Payment
  a) See the Credit Review Risk Analysis Example for more details 17. Wholesale Value at 6 Months
  a) Calculate this value when
    (1) Every time the page is loaded or saved
  b) The Calculations:
    (1) See the Credit Review Risk Analysis Example for more details 18. Maximum Risk per Unit Amount
  a) Calculate this value when:
    (1) The page is loaded for the first time
    (2) The page is loaded AFTER the first time AND the value has not been edited
    (3) The Reset to Defaults function is performed.
  b) Amount may be positive for Equity or negative for Risk
  c) The Calculations:
    (1) Comes from the Credit Review Risk Analysis
    (2) From month 6 through month 12, this is the Amount of Maximum Risk
      (a) Risk is expressed as negative numbers (so Max Risk is the lowest number)

19. Maximum Risk per Unit—Month
  a) Calculate this value when:
    (1) The page is loaded for the first time
    (2) The page is loaded AFTER the first time AND the value has not been edited
    (3) The Reset to Defaults function is performed.
  b) Value will be equal to or greater than 6 AND less than or equal to 12
  c) The Calculations:
    (1) Comes from the Credit Review Risk Analysis
    (2) This is the month number that corresponds to the Maximum Risk Amount per Unit 20. Risk Break Even per Unit—Month
  a) Calculate this value when:
    (1) The page is loaded for the first time
    (2) The page is loaded AFTER the first time AND the value has not been edited
    (3) The Reset to Defaults function is performed.
  b) The Calculations:
    (1) Comes from the Credit Review Risk Analysis
    (2) This is the month number that corresponds to the first month where the Risk per Unit Amount becomes a positive value.
      (a) Value will be equal to or greater than 1 AND less than or equal to the last month of the Lease Term
        (As an example, for a 48 month lease . . . this is from 1 through 48)
        (i) It is possible that a Vehicle Type will not have a break even point (all values are Risk)
          In this case, display the Lease Term as the Break Even month number.

21. Vehicle Plan Notes
  a) See the Use Case—Maintain Credit Review Notes

22. Total Units to be Delivered (Vehicles Tab)
   a) Calculate this value when:
      (1) Every time the page is loaded
   b) The Calculations:
      (1) This is the sum of the Units to be Delivered for every Vehicle Class included for this Credit Review 23. Total Units to be Delivered (Risk Tab)
   a) Calculate this value when:
      (1) Every time the page is loaded
   b) The Calculations:
   c) This is the Total Units to be Delivered # of Units from the Risk page 24. Units to be Delivered—Mismatch Warning message.
   a) When the Total Units to be Delivered (Vehicles Tab) does not equal the Total Units to be Delivered (Risk) tab, display a warning message:
      (1) "The number of Units to be Delivered does not match the Total Units to be Delivered per Vehicle Class. Please correct the Units to be Delivered per Vehicle Class so that the Total Risk for Units to be Delivered can be properly calculated."
   B. Total Gross per Unit Calculation 1. Total Interest Profit+Total Management Fee Profit+Service Charge+Front-End Mark-up
   a) Total Interest Profit
      (1) (Average Equity Balance plus Service Charge)*Interest Variance %*# of Years
         (a) Average Equity Balance Calculation
            (i) Lease Capitalized Price−[((Lease Term−1)/2)*(As Quoted Depreciation %*Lease Capitalized Price)]
            (a) Lease Capitalized Price=Delivered Price from Customer Vehicle Class
            (b) As Quoted Depreciation %=Depreciation % from Customer Vehicle Class
         (b) Service Charge
            (i) Use the Product (Lease Type)="Equity-Fixed"
            (ii) Use the Purchase Method="Ordered" to find the appropriate Customer Pricing Plan
            (iii) Use the Service Charge/Disposal Fee Amount
         (c) Interest Variance %
            (i) Use the Product (Lease Type)="Equity-Fixed"
            (ii) Use the Purchase Method="Ordered" to find the appropriate Customer Pricing Plan
            (iii) Get Interest Rate Variance
         (d) # of Years
            (i) Lease term/12
            (ii) For odd term leases, use fractional values (20 months=1.667)
   -PLUS-
   b) Total Management Fee Profit
      (1) Use the Product (Lease Type)="Equity-Fixed"
      (2) Use the Purchased Method="Ordered" to find the appropriate Customer Pricing Plan
      (3) If Monthly Management Fee Percentage is used
         (a) (Lease Capitalized Price+Required Cap Price Reduction Amount)*Monthly Management Fee Percentage*Lease Term
         (b) Lease Capitalized Price=Delivered Price from the Customer Vehicle Class
      (4) If Monthly Management Fee Amount is used
         (a) Use the Monthly Management Fee Amount*Lease Term
   -PLUS-
   c) Service Charge
      (1) Use the Product (Lease Type)="Equity-Fixed"
      (2) Use the Purchase Method="Ordered") to find the appropriate Customer Pricing Plan
         (a) Use the Service Charge/Disposal Fee Amount
   -PLUS-
   d) Front-End Mark-up
      (1) See the previously described calculations for Front-End Mark-up 2. Total Lease Profit Calculation for Net Lease Types
   a) Monthly Profit
      (1) Use the Product (Lease Type)="Net Lease"
      (2) Use the Purchase Method="Ordered" to find the appropriate Customer Pricing Plan
         (a) Use the Net Lease Monthly Profit that matches the Lease Term for this Vehicle Class -MULTIPLY-
   b) Lease Term
      (1) Lease Term for this Vehicle Class -PLUS-
   c) Service Charge
      (1) Use the Product (Lease Type)="Net Lease"
      (2) Use the Purchase Method="Ordered" to find the appropriate Customer Pricing Plan
         (a) Use the Service Charge/Disposal Fee Amount Exhibit F Lease Management Functional Requirements Specification Credit Review Risk Analysis Table of Contents I. Functional Requirements Specification Introduction II. Screen Print(s)
   A. Risk Analysis III. Detail Tables
   A. Field Mapping Tables
   1. Risk Analysis
   B. Page Actions
   1. Risk Analysis Screen Action Specification I. Functional Requirements Specification Introduction Analysis of Fleet Risk is included in the Credit Review process. Some values are calculated from existing EDGE data and others are added by users.

II. Screen Print(s)

Figure 47:
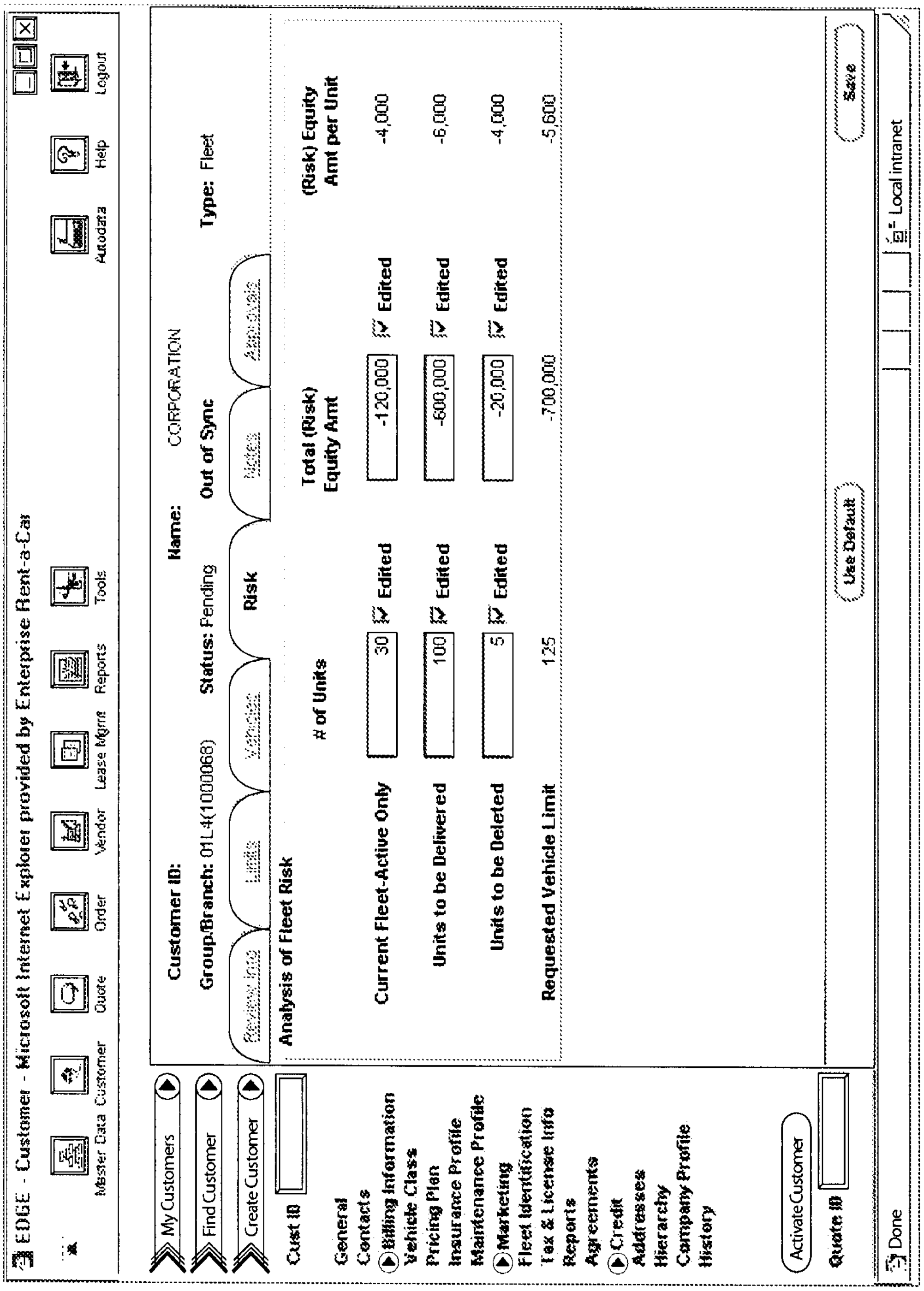
FIG. 47 depicts a screenshot described in Exhibit F below.

A. Risk Analysis—see FIG. 47

III. Detail Tables

A. Field Mapping Tables

1. Risk Analysis

| | Field Name | Required | Control Type | Format | Specific Rules | Data Source Details |
|---|---|---|---|---|---|---|
| 1 | Current Fleet-Active Only Units | Conditionally Required | Text Entry | Numeric (11,0) | If the status is approved or rejected, this value cannot be updated. Otherwise, the value is only required when the corresponding edit indicator is checked. When the edit indicator is checked, a numeric value greater than or equal to zero must be entered by the user. If the edit indicator is not checked, the system will refresh the value when either the calculate button, the save button, or the use defaults button is selected. | If CreditReviewEntity. CreditReviewStatusEntity = Approved or Rejected, set to CreditReviewEntity. FleetRiskLimits.unitsActive FleetCount. The value is now read only. If CreditReviewEntity.CreditReviewStatus Entity is not equal to Approved or Rejected, then: If unitsActiveFleetEdited = true, set CreditReviewEntity.Credit ReviewEntity.FleetRiskLimits.units ActiveFleetCount. If unitsActiveFleetEdited = false but reloading for the first time, set to CreditReviewEntity.CreditReview Entity.FleetRiskLimits.unitsActive FleetCount If unitsActiveFleetEdited = false and loading for the first time, then load from CompanyCustomerEntity.currentFleet Count |
| 2 | Current Fleet-Active Only Units | | Checkbox | | If the status is approved or rejected, this value cannot be updated | CreditReviewEntity.CreditReview Entity.FleetRiskLimits.units Active FleetEdited |
| 3 | Delivered Units | Conditionally Required | Text Entry | Numeric (11,0) | If the status is approved or rejected, this value cannot be updated. Otherwise, the value is only required when the corresponding edit indicator is checked. When the edit indicator is checked, a numeric value greater than or equal to zero must be entered by the user. If the edit indicator is not checked, the system will refresh the value when either the calculate button, the save button, or the use defaults button is selected. | If CreditReviewEntity.CreditReview StatusEntity = Approved or Rejected, set to CreditReviewEntity.Credit ReviewEntity.FleetRiskLimits.unitsTo DeliverCount. The value is now read only. If CreditReviewEntity.CreditReviewStatus Entity is not equal to Approved or Rejected, then: If CreditReviewEntity.FleetRiskLimitsunits ToDeliverEdited = true, set to Credit ReviewEntity.CreditReviewEntity. FleetRisk Limits.unitsToDeliver Count. If CreditReviewEntity.FleetRisk Limit.units ToDeliverEdited is false or use defaults is pressed, then beginning with the month and year following the credit review date for the next twelve months, sum the following value: CustomerMonthlyMarketingForecast Entity.vehicleForecastDelivery |
| 4 | Delivered Units Edited | | Checkbox | | If the status is approved or rejected, this value cannot be updated | CreditReviewEntity.CreditReview Entity.FleetRiskLimits. unitsToDeliverEdited |
| 5 | Deleted Units | Conditionally Required | Text Entry | Numeric (11,0) | If the status is approved or rejected, this value cannot be updated. Otherwise, the value is only required when the corresponding edit indicator is checked. When the edit indicator is checked, a numeric value greater than or equal to zero must be entered by the user. If the edit indicator is not checked, the system will refresh the value when either the calculate button, the save button, or the use defaults button is selected. | If CreditReviewEntity.Credit ReviewStatusEntity = Approved or Rejected, set to CreditReviewEntity. CreditReview Entity.FleetRiskLimits. unitsToDeleteCount. The value is now read only. If CreditReviewEntity.CreditReviewStatus Entity is not equal to Approved or Rejected, then: If unitsToDeleteEdited = true, set to CreditReviewEntity.CreditReview Entity.FleetRiskLimits.unitsTo DeleteCount If unitsToDeleteEdited = false or use defaults is pressed, then beginning with the month and year |

-continued

| | Field Name | Required | Control Type | Format | Specific Rules | Data Source Details |
|---|---|---|---|---|---|---|
| | | | | | | following the credit review date for the next twelve months, sum the following value: CustomerMonthlyMarketingForecast Entity.vehicleForecastDeleted |
| 6 | Deleted Units Edited | | Checkbox | | If the status is approved or rejected, this value cannot be updated | CreditReviewEntity.CreditReview Entity.FleetRiskLimits.units ToDeleteEdited |
| 7 | Requested Vehicle Limit Total Units | | Read Only | Numeric (11.0) | (1) currentFleet (3) deliveredUnits (5) deleted Units If the status is approved or rejected, this value will not be recalculated | If CreditReviewEntity.CreditReview StatusEntity = Approved or Rejected, set to CreditReviewEntity. CreditReviewEntityFleetRiskLimits. requestedVehicleLimitUnitCount. The value is now read only. If CreditReviewEntityCreditReview StatusEntity is not equal to Approved or Rejected, then calculate: currentFleet + deliveredUnits − deletedUnits |
| 8 | Current Fleet-Active Only Total Equity Amt | Conditionally Required | Text Entry | Numeric (11,2) | If the status is approved or rejected, this value cannot be updated. Otherwise, this value is only required when the corresponding edit indicator is checked. When the edit indicator is checked, a whole number money value (positive, negative, or zero) must be entered by the user. If the edit indicator is not checked, the system will refresh the value when either the calculate button, the save button, or the use defaults button is selected. | If CreditReviewEntity.CreditReview StatusEntity = Approved or Rejected, set to CreditReviewEntity.CreditReviewEntity. FleetRiskLimits.riskActive FleetAmount The value is now read only. If CreditReviewEntity.CreditReview StatusEntity is not equal to Approved or Rejected, then: If CreditReviewEntity.FleetRiskLimits riskActiveFleetEdited = true, set to CreditReview Entity.CreditReview Entity.FleetRiskLimits.riskActive FleetAmount If CreditReviewEntity.FleetRiskLimit editedUnits is false, set to Customer.CreditProfile.FleetRiskAmount |
| 9 | Current Fleet-Active Only Units Total Equity Amt Edited | | Checkbox | | If the status is approved or rejected, this value cannot be updated | CreditReviewEntity. CreditReviewEntity. FleetRisklimits.riskActive FleetEdited |
| 10 | Delivered Units Total Equity Amt | Conditionally Required | Text Entry | Numeric (11,2) | If the status approved or rejected, this value cannot be updated. Otherwise, this value is only required when the corresponding edit indicator is checked. When the edit indicator is check, a whole number money value (positive, negative, or zero) must be entered by the user. If the edit indicator is not checked, the system will refresh the value when either the calculate button, the save button, or the use defaults button is selected. | If CreditReviewEntity.CreditReview Status Entity = Approved or Rejected, set to CreditReviewEntity.Credit ReviewEntity.FleetRiskLimits. riskToDeliverAmount This is now read only. If CreditReviewEntity.CreditReview StatusEntity is not equal to Approved or Rejected, then: If riskToDeliverEdited = true, set to CreditReview Entity.Credit Review Entity.FleetRiskLimits.riskTo DeliverAmount If riskToDeliverEdited = false, set to Sum of (Risk per VehicleClass) RiskPer VehicleClass = VehicleClassRiskPer UnitAtTwelveMonths* PotentialUnits ForTheVehicleClass |
| 11 | Delivered Units Total Equity Edited | | Checkbox | | If the status is approved or rejected, this value cannot be updated. | CreditReviewEntity.Credit ReviewEntity.FleetRisk Limits.riskToDeliverEdited |
| 12 | Deleted Units Total Equity Amt | Conditionally Required | Text Entry | Numeric (11,2) | If the status is approved or rejected, this value cannot be updated. Otherwise, this value is only required when the corresponding edit indicator is checked. When the edit indicator is check, a whole number money value (positive, | If CreditReviewEntity.Credit ReviewStatusEntity = Approved or Rejected, set to CreditReviewEntity. CreditReviewEntity.Fleet RiskLimits.riskToDeleteAmount The value is now read only. |

-continued

| | Field Name | Required | Control Type | Format | Specific Rules | Data Source Details |
|---|---|---|---|---|---|---|
| | | | | | negative, or zero) must be entered by the user. If the edit indicator is not checked, the system will refresh the value when either the calculate button, the save button, or the use defaults button is selected. | If CreditReviewEntity.Credit ReviewStatus is not equal to Approved or Rejected, then: If riskToDeleteEdited = true, set to CreditReviewEntity. CreditReviewEntity.Fleet RiskLimits.riskToDeleteAmount If riskToDeleteEdited = false, set to TotalRiskPerVehicle Class = NumberUnitsToBe Deleted* RiskAmountPerUnit ForCurrentFleetActiveOnly |
| 13 | Deleted Units Total Equity Amt Edited | | Checkbox | | If the status is approved or rejected, this value cannot be updated. | CreditReviewEntity. CreditReviewEntity. FleetRiskLimits.riskTo DeleteEdited |
| 14 | Requested Vehicle Limit Total Equity Amt | | Read Only | Numeric (11,2) | (8) currentFleetRiskAmount (10) deliveredRiskAmount (12) deletedRiskAmount If the status is approved or rejected, this value will not be recalculated. | If CreditReviewEntityCredit ReviewStatusEntity = Approved or Rejected, set to CreditReviewEntity. CreditReviewEntity. FleetRiskLimits. requestedVehicleLimit RiskAmount If CreditReviewEntity.Credit ReviewStatusEntity is not equal to Approved or Rejected, then calculate: currentFleet.riskAmount + delivered.riskAmount − deleted.riskAmount |
| 15 | Current Fleet-Active Only Equity Amt per Unit | | Read Only | Standard Amount Format (11,2) | (8) CurrentFleetRiskAmount (1) CurrentFleetUnit Count If the status is approved or rejected, this value will not be recalculated | If CreditReviewEntity.Credit ReviewStatusEntity = Approved or Rejected, set to CreditReviewEntity. CreditReviewEntity. FleetRiskLimits. riskPerUnitActiveFleetAmount If CreditReviewEntity.CreditReview StatusEntity is not equal to Approved or Rejected, then calculate: CurrentFleetRiskAmount/ CurrentFleetUnitCount |
| 16 | Delivered Equity Amt per Unit | | Read Only | Standard Amount format (11,2) | (10) DeliveredRiskAmount (3) DeliveredUnitsCount If the status is approved or rejected, this value will not be recalculated | If CreditReviewEntityCredit ReviewStatusEntity = Approved or Rejected, set to CreditReviewEntity. CreditReviewEntity. FleetRiskLimits.riskPerUnitToDeliver Amount If CreditReviewEntityCreditReview StatusEntity is not equal to Approved or Rejected, then calculate: DeliveredRiskAmount/ DeliveredUnitCount |
| 17 | Deleted Units Equity Amt per Unit | | Read Only | Standard Amount format (11,2) | (12) Deleted RiskAmount (5) DeletedUnits Count If the status is approved or rejected, this value will not be recalculated | If CreditReviewEntity. CreditReviewStatus Entity = Approved or Rejected, set to CreditReview Entity.CreditReviewEntity. FleetRiskLimits.riskPerUnit ToDeleteAmount If Credit ReviewEntity. CreditRevieweStatusEntity |

-continued

| | Field Name | Required | Control Type | Format | Specific Rules | Data Source Details |
|---|---|---|---|---|---|---|
| | | | | | | is not equal to Approved or Rejected, then calculate: DeletedRiskAmount/DeletedUnitsCount |
| 18 | Requested Vehicle Limit Total Equity Amt per Unit | | Read Only | Standard Amount format (11,2) | (14) RequestedVehicle LimitTotal EquityAmount (7) RequestedVehicle LimitTotalUnits If the status is approved or rejected, this value will not be recalculated | If CreditReview Entity.CreditReviewSatus Entity = Approved or Rejected, set to CreditReviewEntity.CreditReview Entity.FleetRiskLimits. requested VehicleLimitRiskAmount PerUnit If CreditReviewEntity.CreditReview StatusEntity is not equal to Approved or Rejected, then calculate: RequestedVehicleLimitTotal EquityAmount/RequestedVehicleLimit TotalUnits |

B. Business Validation/System Generated Notes

1. Risk

Credit Limits Save

| Validation | Msg Type | Property Key |
|---|---|---|
| Unit count cannot be negative | Error | |
| Required value is missing. | Error | |
| Invalid value entered | Error | |
| Max Maintenance Mgmt is required. | Error | |

C. Page Actions

1. Risk Analysis

| Description | Action Type | Action-Specific Rules | Actions/Data Source |
|---|---|---|---|
| Use Default | Button | | The system recalculates all values based on initial defaults for each field and displays the information, keeping the user on the same screen. |
| Calculate | Button | | The system recalculates all values based on values displayed on the screen and displays the information, keeping the user on the same screen. |
| Save | Button | | Recalculates and saves the information entered by the user keeping the user on the same screen. |

Customer Module
Use Case Specification
Credit Review Risk Analysis

Table of Contents

I. View/Update the Credit Review Risk Factors
A. Brief Description
II. Flow of Events
A. Basic Flow—Update the Customer's Analysis of Fleet Risk
III. Special Requirements
IV. Pre-Conditions
V. Post-Conditions
VI. Business Rules—Fleet Risk Analysis
A. General Rules
B. Number of Units
C. Total Risk or Equity Amount
D. Risk or Equity Amount per Unit Software Requirements Definition Section 1

Use Case

I. View/Update the Credit Review Risk Factors

A. Brief Description

The Credit Review process includes an Analysis of Fleet Risk. Values are calculated from existing EDGE data and some can be modified by user.

II. Flow of Events

A. Basic Flow Update the Customer's Analysis of Fleet Risk

1. The use case begins when the user selects to update the Analysis of Fleet Risk 2. The system finds and displays the Analysis of Fleet Risk information a) The user may view the information on this page b) The user may modify some of the values on this page c) See the Business Rules (1) For information about loading data into the Fleet Risk Analysis fields (2) For information about entering data into Fleet Risk Analysis fields (3) For information about field calculations 3. The user can modify Analysis of Fleet Risk Notes on another page a) See the Use Case—Maintain Credit Review Notes 4. The user saves the data.

a) See the Business Rules (1) For information about updating Fleet Risk Analysis fields after a Save operation 5. If the user removes the "Edited" indicator from a user edited value, a) When the page is saved, the value gets replaced with the default calculation (1) See the Business Rules for the default calculations for these fields 6. If the user chooses the Reset to Defaults function a) The system verifies that the user wants to Reset to Defaults for the Analysis of Fleet Risk page b) The system recalculates ALL values based on the initial defaults for each field c) See the Business Rules (1) For information about re-loading data into the Fleet Risk Analysis fields after a Reset to Defaults operation d) The system saves the data 7. The use case ends.

III. Special Requirements

1. None

IV. Pre-Conditions

1. The user must be logged on to EDGE and have appropriate security access to create and update a Credit Review V. Post-Conditions 1. The customer Credit Review is established/updated with the appropriate information

Section 2

Business Rules

VI. Business Rules—Fleet Risk Analysis

A. General Rules

1. During the initiation of a new Credit Review, the system gathers information to fill the fields for the Analysis of Fleet Risk. When the fields are filled, all calculations can be performed.

2. Users may update certain fields, and calculations will be performed when the page is saved.

3. The system provides an option Reset to Defaults for the Analysis of Fleet Risk data.

a) The Reset to Defaults process will gather data as if it were initiating a new Credit Review.

4. Specific Rules regarding whether or not to perform the calculations are listed below.

5. The save operation only captures the user modified information.

a) The data saved after the Final Approval (or Rejection) of a Credit Review will be detailed in the Use Case—Credit Review Approval.

6. For all fields that are designated as Equity/(Risk)

Equity is expressed as a positive number. Risk is expressed as a negative number 7. An example of the supporting calculations for the Analysis of Fleet Risk are found in the following spreadsheet: Credit Review—Risk Analysis Example Calculation changes in the Example spreadsheet Use 65% instead of 70% for the 6-month estimated wholesale value.

This percentage will be a global rate, controlled by Corporate.

Adjust Delivered Price (subtract Mark-up amount and add Capitalized Price Reduction Amount)

See the Credit Review—Risk Analysis Example (link above) for more information

Important information within this spreadsheet includes a monthly schedule for:

a) RBV b) Termination Value c) Estimated Wholesale Value d) Estimated Equity/(Risk) Adjusted for Service Charge B. Number of Units 1. Current Fleet—Active Only a) Calculate this value when:

(1) During the Credit Review Create process (2) When the Reset to Defaults operation is performed b) The Calculation:

(1) The system determines the Number of Units in the Customer's Current Fleet (a) This includes ONLY Active Units (b) This includes Units for the Master and ALL of its subs c) The user may change the value in this field (1) The system indicates when the value has been edited and saved.

2. Units to be Delivered a) Calculate this value when:

(1) The page is loaded for the first time (2) The page is loaded AFTER the first time AND the value has not been edited (3) The Reset to Defaults function is performed.

b) Calculation:

(1) Forecasted Vehicles to be Delivered (From the Master Customer's Marketing Page)

(a) Calculate the sum of the Forecasted Vehicles to be Delivered for the months beginning with the month and year following the Credit Review Date through next 12 months.

c) The user may change the value in this field (1) The system indicates when the value has been edited and saved.

3. Units to be Deleted a) Calculate this value when:

(1) The page is loaded for the first time (2) The page is loaded AFTER the first time AND the value has not been edited (3) The Reset to Defaults function is performed.

b) The Calculation:

(1) From the Master Customer's Marketing Page (a) Calculate as the sum of the Forecasted Vehicles to be Deleted for the months beginning with the month and year following the Credit Review Date through the next 12 months.

c) The user may change the value in this field (1) The system indicates when the value has been edited and saved.

4. Requested Vehicle Limit a) Calculate this value when:

(1) The page is loaded (every time)

(2) The Save function is performed (3) The Reset to Defaults function is performed b) The Calculation:
(1) Number of Units in the Current Fleet (Active Only) plus
(2) Number of Units to be Delivered
minus
(3) Number of Units to be Deleted
c) If the results of this calculation returns a negative number
(1) Display a message to the user
(a) "The requested vehicle limit is negative. You must either change the forecasted unit activity in the Marketing screen or the number of units in the Risk tab to approve this credit review."
(2) This message is displayed on other pages within the system
(a) During Credit Review Create
(b) During EVERY Approval Action (upon Save)
(3) The system is allowed to save the data even if this calculation returns a negative number
C. Total Risk or Equity Amount 1. Current Fleet-Active Only (Risk/Equity Amount)
a) Calculate this value when:
(1) The page is loaded for the first time
(2) The page is loaded AFTER the first time AND the value has not been edited
(3) The Reset to Defaults function is performed.
b) Amount may be positive for Equity or negative for Risk
(1) Zero is an acceptable value
c) The Calculations:
(1) The business currently uses the Customer Fleet Profile Report (non-EDGE)
(a) The Current Fleet Risk amount will be loaded into EDGE
(i) Stored in the Company Profile, Financial Info Tab, Credit Info section.
d) This amount is required before a Credit Review can be approved at any level.
e) The user may change this number
(1) If the calculated number is changed, the system indicates that the field has been edited.

2. Additional Units to be Delivered (Risk/Equity Amount)
a) Calculate this value when:
(1) The page is loaded for the first time
(2) The page is loaded AFTER the first time AND the value has not been edited
(3) The Reset to Defaults function is performed.
b) The Calculations:
(1) The calculations are performed for each Vehicle Class Entry on the Vehicle Plan.
(a) Total Risk per Vehicle Class
(i) Vehicle Class Risk per Unit at Month 12
-MULTIPLY-
(ii) Potential Units for the Vehicle Class
(2) Total all of the "Total Risk per Vehicle Class" results
(a) Zero is an acceptable value
c) This amount is required before a Credit Review can be approved at any level.
d) The user may change this number
(1) If the calculated number is changed, the system indicates that the field has been edited.

3. Units to be Deleted (Risk/Equity Amount)
a) Calculate this value when:
(1) The page is loaded for the first time
(2) The page is loaded AFTER the first time AND the value has not been edited
(3) The Reset to Defaults function is performed.
b) The Calculations:
(1) The default amount is Zero
(2) This amount is required before a Credit Review can be approved at any level.
(3) The user may change this number
(4) If the calculated number is changed, the system indicates that the field has been edited.
(5) Amount may be positive for Equity or negative for Risk
(6) Zero is an acceptable value 4. Requested Vehicle Limit (Risk/Equity Amount)
a) Calculate this value when:
(1) The page is loaded (every time)
(2) The Save function is performed
(3) The Reset to Defaults function is performed
(b) The Calculations:
(1) Current Fleet Total Risk or Equity
plus
(2) Units to be Delivered Total Risk or Equity
minus
(3) Units to be Deleted Total Risk or Equity
D. Risk or Equity Amount per Unit 1. Current Fleet
a) Calculate this value when:
(1) The page is loaded (every time)
(2) The Save function is performed
(3) The Reset to Defaults function is performed
b) The Calculations:
(1) Current Fleet Total Risk or Equity Amount
divided by
(2) Current Fleet Number of Units
(3) If the Current Fleet Number of Units is zero,
(a) Force the Current Fleet Risk or Equity Amount per Unit to be zero.

2. Units to be Delivered
a) Calculate this value when:
(1) The page is loaded (every time)
(2) The Save function is performed
(3) The Reset to Defaults function is performed
b) The Calculations:
(1) Units to be Delivered Total Risk or Equity Amount
divided by
(2) Units to be Delivered Number of Units
(3) If the Units to be Delivered Number of Units is zero,
(a) Force the Units to be Delivered Risk or Equity Amount per Unit to be zero.

3. Units to be Deleted
a) Calculate this value when:
(1) The page is loaded (every time)
(2) The Save function is performed
(3) The Reset to Defaults function is performed
b) The Calculations
(1) Units to be Deleted Total Risk or Equity Amount
divided by
(2) Units to be Deleted Number of Units
(3) If the Units to be Deleted Number of Units is zero,
(a) Force the Units to be Delivered Risk or Equity Amount per Unit to be zero.

4. Requested Vehicle Limit
   a) Calculate this value when:
      (1) The page is loaded (every time)
      (2) The Save function is performed
      (3) The Reset to Defaults function is performed
   b) The Calculations
      (1) Requested Vehicle Limit Total Risk or Equity Amount
      divided by
      (2) Requested Vehicle Limit Number of Units
      (3) If the Requested Vehicle Limit Number of Units is zero,
         (a) Force the Requested Vehicle Limit Risk or Equity Amount per Unit to be zero.
E. Comparison of Units to be Delivered 1. Display the count for Units to be Delivered from the Vehicles page
   a) Calculate this value when:
      (1) The page is loaded (every time)
      (2) The Save function is performed
      (3) The Reset to Defaults function is performed
   b) The Calculations:
      (1) Add the Units to be Delivered for ALL Vehicle Classes from the Vehicles page 2. Display the count for Units to be Delivered from the Risk page
   a) This is that same value that is displayed in the Number of Units section, Units to be Delivered 3. When the Units to be Delivered from the Vehicles page is NOT EQUAL TO the Units to be Delivered from the Risk page, display a warning message
   (1) "The number of Units to be Delivered does not match the Total Units to be Delivered per Vehicle Class. Please correct the Units to be Delivered per Vehicle Class so that the Total Risk for Units to be Delivered can be properly calculated."

Exhibit G
Lease Management
Functional Requirements Specification
Credit Review Notes Table of Contents I. Functional Requirements Specification Introduction II. Screen Print(s)
   A. Credit Review Notes List
   B. Description Of Company & Business Notes
   C. Description Of Enterprise Relationship Notes
   D. Financial Condition Notes
   E. Fleet Profile Notes III. Detail Tables
   A. Field Mapping Tables 1. Credit Review Notes List 2. Description of Company & Business 3. Description of Enterprise Relationship 4. Financial Condition Notes 5. Fleet Profile Notes
   B. Page Actions 1. Description of Business & Company/Description of Enterprise Relationship/Fleet Profile Notes 2. Financial Condition Notes Screen Action Specification I. Functional Requirements Specification Introduction
   The Credit Review process includes Notes that are used to summarize and describe various parts of the Credit Review. The Notes are used as backup to the Credit Review.

Figure 48:
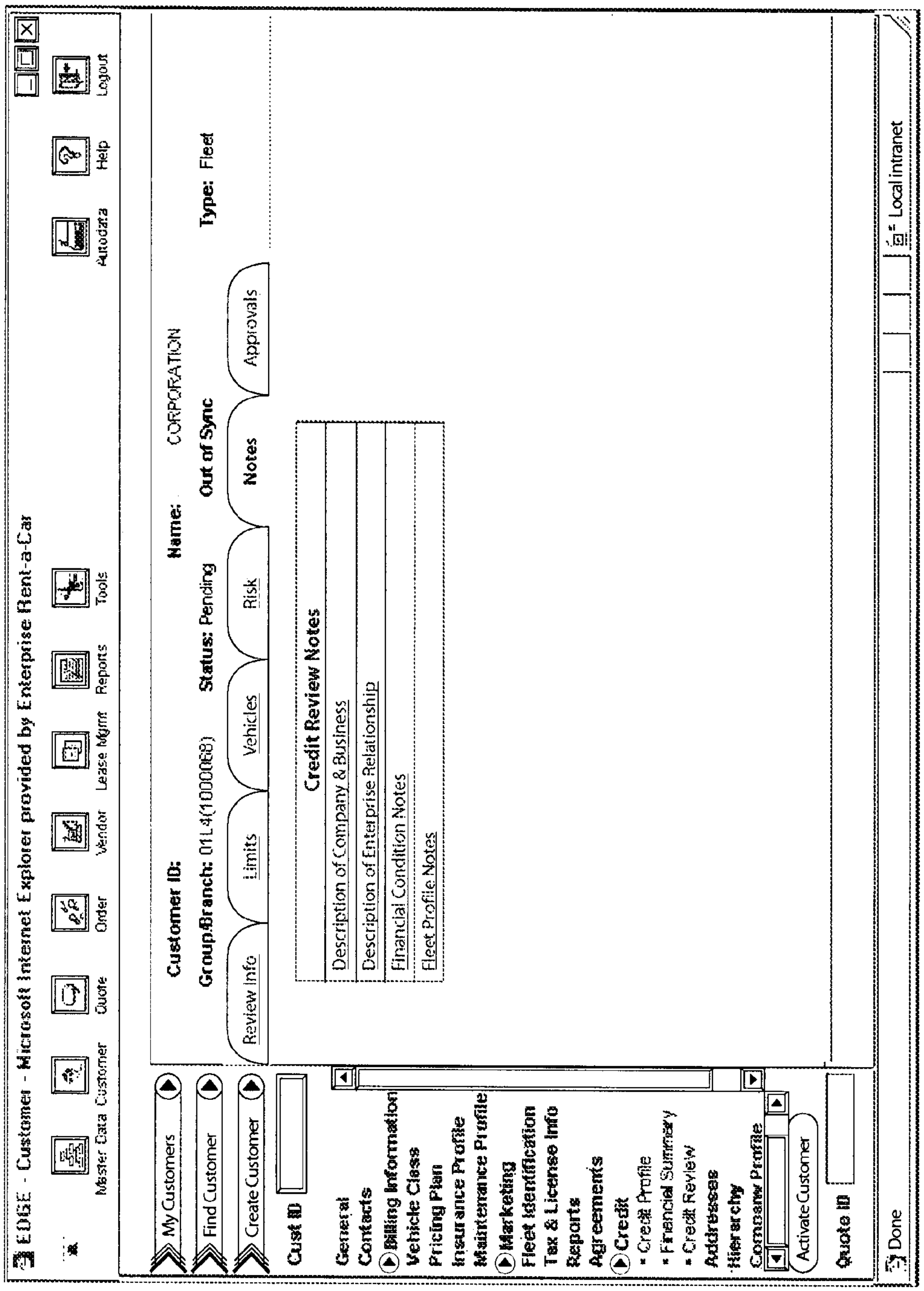
FIGS. 48-52 depict screenshots described in Exhibit G below.
Figure 49:
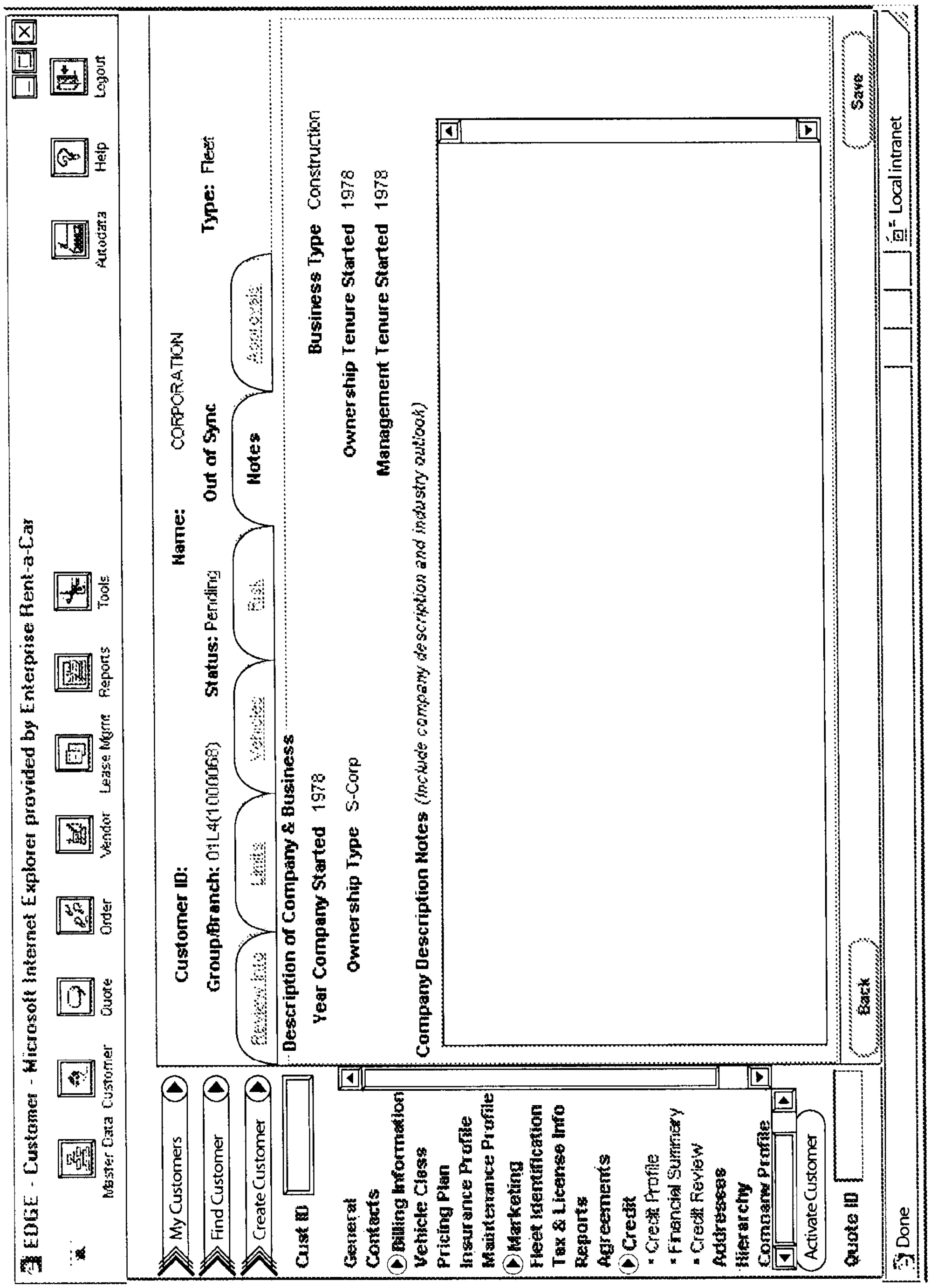
Figure 50:
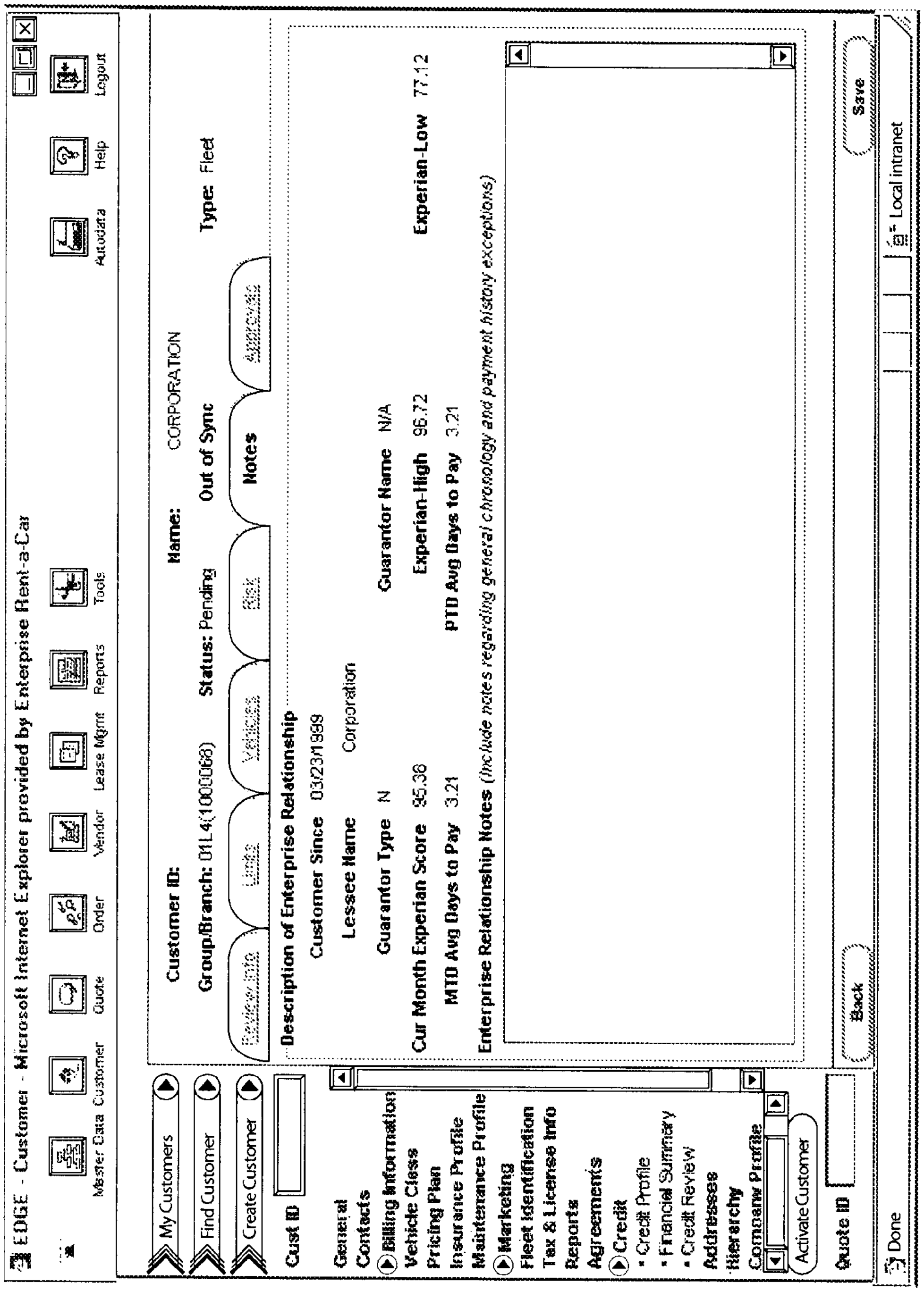
Figure 51:
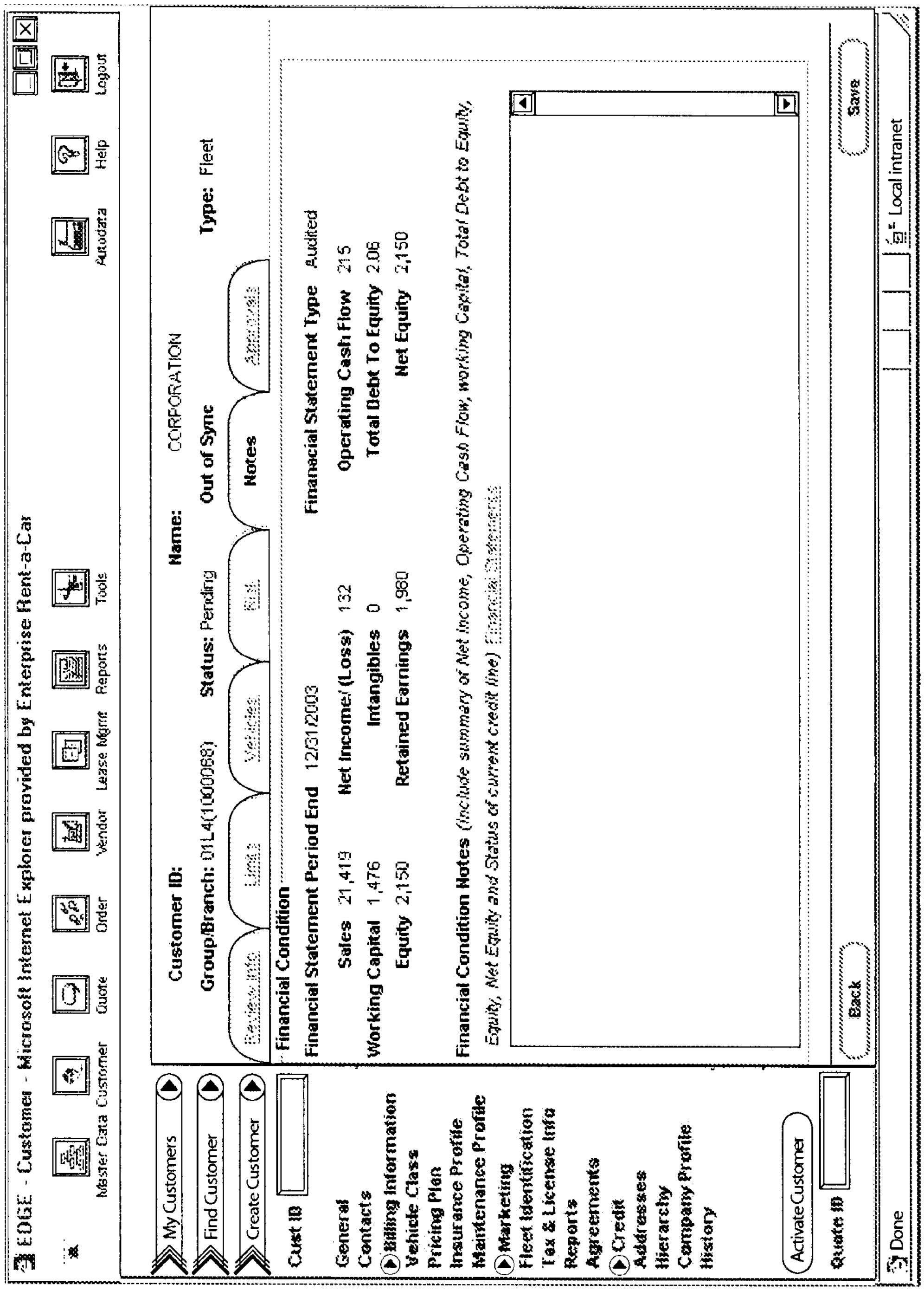
Figure 52:
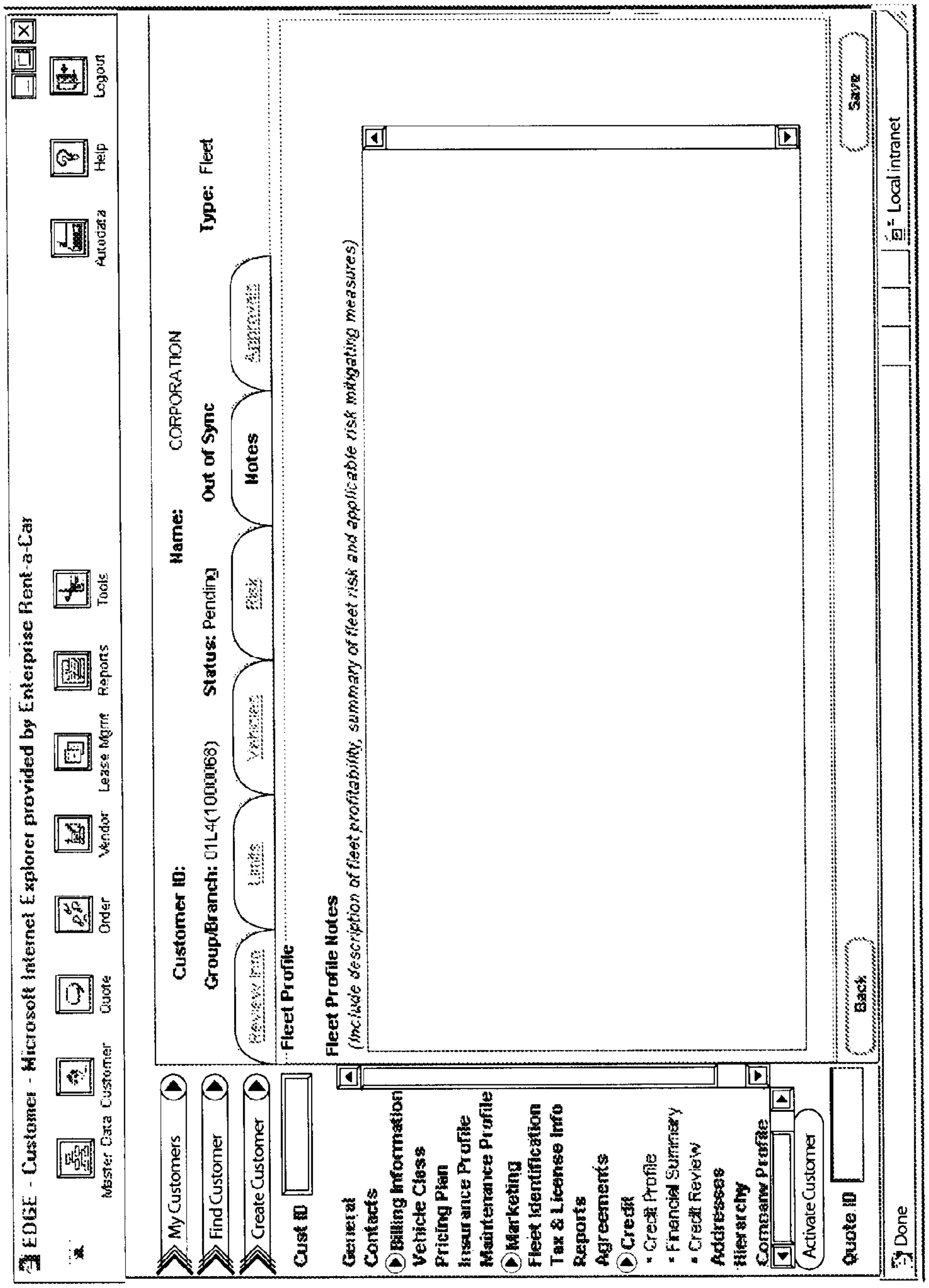

II. Screen Print(s)
   A. Credit Review Notes List—see FIG. 48
   B. Description Of Company & Business Notes—see FIG. 49
   C. Description Of Enterprise Relationship Notes—see FIG. 50
   D. Financial Condition Notes—see FIG. 51
   E. Fleet Profile Notes—see FIG. 52

III. Detail Tables
   A. Field Mapping Tables
   1. Credit Review Notes List

| Field Name | Required | Control Type | Format | Specific Rules | Data Source Details |
|---|---|---|---|---|---|
| Credit Review Notes | | Link | Hyperlink | | creditReview-Note.noteType |

2. Description of Company & Business

| Field Name | Re-quired | Control Type | Format | Specific Rules | Data Source Details |
|---|---|---|---|---|---|
| Year Company Started | | Read Only | Standard Year | | credit-Review.year-Company-Started |
| Business Type | | Read Only | Alpha-numeric | | creditRe-view.business-Type |
| Ownership Type | | Read Only | Alpha-numeric | | creditReview.-ownership-Type |
| Ownership Tenure Started | | Read Only | numeric | | creditReview.-ownership-TenureStarted |
| Management Tenure Started | | Read Only | numeric | | creditReview.-management-TenureStarted |
| Company Description Notes | | Text Area | Alpha-numeric | | credit-Review.note-Description |

3. Description of Enterprise Relationship

| Field Name | Required | Control Type | Format | Specific Rules | Data Source Details |
|---|---|---|---|---|---|
| Customer Since | | Read Only | Standard Date | | creditReview.-customerSince |
| Lessee Name | | Read Only | Alpha-numeric | | creditReview.-lesseeName |
| Guarantor Type | | Read Only | Alpha | | creditReview.-guarantorType |
| Guarantor Name | | Read Only | Alpha-numeric | | creditReview.-guarantorName |

-continued

| Field Name | Required | Control Type | Format | Specific Rules | Data Source Details |
|---|---|---|---|---|---|
| Cur Month Experian Score | | Read Only | Numeric | | creditReview.-curExperian-Score |
| Experian-High | | Read Only | Numeric | | creditReview.-highExperian |
| Experian-Low | | Read Only | Numeric | | creditReview.-lowExperian |
| MTD Avg Days to pay | | Read Only | Numeric | | creditReview.-MTDAvgDays-ToPay |
| PTD Avg Days to Pay | | Read Only | Numeric | | creditReview.-PTDAvgDays-ToPay |
| Enterprise Relationship Notes | | Text Area | Alpha-numeric | | creditReview.-note-Description |

4. Financial Condition Notes

| Field Name | Required | Control Type | Format | Specific Rules | Data Source Details |
|---|---|---|---|---|---|
| Financial Statement Period End | | Read Only | Standard Date | | creditReview.-financialStmt-PeriodEnd |
| Financial Statement Type | | Read Only | Alpha | | creditReview.-financialStmt-Type |
| Sales | | Read Only | Numeric (11,0) | | creditReview.-sales |
| Net Income/ (Loss) | | Read Only | Numeric (11,0) | | creditReview.-netIncome |
| Operating Cash Flow | | Read Only | Numeric (11,0) | | creditReview.-operating-CashFlow |
| Working Capital | | Read Only | Numeric (11,0) | | creditReview.-workingCapital |
| In-tangibles | | Read Only | Numeric | | creditReview.-intangibles |
| Total Debt to Equity | | Read Only | Numeric | | creditReview.-totalDebt-ToEquity |
| Equity | | Read Only | Numeric (11,0) | | creditReview.-equity |
| Retained Earnings | | Read Only | Numeric (11,0) | | creditReview.-retained-Earnings |
| Net Equity | | Read Only | Numeric (11,0) | | creditReview.-netEquity |
| Financial Condition Notes | | Text Area | Alpha-numeric | | creditReview.-note-Description |

5. Fleet Profile Notes

| Field Name | Required | Control Type | Format | Specific Rules | Data Source Details |
|---|---|---|---|---|---|
| Fleet Profile Notes | | Text Area | Alphanumeric | | creditReview.-noteDescription |

B. Page Actions

1. Description of Business & Company/Description of Enterprise Relationship/Fleet Profile Notes

| Description | Action Type | Action-Specific Rules | Format Specific Rules Data Source Details |
|---|---|---|---|
| Back | Button | | Goes back to the Credit Review Notes List. |
| Save | Button | | Saves the data & keeps the user on the same screen. |

2. Financial Condition Notes

| Description | Action Type | Action-Specific Rules | Format Specific Rules Data Source Details |
|---|---|---|---|
| Back | Button | | Goes back to the Credit Review Notes List. |
| Save | Button | | Saves the data & keeps the user on the same screen. |
| Financial Statements | Link | | Pulls the Financial Statements in Adobe Acrobat. |

Customer Module
Use Case Specification
Credit Review Notes

Table of Contents

I. View/Update the Credit Review Notes
A. Brief Description
II. Flow of Events
A. Basic Flow—List the Available Credit Review Notes
B. Alternate Flow—Description of Company & Business
C. Alternate Flow—Description of Enterprise Relationship Notes
D. Alternate Flow—Financial Conditions Notes
E. Alternate Flow—Fleet Profile Notes
III. Special Requirements
IV. Pre-Conditions
V. Post-Conditions
VI. Business Rules—Fleet Risk Analysis
A. Field Rules—Description of Company & Business
B. Field Rules—Description of Enterprise Relationship
C. Financial Condition Software Requirements Definition Section 1

Use Case

I. View/Update the Credit Review Notes

A. Brief Description

The Credit Review process includes Notes that are used to summarize and describe various parts of the Credit Review. The Notes are used as backup to the Credit Review.

II. Flow of Events

A. Basic Flow—List the Available Credit Review Notes

1. The use case begins when the user selects to update the Notes

2. The system displays a list of Available Notes

3. The user selects one of the Available Notes to Review or Update
   a) Notes are always open for update until a Review is closed (Rejected or Final Approval)

4. The system displays selected Notes page:
   a) See Alternate Flow—Description of Company & Business
   b) See Alternate Flow—Description of Enterprise Relationship
   c) See Alternate Flow—Financial Conditions Notes
   d) See Alternate Flow—Fleet Profile Notes 5. After the user has updated and/or reviewed the necessary notes pages, they return to the list of Available Notes and they can go to other parts of the Credit Review 6. This flow ends B. Alternate Flow—Description of Company & Business 1. The system gathers and displays the following (see the Business Rules for more info):
   a) Year Company Started
   b) Ownership Type
   c) Business Type
   d) Ownership Tenure Started
   e) Management Tenure Started 2. The system provides a field for Company Description Notes
   (1) Unlimited, Freeform text, containing information like Company Description and Industry Outlook 3. The user adds or updates the Company Description Notes 4. The user chooses to save the data 5. The system saves the data and remains on the Description of Company & Business notes page 6. The user chooses to go Back to the list of available notes 7. This flow ends C. Alternate Flow—Description of Enterprise Relationship Notes 1. The system gathers and displays the following (see the Business Rules for more info):
   a) Customer Since Date
   b) Lessee Name
   c) Guarantor Required (indicator)
   d) Guarantor Name
   e) Experian Scores
      (1) Current Month Experian Score
      (2) Highest Experian Score
      (3) Lowest Experian Score
   f) Average Days to Pay
      (1) Month-to-Date Average Days to Pay
      (2) Period-to-Date Average Days to Pay
         (a) Currently, this is a rolling 12 month period 2. The system provides a field for Enterprise Relationship Notes
   (1) Unlimited, Freeform text, containing information like Chronology, Payment History exceptions 3. The user adds or updates the Enterprise Relationship Notes 4. The user chooses to save the data 5. The system saves the data and remains on the Enterprise Relationship Notes page 6. The user chooses to go Back to the list of available notes 7. This flow ends D. Alternate Flow—Financial Conditions Notes 1. The system provides a way for the user to review the Customer's Financial Statement page as defined in the Credit Review Report. See Customer Publish the Credit Review Report for details.

2. The system gathers and displays the following (see the Business Rules for more info):
   a) Financial Statement Period End
   b) Financial Statement Type
   c) Sales
   d) Net Income/(Loss)
   e) Operating Cash Flow
   f) Working Capital
   g) Intangibles
   h) Total Debt to Equity
   i) Equity
   j) Retained Earnings
   k) Net Equity 3. The system provides a field for Financial Condition Notes
   a) Unlimited, Freeform text, containing information like Summary of Net Income, Operating Cash Flow, Working Capital, Total Debt to Equity, Equity, Net Equity, and Status of current credit line 4. The user adds or updates the Financial Condition Notes 5. The user chooses to save the data 6. The system saves the data and remains on the Financial Condition Notes page 7. The user chooses to go Back to the list of available notes
   (1) This flow ends E. Alternate Flow—Fleet Profile Notes 1. The system provides a field for Fleet Profile Notes
   a) Unlimited, Freeform text, containing information like Description of Fleet Profitability, Summary of Fleet Risk, and Applicable Risk Mitigating Measures 2. The user adds or updates the Fleet Profile Notes 3. The user chooses to save the data 4. The system saves the data and remains on the Fleet Profile Notes page 5. The user chooses to go Back to the list of available notes 6. This flow ends III. Special Requirements 1. None IV. Pre-Conditions 1. The user must be logged on to EDGE and have appropriate security access to create and update a Credit Review.

V. Post-Conditions

1. The customer Credit Review is established/updated with the appropriate information Section 2

Business Rules

VI. Business Rules—Fleet Risk Analysis

A. Field Rules—Description of Company & Business

1. Year Company Started
   a) This is a new field—stored with Customer General information
   b) Display-only
2. Ownership Type
   a) This is a new field—stored with Customer General information
   b) Display-only
3. Business Type
   a) This is found in Customer General
   b) Display-only
4. Ownership Tenure Started
   a) This is a new field—stored with Customer General information
   b) Display-only
5. Management Tenure Started
   a) This is a new field—stored with Customer General information
   b) Display-only
6. Company Description Notes
   a) During the initiate process, pull these comments from the previous Credit Review, if available.
   b) This field is optional, with Unlimited length comments.
   c) Notes can be modified until the Review achieves Final Approval or is Rejected.
   d) The comment fields can be cleared, if necessary.

B. Field Rules—Description of Enterprise Relationship

1. Customer Since Date
   a) From Customer General
   b) Display-only
2. Lessee name
   a) From Customer General
   b) Company Legal Name
   c) display-only
3. Guarantor Required Indicator
   a) From the Customer Credit Profile
   b) Display-only
4. Guarantor Name
   a) This is a new field—stored with Customer General information
   b) Display-only
5. Current Month Experian Score
   a) New field—From the Customer Credit Profile
   b) Display-only
6. Highest Experian Score
   a) New field—From the Customer Credit Profile
   b) Display-only
7. Lowest Experian Score
   a) New field—From the Customer Credit Profile
   b) Display-only
8. Month-to-Date Average Days to Pay
   a) New field—From the Customer Credit Profile
   b) Display-only
9. Period-to-Date Average Days to Pay
   a) New field—From the Customer Credit Profile
   b) Display-only
10. Enterprise Relationship Notes
   a) During the initiate process, pull these comments from the previous Credit Review, if available.
   b) This comment field is optional, with unlimited length comments
   c) May be modified anytime during the Credit Review process until the Final Approval or Credit Review is Rejected
   d) The comment field can be cleared, if necessary.

C. Financial Condition

1. Financial Statement Values
   a) Pulled from the most recent Financial Summary data for this customer
   b) Display Only
      (1) Financial Statement Period End
      (2) Financial Statement Type
      (3) Sales
      (4) Net Income/(Loss)
      (5) Operating Cash Flow
      (6) Working Capital
      (7) Intangibles
      (8) Total Debt to Equity
      (9) Equity
      (10) Retained Earnings
      (11) Net Equity
2. Financial Condition Notes
   a) During the initiate process, pull these comments from the previous Credit Review, if available.
   b) This comment field is optional, with unlimited length comments
   c) May be modified anytime during the Credit Review process until the Final Approval or Credit Review is Rejected
   d) The comment field can be cleared, if necessary.
3. Fleet Profile Notes
   a) During the initiate process, pull these comments from the previous Credit Review, if available.
   b) This comment field is optional, with unlimited length comments
   c) May be modified anytime during the Credit Review process until the Final Approval or Credit Review is Rejected
   d) The comment field can be cleared, if necessary.

Exhibit H

Credit Review

Functional Requirements Specification

Approvals

Table of Contents

I. Functional Requirements Specification Introduction

II. Screen Print(s)
   A. Approvals List Page
   B. Approvals Create page
   C. Approvals Update Page III. Detail Tables
   A. Field Mapping Tables
   1. Approvals List Page
   2. Approvals Create Page
   3. Approvals Update Page B. Business Validation/System Generated Notes 1. Approvals Notes Page C. Page Actions 1. Approvals List Page 2. Approvals Create page 3. Approvals Update Page Screen Action Specification I. Functional Requirements Specification Introduction Credit Review Approvals shows a list of the users who have taken an action in the selected review. Credit Review Approvals allows the user to update any notes on a user's own actions and also view other actions. Credit Review Approvals is also where the final approval action takes place. In addition to the final approval action there are review, submit for approval and reject actions. Actions are taken in no particular order. However, once a review is approved, the entire Credit Review becomes read only. Also, when the Credit Review is approved, a snap shot is taken of both the current and requested credit review values prior to updating the credit limits with the approved requested values.

II. Screen Print(s)

Figure 53:
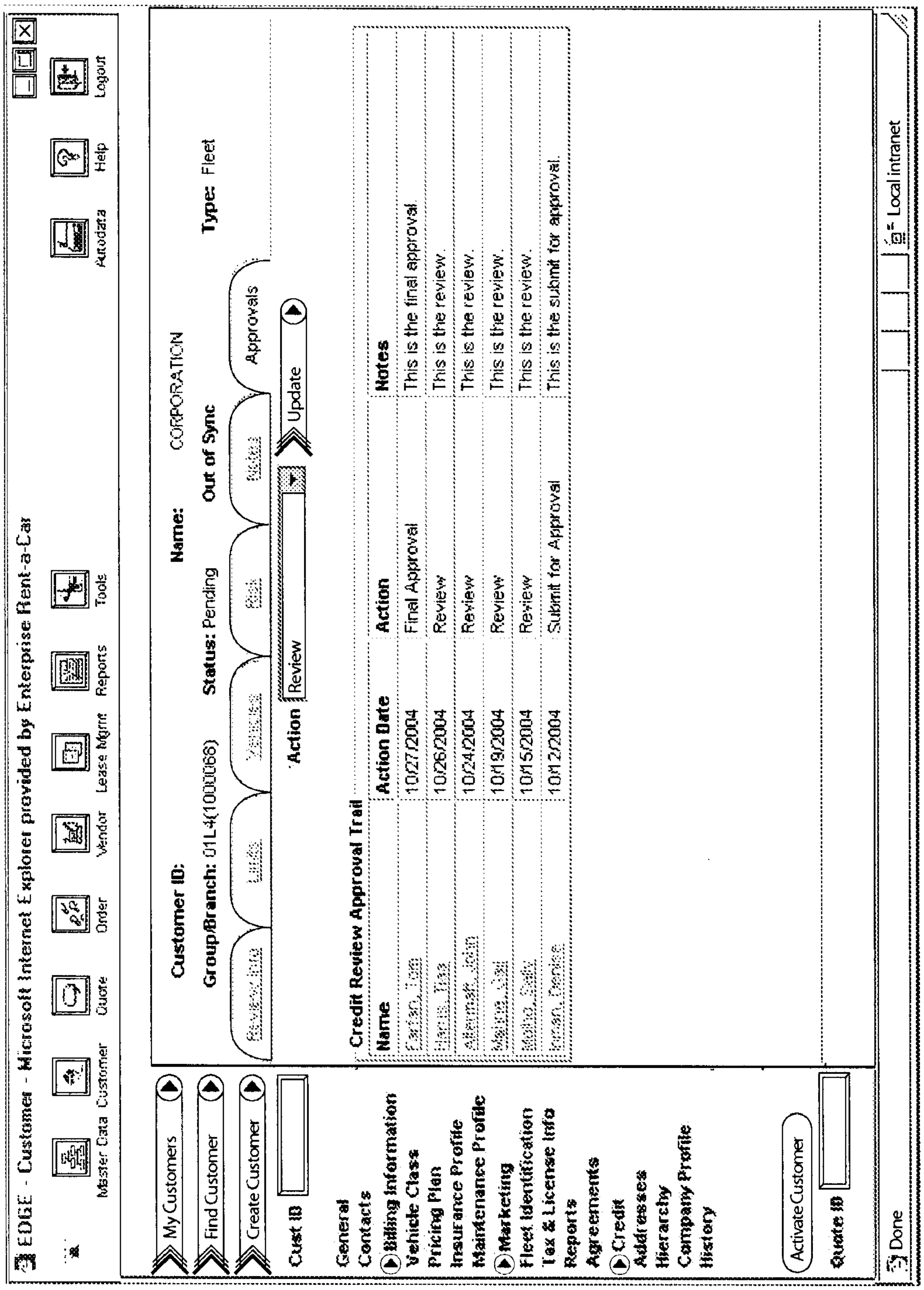
FIGS. 53-55 depict screenshots described in Exhibit H below.

A. Approvals List Page—see FIG. 53

Figure 54:
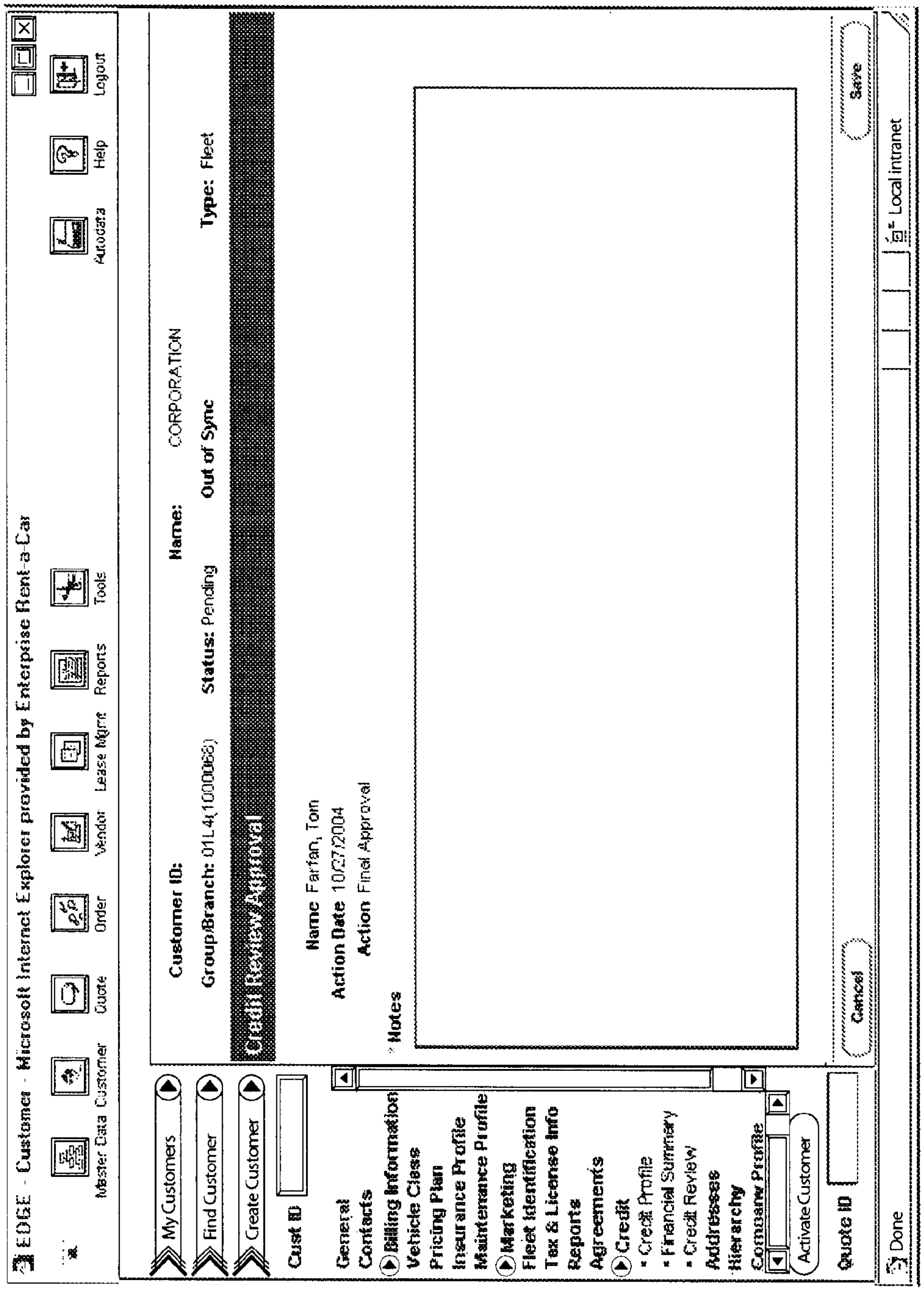

B. Approvals Create Page—see FIG. 54

Figure 55:
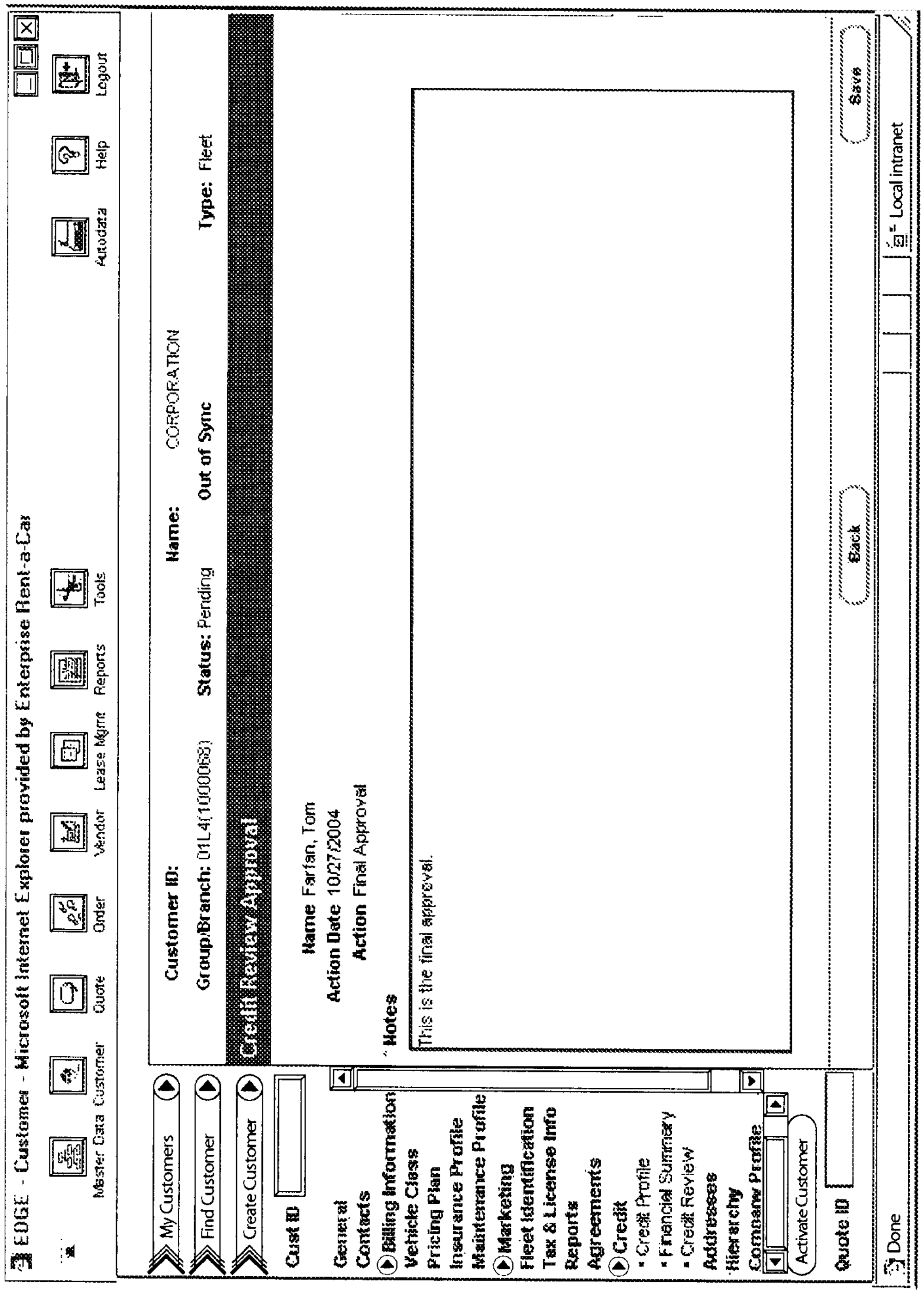

C. Approvals Update Page—see FIG. 55

III. Detail Tables

A. Field Mapping Tables

1. Approvals List Page

| Field Name | Required | Control Type | Format | Specific Rules | Data Source Details |
|---|---|---|---|---|---|
| Review Action | Yes | Drop Down | | | CreditReview-ActivityType.-findAll |
| Reviewer name | | Link | | | creditReview.-reviewActivity.-createdBy |
| Action Date | | Read Only | | | creditReview.-reviewActivity.-createTimestamp |
| Action Taken | | Read Only | | | creditReview.-reviewActivity.-activityType |
| Notes | | Read Only | | | creditReview.-reviewActivity.-activityNotes |

2. Approvals Create Page

| Field Name | Required | Control Type | Format | Specific Rules | Data Source Details |
|---|---|---|---|---|---|
| Reviewer name | | Read | | | EmployeeEntity.-currentUser |
| Action Date | | Read Only | | | DateUtils.-currentDate |
| Action Taken | | Read Only | | | creditReview.-reviewActivity.-activityType |
| Notes | Yes | Text Entry | | | creditReview.-reviewActivity.-activityNotes |

3. Approvals Update Page

| Field Name | Required | Control Type | Format | Specific Rules | Data Source Details |
|---|---|---|---|---|---|
| Reviewer name | | Read | | | creditReview.-reviewActivity.-createdBy |
| Action Date | | Read Only | | | DateUtils.-currentDate |
| Action Taken | | Read Only | | | creditReview.-reviewActivity.-activityType |
| Notes | Yes | Text Entry | | | creditReview.-reviewActivity.-activityNotes |

B. Business Validation/System Generated Notes

1. Approvals Notes Page

Credit Limits Save

| Validation | Msg Type | Property Key |
|---|---|---|
| Notes is required. | Error | |
| Submit for Approval action has already been taken for this review activity | Error | |

C. Page Actions

1. Approvals List Page

| Description | Action Type | Action-Specific Rules | Actions/Data Source |
|---|---|---|---|
| Name | Link | | Goes to Notes Page for the particular name. |

2. Approvals Create Page

| Description | Action Type | Action-Specific Rules | Actions/Data Source |
|---|---|---|---|
| Save | Button | If final approval, then make snap shot, save credit profile values. If customer on Review Hold, release the review hold. | Saves the notes & goes back to the list page. |
| Cancel | Button | | Goes back to the Approvals List Page. Doesn't give an unsaved data warning message. |

3. Approvals Update Page

| Description | Action Type | Action-Specific Rules | Actions/Data Source |
|---|---|---|---|
| Save | Button | If final approval, then make snap shot, save credit profile values. | Saves the notes & remains on the same page. |
| Back | Button | | Goes back to the Approvals List Page. Gives an unsaved |

-continued

| Description | Action Type | Action-Specific Rules | Actions/Data Source |
|---|---|---|---|
| | | | data warning message if the data has been modified but not saved. |

Customer Module
Use Case Specification
Credit Review Approvals

Table of Contents

I. View/Update the Credit Review Approvals
A. Brief Description
II. Flow of Events
A. Basic Flow—Review the Credit Review Approval Trail
B. Alternate Flow—Submit a Credit Review for Approval
C. Alternate Flow—Review a Credit Review
D. Alternate Flow—Reject a Credit Review
E. Alternate Flow—Final Approval for a Credit Review
F. Alternate Flow—Update a Credit Review Approval Record
G. Negative Requested Vehicle Limit
Special Requirements
IV. Pre-Conditions
V. Post-Conditions
VI. Business Rules—Credit Review Approval
A. Credit Review Approval Fields
B. Credit Review Snapshot
C. Credit Profile Updates Software Requirements Definition Section 1

Use Case

I. View/Update the Credit Review Approvals

A. Brief Description

The Credit Review process includes an Approval process. Multiple users can Review a Credit Review. Only one person may grant the Final Approval or Reject a Credit Review. After the Final Approval or Rejection, a Credit Review can be displayed or printed, but not updated. The Final Approval or Rejection process saves a snapshot of the credit review data so that the credit review may be displayed later.

II. Flow of Events

A. Basic Flow—Review the Credit Review Approval Trail

1. The use case begins when the user selects to review the Credit Review Approval Trail.

2. The system displays the Credit Review Approval Trail
 a) The user may view the information at this time.
  (1) Approver Name
  (2) Action Date
  (3) Action
  (4) Approver Notes 3. The user reviews the existing Approval Entries
 a) The user may choose to Submit the Credit Review for Approval
  (1) See the Alternate Flow—Submit a Credit Review for Approval
 b) The user may choose to Review the Credit Review
  (1) See the Alternate Flow—Review a Credit Review
 c) The user may choose to give Reject the Credit Review
  (1) See the Alternate Flow—Reject a Credit Review
 d) The user may choose to give Final Approval for the Credit Review
  (1) See the Alternate Flow—Final Approval for a Credit Review
 e) The user may modify an existing Credit Review Approval Record
  (1) See the Alternate Flow—Update a Credit Review Approval Record
 f) The user receives a message when the Credit Review has a Requested Vehicle Limit that is Negative
  (1) See the Alternate Flow—Negative Requested Vehicle Limit 4. The use case ends.

B. Alternate Flow—Submit a Credit Review for Approval

1. The flow begins when the user selects the Submit for Approval action

2. If there is no "Submit For Approval" record for this user, it is created. If there is already a Submit For Approval" record for the current user, they may update it.

3. The system displays the following:
 a) See the Business Rules for information about the Credit Review Approval Trail fields
 b) Approver Name
 c) Action Date
 d) Action
 e) Notes
  (1) Notes are only available for update if the user is the same as the Approver Name. Notes are display only for all other users.

4. The user must enter Notes

5. The user chooses to Save the data
 a) If the Credit Review has a Negative Requested Vehicle Limit
  (1) See the Alternate Flow—Negative Requested Vehicle Limit
 b) The user may also choose to Cancel the action
  (1) Nothing is saved, the system returns to the Credit Review Approval Trail
  (2) This flow ends.

6. The system changes the status of the Credit Review to "Pending Approval"
 a) This must occur before the "Review" Action can be taken by any user.

7. The system saves the data and returns to the Credit Review Approval Trail

8. This flow ends

C. Alternate Flow—Review a Credit Review

1. The flow begins when the user selects the Review action

2. If the Credit Review status is not Pending Approval, the Review Action is invalid. (Status becomes Pending Approval when a user performs "Submit For Approval" Action)
 a) The system displays an error message
 b) This flow ends.

3. If there is no "Review" record for this user, it is created. If there is already a "Review" record for the current user, they may update it.

4. The system displays the following:
   a) See the Business Rules for information about the Credit Review Approval Trail fields
   b) Approver Name
   c) Action Date
   d) Action
   e) Notes
      (1) Notes are only available for update if the user is the same as the Approver Name. Notes are display only for all other users.

5. The user must enter Notes

6. The user chooses to save the data
   a) The system verifies that the user has the appropriate Credit Approval Level to Review the Credit Review (See Business Rules)
      (1) If the user is not cleared to Review the Credit Review, the system displays a message and this flow ends
   b) If the Credit Review has a Negative Requested Vehicle Limit
      (1) See the Alternate Flow—Negative Requested Vehicle Limit
   c) The user may also choose to Cancel the action
      (1) Nothing is saved, the system returns to the Credit Review Approval Trail
      (2) This flow ends 7. The system changes the status of the Credit Review to Reviewed 8. The system saves the Approval data and returns to the Credit Review Approval Trail 9. This flow ends D. Alternate Flow—Reject a Credit Review 1. The flow begins when the user selects the Reject Action 2. The system displays the following:
   a) See the Business Rules for information about the Credit Review Approval Trail fields
   b) Approver Name
   c) Action Date
   d) Action
   e) Notes 3. The user must enter Notes 4. The user chooses to save the data
   a) The user may also choose to Cancel the action (instead of Save)
      (1) Nothing is saved, the system returns to the Credit Review Approval Trail
      (2) This flow ends 5. The system asks for confirmation of the Reject Action 6. The user confirms the Reject Action
   a) The user may Cancel the confirmation and the Credit Review is not Rejected.
   b) The flow ends 7. The system changes the status of the Credit Review is not Rejected 8. The system saves the Approval Data 9. The system takes a "Snapshot" of all of the Credit Review data for future display.
   a) See the Business Rules for information about the Credit Review Snapshot 10. No more updates will be allowed to the Credit Review 11. This flow ends E. Alternate Flow—Final Approval for a Credit Review 1. The flow begins when the user selects the Final Approval Action 2. The system displays the following:
   a) See the Business Rules for information about the Credit Review Approval Trail fields
   b) Approver Name
   c) Action Date
   d) Action
   e) Notes 3. The user must enter Notes and then chooses to save the data
   a) If the Credit Review has a Negative Requested Vehicle Limit
      (1) See the Alternate Flow—Negative Requested Vehicle Limit
      (2) The Final Approval STOPS HERE until the Negative Requested Vehicle Limit is corrected.
         (a) This flow ends
   b) The user may also choose to Cancel the action (instead of Save)
      (1) Nothing is saved, the system returns to the Credit Review Approval Trail
      (2) This flow ends 4. The system asks for confirmation of the Final Approval Action 5. The user confirms the Final Approval Action
   a) The user may instead, Cancel the confirmation and the Credit Review is not Approved.
      (1) This flow ends 6. The system changes the status of the Credit Review to "Approved"

7. The system saves the Approval Data

8. The system takes a "Snapshot" of all of the Credit Review data for future display.
   a) See the Business Rules for information about the Credit Review Snapshot 9. The system updates the Customer's Credit Profile with the "Requested Amounts"
   a) See the Business Rules for information about the Credit Profile Updates
   b) The system writes entries in the Comments for Credit Profile Updates
   c) After the Credit Profile is updated, the system may perform a Credit Check for this Customer's outstanding quotes
      (1) If the Credit Limit Amount, or Vehicle Limit, or Amount per Vehicle Limit, or Maximum AME per Vehicle Limit are updated,
         (a) The system performs the credit check on all Pending Approval or Pending Re-Approval Quotes for the Customer.
         (b) If the quote passes the credit check, the system will approve the quote.
            (i) If the quote does not pass the credit check, the system will not change the quote status.

10. The System removes the "Review Hold" for the Customer (if one exists)
   a) Generate a Release for the Order Hold in the Customer Credit Profile
   b) Remove the "Review Hold" status overlay for this customer 11. No more updates will be allowed to the Credit Review 12. This flow ends F. Alternate Flow Update a Credit Review Approval Record 1. The flow begins when the user selects an existing Approval Record for Update 2. The system displays the following:
   a) See the Business Rules for information about the Credit Review Approval Trail fields
   b) Approver Name
   c) Action Date
   d) Action
   e) Notes
      (1) Notes are only available for update if the user is the same as the Approver Name Notes are display only for all other users.

3. The user may modify the Notes for the selected Credit Approval Record
   a) Some Notes must be entered in order to save the data 4. The user chooses to save the data
   a) If the Credit Review has a Negative Requested Vehicle Limit
      (1) See the Alternate Flow—Negative Requested Vehicle Limit
   b) The user may also choose to Cancel the action (instead of Save)
      (1) Nothing is saved, the system returns to the Credit Review Approval Trail
      (2) This flow ends 5. The system saves the data and returns to the Credit Review Approval Trail 6. This flow ends G. Negative Requested Vehicle Limit 1. The Requested Vehicle Limit is a calculated number from the Risk page 2. When this value is Negative, display a message
   a) "The requested vehicle limit is negative. You must either change the forecasted unit activity in the Marketing screen or the number of units in the Risk tab to approve this credit review."

3. This message is NOT displayed for the Reject action

4. This message is displayed for the following actions, but the action IS ALLOWED to complete
   a) Submit for Approval
   b) Review 5. this message is displayed for the following action and the action IS NOT ALLOWED to complete
   a) Final Approval 6. This flow ends III. Special Requirements 1. None IV. Pre-Conditions 1. The user must be logged on to EDGE and have appropriate security access to perform actions on a Credit Review.

V. Post-Conditions

1. The Customer's Credit Review has the appropriate status based on the actions taken.

2. The Credit Review "snapshot" is taken for Closed Reviews (Status is Approved or Rejected)
   a) When closed reviews are accessed for later viewing, it is the snapshot data which is displayed, instead of using current data and performing calculations.

3. The Credit Profile is updated when a Credit Review receives Final Approval.

4. System generated Order Hold (Review Hold) is Released

Section 2

Business Rules

VI. Business Rules—Credit Review Approval

A. Credit Review Approval Fields

1. Approver Name
   a) Defaults to the current user.
   b) May not be changed

2. Action Date
   a) Defaults to the current system date.
   b) May not be changed 3. Action
   a) Submit for Approval
   b) Review
      (1) User must have a Credit Approval Level greater than zero to be allowed to Review a Credit Review
      (2) Multiple users may Review the Credit Review prior to the Final Approval
      (3) The Review Action may not be performed until after the Credit Review has had the Submit for Approval Action performed.
      (4) Each user may only perform ONE Review Action per Credit Review
   c) Final Approval
      (1) Requested Vehicle Limit may NOT be Negative
      (2) User must have a Credit Approval Limit that meets or exceeds the Requested Credit Limits to be allowed to choose Final Approval
      (3) Only one Final Approval may be given for a Credit Review
      (4) No changes may be made to the Credit Review after Final Approval
   d) Reject
      (1) User must have a Credit Approval Level greater than zero to be allowed to Reject a Credit Review
      (2) No changes may be made to the Credit Review after a Reject Action
   e) The following table describes the Actions that are available for each State, and shows the Resulting State changes from each Action taken.

| Beginning State | Available Action(s) | Resulting State |
|---|---|---|
| *New—No State | Create (Credit Review History List Page) | Working |
| Working | Submit For Approval | Pending Approval |
| | Reject | Rejected |
| | Final Approval | Approved |

-continued

| Beginning State | Available Action(s) | Resulting State |
|---|---|---|
| Pending Approval | Review | Reviewed |
| | Reject | Rejected |
| | Final Approval | Approved |
| Reviewed | Review | Reviewed |
| | Reject | Rejected |
| | Final Approval | Approved |
| Rejected | No Actions Available | Rejected |
| Approved | No Actions Available | Approved |

B. Credit Review Snapshot

At the time of Final Approval or if the Credit Review is Rejected, Capture all of the Credit Review data needed to display the Credit Review (for historical comparisons). The "Current" information is captured as well as the "Requested" so that the Credit Review can be viewed and printed exactly as it was at the time it was closed. For Final Approval, this is done before the Credit Profile Updates.

1. General Information
  a) Current Review Date
  b) Review Created By
  c) Next Credit Review Date
  d) Credit Review Type
  e) Credit Review Notes 2. Credit Limits
  Capture Both Current and Requested
  a) Credit Limit Amount
  b) Vehicle Limit
  c) Amount per Vehicle Limit
  d) Maximum AME Amount per Vehicle
  e) Maximum Maintenance Management Amount
  f) Maximum Risk Management amount 3. Credit Conditions
  Capture Both Current and Requested
  a) Credit Rating
  b) Required Deposit Amount
  c) Required Deposit Percentage
  d) Required Capitalized Price Reduction Amount
  e) Required Capitalized Price Reduction Percentage
  f) Number of Months Rent Required
  g) Letter of Credit Indicator
  h) Credit Bank Name
  i) Direct Debit Indicator
  j) License, Tax, & Title Billed Indicator
  k) Must Roll Equity Indicator 4. Standard Lease Term—Minimum Depreciation
  Capture Both Current and Requested
  a) 12 month minimum percentage
  b) 24 month minimum percentage
  c) 36 month minimum percentage
  d) 48 month minimum percentage
  e) 60 month minimum percentage 5. Interest Rate Options
  a) Apply Floor Indicator
  b) Floor Value %

6. Vehicle Use and Type
  Capture all Current information (For each Vehicle Type/Lease Type/Term combination)
  a) Vehicle Class
  b) Percentage of Total Potential Units
  c) Potential Units
  d) Front-End Markup Amount
  e) Estimated Delivered Price
  f) Estimated AME Price/Capitalized
  g) Required Capitalized Price Reduction Amount
  h) Lease Type
  i) Lease Term
  j) Annual Mileage
  k) Depreciation Percentage
  l) Total Gross per Unit Amount
  m) Maximum Risk per Unit Amount
  n) Maximum Risk month number
  o) Risk per Unit Amount—Break Even Month Number 7. Analysis of Fleet Risk Snapshot the calculated values (or the User "Edited" values)
  a) Number of Units
    (1) Current Fleet—Active Only
    (2) Units to Be Delivered
    (3) Units to Be Deleted
    (4) Requested Vehicle Limit
  b) Total Risk or Equity Amount
    (1) Current Fleet—Active Only
    (2) Units to Be Delivered
    (3) Units to Be Deleted
    (4) Requested Vehicle Limit
  c) Risk or Equity Amount per Unit
    (1) Current Fleet—Active Only
    (2) Units to Be Delivered
    (3) Units to Be Deleted
    (4) Requested Vehicle Limit 8. Pricing Plan
  a) Capture the Pricing Plan Information for the following:
    (1) Equity Fixed (Ordered & In Stock)
    (2) Net (Ordered & In-Stock)
  b) Pricing Plan information to capture:
    (1) Invoice Adjustment $
    (2) Invoice Adjustment %
    (3) Management Fee $
    (4) Management Fee %
    (5) Interest Adjustment (+ or −)
    (6) Service Charge $
    (7) Service Charge %

9. Credit Review Notes
  a) Description of Company & Business Notes
    (1) Year Company Started
    (2) Ownership Type
    (3) Business Type
    (4) Ownership Tenure Started
    (5) Management Tenure Started
    (6) Company Description Notes
  b) Description of Enterprise Relationship Notes
    (1) Customer Since Date
    (2) Lessee Name
    (3) Guarantor Indicator
    (4) Guarantor Name
    (5) Current Month Experian Score
    (6) Highest Experian Score
    (7) Lowest Experian Score
    (8) Month-to-Date Average Days to Pay
    (9) Period-to-Date Average Days to Pay
    (10) Enterprise Relationship Notes
  c) Financial Condition
    (1) Financial Statement Period End
    (2) Financial Statement Type
    (3) Sales (4) Net Income/(Loss)
(5) Operating Cash Flow
(6) Working Capital
(7) Intangibles
(8) Total Debt to Equity
(9) Equity
(10) Retained Earnings
(11) Net Equity
(12) Financial Condition Notes
d) Fleet Profile Notes 10. Credit Review Approval Trail
a) Approver Name
b) Action Date
c) Action
d) Notes
C. Credit Profile Updates 1. After a Credit Review has achieved Final Approval, the Customer's Credit Profile will be updated. The rules for allowing updates to the Customer's Credit Profile can be found in the Use Case—Maintain Credit Profile.

2. Credit Limits
Replace Current with Requested Values
a) Credit Limit Amount
b) Vehicle Limit
c) Amount per Vehicle Limit
d) Maximum AME Amount per Vehicle
e) Maximum Maintenance Management Amount
f) Maximum Risk Management amount 3. Credit Conditions
Replace Current with Requested Values
a) Credit Rating
b) Required Deposit Amount
c) Required Deposit Percentage
d) Required Capitalized Price Reduction Amount
e) Required Capitalized Price Reduction Percentage
f) Number of Months Rent Required
g) Letter of Credit Indicator
h) Credit Bank Name
i) Direct Debit Indicator
j) License, Tax, & Title Billed Indicator
k) Must Roll Equity Indicator 4. Standard Lease Term—Minimum Depreciation
Replace Current with Requested Values
a) 12 month minimum percentage
b) 24 month minimum percentage
c) 36 month minimum percentage
d) 48 month minimum percentage
e) 60 month minimum percentage 5. Interest Rate Options
a) Apply Floor Indicator
b) Floor Value %

What is claimed is:

1. A system configured for managing a plurality of credit profiles for a plurality of customers by a user, each of said customers having a fleet of leased vehicles, the system comprising:

a server for communication with a client computer, the client computer for use by a user; and, a database in communication with the server, the database being configured to store a plurality of customer credit profiles, each credit profile comprising a credit limit, a vehicle limit, a per vehicle credit limit that represents a maximum amount of credit authorized for any given vehicle in the customer's fleet, a per vehicle aftermarket equipment (AME) credit limit that represents a maximum amount of credit authorized for AME for any given vehicle in the customer's fleet, a maximum maintenance management amount and a maximum risk management amount;

wherein the server is configured to (1) provide a plurality of graphical user interfaces (GUIs) for display on the client computer, at least one of the GUIs being configured to (i) display a selected customer credit profile's credit limit, (ii) display the selected customer credit profile's vehicle limit, (iii) display the selected customer credit profile's per vehicle credit limit, (iv) display the selected customer credit profile's per vehicle AME credit limit, (v) display the selected customer credit profile's maximum maintenance management amount, (vi) display the selected customer credit profile's maximum risk management amount, (vii) display a field for user entry of a proposed change to the selected customer credit profile's credit limit, (viii) display a field for user entry of a proposed change to the selected customer credit profile's vehicle limit, (ix) display a field for user entry of a proposed change to the selected customer credit profile's per vehicle credit limit, (x) display a field for user entry of a proposed change to the selected customer credit profile's AME credit limit, (xi) display a field for user entry of a proposed change to the selected customer credit profile's maximum maintenance management amount, (xii) display a field for user entry of a proposed change to the selected customer credit profile's maximum risk management amount, and (xiii) receive data from the client computer in response to user input, the data corresponding to a request for a proposed change to one of said customer's credit profiles based on user entry in at least one of the fields, at least one of the GUIs being configured to display, in response to receiving the data corresponding to the proposed change request, at least a portion of the selected customer's credit profile, and at least one of the GUIs being configured to receive an action input from the client computer in response to user input, the action input identifying an action to take on the proposed change request, and (2) update the selected customer's credit profile in accordance with the received action input.

2. The system of claim 1 wherein the user entry fields, the selected customer credit profile's credit limit, vehicle limit, per vehicle credit limit, per vehicle AME credit limit, maximum maintenance management amount and maximum risk management amount are all displayed on the same GUI.

3. The system of claim 1 wherein the customer credit profile further comprises a plurality of lease term depreciation percentages applicable to a plurality of lease months, and wherein at least one of the GUIs is configured to display the customer credit profile's current lease term depreciation percentages and a plurality of fields for user entry of a plurality of requested lease term depreciation percentages for the customer credit profile.

4. The system of claim 1 wherein the customer credit profile further comprises a credit rating that represents a level of scrutiny that will applied to credit checks applied to a leased vehicle order by the customer, and wherein at least one of the GUIs is configured to display the customer credit profile's credit rating, and a field for user entry of a requested credit rating for the customer credit profile.

5. The system of claim 1 wherein at least one of the GUIs is configured with a plurality of fields for user entry of lease data by vehicle class for leased vehicles in a customer's planned vehicle fleet.

6. The system of claim 1 wherein at least one of the GUIs is configured to display a calculated risk amount corresponding to a planned leased vehicle fleet for the customer.

7. The system of claim 1 wherein at least one of the GUIs is configured to display a calculated risk amount corresponding to current leased vehicles in the customer's leased vehicle fleet and a calculated risk amount corresponding to leased vehicles that are planned for delivery to the customer's leased vehicle fleet.

8. The system of claim 1 wherein at least one of the GUIs is configured to display a calculated risk amount corresponding to current leased vehicles in the customer's leased vehicle fleet and a calculated risk amount corresponding to leased vehicles that are planned for delivery to the customer's leased vehicle fleet, and wherein that at least one GUI is further configured to allow the user to modify at least one of the displayed risk amounts.

9. The system of claim 1 wherein at least one of the GUIs allows the user to initiate a credit review for a customer's credit profile and specify a type of credit review that is to be undertaken.

10. The system of claim 9 wherein the credit review type comprises a credit review for at least one selected from the group consisting of a requested increase in credit limit and a requested increase in vehicle limit.

11. The system of claim 9 wherein the customer credit profile further comprises a credit rating that represents a level of scrutiny that will apply to credit checks applied to a leased vehicle order by the customer, and wherein the credit review type comprises a credit review for a requested change in credit rating.

12. The system of claim 1 wherein at least one of the GUIs allows the user to schedule a future credit review for the customer's credit profile.

13. The system of claim 1 wherein at least a plurality of credit profiles are applicable to a plurality of master customers, each master customer comprising at least one subcustomer, each subcustomer also having its own leased vehicle fleet, wherein the database is not configured to store credit profiles that are unique to subcustomers.

14. The system of claim 1 wherein the customer credit profile further comprises financial information for the customer and an identifier associated with that financial information that represents a level of scrutiny applied to that financial information by an external auditor, and wherein at least one of the GUIs is configured to display the credit profile's financial information and the identifier associated therewith.

15. A method for user management of a plurality of customer credit profiles, at least one of said customers having a fleet of leased vehicles, the method comprising:

providing at least one GUI through which a user can selectively choose to propose a change for a credit profile of a customer, the credit profile being stored in a database and comprising a credit limit, a vehicle limit, and at least one member selected from the group consisting of a per vehicle credit limit that represents a maximum amount of credit authorized for any given vehicle in the customer's fleet, a per vehicle aftermarket equipment (AME) credit limit that represents a maximum amount of credit authorized for AME for any given vehicle in the customer's fleet, a maximum maintenance management amount, and a maximum risk management amount;

receiving input through that GUI to propose a change to at least one of the group consisting of the credit limit, the vehicle limit, and at least one member selected from the group consisting of the per vehicle credit limit, the per vehicle AME credit limit, the maximum maintenance management amount, and the maximum risk management amount;

providing at least one GUI through which a user can submit a request to review the proposed change to the customer's credit profile;

providing at least one GUI through which a user can view data stored in the customer's credit profile in response to a submitted request to review the proposed change;

providing at least one GUI through which a user can provide input corresponding to an approval or rejection of the proposed change; and, updating the customer's stored credit profile in accordance with the approval or rejection input; and wherein the method steps are performed by at least one processor.

16. The method of claim 15 wherein the at least one processor comprises a server in communication with a plurality of client computers over a network, wherein the server is configured to provide the GUIs over the network to the client computers for display thereon.

17. The method of claim 16 further comprising:

providing at least one GUI through which a user can view the customer credit profile's current credit limit and current vehicle limit.

18. The method of claim 16 wherein the customer credit profile further comprises a plurality of lease term depreciation percentages applicable to a plurality of lease months, the method further comprising:

providing at least one GUI through which a user can request a change to at least one of the credit profile's lease term depreciation percentages.

19. The method of claim 16 wherein the customer credit profile further comprises a credit rating that represents a level of scrutiny that will be applied to a credit check applied to a leased vehicle order by the customer, the method further comprising:

providing at least one GUI through which a user can request a change to the credit profile's credit rating.

20. The method of claim 16 further comprising:

providing at least one GUI through which a user can enter lease data broken down by vehicle class for leased vehicles in a customer's planned vehicle fleet, the entered lease data for display to a user when that user is evaluating the credit profile change request.

21. The method of claim 16 further comprising:

providing at least one GUI through which a user can specify a type of credit review to be performed on a customer's credit profile.

22. The method of claim 16 further comprising:

providing at least one GUI through which a user can view a calculated risk amount corresponding to current leased vehicles in the customer's leased vehicle fleet and a calculated risk amount corresponding to leased vehicles that are planned for delivery to the customer's leased vehicle fleet, and wherein that at least one GUI is further configured to allow the user to modify at least one of the displayed risk amounts.

23. The method of claim 16 further comprising:

providing at least one GUI through which a user provide input corresponding to scheduling a future credit review for the customer's credit profile; and scheduling a future credit review for the customer's credit profile in response to scheduling input received from the user.

24. The method of claim 16 further comprising storing a master customer credit profile in the database, the master customer credit profile serving as the credit profile for a master customer and each subcustomer of the master customer.

25. The method of claim 16 wherein the customer credit profile further comprises financial information for the customer and an identifier associated with that financial information that represents a level of scrutiny applied to that financial information by an external auditor, the method further comprising:

providing at least one GUI that is configured to display the credit profile's financial information and the identifier associated therewith.

26. The method of claim 16 further comprising the client computers.

27. A method for user management of credit for a plurality of fleet customers, each fleet customer having a fleet of leased vehicles, the method comprising:

providing at least one GUI through which a user can selectively choose to propose a change for a customer's credit information, the credit information being stored in a database and comprising financial data about the customer, an identifier associated with the financial data that corresponds to a level of scrutiny applied to the financial data, a credit limit, a vehicle limit, and at least one member selected from the group consisting of a per vehicle credit limit that represents a maximum amount of credit authorized for any given vehicle in the customer's fleet, a per vehicle aftermarket equipment (AME) credit limit that represents a maximum amount of credit authorized for AME for any given vehicle in the customer's fleet, a maximum maintenance management amount, and a maximum risk management amount;

receiving input through that GUI to propose a change to at least one of the group consisting of the credit limit, the vehicle limit, and at least one member selected from the group consisting of the per vehicle credit limit, the per vehicle AME credit limit, the maximum maintenance management amount, and the maximum risk management amount;

providing at least one GUI through which a user can submit a request to review the proposed change to the customer's credit information;

providing at least one GUI through which a user can view the customer credit information's financial data and the identifier associated therewith;

providing at least one GUI through which a user can provide input corresponding to an approval or rejection of the proposed change; and updating the customer's stored credit information in the database in accordance with the user's approval or rejection input; and wherein the method steps are performed by at least one processor.

28. The method of claim 27 wherein the at least one processor comprises a server in communication with a plurality of client computers over a network, wherein the server is configured to provide the GUIs over the network to the client computers for display thereon.

29. The method of claim 28 wherein the identifier corresponds to a level of scrutiny applied to the financial data by an external party.

30. The method of claim 29 wherein a plurality of different identifiers are available for association with each customer's financial information, the plurality of identifiers comprising an identifier that indicates the financial data has been reviewed but not fully audited by an external auditor and at least one identifier that indicates the financial data has not been reviewed by an external auditor.

31. The method of claim 30 wherein the plurality of identifiers further comprise an identifier that indicates the financial data is a tax return.

32. The method of claim 28 wherein each of a plurality of users has an assigned approval limit, the method further comprising:

assigning a credit information review for a credit information change request to a user at least partially on the basis of the user's assigned approval limit.

33. The method of claim 32 wherein the assigned approval limit comprises at least one selected from the group consisting of a per customer maximum vehicle limit and a per customer maximum credit limit.

34. The method of claim 28 further comprising the client computers.

35. A system comprising:

a server configured to (1) provide a plurality of GUIs for display on any of a plurality of client computers, the plurality of GUIs being configured to interface a plurality of users of the client computers with vehicle fleet leasing credit management software, (2) accept a plurality of commands from the GUIs, and (3) execute the vehicle fleet leasing credit management software in response to the accepted commands, the vehicle fleet leasing credit management software being configured to provide integrated management of a plurality of credit profiles by the users through the GUIs, each credit profile corresponding to a customer having a fleet of leased vehicles, the integrated management comprising:

(a) the vehicle fleet leasing credit management software being configured to respond to a request by at least one of the users to propose a change to a customer's credit profile to accommodate a potential change to that customer's vehicle fleet by (i) displaying data within that customer's credit profile on at least one of the client computers through at least one of the GUIs, the displayed data comprising a credit limit corresponding to a maximum amount of monetary credit that has been authorized for extension to that customer and a leased vehicle limit corresponding to a maximum number of leased vehicles that are authorized for that customer's leased vehicle fleet, (ii) providing a field through at least one of the GUIs for user entry to enter a proposed new value for the credit limit, (iii) providing a field through at least one of the GUIs for user entry to enter a proposed new value for the leased vehicle limit, (iv) accepting a user entry through at least one of the fields to thereby define a proposed new credit profile for that customer, and (v) submitting the proposed new credit profile for approval; and (b) the vehicle fleet leasing credit management software being further configured to permit at least one of the users to conduct a credit review corresponding to the proposed new credit profile by (i) providing at least one GUI for access by at least one of the users that displays a current state and a projected state for that customer's vehicle fleet, (ii) providing at least one GUI for access by at least one of the users that provides an analysis of a credit risk for that customer based on a risk analysis technique that is systematically uniform for a lessor of the vehicle fleet with respect to the users of the vehicle fleet leasing credit management software, (iii) providing at least one GUI for access by at least one of the users that provides a view of financial information for that customer that is systematically uniform for the lessor with respect to the users of the vehicle fleet leasing credit management software, and (iv) providing at least one GUI for access by at least one of the users that permits that at least one user to approve the proposed new credit profile.

36. The system of claim 35 wherein the integrated management further comprises the vehicle fleet leasing credit management software being further configured to respond to a request by at least one the users to propose a change to a customer's credit profile to accommodate a potential change to that customer's vehicle fleet by (i) displaying data within that customer's credit profile on at least one of the client computers through at least one of the GUIs, the displayed data further comprising a per vehicle credit limit corresponding to a maximum amount of monetary credit that has been authorized for extension to that customer for any given vehicle in that customer's fleet, (ii) providing a field through at least one of the GUIs for user entry to enter a proposed new value for the per vehicle credit limit, (iii) accepting a user entry through the per vehicle credit limit field to thereby define a proposed new credit profile for that customer, and (iv) submitting the proposed new credit profile for approval.

37. The system of claim 35 wherein the integrated management further comprises the vehicle fleet leasing credit management software being further configured to respond to a request by at least one the users to propose a change to a customer's credit profile to accommodate a potential change to that customer's vehicle fleet by (i) displaying data within that customer's credit profile on at least one of the client computers through at least one of the GUIs, the displayed data further comprising a per vehicle aftermarket equipment (AME) credit limit corresponding to a maximum amount of monetary credit that has been authorized for extension to that customer for AME for any given vehicle in that customer's fleet, (ii) providing a field through at least one of the GUIs for user entry to enter a proposed new value for the per vehicle AME credit limit, (iii) accepting a user entry through the per vehicle AME credit limit field to thereby define a proposed new credit profile for that customer, and (iv) submitting the proposed new credit profile for approval.

38. The system of claim 35 wherein the integrated management further comprises the vehicle fleet leasing credit management software being configured to (i) permit at least one of the users to place a credit hold on a customer through at least one of the GUIs, and (ii) permit at least one of the users to release a credit hold on a customer through at least one of the GUIs.

39. The system of claim 35 wherein the integrated management further comprises the vehicle fleet leasing credit management software being configured to (i) permit at least one of the users to place an order hold on a customer through at least one of the GUIs, and (ii) permit at least one of the users to release an order hold on a customer through at least one of the GUIs.

40. The system of claim 35 wherein the integrated management further comprises the vehicle fleet leasing credit management software being further configured to display an indicator as part of the standardized financial information view, wherein the indicator comprises any of a plurality of indicators which indicate a level of scrutiny applied to the customer's financial information.

41. The system of claim 40 wherein the plurality of indicators comprise:

an audited indicator for financial information which was audited by a third party auditor;

a reviewed indicator for financial information which was reviewed by a third party auditor but not fully audited;

a compiled indicator for financial information which was compiled by a third party auditor but not fully reviewed or audited;

an internal indicator for financial information created internally by a customer and not subject to any third party auditing; and a tax return indicator for financial information which represents a customer's tax return.

42. The system of claim 35 wherein the integrated management further comprises the vehicle fleet leasing credit management software being further configured to respond to an approval of the proposed new credit profile by (i) updating that customer's credit profile with the approved new credit profile, and (ii) automatically performing a credit check for that customer against the updated credit profile and any outstanding quotes or orders for that customer's vehicle fleet.

43. The system of claim 35 further comprising a database in communication with the server, the database being configured to store data for the credit profiles and customer's vehicle fleets.

44. A method comprising:

providing a plurality of GUIs for display on any of a plurality of client computers, the plurality of GUIs being configured to interface a plurality of users of the client computers with vehicle fleet leasing credit management software;

accepting a plurality of commands from the GUIs; and executing the vehicle fleet leasing credit management software in response to the accepted commands, the vehicle fleet leasing credit management software being configured to provide integrated management of a plurality of credit profiles by the users through the GUIs, each credit profile corresponding to a customer having a fleet of leased vehicles, wherein the executing step comprises (1) responding to a request by at least one of the users to propose a change to a customer's credit profile to accommodate a potential change to that customer's vehicle fleet by (i) displaying data within that customer's credit profile on at least one of the client computers through at least one of the GUIs, the displayed data comprising a credit limit corresponding to a maximum amount of monetary credit that has been authorized for extension to that customer and a leased vehicle limit corresponding to a maximum number of leased vehicles that are authorized for that customer's leased vehicle fleet, (ii) providing a field through at least one of the GUIs for user entry to enter a proposed new value for the credit limit, (iii) providing a field through at least one of the GUIs for user entry to enter a proposed new value for the leased vehicle limit, (iv) accepting a user entry through at least one of the fields to thereby define a proposed new credit profile for that customer, and (v) submitting the proposed new credit profile for approval, and (2) permitting at least one of the users to conduct a credit review corresponding to the proposed new credit profile by (i) providing at least one GUI for access by at least one of the users that displays a current state and a projected state for that customer's vehicle fleet, (ii) providing at least one GUI for access by at least one of the users that provides an analysis of a credit risk for that customer based on a risk analysis technique that is systematically uniform for a lessor of the vehicle fleet with respect to the users of the vehicle fleet leasing credit management software, (iii) providing at least one GUI for access by at least one of the users that provides a view of financial information for that customer that is systematically uniform for the lessor with respect to the users of the vehicle fleet leasing credit management software, and (iv) providing at least one GUI for access by at least one of the users that permits that at least one user to approve the proposed new credit profile.

45. The method of claim 44 wherein the executing step further comprises responding to a request by at least one the users to propose a change to a customer's credit profile to accommodate a potential change to that customer's vehicle fleet by (i) displaying data within that customer's credit profile on at least one of the client computers through at least one of the GUIs, the displayed data further comprising a per vehicle credit limit corresponding to a maximum amount of monetary credit that has been authorized for extension to that customer for any given vehicle in that customer's fleet, (ii) providing a field through at least one of the GUIs for user entry to enter a proposed new value for the per vehicle credit limit, (iii) accepting a user entry through the per vehicle credit limit field to thereby define a proposed new credit profile for that customer, and (iv) submitting the proposed new credit profile for approval.

46. The method of claim 44 wherein the executing step further comprises responding to a request by at least one the users to propose a change to a customer's credit profile to accommodate a potential change to that customer's vehicle fleet by (i) displaying data within that customer's credit profile on at least one of the client computers through at least one of the GUIs, the displayed data further comprising a per vehicle aftermarket equipment (AME) credit limit corresponding to a maximum amount of monetary credit that has been authorized for extension to that customer for AME for any given vehicle in that customer's fleet, (ii) providing a field through at least one of the GUIs for user entry to enter a proposed new value for the per vehicle AME credit limit, (iii) accepting a user entry through the per vehicle AME credit limit field to thereby define a proposed new credit profile for that customer, and (iv) submitting the proposed new credit profile for approval.

47. The method of claim 44 wherein the executing step further comprises (1) permitting at least one of the users to place a credit hold on a customer through at least one of the GUIs, and (2) permitting at least one of the users to release a credit hold on a customer through at least one of the GUIs.

48. The method of claim 44 wherein the executing step further comprises (1) permitting at least one of the users to place an order hold on a customer through at least one of the GUIs, and (2) permitting at least one of the users to release an order hold on a customer through at least one of the GUIs.

49. The method of claim 44 wherein the executing step further comprises displaying an indicator as part of the standardized financial information view, wherein the indicator comprises any of a plurality of indicators which indicate a level of scrutiny applied to the customer's financial information.

50. The method of claim 49 wherein the plurality of indicators comprise:

an audited indicator for financial information which was audited by a third party auditor;

a reviewed indicator for financial information which was reviewed by a third party auditor but not fully audited;

a compiled indicator for financial information which was compiled by a third party auditor but not fully reviewed or audited;

an internal indicator for financial information created internally by a customer and not subject to any third party auditing; and a tax return indicator for financial information which represents a customer's tax return.

51. The method of claim 44 wherein the executing step further comprises responding to an approval of the proposed new credit profile by (1) updating that customer's credit profile with the approved new credit profile, and (2) automatically performing a credit check for that customer against the updated credit profile and any outstanding quotes or orders for that customer's vehicle fleet.

52. The method of claim 44 wherein the software limits access to the plurality of GUIs to authorized users wherein the authorized users comprise employees of a fleet management company.

* * * * *